US012755699B2

(12) United States Patent
Ishii et al.

(10) Patent No.: US 12,755,699 B2
(45) Date of Patent: Oct. 6, 2026

(54) DISPLAY DEVICE

(71) Applicant: Japan Display Inc., Tokyo (JP)

(72) Inventors: Tatsuya Ishii, Tokyo (JP); Kenji Harada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/233,880

(22) Filed: Jun. 10, 2025

(65) Prior Publication Data

US 2026/0016918 A1 Jan. 15, 2026

(30) Foreign Application Priority Data

Jul. 12, 2024 (JP) ................................ 2024-112751

(51) Int. Cl.
*G06F 3/044* (2006.01)
*G09G 3/32* (2016.01)
*G09G 3/3233* (2016.01)

(52) U.S. Cl.
CPC ............. *G09G 3/3233* (2013.01); *G09G 3/32* (2013.01); *G09G 2300/0819* (2013.01); *G09G 2300/0842* (2013.01); *G09G 2310/08* (2013.01)

(58) Field of Classification Search
CPC ................... G09G 3/3233; G09G 3/32; G09G 2300/0819; G09G 2300/0842; G09G 2310/08
See application file for complete search history.

(56) References Cited

U.S. PATENT DOCUMENTS 11,087,685 B1 * 8/2021 Lu ........................ G09G 3/3233
12,046,199 B2 * 7/2024 Cho ..................... G09G 3/3233
2014/0118328 A1 * 5/2014 Guo ..................... G09G 3/3233 345/212
2015/0161940 A1 * 6/2015 Woo ....................... G09G 3/325 345/58
2023/0215362 A1 * 7/2023 Kim ..................... G09G 3/3233 345/212
2025/0201158 A1 * 6/2025 Shin ..................... H10K 59/131
2025/0273148 A1 * 8/2025 Kim ....................... G09G 3/006
2026/0171016 A1 * 6/2026 Sakaguchi ........... G09G 3/3233

FOREIGN PATENT DOCUMENTS

JP 2005-037844 A 2/2005

* cited by examiner

*Primary Examiner* — Christopher E Leiby
(74) *Attorney, Agent, or Firm* — K&L Gates LLP

(57) ABSTRACT

A display device includes a first transistor controlled by a first control signal and connected between an image data signal line and a first node, a third transistor controlled by a second control signal and connected between the first node and a second node, a second transistor connected to the second node and connected between a power line and a third node, a fourth transistor controlled using a third control signal and connected between a reference voltage power line and the second node, a fifth transistor controlled by a fourth control signal and connected between an initialization voltage power line and the third node, and a sixth transistor controlled by a fifth control signal and connected between a pre-charge voltage power line and the first node.

8 Claims, 52 Drawing Sheets

VINI2-Vne=VTH, VTHEL>Vne
⇔
VTHEL>VINI2-VTH
⇔
VINI2<VTHEL+VTH

DISPLAY DEVICE

CROSS-REFERENCE TO RELATED APPLICATIONS

This application claims the benefit of priority to Japanese Patent Application No. 2024-112751 filed on Jul. 12, 2024, the entire contents of which are incorporated herein by reference.

FIELD

An embodiment of the present invention relates to a display device.

BACKGROUND

In recent years, a display device (self-luminous display device) including a light-emitting element that emits light in a self-luminous manner has become popular. For example, the light-emitting element may be a light-emitting diode (LED), a micro light-emitting diode (micro LED), or an organic electroluminescence (EL) element. The self-luminous display device includes a plurality of pixels and a control circuit for driving the plurality of pixels. When the control circuit supplies a voltage to each of the plurality of pixels, a current corresponding to the supplied voltage flows to the light-emitting element included in each of the plurality of pixels. Each of the light-emitting elements emits light with a luminance corresponding to a current flowing through the light-emitting element, and a pixel including the light-emitting element can display an image with a gradation corresponding to the luminance.

For example, a display device including an organic light-emitting element and capable of suppressing display defects such as display unevenness using a pre-charge voltage generated by a source driver IC is known.

SUMMARY

A display device includes an image data signal line to which a data voltage is supplied, a power line to which a constant voltage is supplied, a reference voltage power line to which a reference voltage is supplied, an initialization voltage power line to which an initialization voltage is supplied, a pre-charge voltage power line to which a pre-charge voltage is supplied, a first transistor controlled by a first control signal, and electrically connected between the image data signal line and a first node, a third transistor controlled by a second control signal different from the first control signal, electrically connected between the first node and a second node, a second transistor including a gate electrode electrically connected to the second node, and electrically connected between the power line and a third node, a fourth transistor controlled by a third control signal different from the first control signal and the second control signal, electrically connected between the reference voltage power line and the second node, a fifth transistor controlled by a fourth control signal different from the first control signal, the second control signal, and the third control signal, and electrically connected between the initialization voltage power line and the third node, a sixth transistor controlled by a fifth control signal different from the first control signal, the second control signal, the third control signal, and the fourth control signal, and electrically connected between the pre-charge voltage power line and the first node, a light-emitting element electrically connected to the third node, and a capacitive element electrically connected between the first node and the third node.

A display device includes an image data signal line to which a data voltage is supplied, a power line to which a constant voltage is supplied, a scan voltage signal line to which an initialization voltage, a reference voltage, and a pre-charge voltage are supplied, a first transistor controlled by a first control signal, electrically connected between the image data signal line and a first node, a third transistor controlled by a second control signal different from the first control signal, and electrically connected between the first node and a second node, a second transistor including a gate electrode electrically connected to the second node, and electrically connected between the power line and a third node, a fourth transistor controlled by a third control signal different from the first control signal and the second control signal, and electrically connected between the scan voltage signal line and the second node, a fifth transistor controlled by a fourth control signal different from the first control signal, the second control signal, and the third control signal, and electrically connected between the scan voltage signal line and the third node, a light-emitting element electrically connected to the third node, and a capacitive element electrically connected between the first node and the third node.

DESCRIPTION OF EMBODIMENTS

Figure 1:
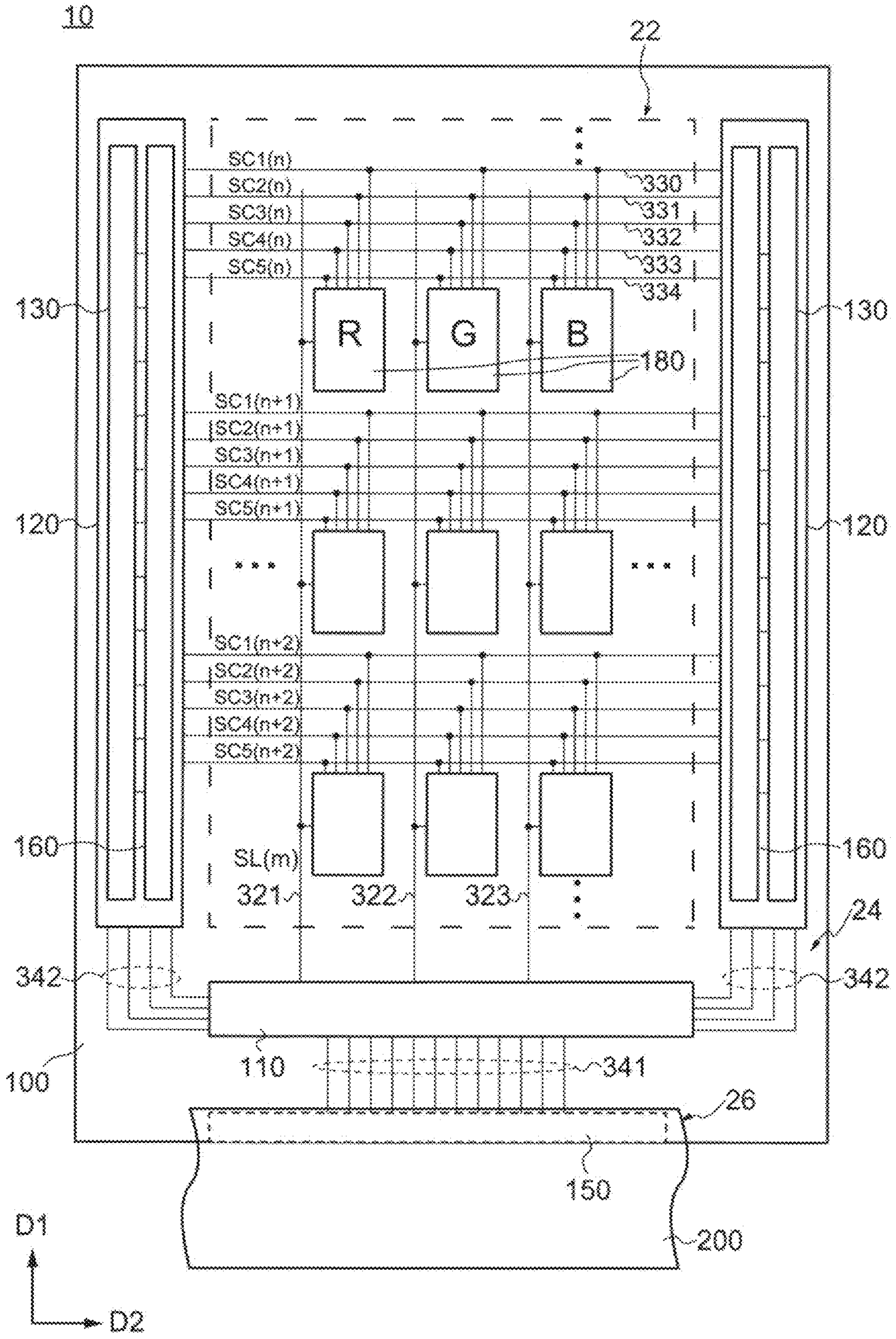
FIG. 1 is a schematic diagram showing a configuration of a display device according to the first embodiment of the present invention.

Hereinafter, embodiments of the present invention will be described with reference to the drawings and the like. However, the present invention can be implemented in many different aspects and should not be construed as being limited to the description of the embodiments exemplified below. Furthermore, in the drawings, the widths, thicknesses, shapes, configurations, and the like of the respective portions may be schematically represented in comparison with the actual embodiments for clarity of the description, but the drawings are merely examples, and do not limit the interpretation of the present invention. In addition, the terms "first" and "second" appended to each element are convenience signs used to distinguish each element, and do not have any further meaning unless otherwise specified.

In the present specification, the phrase "α includes A, B, or C," "α includes any of A, B, and C," "α includes one selected from a group consisting of A, B, and C," and the like does not exclude cases where a includes a plurality of combinations of A to C unless otherwise indicated. Furthermore, these expressions do not exclude the case where a includes other elements.

In the case where expressions such as the same, identical, and match are used in one embodiment of the present invention, the same, identical, and match may include errors within the design. Further, in the case where errors within the design are included in one embodiment of the present invention, expressions such as "substantially the same" and "substantially identical" may be used.

For example, a display device according to an embodiment of the present invention is a display device using an EL element as a self-luminous light-emitting element. For example, the display device using the EL element may be referred to as a self-luminous display device, an EL display device, or the like.

1. First Embodiment

[1-1. Overview of Display Device 10]

An overview of a display device 10 according to the first embodiment will be described with reference to FIG. 1. FIG. 1 is a schematic diagram showing a configuration of the display device 10. The configuration of the display device 10 shown in FIG. 1 is an example, and the configuration of the display device 10 is not limited to the configuration shown in FIG. 1.

The display device 10 includes an array substrate 100, a flexible printed circuit board 200 (FPC 200), and an IC chip 110. In addition, the display device 10 includes a display region 22 provided on the array substrate 100, a peripheral region 24 surrounding the display region 22, and a terminal region 26.

The display region 22 includes a plurality of pixels 180. For example, the plurality of pixels 180 is arranged in a matrix along a first direction D1 (column direction) and a second direction D2 (row direction) intersecting the first direction D1. The pixel 180 is the smallest unit constituting a part of an image to be displayed on the display region 22. For example, each of the plurality of pixels 180 may correspond to a sub-pixel R, a sub-pixel G, and a sub-pixel B. One pixel may be formed by three sub-pixels. The arrangement of the pixel 180 is not limited, and the arrangement of the pixel 180 may be a stripe arrangement, a delta arrangement, a pentile arrangement, or the like. For example, the arrangement of the plurality of pixels 180 is the stripe arrangement.

The sub-pixel R, the sub-pixel G, and the sub-pixel B are configured to display images of different colors. For example, each of the sub-pixel R, the sub-pixel G, and the sub-pixel B includes the light-emitting element including a light-emitting layer emitting red, green, and blue. An arbitrary voltage or current is supplied to each of the three sub-pixels, and the display device 10 can display an image.

The peripheral region 24 includes the IC chip 110 and two control circuits 120. The IC chip 110 is connected to a terminal section 150 using a connection wiring 341. Each of the two control circuits 120 is connected to the IC chip 110 using a connection wiring 342. The peripheral region 24 may be referred to as a frame region. The connection wiring 341 may be referred to alone as the connection wiring 341, and a bundle of a plurality of connection wirings 341 may be referred to as the connection wiring 341. Similar to the connection wiring 341, the connection wiring 342 may be referred to alone as the connection wiring 342, and a bundle of a plurality of connection wirings 342 may be referred to as the connection wiring 342.

The terminal region 26 includes the terminal section 150 and the FPC 200 electrically connected to the terminal section 150. The terminal region 26 is a region opposite the region where the display region 22 is provided in the peripheral region 24 in the first direction D1.

The FPC 200 is connected to a plurality of terminal sections 150. The display device 10 is connected to an external device (not shown) via the FPC 200 and the plurality of terminal sections 150. A control signal and a voltage are transmitted from the external device to the display device 10 via the FPC 200 and the plurality of terminal sections 150. The display device 10 drives each pixel 180 provided in the display device 10 using the control signal and a voltage transmitted from the external device. As a result, the display device 10 can display an image in the display region 22.

The IC chip 110 supplies signals, voltages, and the like for driving each pixel 180 to the two control circuits 120 and each pixel 180 (a pixel circuit 181) via the FPC 200, the plurality of terminal sections 150, and the connection wiring 341.

The IC chip 110, each of the two control circuits 120, and each of the IC chip 110 may be referred to alone as the control circuit, and a group of circuits including the IC chip 110, each of the two control circuits 120, and a part or all of the IC chip 110 may be referred to as a control circuit in the present specification and the drawings.

[1-2. Configuration of IC Chip 110]

An overview of the IC chip 110 will be described with reference to FIG. 1. The IC chip 110 is provided at a position adjacent to the display region 22 in the first direction D1. Image data signal lines 321, 322, and 323 are electrically connected to the IC chip 110 and extend along the first direction D1 and are connected to the plurality of pixels 180 arranged along the first direction D1.

For example, the IC chip 110 includes a plurality of selection circuits (not shown). For example, each of the plurality of selection circuits is a switch controlled based on an ON signal and an OFF signal supplied to a selection signal. The selection circuit is selected by the ON signal provided to the selection signal and provides an image data signal SL(m) to the image data signal line 321 and the pixel 180 electrically connected to the image data signal line 321. The selection signal and the image data signal SL(m) are transmitted from the external device to the IC chip 110 via the FPC 200 and the plurality of terminal sections 150. For example, the image data signal SL(m) includes a data signal VDATA, and the data signal VDATA includes a data voltage equal to or higher than a voltage VSIGL (see FIG. 5) and equal to or lower than a voltage VSIGH (see FIG. 5).

For example, the ON signal is a signal including a voltage that conducts the selection circuit (switch), and the OFF signal is a signal including a voltage that cuts off the selection circuit (switch). In the present invention, the ON signal may be a high-level voltage (potential) (high, High, HI), the OFF signal may be a low-level voltage (potential) (low, Low, LO), the ON signal may be a low-level voltage (potential) (low, Low, LO), and the OFF signal may be a high-level voltage (potential) (high, High, HI). The high-level voltage is greater (higher) than the low-level voltage. For example, in the display device according to an embodiment of the present specification, the ON signal is the high-level voltage and the OFF signal is the low-level voltage.

[1-3. Configuration of Control Circuit 120]

An overview of the control circuit 120 will be described with reference to FIG. 1. The two control circuits 120 are provided along the second direction D2 at a position adjacent to both sides (left and right) of the display region 22. A scan signal line 330, a scan signal line 331, a scan signal line 332, a scan signal line 333, and a scan signal line 334 are electrically connected to the control circuit 120, extend along the second direction D2, and connected to the plurality of pixels 180 arranged along the second direction D2. For example, each scan signal line of the display device 10 shown in FIG. 1 is connected to both of the two control circuits 120. Each scan signal line may be connected to one of the control circuits 120. For example, the n-th scan signal line may be electrically connected to the control circuit 120 on the right side with respect to the second direction D2 of the display region 22 and the n+1st scan signal line may be electrically connected to the control circuit 120 on the left side with respect to the second direction D2 of the display region 22. The number n is a positive integer.

The control circuit 120 includes a shift register circuit 130 and a scan driver circuit 160. For example, the control circuit 120 is a gate driver, and a control signal including a clock signal, a start pulse, a plurality of enable signals, and the like, and a voltage such as a drive voltage VDDEL (see FIG. 2) and a reference voltage VSSEL (see FIG. 2) are input. The control circuit 120 can sequentially select a scan line by inputting the control signal and a power supply.

The shift register circuit 130 is electrically connected to the scan driver circuit 160. The shift register circuit 130 includes a plurality of shift registers (not shown). Further, the shift register 130 is supplied with the above-described plurality of control signals via the plurality of connection wirings 342, the drive voltage VDDEL is supplied via a drive power line PVDD (see FIG. 2), and the reference voltage VSSEL is supplied via a reference voltage line PVSS (see FIG. 2). The shift register circuit 130 has a role of generating a plurality of output signals (not shown) shifted at different timings based on the plurality of control signals described above and sequentially outputting the output signals to the scan driver circuit 160.

The scan driver circuit 160 includes a plurality of scan drivers. For example, the plurality of scan drivers is supplied with the plurality of output signals from the shift register circuit 130, the plurality of enable signals described above is supplied from the IC chip 110 via the plurality of connection wirings 342, the drive voltage VDDEL is supplied via the drive power line PVDD, and the reference voltage VSSEL is supplied via the reference voltage line PVSS. The plurality of scan drivers has a role of sequentially supplying scan signals having different timings (for example, a first scan signal SC1(*n*), a second scan signal SC2(*n*), a third scan signal SC3(*n*), a fourth scan signal SC4(*n*), and a fifth scan signal SC5(*n*)) to each scan signal line based on the plurality of output signals and the plurality of enable signals, and driving the pixel 180 (the pixel circuit 181) electrically connected to each scan signal line. For example, the fifth scan signal SC5(*n*) and the scan signal line 334 to which the fifth scan signal SC5(*n*) is supplied are the so-called scan signal and scan signal line.

[1-4. Configuration of Pixel 180]

Figure 2:
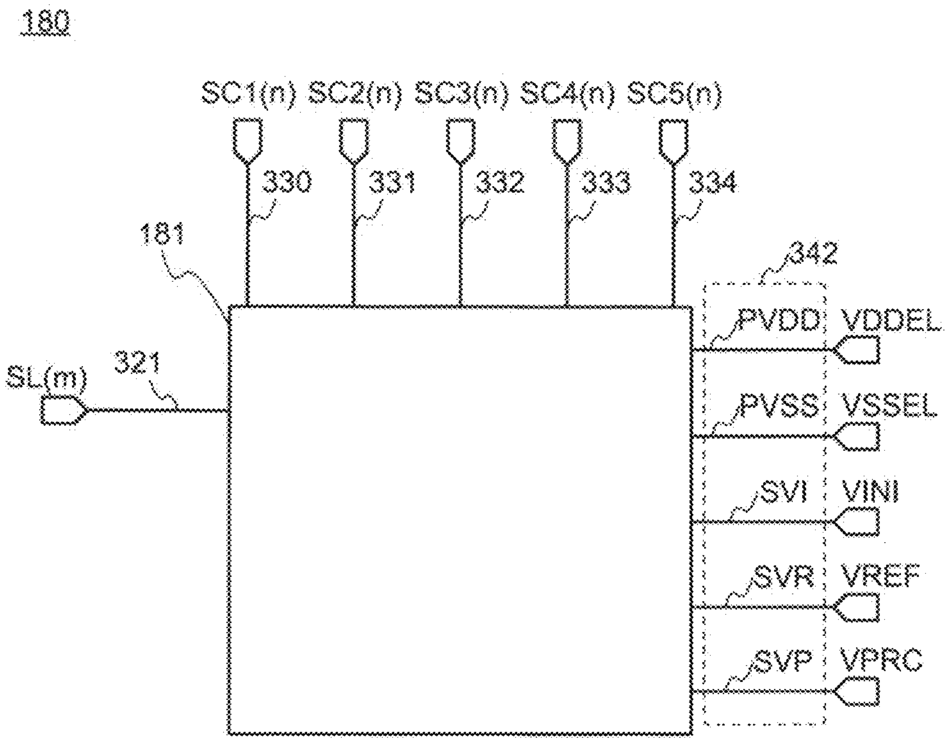
FIG. 2 is a schematic diagram showing input signals to a pixel circuit according to the first embodiment of the present invention.
Figure 3:
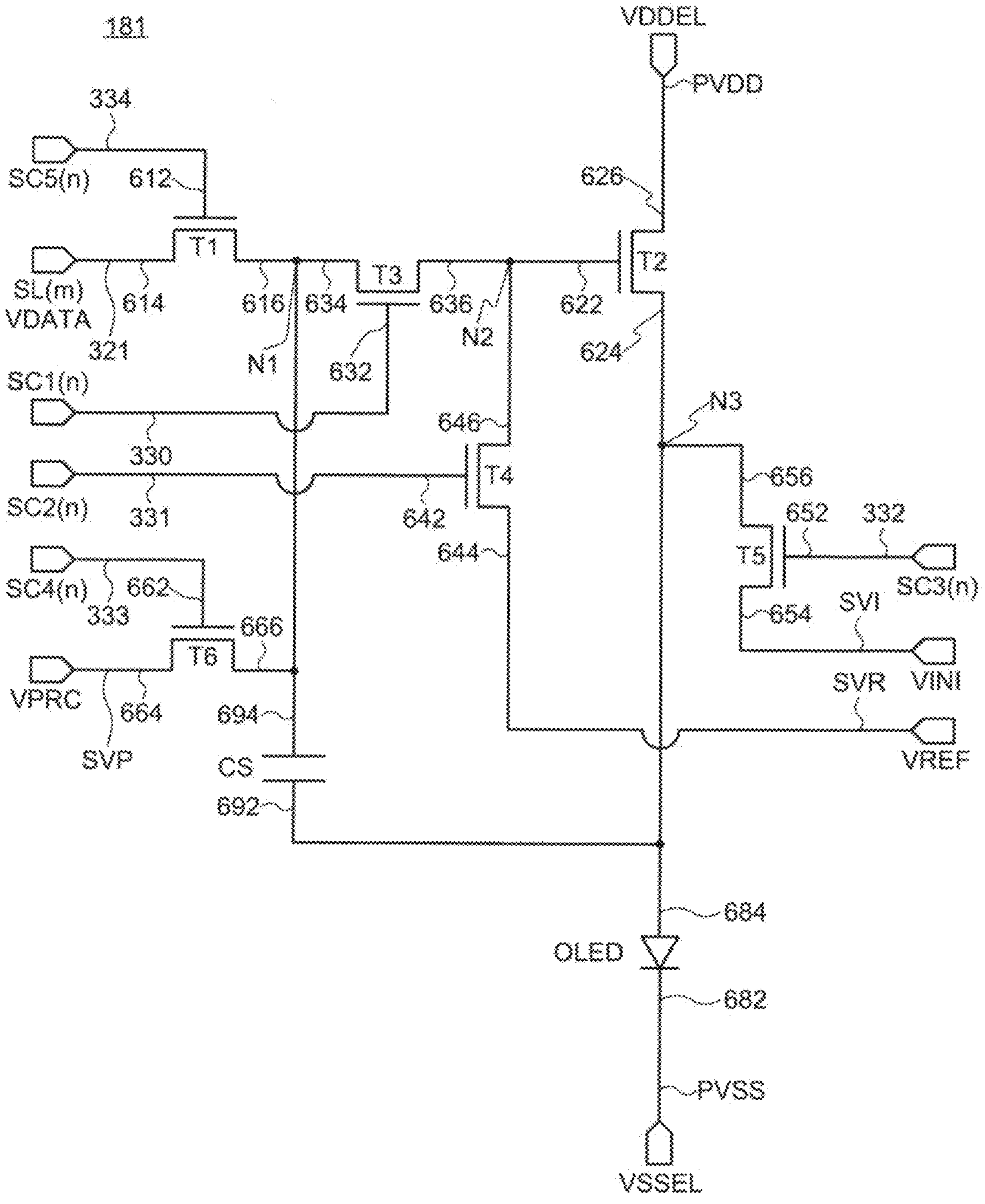
FIG. 3 is a schematic diagram showing a configuration of a pixel circuit according to the first embodiment of the present invention.

An overview of the pixel 180 and the pixel circuit 181 will be described with reference to FIG. 1 to FIG. 3. FIG. 2 is a schematic diagram showing input signals to the pixel circuit 181 included in the pixel 180. FIG. 3 is a circuit diagram showing a configuration of the pixel circuit 181. For example, FIG. 2 and FIG. 3 show the configurations of the pixel circuit 181 of the pixel 180 shown in FIG. 1. The configurations of the pixel 180 and the pixel circuit 181 are not limited to the configurations shown in FIG. 1 to FIG. 3.

The pixel circuit 181 is a circuit for driving the pixel 180. The pixel circuits of the sub-pixel R, the sub-pixel G, and the sub-pixel B included in the pixel 180 are similar to those of the pixel circuit 181. The sub-pixel R, the sub-pixel G, and the sub-pixel B are different in the colors emitted by a light-emitting element OLED. In the following explanation, the light-emitting element OLED emitting red light will be described as an example.

As shown in FIG. 2, the image data signal SL(m), the first scan signal SC1(*n*), the second scan signal SC2(*n*), the third scan signal SC3(*n*), the fourth scan signal SC4(*n*), the fifth scan signal SC5(*n*), a pre-charge voltage VPRC, a reference voltage VREF, and an initialization voltage VINI are supplied to the pixel circuit 181. In addition, the drive voltage VDDEL and the reference voltage VSSEL are supplied to the pixel circuit 181 as a power supply for driving the pixel 180. For example, the pre-charge voltage VPRC, the reference voltage VREF, the initialization voltage VINI, the drive voltage VDDEL, and the reference voltage VSSEL may be constant voltages, and may be variable voltages that fluctuate depending on the timing of each signal.

The pre-charge voltage VPRC is supplied to a pre-charge voltage power line SVP, the reference voltage VREF is supplied to a reference voltage power line SVR, the initialization voltage VINI is supplied to an initialization voltage power line SVI, the drive voltage VDDEL is supplied to the drive power line PVDD, and the reference voltage VSSEL is supplied to the reference voltage line PVSS. For example, each of the pre-charge voltage VPRC, the reference voltage power line SVR, the initialization voltage power line SVI, the drive power line PVDD, and the reference voltage line PVSS is electrically connected to the different connection wirings 342. In addition, for example, the pre-charge voltage VPRC, the reference voltage power line SVR, the initialization voltage power line SVI, the drive power line PVDD, and the reference voltage line PVSS may each be different connection wirings 342. For example, the pre-charge voltage VPRC is an intermediate voltage (potential) between the voltage VSIGL and the voltage VSIGH.

For example, the pre-charge voltage VPRC, the reference voltage VREF, the initialization voltage VINI, the drive voltage VDDEL, and the reference voltage VSSEL are supplied from the external device to the IC chip 110 via the FPC 200, the terminal section 150, and the connection wiring 341. In addition, for example, the pre-charge voltage VPRC, the reference voltage VREF, the initialization voltage VINI, the drive voltage VDDEL, and the reference voltage VSSEL are supplied from the IC chip 110 to the plurality of pixels 180 (pixel circuits 181) via the connection wiring 342, the pre-charge voltage power line SVP, the reference voltage power line SVR, the initialization voltage power line SVI, the drive power line PVDD, and the reference voltage line PVSS. Although not shown, the pre-charge voltage VPRC, the reference voltage VREF, the initialization voltage VINI, the drive voltage VDDEL, and the reference voltage VSSEL may be connected from the external device to the pre-charge voltage power line SVP, the reference voltage power line SVR, the initialization voltage power line SVI, the drive power line PVDD, and the reference voltage line PVSS via the FPC 200, the terminal section 150, and the connection wiring 341, and not via the IC chip 110 and the connection 342, and may be supplied to the plurality of pixels 180 (the pixel circuit 181). For example, the pre-charge voltage VPRC, the reference voltage VREF, the initialization voltage VINI, and the reference voltage VSSEL are smaller than the drive voltage VDDEL.

As shown in FIG. 3, the pixel circuit 181 includes a first transistor T1, a second transistor T2, a third transistor T3, a fourth transistor T4, a fifth transistor T5, a sixth transistor T6, a capacitive element CS, and the light-emitting element OLED. Each of these transistors includes a gate electrode and a pair of electrodes (a source electrode and a drain electrode) consisting of a first electrode and a second electrode. Each of the capacitive element CS and the light-emitting element OLED has a pair of electrodes consisting of the first electrode and the second electrode.

For example, the first transistor T1 is a select transistor. The first transistor T1 has a function of supplying the image data signal SL(m) to a first node N1.

For example, the second transistor T2 is a drive transistor. A gate voltage applied to a gate electrode 622 of the second transistor T2 is a voltage in which the variation in a threshold voltage VTH is corrected based on at least the reference voltage VREF and the initialization voltage VINI. In addition, the second transistor T2 controls the amount of current flowing from the drive power line PVDD to the light-emitting element OLED based on the gate voltage with the threshold voltage VTH corrected and the input image data signal SL(m). That is, the second transistor T2 has a function of causing the light-emitting element OLED to emit light by supplying a current corresponding to a display gradation (brightness) from the drive voltage VDDEL to the light-emitting element OLED. The gate voltage is a potential difference Vgs between the voltage supplied to the gate electrode 622 and the voltage supplied to a first electrode (source) 624. The potential difference Vgs is also a potential difference between a voltage supplied to a second node N2 and a voltage supplied to a third node N3.

The third transistor T3 has a function of conducting the first node N1 and the second node N2 to supply the image data signal SL(m) (data signal VDATA) to the second node N2.

The fourth transistor T4 has a function of conducting the second node N2 and the reference voltage power line SVR to supply the reference voltage VREF to the second node N2 and initializing the second node N2.

The fifth transistor T5 has a function of conducting the third node N3 and the initialization voltage power line SVI to supply the initialization voltage VINI to the third node N3 and initializing the third node N3.

The sixth transistor T6 has a function of conducting the first node N1 and the pre-charge voltage power line SVP to supply the pre-charge voltage VPRC to the first node N1 and supplying an intermediate potential to the first node N1.

The capacitive element CS has a function of holding a charge equivalent to the threshold voltage VTH of the second transistor T2 and a function of holding a charge equivalent to a data voltage (a voltage equal to or higher than the voltage VSIGL (see FIG. 9) and equal to or lower than the voltage VSIGH (see FIG. 9)) included in the image data signal SL(m) supplied to the first node N1.

The light-emitting element OLED has diode characteristics and has a function of emitting light based on a current flowing through the light-emitting element OLED. The current flowing through the light-emitting element OLED is a drain current (current Ion) of the second transistor T2.

The first transistor T1 includes a gate electrode 612, a first electrode 614, and a second electrode 616. The gate electrode 612 is electrically connected to the scan signal line 334. The first electrode 614 is electrically connected to the image data signal line 321. The second electrode 616 is electrically connected to the first node N1, a first electrode 634 of the third transistor T3, a second electrode 666 of the sixth transistor T6, and a second electrode 694 of the capacitive element CS. As described above, the fifth scan signal SC4(*n*) is supplied to the scan signal line 334. The switching of the first transistor T1 is controlled using the fifth scan signal SC5(*n*). In other words, the first transistor T1 is controlled to be in a conductive state (ON state) or a non-conductive state (OFF state) by the fifth scan signal SC5(*n*). When the signal supplied to the fifth scan signal SC5(*n*) is LO, the first transistor T1 is in the non-conductive state. When the signal supplied to the fifth scan signal SC5(*n*) is HI, the first transistor T1 is in the conductive state.

The second transistor T2 includes the gate electrode 622, the first electrode 624, and a second electrode 626. The gate electrode 622 is electrically connected to the second node N2, a second electrode 636 of the third transistor T3, and a second electrode 646 of the fourth transistor T4. The first electrode 624 is electrically connected to the third node N3, a second electrode 656 of the fifth transistor T5, a first electrode 692 of the capacitive element CS, and a second electrode 684 of the light-emitting element OLED. The second electrode 626 is electrically connected to the drive power line PVDD. The threshold voltage of the second transistor T2 is the threshold voltage VTH. The second transistor T2 controls the current flowing through the light-emitting element OLED according to the potential difference Vgs, a potential difference Vds between the voltage supplied to the second electrode 626 and the voltage supplied to the first electrode 624 (the third node N3), and the threshold voltage VTH. For example, when the potential difference Vgs is smaller than the threshold voltage VTH and the potential difference Vds is equal to or lower than 0 V, the second transistor T2 is in the non-conductive state, and no current flows through the light-emitting element OLED and black is displayed. For example, when the potential difference Vgs is equal to or higher than the threshold voltage VTH and the potential difference Vds is higher than 0 V, the second transistor T2 is in the conductive state which causes the current Ion to flow and causes the light-emitting element OLED to emit light with a brightness according to the amount of current.

The third transistor T3 includes a gate electrode 632, the first electrode 634, and the second electrode 636. The switching of the third transistor T3 is controlled using the first scan signal SC1(*n*). The conductive state (ON state) and the non-conductive state (OFF state) of the third transistor T3 are controlled by the first scan signal SC1(*n*). When the signal supplied to the first scan signal SC1(*n*) is LO, the third transistor T3 is in the non-conductive state. When the signal supplied to the first scan signal SC1(*n*) is HI, the third transistor T3 is in the conductive state.

The fourth transistor T4 includes a gate electrode 642, a first electrode 644, and a second electrode 646. The gate electrode 642 is electrically connected to the scan signal line 331. The second scan signal SC2(*n*) is supplied to the scan signal line 331. The first electrode 644 is electrically connected to the reference voltage power line SVR. The switching of the fourth transistor T4 is controlled using the second scan signal SC2(*n*). In other words, the conductive state (ON state) and the non-conductive state (OFF state) of the fourth transistor T4 are controlled by the second scan signal SC2(*n*). When the signal supplied to the second scan signal SC2(*n*) is LO, the fourth transistor T4 is in the non-conductive state. When the signal supplied to the second scan signal SC2(*n*) is HI, the fourth transistor T4 is in the conductive state.

The fifth transistor T5 includes a gate electrode 652, a first electrode 654, and a second electrode 656. The gate electrode 652 is electrically connected to the scan signal line 332. The third scan signal SC3(*n*) is supplied to the scan signal line 332. The first electrode 654 is electrically connected to the initialization voltage power line SVI. The switching of the fifth transistor T5 is controlled using the third scan signal SC3(*n*). In other words, the conductive state (ON state) and the non-conductive state (OFF state) of the fifth transistor T5 are controlled by the third scan signal SC3(*n*). When the signal supplied to the third scan signal SC3(*n*) is LO, the fifth transistor T5 is in the non-conductive state. When the signal supplied to the third scan signal SC3(*n*) is HI, the fifth transistor T5 is in the conductive state.

The sixth transistor T6 includes a gate electrode 662, a first electrode 664, and a second electrode 666. The gate electrode 662 is electrically connected to the scan signal line 333. The fourth scan signal SC4(*n*) is supplied to the scan signal line 333. The first electrode 664 is electrically connected to the pre-charge voltage power line SVP. The switching of the sixth transistor T6 is controlled using the fourth scan signal SC4(*n*). In other words, the conductive state (ON state) and the non-conductive state (OFF state) of the sixth transistor T6 are controlled by the fourth scan signal SC4(*n*). When the signal supplied to the fourth scan signal SC4(*n*) is LO, the sixth transistor T6 is in the non-conductive state. When the signal supplied to the fourth scan signal SC4(*n*) is HI, the sixth transistor T6 is in the conductive state.

A first electrode 682 of the light-emitting element OLED is electrically connected to the reference voltage line PVSS. As described above, the reference voltage VSSEL is supplied to the reference voltage line PVSS. For example, the first electrode 682 of the light-emitting element OLED is a cathode electrode, and the second electrode 684 of the light-emitting element OLED is an anode electrode.

For example, it is assumed that the conductive state of the transistor in the display device 10 indicates a state in which the source electrode and the drain electrode of the transistor are conductive and the transistor is in the ON state (ON), and the non-conductive state of the transistor in the display device 10 indicates a state in which the source electrode and the drain electrode of the transistor are non-conductive and the transistor is in the OFF state (OFF). Furthermore, in each transistor, the source electrode and the drain electrode may be interchanged depending on a voltage or a potential supplied to each electrode. In addition, those skilled in the art will readily appreciate that even when the transistor is in the OFF state, a slight current flows, such as a leakage current.

The transistors shown in FIG. 3 can have Group 14 elements, such as silicon or germanium, or an oxide exhibiting semiconductor properties in a channel region. For example, a metal oxide with semiconductor properties can be used as an oxide exhibiting semiconductor properties. For example, an oxide semiconductor containing two or more metals including indium (In) is used as the metal oxide with semiconductor properties. Furthermore, in addition to indium, gallium (Ga), zinc (Zn), aluminum (Al), hafnium (Hf), yttrium (Y), zirconia (Zr), and lanthanoids may be used as the metal oxide with semiconductor properties. In addition, the metal oxide with semiconductor properties may be amorphous, crystalline, or a mixed phase of amorphous and crystalline. Furthermore, in the case where the display device 10 includes both a transistor including the Group 14 element in the channel region and a transistor containing the oxide with semiconductor properties in the channel region, a method for manufacturing the display device 10 includes forming a semiconductor layer containing the Group 14 element and forming a semiconductor layer (e.g., an oxide semiconductor layer) containing the oxide with semiconductor properties.

For example, the leakage current of a transistor including the metal oxide with semiconductor properties is extremely small. Therefore, the charge equivalent to the voltage (potential) written in the capacitive element using the transistor having the metal oxide with semiconductor properties is unlikely to escape from the capacitive element. As a result, by using the transistor having the metal oxide with semiconductor properties, the charge written in the capacitive element can be held for a long time. In addition, under the condition that the gate-source voltage (the potential difference (Vgs) between the gate electrode and the source electrode and the source-drain voltage (e.g., the potential difference (Vds) between the source electrode and the drain electrode)) are the same, the drain current of the transistor having the metal oxide with semiconductor properties may be greater than the drain current of the transistor having a low-temperature polysilicon (LTPS). As a result, under the same drain current conditions, the gate-source voltage and the source-drain voltage of the transistor having the metal oxide with semiconductor properties can be made smaller than the transistor having the LTPS. Therefore, the power consumption of the display device 10 can be suppressed by using the transistor having the metal oxide with semiconductor properties.

For example, the channel region of the first transistor T1 or the channel region of the fourth transistor T4 may be formed using the metal oxide with semiconductor properties. In addition, the channel region of the second transistor T2 or the channel region of the fifth transistor T5 may be formed using the metal oxide with semiconductor properties. For example, when the channel region of the first transistor T1 is formed using the metal oxide, discharging of the charge equivalent to the voltage included in the data signal VDATA held in the first node N1 and the second electrode 694 of the capacitive element CS is difficult, and the first node N1 and the second electrode 694 of the capacitive element CS can hold the charge for a long time.

For example, the channel region of each transistor may contain crystalline silicon. For example, the crystalline silicon may be the low-temperature polysilicon (LTPS) or single-crystal silicon. For example, each transistor in the display device 10 is formed using a thin film transistor (TFT). In addition, the channel region of each transistor may be formed using a silicon wafer or single-crystal silicon such as an SOI substrate. In the display device 10, the configuration of the transistor, the connection of the storage capacitor, power supply voltage, and the like may be appropriately adapted according to the application and specifications.

In the first embodiment, the first transistor T1 to the sixth transistor T6 are n-channel field-effect transistors, and each of the channel regions of the first transistor T1 to the sixth transistor T6 is formed using the metal oxide with semiconductor properties.

[1-5. Driving Method of Display Device 10]

A driving method of the display device 10 will be described with reference to FIG. 4 to FIG. 8. FIG. 4 to FIG. 8 are schematic diagrams showing timing charts of the display device 10. The driving method shown in FIG. 4 to FIG. 8 is an example, and the driving method for the display device 10 is not limited to the driving method shown in FIG. 4 to FIG. 8. Configurations that are the same as or similar to those in FIG. 1 to FIG. 3 will be described as necessary. In addition, the horizontal axis of the timing charts represents time (TIME).

Figure 4:
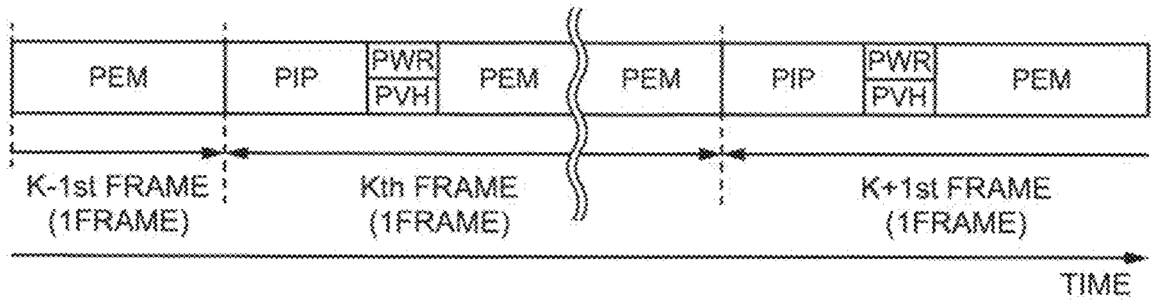
FIG. 4 is a timing chart of a display device according to the first embodiment of the present invention.

For example, the frequency at which the display device 10 is driven is 60 Hz, and one frame (1FRAME) is driven at 60 Hz. FIG. 4 shows the current frame (KthFRAME), a portion of the previous frame of the current frame (K−1stFRAME), and a portion of the subsequent frame of the current frame (K+1stFRAME). In addition, FIG. 5 to FIG. 8 show a light emission period PEM of the previous frame (K−1stFRAME) of the current frame, a period PIP of the current frame (KthFRAME), a period PWR, and a period PVH. Furthermore, FIG. 5 to FIG. 8 show one horizontal period (a horizontal period HRP) for one pixel 180 (pixel circuit 181).

First, an overview of a driving method of the display device 10 will be described with reference to FIG. 4. As shown in FIG. 4, the driving method of the display device 10 includes at least an initialization and pre-charge period PIP, a writing period PWR, a threshold acquisition and holding period PVH, and the light emission period PEM in one frame. In the pixel 180 (the pixel circuit 181) included in the display device 10, the period PWR and the period PVH are executed after the period PIP. In addition, after the light emission period PEM of the previous frame of the current frame, the period PIP, the period PWR, and the period PVH of the current frame are executed, and after the light emission period PEM of the current frame, the period PIP, the period PWR, and the period PVH of the subsequent frame of the current frame are executed.

The period PIP is a period during which the pre-charge voltage is supplied to the first node N1, and is a period during which the second node N2 and the third node N3 are initialized. The period PWR is a period during which the data signal VDATA is written to the pixel 180 (the pixel circuit 181). The period PVH is a period during which the threshold voltage of the second transistor T2 is obtained by performing an operation to make the potential difference Vgs to be the same as the threshold voltage VTH, and a charge equivalent to the threshold voltage is held in the third node N3 (the first electrode 692 of the capacitive element CS). Further, the light emission period PEM is a period during which the pixel 180 emits light based on the written (supplied) data signal VDATA and the obtained threshold voltage of the second transistor T2 (threshold voltage correction). In FIG. 4, for convenience of explanation, the period PWR overlaps the period PVH, but the actual period PVH starts after the period PWR starts and ends after the period PWR ends. That is, a part of the period PWR overlaps the period PVH.

Next, the horizontal period HRP in the driving method of the pixel 180 (the pixel circuit 181) of the display device 10 will be described with reference to FIG. 4 to FIG. 8.

The horizontal period HRP in the driving method of the display device 10 includes the period PWR and the period PVH. The first scan signal SC1(*n*), the second scan signal SC2(*n*), the third scan signal SC3(*n*), the fourth scan signal SC4(*n*), the fifth scan signal SC5(*n*), the image data signal SL(m), the initialization voltage VINI, the reference voltage VREF, and the pre-charge voltage VPRC are input to the pixel 180 (pixel circuit 181) in the horizontal period HRP. For example, the pixel 180 (pixel circuit 181) is selected according to the timings of the first scan signal SC1(*n*), the second scan signal SC2(*n*), the third scan signal SC3(*n*), the fourth scan signal SC4(*n*), and the fifth scan signal SC5(*n*). The image data signal SL(m), the initialization voltage VINI, the reference voltage VREF, and the pre-charge voltage VPRC are input to the selected pixel 180 (pixel circuit 181) according to the timings of the respective signals. Similar operations are performed on all the pixels 180 (the pixel circuits 181), and an image of the frame corresponding to 1FRAME is displayed on the display region 22 of the display device 10 based on the image data signal SL(m) input to all the pixels 180 (the pixel circuits 181).

For example, the voltages (potentials) supplied to each signal in each period of each frame in the timing charts shown in FIG. 4 to FIG. 8 are shown in Table 1.

TABLE 1

| | Setting value [V] |
|---|---|
| VTH | 1 |
| VSIGL(Black) | −0.5 |
| VSIGH(White) | 3.5 |
| HI | 10 |
| LO | −4 |
| VINI | −2 |
| VREF | 0 |
| VPRC | 1.5 |
| VDDEL | 8 |
| VSSEL | 0 |

[1-5-1. First Example of Driving Method of Display Device 10]

Figure 5:
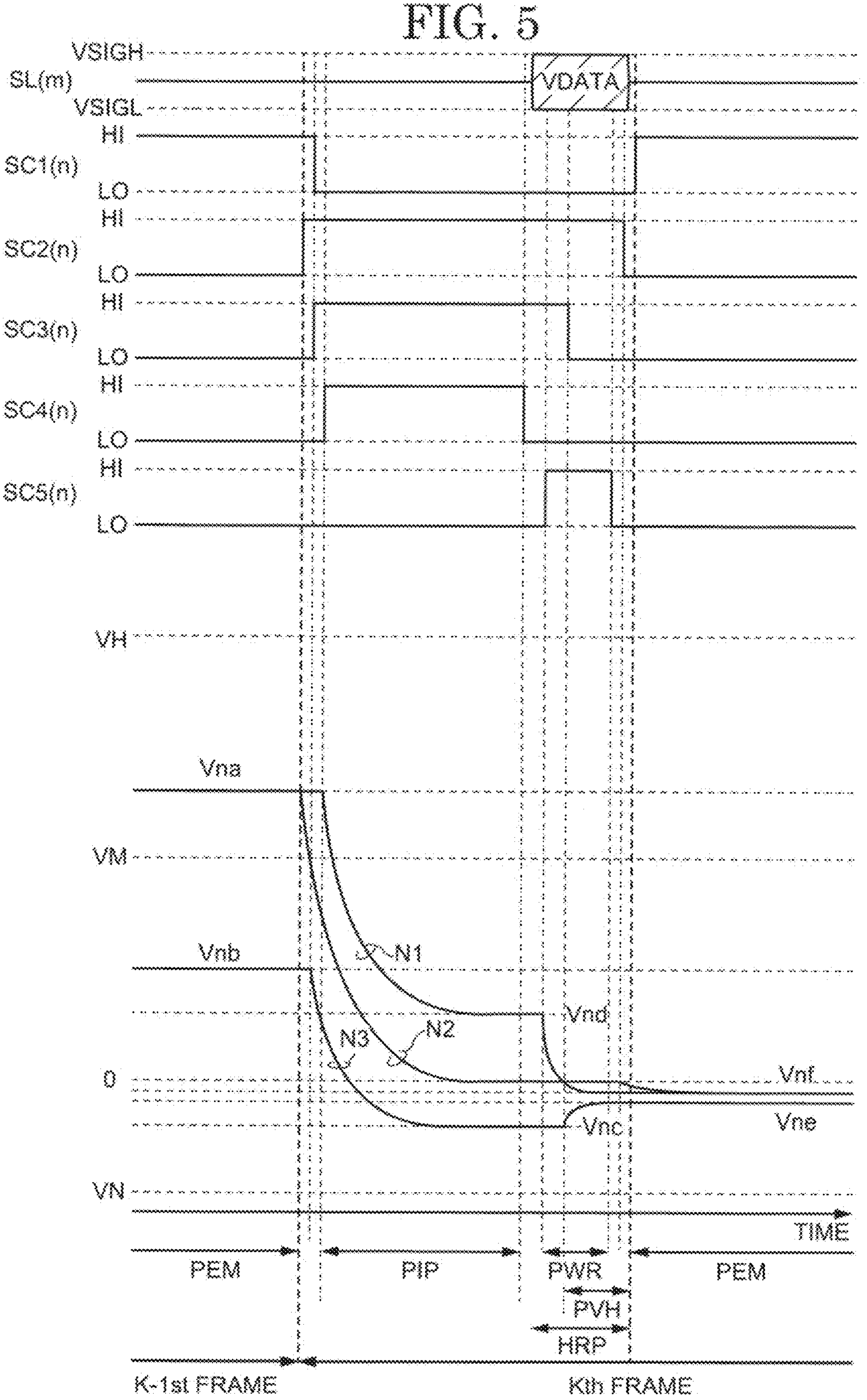
FIG. 5 is a timing chart of a display device according to the first embodiment of the present invention.

A first example of the driving method of the display device 10 will be described with reference to FIG. 5. The driving method shown in the first example includes the pixel 180 (the pixel circuit 181) displaying a white image based on the voltage VSIGH in the previous frame (K−1stFRAME) of the current frame (KthFRAME), and then the pixel 180 (the pixel circuit 181) displaying a black image based on the voltage VSIGL in the KthFRAME. In other words, the driving method shown in the first example includes displaying images of different colors in consecutive frames.

The data signal VDATA is input to each pixel 180 (pixel circuit 181) according to each period (a period PIN, the horizontal period HRP (the period PWR and the period PVH)). The data signal VDATA is analog data (a video signal) including a voltage equal to or higher than the voltage VSIGL and equal to or lower than the voltage VSIGH. In FIG. 5, only the data signal VDATA (a video signal voltage equal to or higher than the voltage VSIGL and equal to or lower than the voltage VSIGH) written in the horizontal period HRP is shown in the image data signal SL(m). In the data signal VDATA in the periods excluding the horizontal period HRP, the video signal voltage equal to or higher than the voltage VSIGL and equal to or lower than the voltage VSIGH is continuously supplied to the image data signal SL(m) based on the data signal VDATA written in the pixel circuit 181 of the corresponding row, but is omitted in FIG. 5 and indicated by a horizontal line. As shown in Table 1, for example, the voltage VSIGL is −0.5 V, and the pixel 180 to which the voltage VSIGL is supplied does not emit light and becomes black. In addition, for example, the voltage VSIGH is 3.5 V, and the pixel 180 to which the voltage VSIGH is supplied emits various colors. Furthermore, for example, as shown in Table 1 or FIG. 5 to FIG. 8, the voltage VH (HI) is 10 V, the voltage VL (LO) is −4 V, the initialization voltage VINI is −2 V, the reference voltage VREF is 0 V, the pre-charge voltage VPRC is 8 V, the reference voltage VSSEL is 0 V, the voltage VM is 5 V, and the voltage VN is −5 V.

The light emission period PEM of the K−1stFRAME is a period during which the pixel 180 (the pixel circuit 181) emits light according to the potential difference Vgs (voltage supplied to the second node N2 (voltage V (N2))−voltage supplied to the third node N3 (voltage V (N3))). For example, the pixel 180 (the pixel circuit 181) emits red light, and white light is emitted by three pixels using the pixel 180 emitting red light, the pixel 180 emitting blue light, and the pixel 180 emitting green light.

For example, in the light emission period PEM of the K−1stFRAME, the voltage of the data signal VDATA supplied to other than the selected pixel 180 (pixel circuit 181) is supplied to the image data signal SL(m) (data signal VDATA), HI is supplied to the first scan signal SC1(*n*), and LO is supplied to the second scan signal SC2(*n*), the third scan signal SC3(*n*), the fourth scan signal SC4(*n*), and the fifth scan signal SC5(*n*). The third transistor T3 is in the ON state, and the first transistor T1, the fourth transistor T4, the fifth transistor T5, and the sixth transistor T6 are in the OFF state. In addition, for example, a voltage Vna supplied to the first node N1 and the second node N2 is 7 V, a voltage Vnb supplied to the third node N3 is 2.5 V, and the potential difference Vgs is 4.5 V. Therefore, the second transistor T2 can flow the current Ion based on the potential difference Vgs and the potential difference Vds according to the voltage VSIGH input in the horizontal period HRP of the K−1stFRAME. In addition, the current Ion flows from the drive power line PVDD to the light-emitting element OLED and the reference voltage line PVSS, and the light-emitting element OLED emits light.

In a period between the light emission period PEM and the period PIP of the K−1stFRAME following the light emission period PEM of the K−1stFRAME, the data signal VDATA supplied to pixels other than the selected pixel 180 (the pixel circuit 181) is supplied to the image data signal SL(m). The second scan signal SC2(*n*) changes from the state in which LO is supplied to the state in which HI is supplied. When the second scan signal SC2(*n*) is in the state in which HI is supplied, the first scan signal SC1(*n*) changes from the state in which HI is supplied to the state in which LO is supplied, and the third scan signal SC3(*n*) changes from the state in which LO is supplied to the state in which HI is supplied. The fourth scan signal SC4(*n*) and the fifth scan signal SC5(*n*) are in the state in which LO is supplied.

Therefore, the fourth transistor T4 and the fifth transistor T5 are turned from the OFF state to the ON state, the third transistor T3 is turned from the ON state to the OFF state, and the first transistor T1 and the sixth transistor T6 are maintained in the OFF state.

As a result, the voltage supplied to the first node N1 maintains the voltage Vna, and the voltage supplied to the second node N2 gradually drops from the voltage Vna toward 0 V (reference voltage VREF). In addition, the voltage supplied to the third node N3 gradually drops from the voltage Vnb toward a voltage Vnc (initialization voltage VINI, −2 V). Since the second transistor T2 and the fifth transistor T5 are in the ON state and a current flows from the drive power line PVDD to the initialization voltage power line SVI, the light-emitting element OLED does not emit light.

In the period PIP following the period between the light emission period PEM and the period PIP of the K−1stFRAME, for example, the image data signal SL(m) is maintained in the state in which the voltage of the data signal VDATA supplied to the pixel 180 (pixel circuit 181) other than the selected pixel is supplied, the second scan signal SC2(*n*) and the third scan signal SC3(*n*) are maintained in the state in which HI is supplied, and the first scan signal SC1(*n*) and the fifth scan signal SC5(*n*) are maintained in the state in which LO is supplied. The fourth scan signal SC4(*n*) changes from the state in which LO is supplied to the state in which HI is supplied.

Therefore, the sixth transistor T6 is turned from the OFF state to the ON state, the second transistor T2, the fourth transistor T4, and the fifth transistor T5 are maintained in the ON state, and the first transistor T1 and the third transistor T3 are maintained in the OFF state.

As a result, the voltage supplied to the first node N1 gradually drops from the voltage Vna toward a voltage Vnd (pre-charge voltage VPRC, 1.5 V) and becomes the voltage Vnd. The voltage supplied to the second node N2 gradually drops from the voltage Vna toward 0 V (reference voltage VREF) and becomes 0 V. The voltage supplied to the third node N3 gradually drops from the voltage Vnb toward the voltage Vnc (initialization voltage VINI, −2 V) and becomes the voltage Vnc. The potential difference Vgs is 2 V (0 V−(−2 V)) and the potential difference Vds is 10 V (8 V−(−2 V)). Similar to the period between the light emission period PEM and the period PIP of the K−1stFRAME, the second transistor T2 and the fifth transistor T5 are in the ON state and a current Ion flows from the drive power line PVDD to the initialization voltage power line SVI, and the light-emitting element OLED does not emit light.

As described above, in the period PIP, the pre-charge voltage (intermediate potential) is supplied to the first node N1, the second node N2 is initialized by the reference voltage VREF (0 V), and the third node N3 is initialized by the initialization voltage VINI (−2 V). In addition, for example, after the period PIP, the initialization of the third node N3 continues until the third scan signal SC3(*n*) changes from the state in which HI is supplied to the state in which LO is supplied.

After the period PIP, in the first period of the horizontal period HRP of the KthFRAME, the image data signal SL(m) is in a state in which the data signal VDATA of the voltage VSIGL input to the selected pixel 180 (the pixel circuit 181) is supplied, the second scan signal SC2(*n*) and the third scan signal SC3(*n*) are maintained in the state in which HI is supplied, and the first scan signal SC1(*n*) and the fifth scan signal SC5(*n*) are maintained in the state in which LO is supplied. The fourth scan signal SC4(*n*) changes from the state in which HI is supplied to the state in which LO is supplied.

Therefore, the sixth transistor T6 is turned from the ON state to the OFF state, the second transistor T2, the fourth transistor T4, and the fifth transistor T5 are maintained in the ON state, and the first transistor T1 and the third transistor T3 are maintained in the OFF state.

As a result, the voltage supplied to the first node N1 maintains the voltage Vnd, the voltage supplied to the second node N2 maintains 0 V, and the voltage supplied to the third node N3 maintains the voltage Vnc. In addition, similar to the period PIP, the light-emitting element OLED does not emit light.

In the period PWR following the first period of the horizontal period HRP, the image data signal SL(m) is maintained in the state in which the data signal VDATA of the voltage VSIGL is supplied, the second scan signal SC2(*n*) and the third scan signal SC3(*n*) are maintained in the state in which HI is supplied, and the first scan signal SC1(*n*) and the fourth scan signal SC4(*n*) are maintained in the state in which LO is supplied. The fifth scan signal SC5(*n*) changes from the state in which LO is supplied to the state in which HI is supplied.

Therefore, the first transistor T1 is turned from the OFF state to the ON state, the second transistor T2, the fourth transistor T4, and the fifth transistor T5 are maintained in the ON state, and the third transistor T3 and the sixth transistor T6 are maintained in the OFF state.

As a result, the voltage supplied to the first node N1 gradually drops from the voltage Vnd toward a voltage Vnf (voltage VSIGL, −0.5 V), the voltage supplied to the second node N2 maintains 0 V, and the voltage supplied to the third node N3 maintains the voltage Vnc. In addition, similar to the period PIP, the light-emitting element OLED does not emit light.

In the middle of the period PWR, in the period PVH parallel to (overlapping) the period PWR, the image data signal SL(m) is maintained in the state in which the data signal VDATA of the voltage VSIGL is supplied, the second scan signal SC2(*n*) and the fifth scan signal SC5(*n*) are maintained in the state in which HI is supplied, and the first scan signal SC1(*n*) and the fourth scan signal SC4(*n*) are maintained in the state in which LO is supplied. The third scan signal SC3(*n*) changes from the state in which HI is supplied to the state in which LO is supplied.

Therefore, the fifth transistor T5 is turned from the ON state to the OFF state, the first transistor T1 and the fourth transistor T4 are maintained in the ON state, and the third transistor T3 and the sixth transistor T6 are maintained in the OFF state.

The voltage supplied to the first node N1 continues to gradually drop toward the voltage Vnf and becomes the voltage Vnf, and the voltage supplied to the second node N2 maintains 0 V.

Immediately after the start of the period PVH, the potential difference Vgs is 2 V (0 V−voltage Vnc (−2 V)) and the potential difference Vds is 10 V. Since the potential difference Vgs and the potential difference Vds are greater than the threshold voltage VTH, the second transistor T2 is in the ON state. Therefore, the current Ion flows from the second electrode 626 of the second transistor T2 to the first electrode 624. Since the fifth transistor T5 is in the OFF state, the node N3 is released, the second transistor T2 is in the ON state, the current Ion flows from the drive power line PVDD (the second electrode 626 side) toward the third node N3 (the first electrode 624 side), and the voltage supplied to the third node N3 gradually rises from the voltage Vnc.

When the potential difference Vgs becomes the threshold voltage VTH, the second transistor T2 is turned from the ON state to the OFF state, and the current Ion does not flow. In this case, the voltage supplied to the third node N3 rises from the voltage Vnc (−2 V) to a voltage Vne (−1 V), the potential difference Vgs is 1 V (0 V−voltage Vne (−1 V)), the potential difference Vds is 9 V, and the potential difference Vgs is the same as the threshold voltage VTH (1 V). That is, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). In addition, since the second transistor T2 is in the OFF state and no current Ion flows from the drive power line PVDD to the reference voltage line PVSS, the light-emitting element OLED does not emit light.

In the period at the end of the period PVH, the image data signal SL(m) is maintained in the state in which the data signal VDATA of the voltage VSIGL is supplied, and the third scan signal SC3(*n*) and the fourth scan signal SC4(*n*) maintain the state in which LO is supplied. The fifth scan signal SC5(*n*) changes from the state in which HI is supplied to the state in which LO is supplied. When the fifth scan signal SC5(*n*) is in the state in which LO is supplied, the second scan signal SC2(*n*) changes from the state in which HI is supplied to the state in which LO is supplied. When the second scan signal SC2(*n*) is in the state in which LO is supplied, the first scan signal SC1(*n*) changes from the state in which LO is supplied to the state in which HI is supplied.

Therefore, the third transistor is turned from the OFF state to the ON state, the first transistor T1 and the fourth transistor are turned from the ON state to the OFF state, and the second transistor T2 and the fifth transistor T5, and the sixth transistor T6 are maintained in the OFF state.

As a result, the first node N1 and the second node N2 are conductive, the voltage supplied to the second node N2 gradually drops toward the voltage Vnf and becomes the voltage Vnf, the voltage supplied to the first node N1 maintains the voltage Vnf, and the voltage supplied to the third node N3 maintains the voltage Vne. In addition, since the potential difference Vgs is the voltage Vnf (−0.5 V)−voltage Vne (−1 V)) and the potential difference Vgs is smaller than the threshold voltage VTH, no current Ion flows from the drive power line PVDD to the reference voltage line PVSS. Therefore, the light-emitting element OLED does not emit light.

As described above, in the period PWR, the data signal VDATA is written to the pixel 180 (the pixel circuit 181). Furthermore, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

The light emission period PEM of the KthFRAME following the horizontal period HRP of the KthFRAME is the period during which the pixel 180 emits light based on the voltage VSIGL supplied to the first node N1 and the potential difference Vgs between the voltage supplied to the second node N2 and the voltage supplied to the third node N3.

For example, in the light emission period PEM of the KthFRAME, the data signal VDATA supplied to pixels other than the selected pixel 180 (pixel circuit 181) is supplied to the image data signal SL(m). In addition, the first scan signal SC1(*n*) is maintained in the state in which HI is supplied, and the second scan signal SC2(*n*) to the fifth scan signal SC5(*n*) are maintained in the state in which LO is supplied.

Therefore, the first transistor T1, the second transistor T2, the fourth transistor T4, the fifth transistor T5, and the sixth transistor T6 are maintained in the OFF state, and the third transistor T3 is maintained in the ON state. Since the second transistor T2 is in the OFF state and no current Ion flows from the drive power line PVDD to the reference voltage line PVSS, the light-emitting element OLED does not emit light. As a result, for example, the pixel 180 emitting red light becomes black. In addition, similar to the pixel 180 emitting red light, the pixel 180 emitting blue light, and the pixel 180 emitting green do not emit light, so that the three pixels using the pixel 180 emitting red light, the pixel 180 emitting blue light, and the pixel 180 emitting green light become black.

The display device 10 includes the sixth transistor T6 for supplying the pre-charge voltage VPRC (intermediate potential) to the first node N1, and the first transistor T1 for supplying the data signal VDATA to the first node N1. In addition, the driving of the display device 10 includes supplying the pre-charge voltage VPRC to the first node N1 by the sixth transistor T6, and supplying the pre-charge voltage VPRC to the first node N1 and then supplying the data signal VDATA to the first node N1 by the first transistor T1. That is, the display device 10 may supply the intermediate potential to the first node N1 and then supply the data signal VDATA to the first node N1.

As described in "1-5-1. First Example of Driving Method of Display Device 10", in the case where a white image is displayed based on the voltage VSIGH in the K−1stFRAME and then a black image is displayed based on the voltage VSIGL in the KthFRAME, the first node N1 is supplied with the voltage VSIGH (3.5 V), and then supplied with the intermediate potential (1.5 V) and then supplied with the voltage VSIGL (−0.5 V). That is, in the case where the data voltage is written, the potential fluctuation of the first node N1 is 2 V (1.5 V−(−0.5 V)).

On the other hand, for example, in the display device including a configuration in which the data signal VDATA is supplied without supplying the intermediate potential to the first node N1, in the case where a white image is displayed based on the voltage VSIGH in the K−1stFRAME and then a black image is displayed based on the voltage VSIGL in the KthFRAME, the voltage VSIGH (3.5 V) is supplied to the pixel (pixel circuit) and then the voltage VSIGL (−0.5 V) is supplied. As a result, in the display device including the configuration in which the data signal VDATA is supplied without supplying the intermediate potential to the first node N1, the potential fluctuation in the pixel (pixel circuit) becomes 4 V (3.5 V−(−0.5 V)), and the potential fluctuation becomes larger than that of the display device 10.

Therefore, the potential fluctuation of the first node N1 in the display device 10 is smaller than the potential fluctuation of the first node N1 of a display device that supplies the data voltage without supplying the intermediate potential to the first node N1.

The decrease in the potential fluctuation of the first node N1 is equivalent to a decrease in the potential fluctuation of the image data signal line 321 to which the data signal VDATA is supplied. When the potential fluctuation of the image data signal line 321 is large, the unwanted electromagnetic interference EMI caused by the potential fluctuation of the image data signal line 321 becomes large. Since the display device 10 can reduce the potential fluctuation of the image data signal line 321, the display device 10 can reduce the unwanted electromagnetic interference EMI (Electromagnetic Interference) caused by the potential fluctuation of the image data signal line 321.

In addition, since the display device 10 can reduce the potential fluctuation of the first node N1, the time (writing speed) required for writing data to the first node N1 in the display device 10 can be reduced compared with the display device in which the data signal VDATA is supplied to the first node N1 without supplying the intermediate potential. That is, the display device 10 can achieve a writing speed faster than the display device that supplies the data signal VDATA to the first node N1 without supplying the intermediate potential.

Further, the display device 10 can increase the writing speed of data to the first node N1, so that the time required for the horizontal period HRP can be reduced. As a result, for example, the display device 10 can increase the number of pixels that can be written in the reduced period. Therefore, the display device 10 can provide a high-resolution display device and a large-screen display device.

In addition, the driving method of the display device 10 includes that the period PVH starts after the period PWR starts, and ends after the period PWR ends. That is, a part of the period PWR overlaps the period PVH, and the period PVH is shifted from the period PWR. On the other hand, for example, in the driving method in which the deviation between the period PWR and the period PVH is small, when the second transistor T2 is in the conductive state, the voltage supplied to the third node N3 becomes an unintended voltage due to the influence of the potential fluctuation of the data voltage (the first node N1), so that the initialization voltage VINI (Vnc) needs to be set deeply (at a lower potential), which leads to increased power consumption. As described above, since the driving method of the display device 10 includes the configuration in which the period PVH is shifted from the period PWR, the writing time can be reduced and the increase in power consumption can be suppressed.

[1-5-2. Second Example of Driving Method of Display Device 10]

Figure 6:
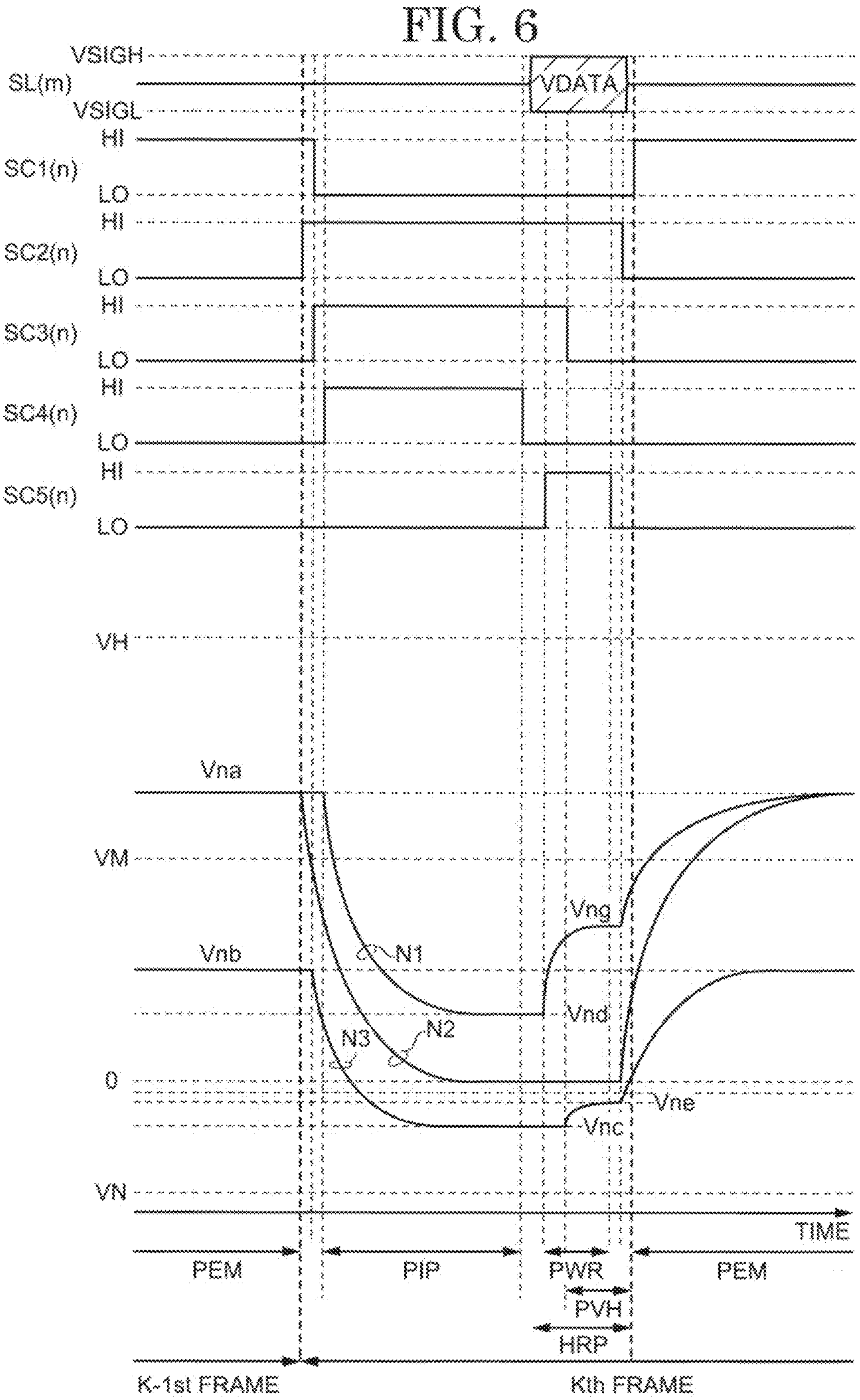
FIG. 6 is a timing chart of a display device according to the first embodiment of the present invention.

A second example of the driving method of the display device 10 will be described with reference to FIG. 6. The driving method shown in the second example of the driving method of the display device 10 includes the pixel 180 (the pixel circuit 181) displaying a white image based on the voltage VSIGH of the data signal VDATA in the previous frame (K−1stFRAME) of the current frame (KthFRAME) and then the pixel 180 (the pixel circuit 181) displaying a white image based on the voltage VSIGH of the data signal VDATA in the KthFRAME. In other words, the driving method shown in the second example includes displaying images of the same color (white) in consecutive frames. Configurations that are the same as or similar to those in FIG. 1 to FIG. 5 will be described as necessary.

The configurations of the first scan signal SC1(*n*) to the fifth scan signal SC5(*n*) are similar to the configurations described in "1-5-1. First Example of Driving Method of Display Device 10". In addition, the voltages (potentials) and the like of the first node N1, the second node N2, and the third node N3 in the periods excluding the horizontal period HRP of the KthFRAME and the light emission period PEM of the KthFRAME are similar to the configuration described in "1-5-1. First Example of Driving Method of Display Device 10". Furthermore, the operations and the like of the transistors in the periods are similar to the configuration described in "1-5-1. First Example of Driving Method of Display Device 10". Therefore, configurations and the like similar to those described in "1-5-1. First Example of Driving Method of Display Device 10" will be described as necessary. In addition, the data signal VDATA of VSIGH corresponding to white is supplied to the image data signal SL(m) in the horizontal period HRP, and the data signal VDATA similar to the configuration described in "1-5-1. First Example of Driving Method of Display Device 10" is supplied in the periods other than the horizontal period HRP.

The driving method of the second example of the display device 10 in the light emission period PEM of the K−1stFRAME, a period between the light emission period PEM of the K−1stFRAME and the period PIP of the KthFRAME following the light emission period PEM of the K−1stFRAME, the period PIP of the KthFRAME, and the first period of the horizon period HRP of the KthFRAME following the period PIP of the KthFRAME is similar to the driving method described in "1-5-1. First Example of Driving Method of Display Device 10".

In the period PWR following the first period of the horizontal period HRP in the second example of the driving method of the display device 10, the configurations of the control signals, the operations of the transistors, and the like are similar to those described in "1-5-1. First Example of Driving Method of Display Device 10". The voltage supplied to the first node N1 gradually rises from the voltage Vnd toward a voltage Vng (voltage VSIGH, 3.5 V), the voltage supplied to the second node N2 maintains 0 V (reference voltage VREF), and the voltage supplied to the third node N3 maintains the voltage Vnc (initialization voltage VINI, −2 V). In addition, similar to the period PIP, the light-emitting element OLED does not emit light.

In the middle of the period PWR in the second example of the driving method of the display device 10, in the period PVH parallel to (overlapping) the period PWR, the configurations of the control signals, the operations of the transistors, and the like are similar to those described in "1-5-1. First Example of Driving Method of Display Device 10". The voltage supplied to the first node N1 gradually rises toward the voltage Vng and becomes the voltage Vng, and the voltage supplied to the second node N2 maintains 0 V.

Immediately after the start of the period PVH in the second example of the driving method of the display device 10, the potential difference Vgs is 2 V, the potential difference Vds is 10 V, and the potential difference Vgs and the potential difference Vds are greater than the threshold voltage VTH, so that the second transistor T2 is in the ON state. Therefore, the current Ion flows from the second electrode 626 of the second transistor T2 to the first electrode 624. Since the fifth transistor T5 is in the OFF state but the second transistor T2 is in the ON state, the current Ion flows from the drive power line PVDD (the second electrode 626 side)

toward the third node N3 (the first electrode 624 side), and the voltage supplied to the third node N3 gradually rises from the voltage Vnc.

When the potential difference Vgs becomes the threshold voltage VTH, the second transistor T2 is turned from the ON state to the OFF state, and the current Ion does not flow. In this case, the voltage supplied to the third node N3 rises from the voltage Vnc to the voltage Vne (−1 V), and the potential difference Vgs (0 V−(−1 V)) is the same as the threshold voltage VTH (1 V). That is, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). In addition, since the second transistor T2 is in the OFF state and no current flows from the drive power line PVDD to the reference voltage line PVSS, the light-emitting element OLED does not emit light.

In the period at the end of the period PVH in the second example of the driving method of the display device 10, the configurations of the control signals, the operations of the transistors, and the like are similar to the configurations described in "1-5-1. First Example of Driving Method of Display Device 10". The first node N1 and the second node N2 are conductive, and the voltage supplied to the second node N2 gradually rises. As a result, the second transistor T2 is in the conductive state, and the current Ion flows from the drive power line PVDD to the reference voltage line PVSS. Therefore, the voltage supplied to the first node N1 and the voltage supplied to the third node N3 rise to follow the rise in the voltage supplied to the second node N2. Due to the voltage rise of the third node N3, the voltage supplied to the first node N1 and the voltage supplied to the second node N2 further rise.

In addition, for example, in the light emission period PEM of the KthFRAME following the horizontal period HRP of the KthFRAME in the second example of the display device 10 driving method, the voltage supplied to the first node N1 and the voltage supplied to the second node N2 rise to the voltage Vna, and the voltage supplied to the third node N3 rises to the voltage Vnb. As a result, the potential difference Vgs becomes 4.5 V (voltage Vna (7 V)−voltage Vnb (2.5 V)). The potential difference Vgs is greater than the threshold voltage VTH, the second transistor T2 is in the ON state, the current Ion flows from the drive power line PVDD to the reference voltage line PVSS, and the light-emitting element OLED emits light. For example, the pixel 180 (the pixel circuit 181) emits red light, and white light is emitted by three pixels using the pixel 180 emitting red light, the pixel 180 emitting blue light, and the pixel 180 emitting green light.

As described above, in the period PWR in the second example of the display device 10, the data-signal VDATA is written to the pixel 180 (the pixel circuit 181). Further, in the period PVH in the second example of the driving method of the display device 10, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). Furthermore, in the light emission period PEM of the KthFRAME in the second example of the display device 10, white light is emitted by three pixels.

[1-5-3. Third Example of Driving Method of Display Device 10]

Figure 7:
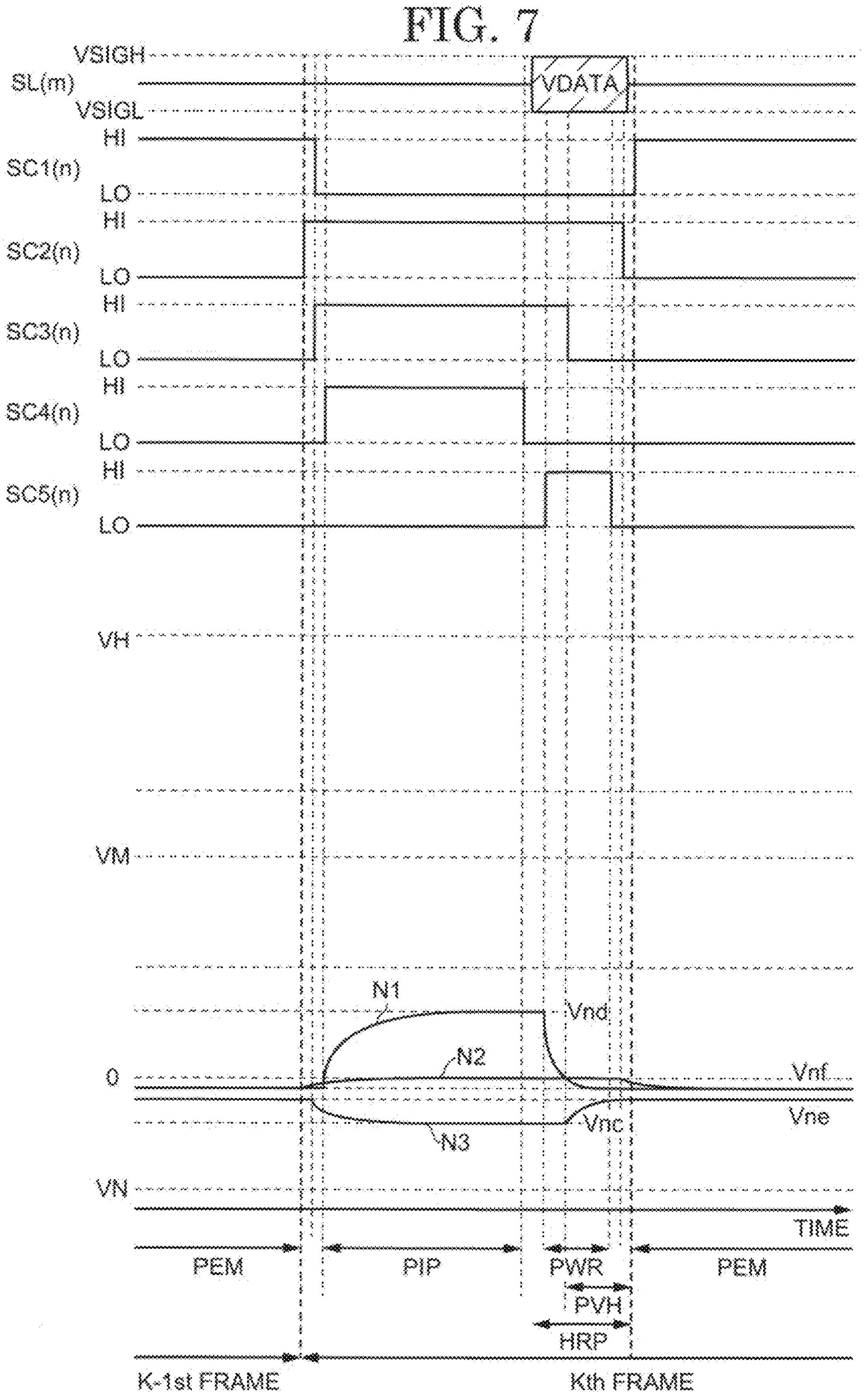
FIG. 7 is a timing chart of a display device according to the first embodiment of the present invention.

A third example of the driving method of the display device 10 will be described with reference to FIG. 7. The driving method shown in the third example of the driving method of the display device 10 includes the pixel 180 (the pixel circuit 181) displaying a black image based on the voltage VSIGL of the data signal VDATA in the previous frame (K−1stFRAME) of the current frame (KthFRAME) and then the pixel 180 (the pixel circuit 181) displaying a black image based on the voltage VSIGL of the data signal VDATA in the KthFRAME. In other words, the driving method shown in the third example includes displaying images of the same color (black) in consecutive frames. Configurations that are the same as or similar to those in FIG. 1 to FIG. 6 will be described as necessary.

The configurations of the first scan signal SC1(*n*) to the fifth scan signal SC5(*n*) are similar to those described in "1-5-1. First Example of Driving Method of Display Device 10". In addition, the voltages (potentials) of the first node N1, the second node N2, the third node N3, and the like in the horizontal period HRP of the KthFRAME and the light emission period PEM of the KthFRAME are similar to the configurations described in "1-5-1. First Example of Driving Method of Display Device 10". Further, the operations and the like of the transistors in the periods are similar to the configurations described in "1-5-1. First Example of Driving Method of Display Device 10". Therefore, configurations and the like similar to those described in "1-5-1. First Example of Driving Method of Display Device 10" will be described as necessary. In addition, the data signal VDATA of VSIGH corresponding to black is supplied to the image data signal SL(m) in the horizontal period HRP, and the data signal VDATA similar to the configuration described in "1-5-1. First Example of Driving Method of Display Device 10" is supplied in the periods other than the horizontal period HRP.

The light emission period PEM of the K−1stFRAME is a period during which the pixel 180 (pixel circuit 181) emits light according to the potential difference Vgs (voltage V (N2)−voltage V (N3)=Vnf (−0.5 V)−voltage Vne (−1 V)). For example, the potential difference Vgs is 0.5 V and is smaller than the threshold voltage VTH. Therefore, since the second transistor T2 is in the OFF state and no current Ion flows from the drive power line PVDD to the reference voltage line PVSS, the light-emitting element OLED does not emit light. As a result, for example, the pixel 180 becomes black.

In the period between the light emission period PEM of the K−1stFRAME and the period PIP of the KthFRAME following the light emission period PEM of the K−1stFRAME, the voltage supplied to the first node N1 maintains the voltage Vnf, and the voltage supplied to the second node N2 gradually rises from the voltage Vnf toward the reference voltage VREF. In addition, the voltage supplied to the third node N3 gradually drops from the voltage Vnb toward the voltage Vnc. Since the second transistor T2 and the fifth transistor T5 are in the ON state and a current flows from the drive power line PVDD to the initialization voltage power line SVI, the light-emitting element OLED does not emit light.

In the period PIP of the KthFRAME following the light emission period PEM of the K−1stFRAME and the period PIP of the KthFRAME, the voltage supplied to the first node N1 gradually rises from the voltage Vnf toward the voltage Vnd (pre-charge voltage VPRC, 1.5 V) and becomes the voltage Vnd. The voltage supplied to the second node N2 gradually rises from the voltage Vnf toward 0 V (reference voltage VREF) and becomes 0 V. The voltage supplied to the third node N3 gradually drops from the voltage Vne toward the voltage Vnc (initialization voltage VINI, −2 V) and becomes the voltage Vnc. The potential difference Vgs is 2 V (0 V−(−2 V)) and the potential difference Vds is 10 V (8 V−(−2 V)). Since the second transistor T2 and the fifth transistor T5 are in the ON state and a current flows from the drive power line PVDD to the initialization voltage power line SVI, the light-emitting element OLED does not emit light.

As described above, in the period PIP in the third example of the driving method of the display device 10, the precharge voltage (intermediate potential) is supplied to the first node N1, the second node N2 is initialized by the reference voltage VREF (0 V), and the third node N3 is initialized by the initialization voltage VINI (−2 V).

As described above, the voltages (potentials) of the first node N1, the second node N2, and the third node N3 in the horizontal period HRP and the light emission period PEM of the KthFRAME following the period PIP, the operations of the transistors, and the like are similar to those described in "1-5-1. First Example of Driving Method of Display Device 10".

Furthermore, in the period PWR in the third example, the data signal VDATA (the voltage VSIGL in the third example) is written to the pixel 180 (the pixel circuit 181) similar to "1-5-1. First Example of Driving Method of Display Device 10". Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Furthermore, in the light emission period PEM of the KthFRAME, similar to "1-5-1. First Example of Driving Method of Display Device 10", since the pixel 180 emitting red light, the pixel 180 emitting blue light, and the pixel 180 emitting green light do not emit light, three pixels using the pixel 180 emitting red light, the pixel 180 emitting blue light, and the pixel 180 emitting green light become black.

[1-5-4. Fourth Example of Driving Method of Display Device 10]

Figure 8:
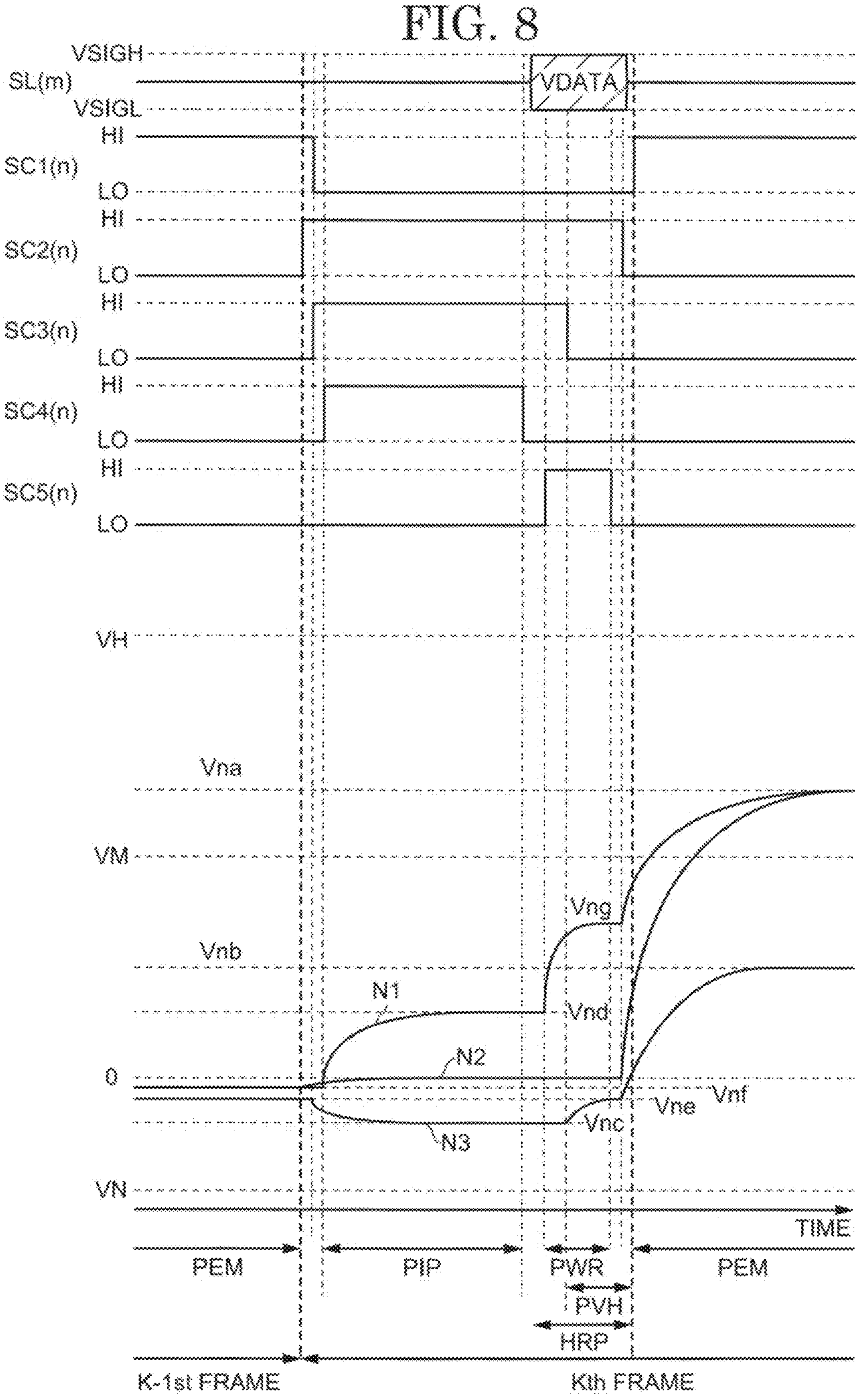
FIG. 8 is a timing chart of a display device according to the first embodiment of the present invention.

A fourth example of the driving method of the display device 10 will be described with reference to FIG. 8. The driving method shown in the fourth example of the driving method of the display device 10 includes the pixel 180 (the pixel circuit 181) displaying a black image based on the voltage VSIGL of the data signal VDATA in the previous frame (K−1stFRAME) of the current frame (KthFRAME) and then the pixel 180 (the pixel circuit 181) displaying a white image based on the voltage VSIGH of the data signal VDATA in the KthFRAME. In other words, the driving method shown in the fourth example includes displaying images of different colors in consecutive frames. Configurations that are the same as or similar to those in FIG. 1 to FIG. 7 will be described as necessary.

The configurations of the first scan signal SC1(*n*) to the fifth scan signal SC5(*n*) are similar to those described in "1-5-1. First Example of Driving Method of Display Device 10". In addition, the voltages (potentials) of the first node N1, the second node N2, and the third node N3 in the light emission period PEM of K−1thFRAME and the period PIP of the KthFRAME, the operations of the transistors, and the like are similar to "1-5-3. Third Example of Driving Method of Display Device 10", and the voltages (potentials) of the first node N1, the second node N2, and the third node N3 in the horizontal period HRP of the KthFRAME and the light emission period PEM of the KthFRAME, the operations of the transistors, and the like are similar to "1-5-2. Second Example of Driving Method of the display device 10". Configurations and the like similar to those described in "1-5-1. First Example of Driving Method of Display Device 10", "1-5-2. Second Example of Driving Method of the display device 10", and "1-5-3. Third Example of Driving Method of Display Device 10" will be described as necessary. In addition, the data signal VDATA of VSIGH corresponding to white is supplied to the image data signal SL(m) in the horizontal period HRP, and the data signal VDATA similar to the configuration described in "1-5-1. First Example of Driving Method of Display Device 10" is supplied in the periods other than the horizontal period HRP.

The fourth example of the driving method of the display device 10 in the light emission period PEM of the K−1stFRAME, the period between the light emission period PEM of the K−1stFRAME and the period PIP of the KthFRAME, and the period PIP of the KthFRAME is similar to the driving method described in "1-5-3. Third Example of Driving Method of PEM, K−1stFRAME 10".

The fourth example of the driving method of the display device 10 in the horizontal period HRP of the K−1stFRAME and the light emission period PEM of the KthFRAME is similar to the driving method described in "1-5-2. Second Example of Driving Method of Display Device 10".

[1-6. Cross-Sectional Structure of Pixel 180 Along Line A1-A2]

Figure 9:
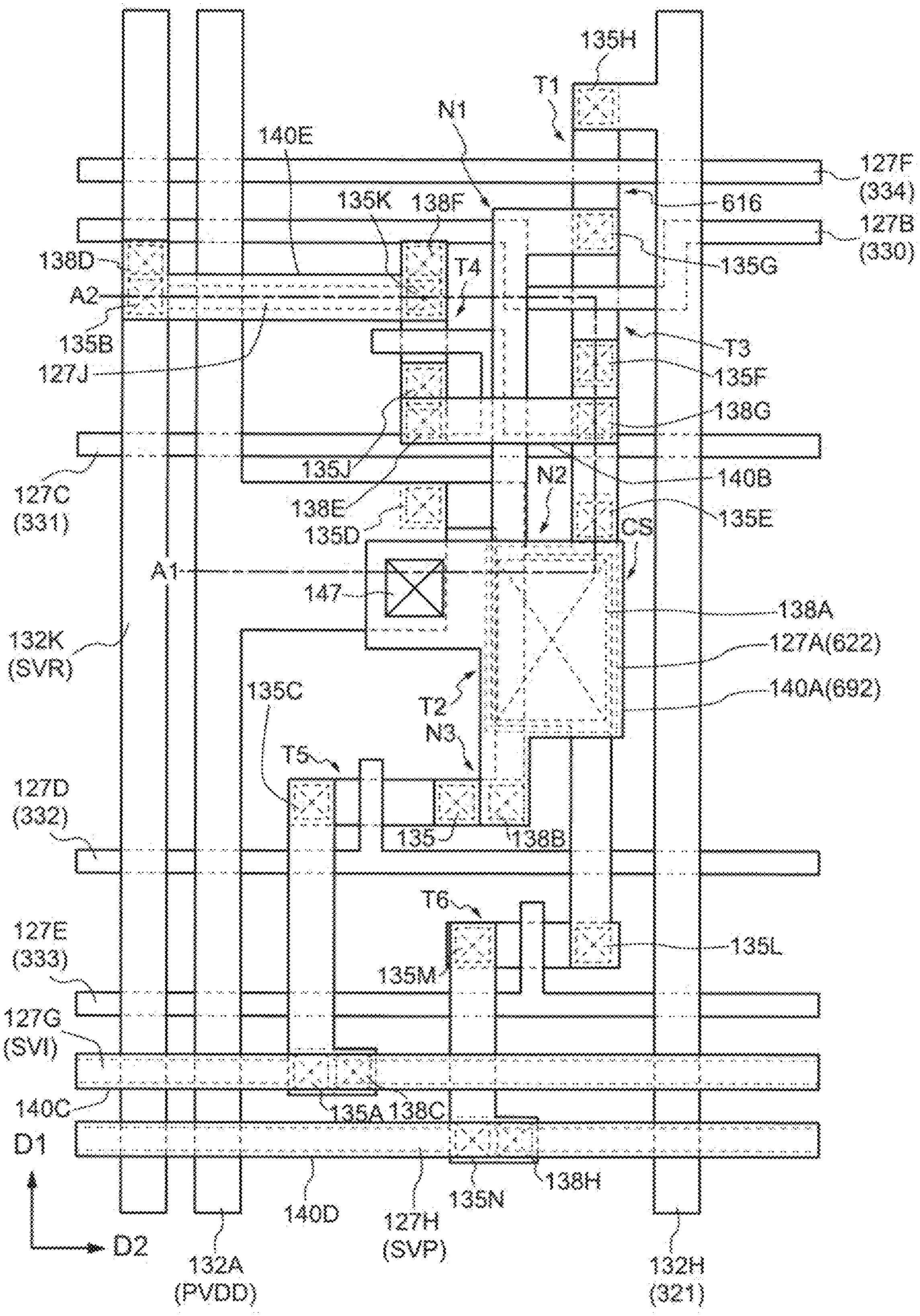
FIG. 9 is a layout diagram of a pixel according to the first embodiment of the present invention.
Figure 10:
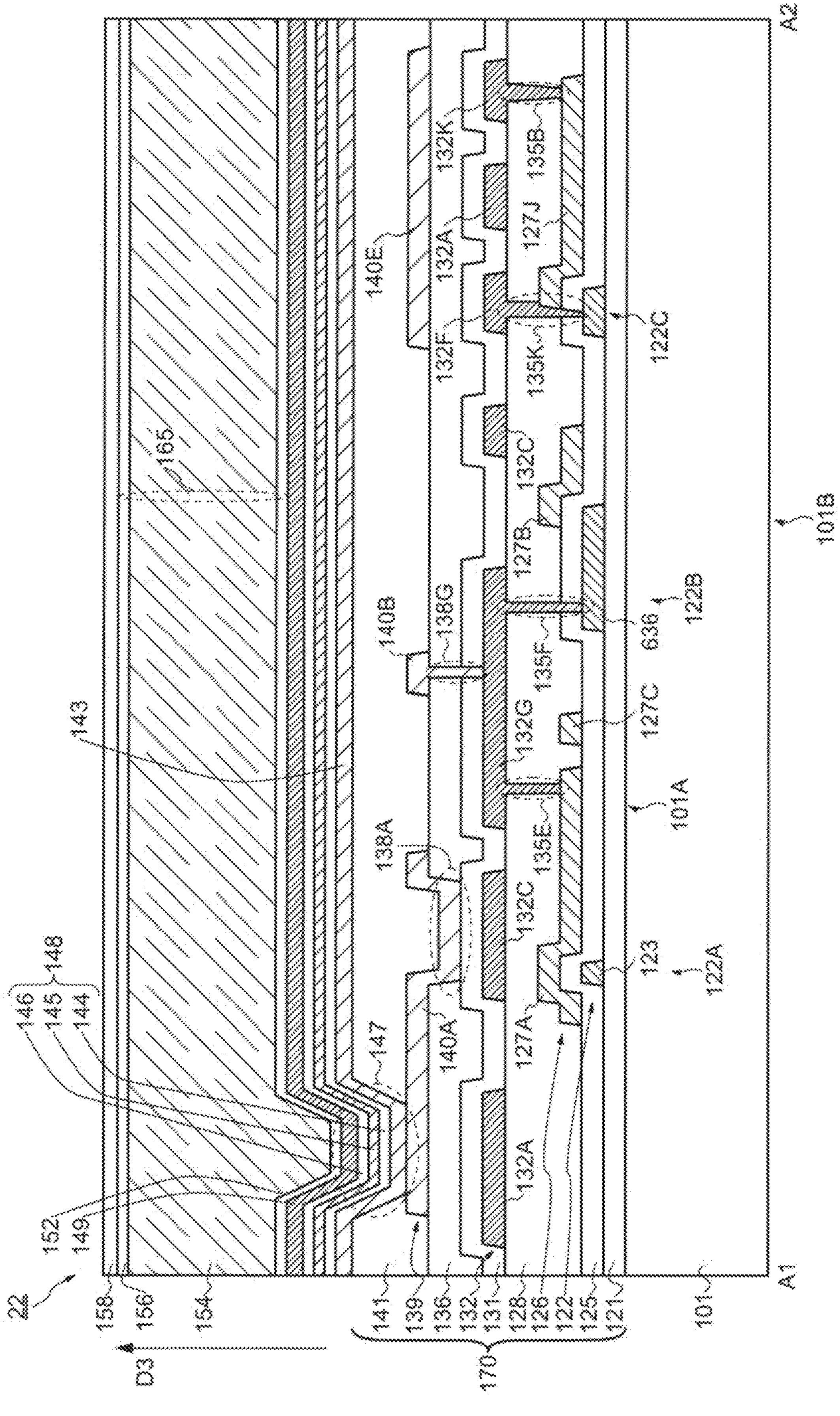
FIG. 10 is an end view showing an end face cut along a line A1-A2 in the layout shown in FIG. 9.

A cross-sectional structure of the pixel 180 along a line A1-A2 will be described with reference to FIG. 9, FIG. 10, and FIG. 12 to FIG. 14. FIG. 9 and FIG. 12 to FIG. 14 are layout diagrams of the pixel 180. FIG. 10 is an end view showing an end face of the pixel 180 shown in FIG. 9 cut along the line A1-A2. The configuration of the pixel 180 shown in FIG. 9, FIG. 10, and FIG. 12 to FIG. 14 is an example, and the configuration of the pixel 180 is not limited to the example shown in FIG. 9, FIG. 10, and FIGS. 12 to 14. Configurations that are the same as or similar to those in FIG. 1 to FIG. 8 will be described as necessary.

In addition, as an example of the end face of the pixel 180, the end face of the pixel 180 shown in FIG. 10 is an end face along the drive power line PVDD (a first wiring 132A), a contact hole opening 147 for an anode electrode, the second electrode 694 (a first wiring 132C) of the capacitive element CS, the first electrode 692 (a second wiring 140A) of the capacitive element CS, the gate electrode 622 (a gate wiring 127A) of the second transistor T2, a channel region 123 of a semiconductor layer 122, an organic insulating film opening 138A for the capacitive element CS, a first contact hole opening 135E, a first wiring 132G, a second contact hole opening 138G, the scan signal line 331 (a gate wiring 127C), a first contact hole opening 135F, a semiconductor layer 122B, the scan signal line 330 (a gate wiring 127B), the second electrode 694 (the first wiring 132C) of the capacitive element CS, a second wiring 140E, a first wiring 132F, a first contact hole opening 135K, a semiconductor layer 122C, a gate wiring 127J, the drive power line PVDD (the first wiring 132A), the reference voltage power line SVR (a first wiring 132K), and the first contact hole opening 135B.

A substrate 101 includes a first surface 101A and a second surface 101B opposite the first surface 101A. The semiconductor layer 122 is provided on the first surface 101A of the substrate 101 via an underlayer 121. The semiconductor layer 122 includes the semiconductor layers 122A, 122B, and 122C. The semiconductor layer 122A includes the channel region 123 and an impurity region 124A. For example, the impurity region is referred to as a source region or a drain region. For example, the second transistor T2 and the fifth transistor T5 include the semiconductor layer 122A, and the first electrode 624 and the second electrode 656 include the impurity region 124A. In other words, the semiconductor layer 122A includes the channel region of the second transistor T2 and the channel region of the fifth transistor T5. Similar to the semiconductor layer 122A, the first transistor T1 and the third transistor T3 include the semiconductor layer 122B, the fourth transistor T4 includes the semiconductor layer 122C, and the first electrode 614, the second electrode 616, the first electrode 634, the second electrode 636, the first electrode 644, and the second electrode 646 include the impurity region.

A gate insulating layer 125, a conductive layer 126, an insulating layer 128, and a conductive layer 132 are provided in this order on the semiconductor layer 122. The conductive layer 126 includes the gate wiring 127A (the gate electrode 622), the gate wiring 127B (the scan signal line 330), the gate wiring 127C (the scan signal line 331), and the gate wiring 127J (reference voltage power line SVR). The conductive layer 132 includes the first wiring 132A (the drive power line PVDD), the first wiring 132C (the second electrode 694), the first wiring 132G, the first wiring 132F, and the first wiring 132K (reference voltage power line SVR). In addition, a region where the conductive layer 126 and the semiconductor layer 122 overlap is the channel region. In other words, a region where a gate electrode and a semiconductor layer of each transistor overlap is the channel region.

Each transistor of the pixel 180 is formed using the semiconductor layer 122 (the channel region 123 and the impurity region 124A), the gate insulating layer 125, and the conductive layer 126 (e.g., the gate wiring 127A).

A first contact hole opening 135 reaching the semiconductor layer 122 is provided in the gate insulating layer 125 and the insulating layer 128. The first contact hole opening 135E exposes the gate wiring 127A. The first contact hole opening 135F exposes the gate wiring 127J and the semiconductor layer 122B. The first contact hole opening 135K exposes the semiconductor layer 122C. The first contact hole opening 135B exposes the gate wiring 127J.

The conductive layer 132 is electrically connected to the conductive layer 126 or the semiconductor layer 122 via the first contact hole opening 135. For example, the first wiring 132G is electrically connected to the gate wiring 127A via the first contact hole opening 135E and is electrically connected to the semiconductor layer 122B via the first contact hole opening 135F. That is, the first wiring 132G has a function of electrically connecting the gate wiring 127A and the semiconductor layer 122B. In addition, for example, the first wiring 132F is electrically connected to the gate wiring 127J and the semiconductor layer 122C via the first contact hole opening 135K. That is, the first wiring 132F has a function of electrically connecting the gate wiring 127J and the semiconductor layer 122C via one opening (the first contact hole opening 135K).

An insulating layer 131 is provided to cover the conductive layer 132. An insulating layer 136 is provided to cover the insulating layer 131.

The second contact hole opening 138G is provided in the insulating layer 131 and the insulating layer 136. The organic insulating film opening 138A for the capacitive element CS is provided in the insulating layer 136. A conductive layer 139 is provided on the insulating layer 136 and in the organic insulating film opening 138A for the capacitive element CS and the second contact hole opening 138G. The conductive layer 139 includes the second wiring 140A (the first electrode 692), a second wiring 140B, and the second wiring 140E (the reference voltage power line SVR). The second contact hole opening 138G exposes the conductive layer 132 (e.g., the first wiring 132G). For example, the second contact hole opening 138G electrically connects the second wiring 140B and the first wiring 132G. The organic insulating film opening 138A for the capacitive element CS exposes the insulating layer 136. For example, the capacitive element CS is formed using the insulating layer 131 as a dielectric and the first wiring 132C (the second electrode 694) and the second wiring 140A (the first electrode 692). For example, the second wiring 140A also serves as a pixel electrode. Although not shown, for example, the second contact hole opening 138 exposes a part of a plurality of terminals (not shown) included in the terminal section 150. Some of the exposed terminals are electrically connected to the FPC 200 using a conductive film such as an anisotropic conductive film (not shown).

An insulating layer 141 is provided to cover the conductive layer 139.

The underlayer 121, the semiconductor layer 122, the gate insulating layer 125, the conductive layer 126, the insulating layer 128, the conductive layer 132, the insulating layer 131, the insulating layer 136, the conductive layer 139, and the insulating layer 141 are collectively referred to as an array section 170.

Next, the layers above the insulating layer 141 will be described. The contact hole opening 147 for an anode electrode is provided in the insulating layer 141. The contact hole opening 147 for an anode electrode exposes the conductive layer 139 (e.g., the second wiring 140A).

An anode electrode 143 is provided to cover the exposed conductive layer 139, the contact hole opening 147 for an anode electrode, and the insulating layer 141. A functional layer 148 is provided on the anode electrode 143. A common electrode 149 is provided on the functional layer 148. The common electrode 149 is a cathode electrode (the first electrode 682 of the light-emitting element OLED). In this case, the light-emitting element OLED is composed of the anode electrode 143, the functional layer 148, and the common electrode 149.

The configuration of the functional layer 148 can be selected as appropriate. For example, the functional layer 148 may be configured by combining a carrier injection layer, a carrier transport layer, a light-emitting layer, a carrier blocking layer, an exciton blocking layer, and the like. For example, the functional layer 148 shown in FIG. 10 includes a first layer 144, a second layer 145, and a third layer 146. For example, the first layer 144 is a carrier (hole) injection and transport layer, the second layer 145 is a light-emitting layer, and the third layer 146 is a carrier (electron) injection and transport layer.

A sealing film 165 is provided on the common electrode 149. For example, the sealing film 165 includes a first inorganic insulating layer 152, an organic insulating layer 154, and a second inorganic insulating layer 156. In addition, the first inorganic insulating layer 152 and the second inorganic insulating layer 156 are formed to cover at least the display region 22. A cover film 158 is arranged on the second inorganic insulating layer 156.

For example, the first layer 144, the second layer 145 (light-emitting layer), the third layer 146, and the common electrode 149 included in the functional layer 148 are not arranged on the IC chip 110 and the control circuit 120. The sealing film 165 and the cover film 158 are arranged on the IC chip 110 and the control circuit 120. The sealing film 165 and the cover film 158 suppress impurities (water, oxygen, etc.) from entering the light-emitting element OLED, the transistors, and the like from outside of the display device 10.

Common metal materials are used as the conductive layer 126, the conductive layer 132, the conductive layer 139, and the common electrode 149. For example, aluminum (Al), titanium (Ti), chromium (Cr), cobalt (Co), nickel (Ni), molybdenum (Mo), hafnium (Hf), tantalum (Ta), tungsten (W), bismuth (Bi), silver (Ag), copper (Cu), and an alloy or compound thereof are used as the common metal material.

For example, the semiconductor layer 122 may contain the LTPS and may contain a metal oxide.

A common insulating material can be used as a material for forming the underlayer 121, the gate insulating layer 125, the insulating layer 131, the first inorganic insulating layer 152, and the second inorganic insulating layer 156. For example, inorganic insulating layers such as silicon oxide ($SiO_x$), silicon oxynitride ($SiO_xN_y$), silicon nitride ($SiN_x$), and silicon nitride oxide ($SiN_xO_y$) are used as the insulating layers.

For example, an organic compound material having excellent surface-flatness can be used as a material for forming the insulating layer 128, the insulating layer 136, the insulating layer 141, and the organic insulating layer 154. The insulating layer 128, the insulating layer 136, and the insulating layer 141 may be referred to as organic insulating layers.

[1-7. Method for Manufacturing Display Device 10]

Figure 11:
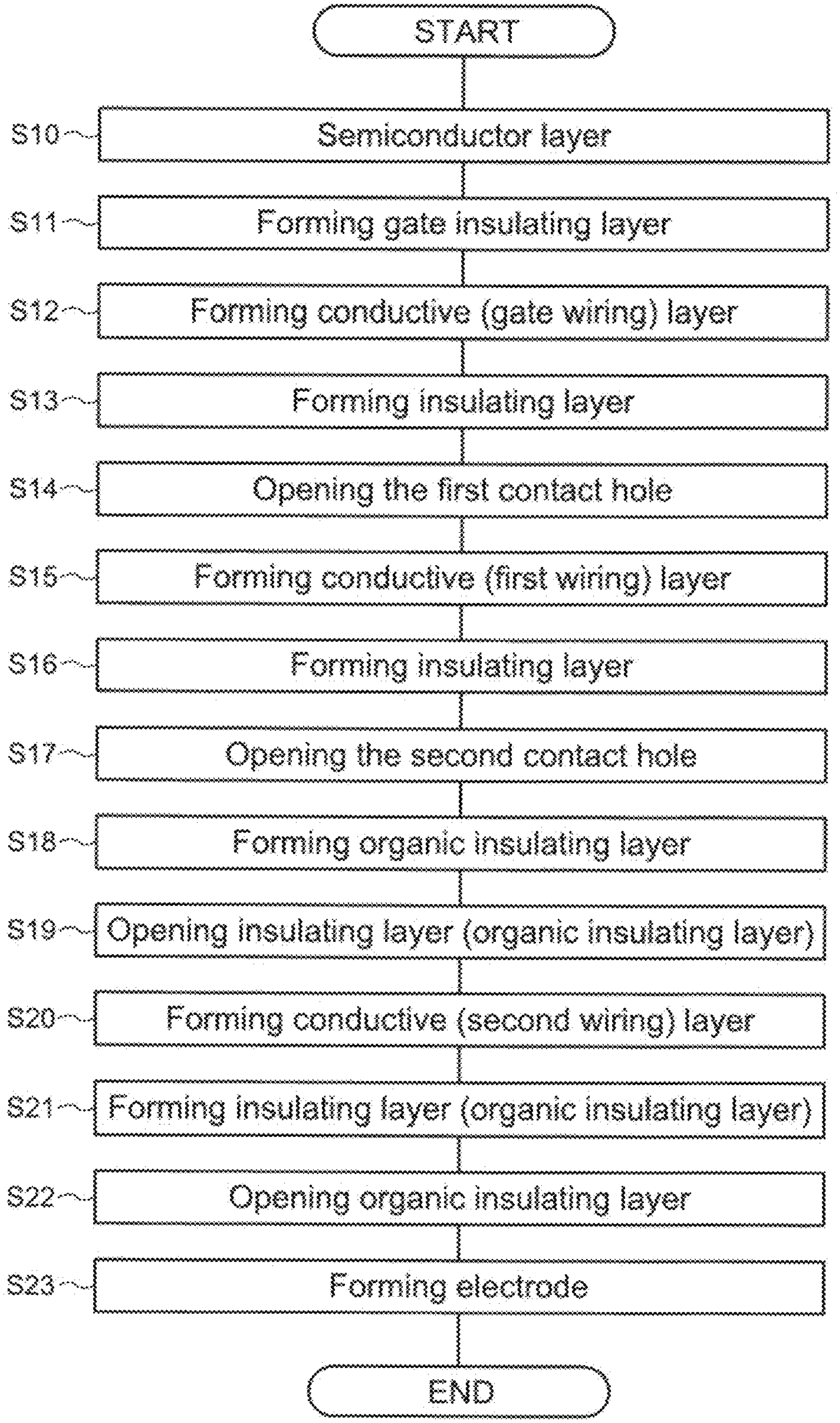
FIG. 11 is a sequence diagram showing a method for manufacturing a display device according to the first embodiment of the present invention.

A method for manufacturing the display device 10 (pixel 180) will be described with reference to FIG. 9 to FIG. 14. FIG. 11 is a sequence diagram showing a method for manufacturing the display device 10. Configurations that are the same as or similar to those in FIG. 1 to FIG. 8 will be described as necessary.

As shown in FIG. 10, when manufacturing of the display device 10 (pixel 180) is started, the underlayer 121 is formed on the first surface 101A of the substrate 101.

Figure 12:
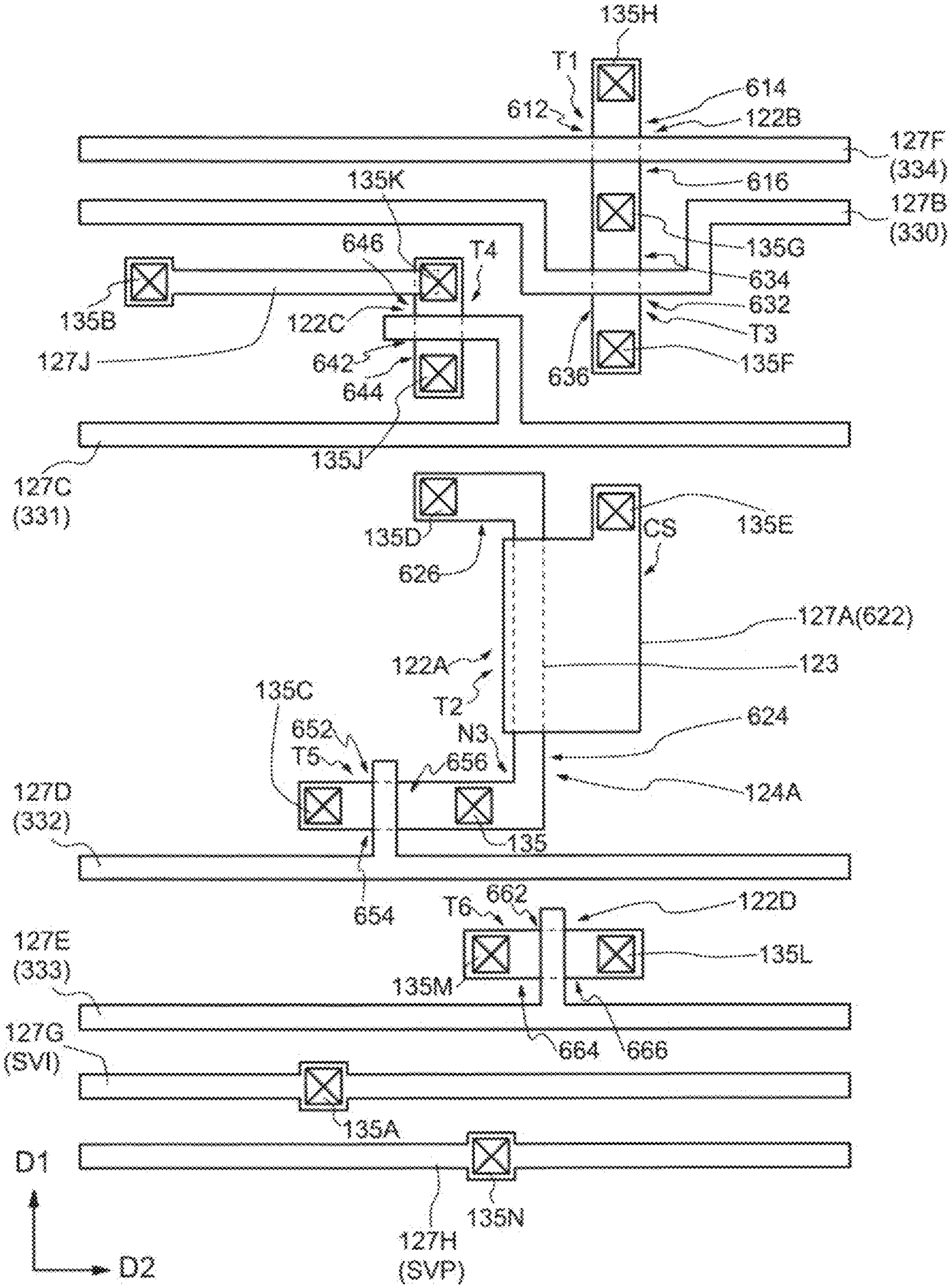
FIG. 12 is a layout diagram of a pixel according to the first embodiment of the present invention.

As shown in FIG. 10 or FIG. 12, the semiconductor layer 122 is formed on the underlayer 121 (step 10 (S10) of FIG. 11). The semiconductor layer 122 includes the semiconductor layers 122A, 122B, 122C, and 122D. The semiconductor layer 122A serves as both the semiconductor layer of the second transistor T2 and the semiconductor layer of the fifth transistor T5. The semiconductor layer 122B serves as both the semiconductor layer of the first transistor T1 and the semiconductor layer of the third transistor T3. The semiconductor layer 122C is the semiconductor layer of the fourth transistor T4. The semiconductor layer 122D is the semiconductor layer of the sixth transistor T6. In other words, the semiconductor layer 122B includes the channel region of the first transistor T1 and the channel region of the third transistor T3, the semiconductor layer 122C includes the channel region of the fourth transistor T4, and the semiconductor layer 122D includes the channel region of the sixth transistor T6.

For example, the method for manufacturing the display device 10 includes forming the semiconductor layer 122 using a metal oxide. Therefore, the first transistor T1 to the sixth transistor T6 can all be n-channel field-effect transistors. For example, in the method for manufacturing the display device 10, the number of manufacturing steps can be reduced as compared with the case of forming the semiconductor layer 122 using crystalline silicon or the like and forming an n-channel field-effect transistor and a p-channel field-effect transistor. In addition, the method for manufacturing the display device 10 can suppress a decrease in yield and reduce manufacturing costs by reducing the number of manufacturing steps.

The gate insulating layer 125 (see FIG. 10) is formed on the semiconductor layer 122 and on the underlayer 121 where the semiconductor layer 122 is not formed (step 11 (S11) of FIG. 11).

The conductive layer 126 (see FIG. 10) is formed on the gate insulating layer 125 (step 12 (S12) of FIG. 11). As shown in FIG. 10 or FIG. 12, the conductive layer 126 includes the gate wiring 127A (the gate electrode 622), the gate wiring 127B (the scan signal line 330), the gate wiring 127C (the scan signal line 331), a gate wiring 127D (the scan signal line 332), a gate wiring 127E (the scan signal line 333), a gate wiring 127F (the scan signal line 334), a gate wiring 127G (the initialization voltage power line SVI), a gate wiring 127H (the pre-charge voltage power line SVP), and the gate wiring 127J (the reference voltage power line SVR). The gate wiring 127B includes the gate electrode 632 and the gate wiring 127C includes the gate electrode 642. The gate wiring 127D includes the gate electrode 652 and the gate wiring 127E includes the gate electrode 662. The gate wiring 127F includes the gate electrode 612.

A region where the second gate electrode 622 of the second transistor T2 and the semiconductor layer 122A overlap is a channel region 123, and the channel region 123 corresponds to a channel length of the second transistor T2. Similarly, a region where the gate electrode 612 of the first transistor T1 and the semiconductor layer 122B overlap is the channel region of the first transistor T1. A region where the third transistor T3 and the semiconductor layer 122B overlap is the channel region of the third transistor T3 and corresponds to the channel length. A region where the fourth transistor T4 and the semiconductor layer 122C overlap is the channel region of the fourth transistor T4 and corresponds to the channel length. A region where the fifth transistor T5 and the semiconductor layer 122A overlap is the channel region of the fifth transistor T5 and corresponds to the channel length. A region where the sixth transistor T6 and the semiconductor layer 122D overlap is the channel region of the sixth transistor T6 and corresponds to the channel length of the sixth transistor T6.

As shown in FIG. 12, in a plan view, the channel region 123 of the second transistor T2 is larger (longer) than the channel region of the first transistor T1, the channel region of the third transistor T3, the channel region of the fourth transistor T4, the channel region of the fifth transistor T5, and the channel region of the sixth transistor T6. That is, the channel length of the second transistor T2 is longer than the channel length of the first transistor T1, the channel length of the third transistor T3, the channel length of the fourth transistor T4, the channel length of the fifth transistor T5, and the channel length of the sixth transistor T6. Since the second transistor T2 operates in the saturated region, the kink effect needs to be suppressed. Furthermore, the resistance of the second transistor T2 to hot carriers needs to be higher than the resistance of the other transistors in the pixel 180 to hot carriers. To suppress the kink effect and ensure reliability (hot carrier resistance), the channel length of the second transistor T2 is longer than the channel length of the other transistors in the pixel 180.

The insulating layer 128 (see FIG. 10) is formed on the conductive layer 126 and on the gate insulating layer 125 where the conductive layer 126 is not formed (step 13 (S13) of FIG. 11).

As shown in FIG. 10 or FIG. 12, the first contact hole openings 135, 135A, 135B, 135C, 135D, 135E, 135F, 135G,

135H, 135J, 135K, 135L, 135M, and 135N are opened (step 14 (S14)). Each opening opens the gate insulating layer 125 and the insulating layer 128 to expose wirings, semiconductor layers or electrodes corresponding to each opening. For example, the first contact hole opening 135 exposes the semiconductor layer 122A (e.g., the impurity region 124A) and the first contact hole opening 135A exposes the gate wiring 127G. Other openings also expose the corresponding wirings, semiconductor layers or electrodes.

Figure 13:
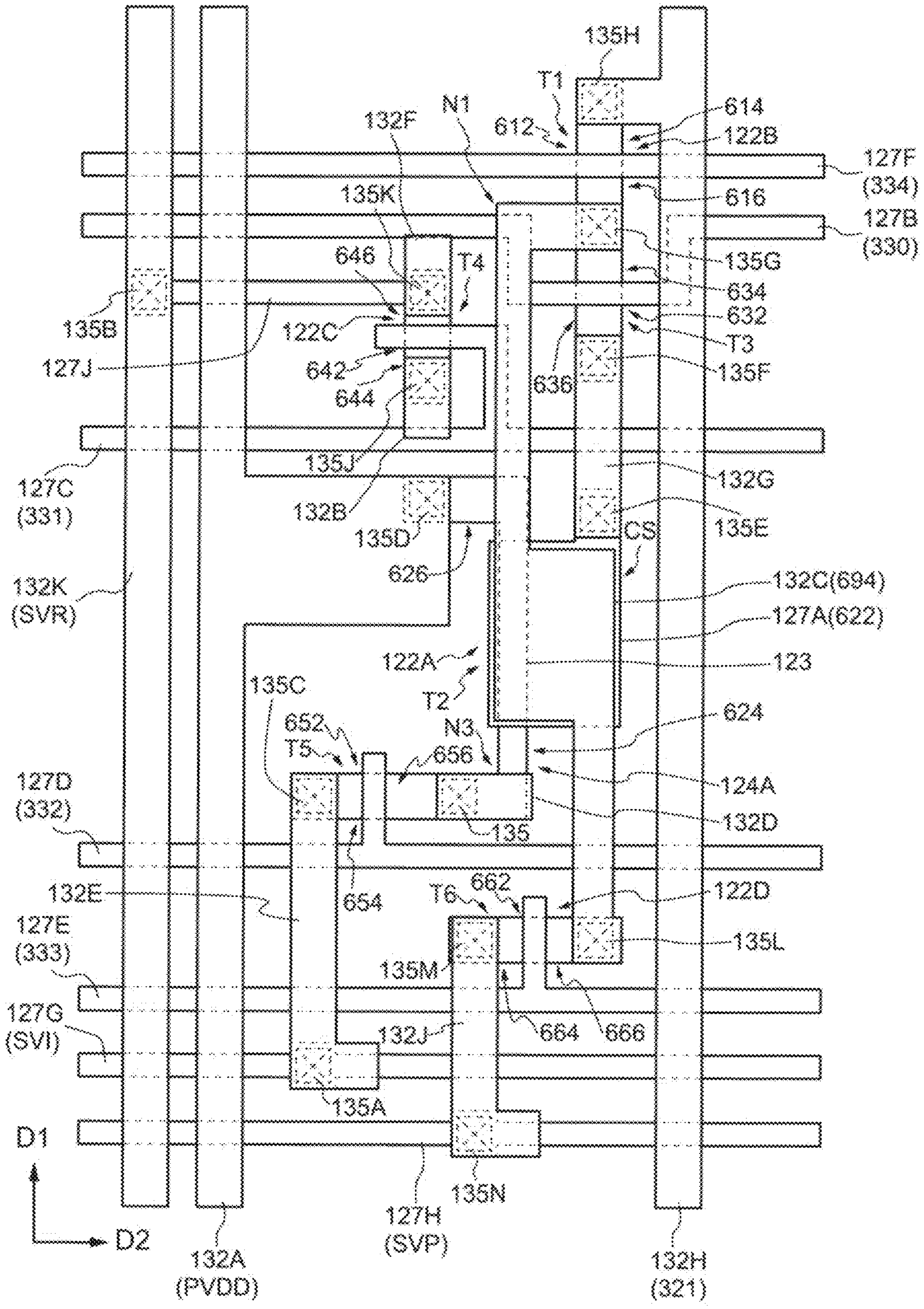
FIG. 13 is a layout diagram of a pixel according to the first embodiment of the present invention.

The conductive layer 132 (see FIG. 10) is formed on the insulating layer 128 (step 15 (S15)). As shown in FIG. 10 or FIG. 13, the conductive layer 132 includes the first wiring 132A (the drive power line PVDD), a first wiring 132B, a first wiring 132C (the second electrode 694), a first wiring 132D, a first wiring 132E, a first wiring 132F, a first wiring 132G, a first wiring 132H (the image data signal line 321), a first wiring 132J, and a first wiring 132K (the reference voltage power line SVR).

As shown in FIG. 13, in a plan view, the first wiring 132A is electrically connected to the semiconductor layer 122A via the first contact hole opening 135D, the second electrode 694 is electrically connected to the first electrode 644 via the first contact hole opening 135J, the second electrode 694 is electrically connected to the second electrode 616 and the first electrode 634 via the first contact hole opening 135G and electrically connected to the second electrode 666 via the first contact hole opening 135L, and the first wiring 132D is electrically connected to the second electrode 656 and the first electrode 624 via the first contact hole opening 135. In addition, as shown in FIG. 13, in a plan view, the first wiring 132E is electrically connected to the initialization voltage power line SVI via the first contact hole opening 135A and electrically connected to the first electrode 654 via the first contact hole opening 135C, the first wiring 132F is electrically connected to the second electrode 646 via the first contact hole opening 135K, the first wiring 132G is electrically connected to the second electrode 636 via the first contact hole opening 135F and electrically connected to the gate electrode 622 via the first contact hole opening 135E, the image data signal line 321 is electrically connected to the first electrode 614 via the first contact hole opening 135H, the first wiring 132J is electrically connected to the first electrode 664 via the first contact hole opening 135M and electrically connected to the pre-charge voltage power line SVP via the first contact hole opening 135N, and the reference voltage power line SVR is electrically connected to the gate wiring 127C via the first contact hole opening 135B and electrically connected to the second electrode 646 via the first contact hole opening 135K.

In addition, as shown in FIG. 13, the second electrode 694, the gate electrode 622, and the semiconductor layer 122A (the channel region 123) overlap. That is, the second transistor T2 (the channel region and the gate electrode 622) overlaps the second electrode 694 of the capacitive element CS.

The insulating layer 131 (see FIG. 10) is formed on the conductive layer 132 and on the insulating layer 128 where the conductive layer 132 is not formed (step 16 (S16) of FIG. 11).

Figure 14:
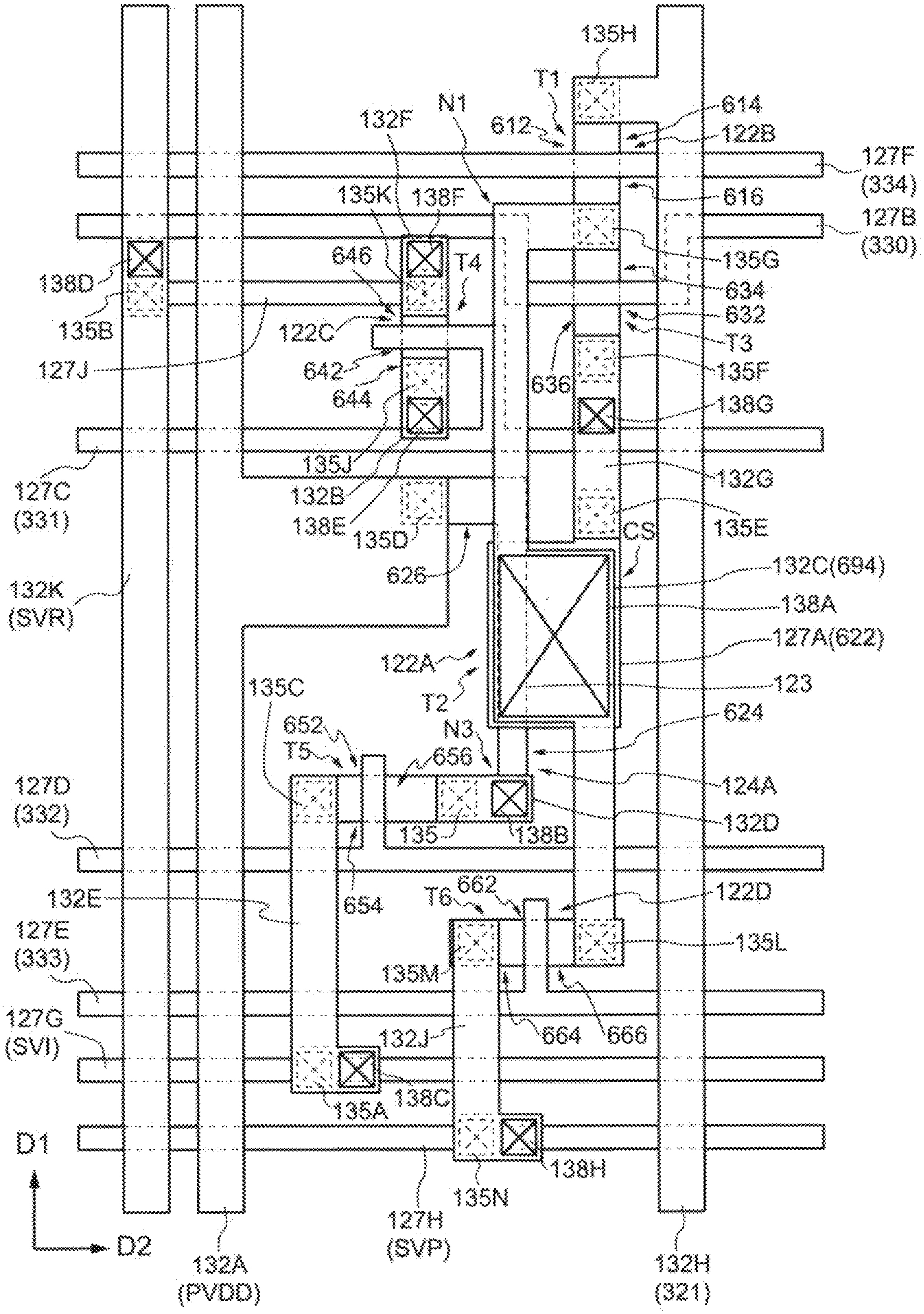
FIG. 14 is a layout diagram of a pixel according to the first embodiment of the present invention.

As shown in FIG. 10 or FIG. 14, the second contact hole openings 138B, 138C, 138D, 138E, 138F, 138G, and 138H are opened (step 17 (S17)). Each opening opens the insulating layer 131 to expose wirings, semiconductor layers or electrodes corresponding to each opening. For example, the second contact hole opening 138B exposes the first wiring 132D and the second contact hole opening 138G exposes the first wiring 132G. Other openings also expose the corresponding wirings, semiconductor layers or electrodes.

The insulating layer 136 (organic insulating layer) (see FIG. 10) is formed on the insulating layer 131 (step 18 (S18) of FIG. 11).

As shown in FIG. 10 or FIG. 14, the insulating layer 136 (organic insulating layer) is opened (step 19 (S19)). In the opening of S19, the organic insulating film opening 138A for the capacitive element CS is opened. Furthermore, in the opening of S19, the second contact hole openings 138B, 138C, 138D, 138E, 138F, 138G, and 138H are opened similar to the opening of S17. That is, the second contact hole openings 138B, 138C, 138D, 138E, 138F, 138G, and 138H are opened twice. Each opening opens the insulating layer 136 to expose insulating layers, wirings or electrodes corresponding to each opening. For example, the organic insulating film opening 138A for the capacitive element CS removes only the insulating layer 136 on the second electrode 694 and exposes the insulating layer 131. On the other hand, the second contact hole opening 138G removes only the insulating layer 136 on the first wiring 132G and exposes the first wiring 132G. Other openings also expose the corresponding insulating layers, wirings or electrodes.

The conductive layer 139 (see FIG. 110) is formed on the insulating layer 136 and on the insulating layer 131 exposed by the organic insulating film opening 138A for the capacitive element CS (step 20 (S20)). As shown in FIG. 9 or FIG. 10, the conductive layer 139 includes the second wiring 140A (the first electrode 692), the second wiring 140B, the second wiring 140C, the second wiring 140D, and the second wiring 140E (the reference voltage power line SVR).

As shown in FIG. 9 or FIG. 10, in a plan view, the first electrode 692 is electrically connected to the second transistor T2 and the fifth transistor T5 via the second contact hole opening 138B and the first contact hole opening 135. The second wiring 140B is electrically connected to the third transistor T3 via the second contact hole opening 138G, the first wiring 132G, and the first contact hole opening 135F, and is electrically connected to the fourth transistor T4 via the second contact hole opening 138E, the first wiring 132B, and the first contact hole opening 135J, and is electrically connected to the gate electrode 622 via the second contact hole opening 138E, the first wiring 132B, and the first contact hole opening 135E. The second wiring 140C is electrically connected to the first wiring 132E and the initialization voltage power line SVI via the second contact hole opening 138C and the first contact hole opening 135A. The second wiring 140D is electrically connected to the first wiring 132J and the pre-charge voltage power line SVP via the second contact hole opening 138H and the first contact hole opening 135N. The second wiring 140E is electrically connected to the gate wiring 127C and the fourth transistor T4 via the second contact hole opening 138F, the first wiring 132F, and the first contact hole opening 135K, and is electrically connected to the first wiring 132K (the reference voltage power line SVR) via the second contact hole opening 138D.

In addition, as shown in FIG. 9, the second wiring 140C is connected to and overlaps the gate wiring 127G (the initialization voltage power line SVI) and extends in parallel along the second direction D2. Therefore, since the initialization voltage power line SVI is formed using the two-layer metal wiring, the wiring resistance is smaller than the voltage line formed by the one-layer metal wiring. As a result, the initialization voltage power line SVI has a high current supply capability and can supply a stable voltage to the transistor. The second wiring 140D is connected to and overlaps the gate wiring 127H (the pre-charge voltage power line SVP) and extends in parallel along the second direction D2. Therefore, similar to the initialization voltage power line SVI, the pre-charge voltage power line SVP is formed using the two-layer metal wiring, so that the pre-charge voltage power line SVP has advantageous effects similar to those of the initialization voltage power line SVI.

In addition, as shown in FIG. 9, the first electrode 692, the second electrode 694, the gate electrode 622, and the semiconductor layer 122A (the channel region 123) overlap. That is, the second transistor T2 overlaps the capacitive element CS.

The insulating layer 141 (organic insulating layer) (see FIG. 10) is formed on the conductive layer 139 and on the insulating layer 136 where the conductive layer 139 is not formed (step 21 (S21) of FIG. 11).

As shown in FIG. 9 or FIG. 10, the insulating layer 141 (organic insulating layer) is opened (step 22 (S22)). In the opening of S22, the contact hole opening 147 for an anode electrode is opened. The contact hole opening 147 for an anode electrode removes the insulating layer 141 on the second wiring 140A and exposes the second wiring 140A. The contact hole opening 147 for an anode electrode may be referred to as an organic insulating layer opening. In addition, as shown in FIG. 9, the contact hole opening 147 overlaps the second wiring 140A and the first wiring 132A in a plan view.

The anode electrode 143 is provided on the exposed second wiring 140A, the contact hole opening 147 for an anode electrode, and the insulating layer 141. In addition, the functional layer 148 is provided on the anode electrode 143. The common electrode 149 is provided on the functional layer 148 (step 23 (S23)). For example, the anode electrode 143 and the functional layer 148 are provided for each pixel, and the common electrode 149 is provided to overlap the display region 22.

After S24, the sealing film 165 and the cover film 158 are provided in this order on the common electrode 149.

As described above, the manufacturing of the display device 10 (pixel 180) is completed.

2. Second Embodiment

Figure 15:
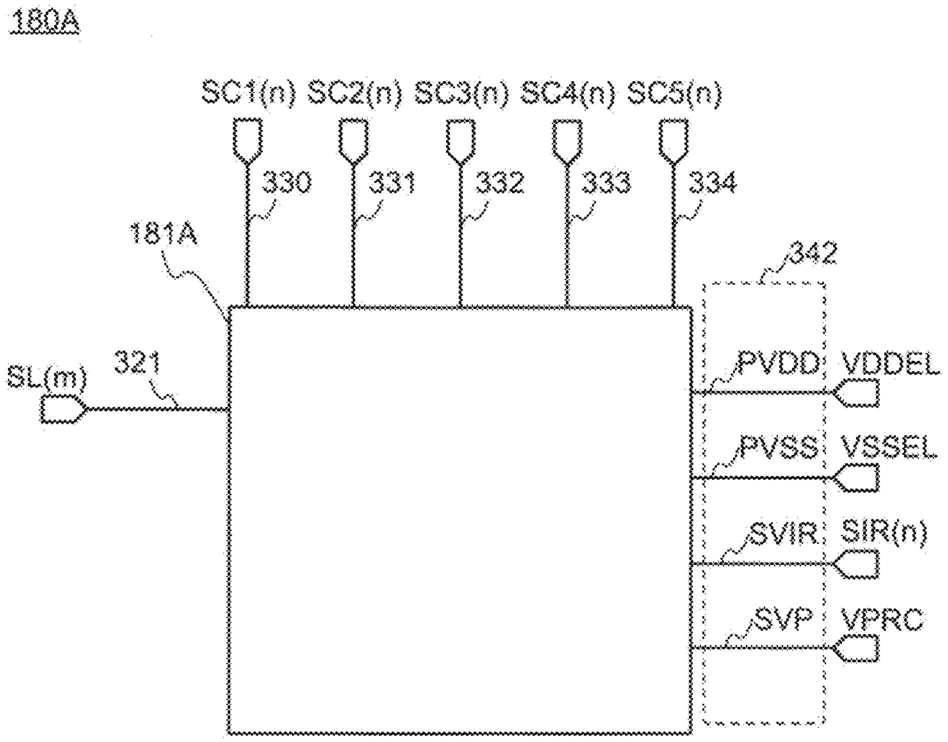
FIG. 15 is a schematic diagram showing input signals to a pixel circuit according to the second embodiment of the present invention.
Figure 16:
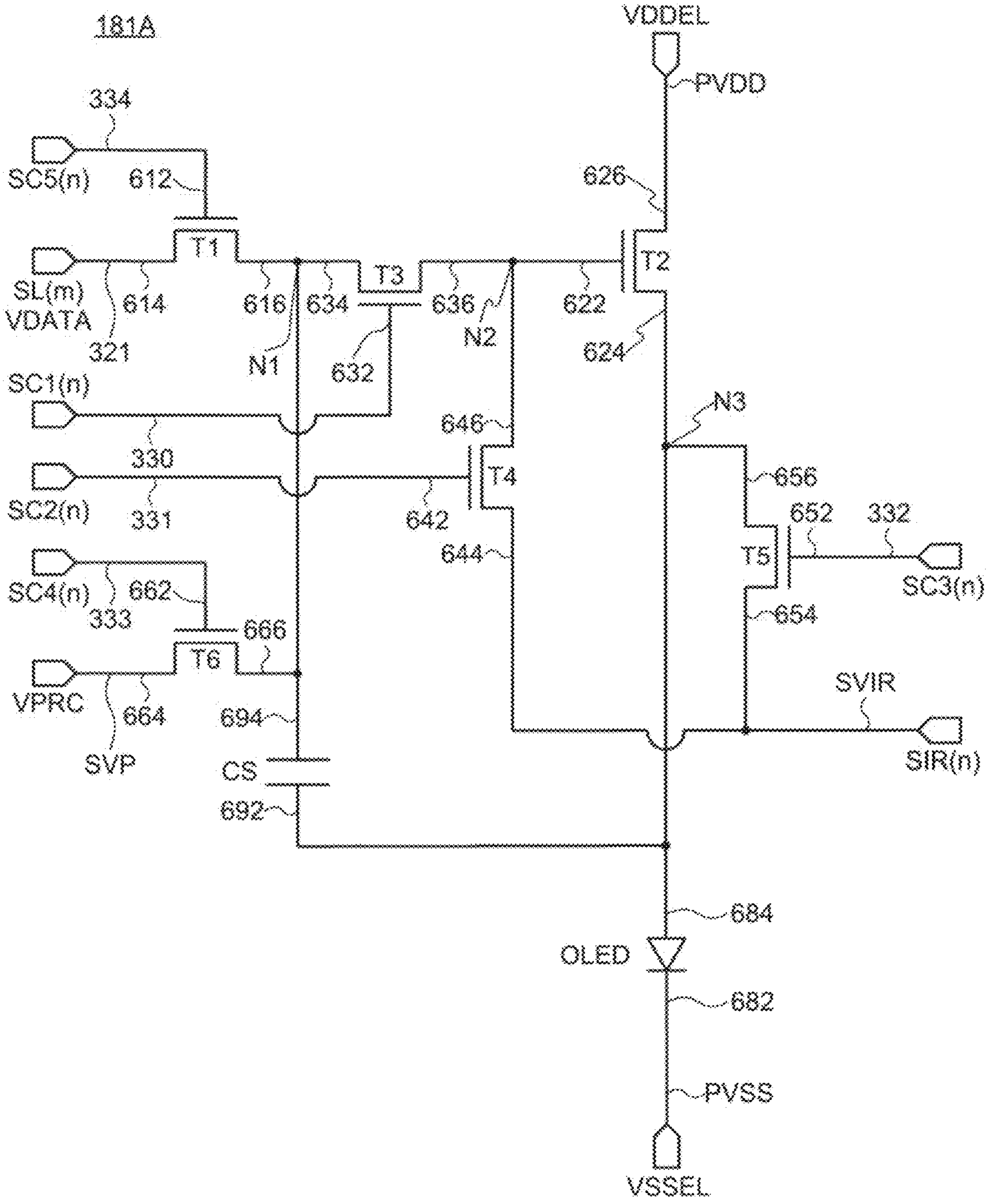
FIG. 16 is a circuit diagram showing a configuration of a pixel circuit according to the second embodiment of the present invention.

An overview of the display device according to a second embodiment will be described with reference to FIG. 1, FIG. 4, and FIG. 15 to FIG. 20. FIG. 15 is a schematic diagram showing input signals to a pixel 180A (a pixel circuit 181A) according to the second embodiment, FIG. 16 is a circuit diagram showing the configuration of the pixel circuit 181A, and FIG. 17 to FIG. 20 are timing charts of the display device according to the second embodiment.

The display device according to the second embodiment includes the pixel 180A and the pixel circuit 181A. Specifically, the pixel 180A and the pixel circuit 181A include the configurations shown in (1) to (3) below. Mainly, the configurations shown in (1) to (3) are different from the configurations of the pixel 180 and the pixel circuit 181 of the display device 10 according to the first embodiment.

(1) A scan voltage power line SVIR to which a scan voltage power supply SIR(n) is supplied is included.

(2) The scan voltage power line SVIR is a signal line that combines the reference voltage power line SVR to which the reference voltage power supply VREF is supplied and the initialization voltage power line SVI to which the initialization voltage VINI is supplied. That is, the scan voltage power line SVIR has a configuration serving as both the reference voltage power line SVR and the initialization voltage power line SVI.

(3) The scan voltage power supply SIR(n) includes voltages that change alternately with time. The voltages that change alternately with time are the initialization voltage VINI2 and the initialization voltage VINI1.

Configurations other than the configuration shown in (1) to (3) in the pixel 180A and the pixel circuit 181A and the configuration related to the configuration shown in (1) to (3) in the pixel 180A and the pixel circuit 181A are similar to those of the display device 10 according to the first embodiment. Therefore, differences from the display device 10 according to the first embodiment will be mainly described here. When describing the configurations and functions of the display device according to the second embodiment, the same configurations and functions as those of the display device 10 according to the first embodiment will be described as necessary. In addition, configurations that are the same as or similar to those in FIG. 1 to FIG. 14 will be described as necessary.

[2-1. Configuration of Pixel 180A]

An overview of the pixel 180A and the pixel circuit 181A will be described with reference to FIG. 15 and FIG. 16.

The pixel circuit 181A is connected to the scan voltage power line SVIR. The scan voltage power line SVIR functions as both a power line that supplies a voltage to the pixel 180A and the pixel circuit 181A, and a signal line whose voltage (potential) changes with time.

In the pixel circuit 181A, the first electrode 644 of the fourth transistor T4 and the first electrode 654 of the fifth transistor T5 are electrically connected to the scan voltage power line SVIR. The initialization voltage VINI2 or the initialization voltage VINI1 is supplied to the first electrode 644 of the fourth transistor T4 and the first electrode 654 of the fifth transistor T5 depending on the time.

For example, the scan voltage power line SVIR is electrically connected to the connection wiring 342 different from the pre-charge voltage power line SVP, the drive power line PVDD, and the reference voltage line PVSS. In addition, for example, the scan voltage power line SVIR may be one of the connection wirings 342.

For example, similar to the initialization voltage VINI, the scan voltage power supply SIR(n) may be supplied from an external device to the IC chip 110, and may be supplied from the IC chip 110 to a plurality of pixels 180A (pixel circuits 181A) via the connection wiring 342 and the scan voltage power line SVIR. Although not shown, similar to the initialization voltage VINI, the scan voltage power supply SIR(n) may be connected to the scan voltage power line SVIR from the external device via the FPC 200, the terminal section 150, and the connection wiring 341, not via the IC chip 110 and the connection wiring 342.

The fourth transistor T4 has a function of conducting the second node N2 and the scan voltage power line SVIR to supply the initialization voltage VINI1 or the initialization voltage VINI2 to the second node N2 and initializing the second node N2. For example, the initialization voltage VINI1 and the initialization voltage VINI2 are constant voltages.

The fifth transistor T5 has a function of conducting the third node N3 and the scan voltage power line SVIR to supply the initialization voltage VINI1 to the third node N3 and initializing the third node N3.

Configuration and functions of the pixel circuit 181A other than the configurations and functions described in "2-1. Configuration of Pixel 180A" are similar to those of the pixel circuit 181.

[2-2. Driving Method of Pixel Circuit 181A]

A driving method of the display device according to the second embodiment will be described with reference to FIG. 17 to FIG. 20. Configurations that are the same as or similar to those in FIG. 1 to FIG. 16 will be described as necessary. In addition, similar to the first embodiment, the horizontal axis of the timing charts represents time (TIME).

The driving method of the display device according to the second embodiment is different from the driving method of the display device 10 according to the first embodiment in the configuration related to the configuration shown in (1) to (3) described in "2-1. Configuration of Pixel 180A". Configurations and functions other than those related to (1) to (3) described in "2-1. Configuration of Pixel 180A" are similar to the driving method of the display device 10 according to the first embodiment.

The driving method of the display device according to the second embodiment includes periods similar to those of the driving method of the display device 10 according to the first embodiment shown in FIG. 4.

In one horizontal period (horizontal period HRP) in the driving method of the display device according to the second embodiment, the first scan signal SC1(*n*), the second scan signal SC2(*n*), the third scan signal SC3(*n*), the fourth scan signal SC4(*n*), the fifth scan signal SC5(*n*), the image data signal SL(m), and the scan voltage power supply SIR(n) are input to the pixel 180A (pixel circuit 181A). For example, the pixel 180A (pixel circuit 181A) is selected according to timings of the first scan signal SC1(*n*), the second scan signal SC2(*n*), the third scan signal SC3(*n*), the fourth scan signal SC4(*n*), the fifth scan signal SC5(*n*), and the scan voltage power supply SIR(n). The image data signal SL(m) and the scan voltage power supply SIR(n) are input to the selected pixel 180A (pixel circuit 181A) according to the timings of the respective signals. Similar operations are performed on all the pixels 180A (pixel circuit 181A), and an image of the frame corresponding to 1FRAME is displayed on the display region 22 of the display device 10 based on the image data signal SL(m) input to all the pixels 180A (pixel circuits 181A).

For example, the voltages (potentials) supplied to each signal of each frame in the timing charts shown in FIG. 17 to FIG. 20 and FIG. 33 are shown in Table 2.

TABLE 2

| | Setting value [V] |
|---|---|
| VTH | 1 |
| VSIGL(Black) | −0.5 |
| VSIGH(White) | 3.5 |
| HI | 10 |
| LO | −4 |
| VINI1 | −2 |
| VINI2 | 0 |
| VPRC | 1.5 |
| VDDEL | 8 |
| VSSEL | 0 |

For example, as shown in Table 2, the initialization voltage VINI2 is 0 V and the initialization voltage VINI1 is −2 V. The initialization voltage VINI2 is the same as the reference voltage VREF, and the initialization voltage VINI1 is the same as the initialization voltage VINI. The setting values of other voltages are the setting values shown in Table 1 described in "1-5. Driving Method of Display Device 10".

[2-2-1. First Example of Driving Method of Pixel Circuit 181A]

Figure 17:
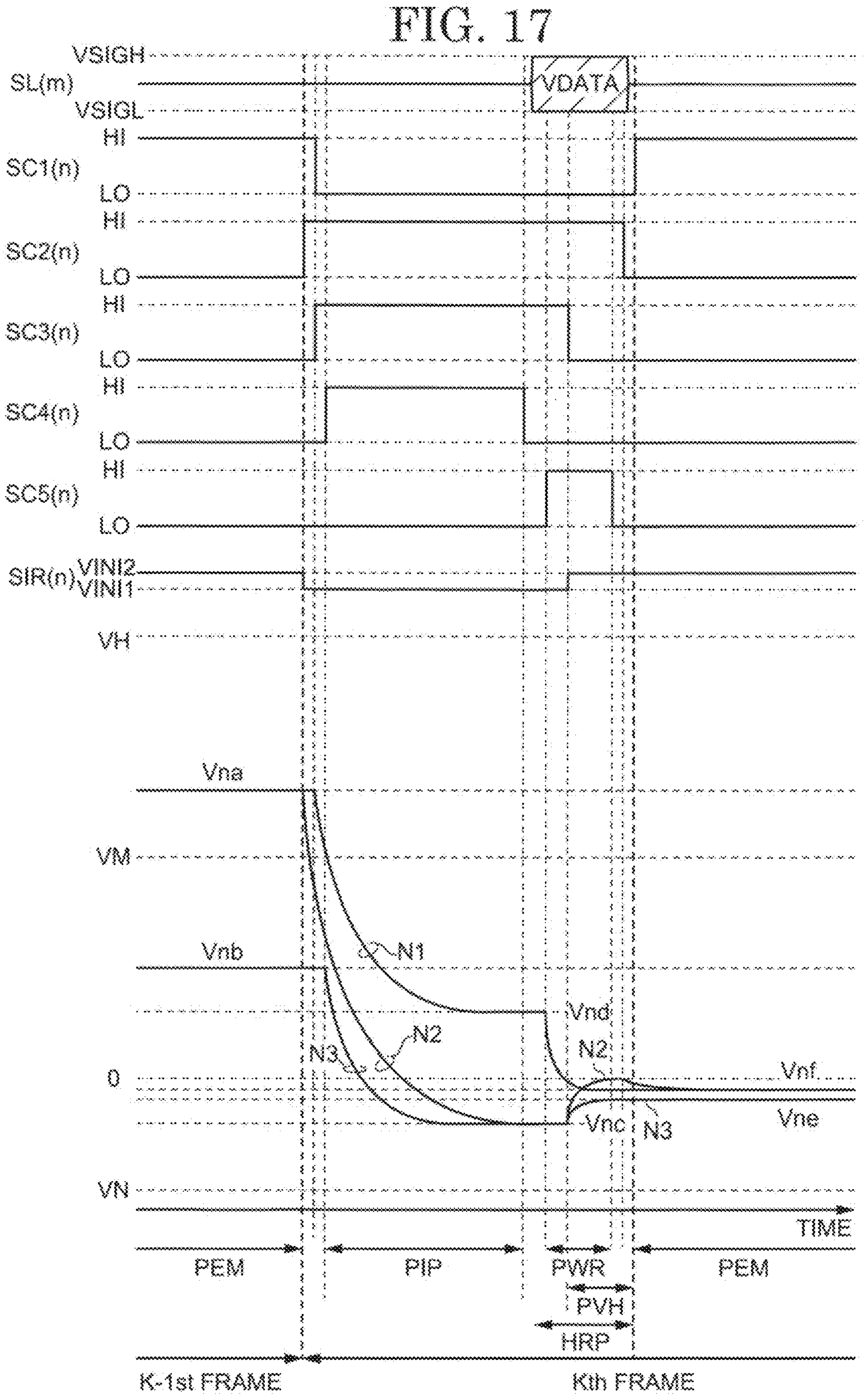
FIG. 17 is a timing chart of a display device according to the second embodiment of the present invention.

A first example of a driving method of the pixel circuit 181A will be described with reference to FIG. 17. Similar to the first example of the driving method of the display device 10 according to the first embodiment, the first example of the driving method of the pixel circuit 181A includes displaying images of different colors in consecutive frames. Configurations that are the same as or similar to those in FIG. 1 to FIG. 16 will be described as necessary.

The scan voltage power supply SIR(n) is supplied with the initialization voltage VINI2 in the light emission period PEM of the K−1stFRAME, the initialization voltage VINI2 is supplied in the period PIP of the KthFRAME, and the initialization voltage VINI1 is supplied in the period PVH and the light emission period of the KthFRAME.

Configurations of the first scan signal SC1(*n*) to the fifth scan signal SC5(*n*) are similar to those described in "1-5-1. First Example of Driving Method of Display Device 10". In addition, the operations and the like of the transistors in the periods are similar to those described in "1-5-1. First Example of Driving Method of Display Device 10". Therefore, configurations and the like similar to the configuration described in "1-5-1. First Example of Driving Method of Display Device 10" will be described as necessary.

In the light emission period PEM of the K−1stFRAME, the light-emitting element OLED emits light similar to the configuration described in "1-5-1. First Example of Driving Method of Display Device 10".

In the period between the light emission period PEM and the period PIP of the K−1stFRAME following the light emission period PEM of the K−1stFRAME, the scan voltage power supply SIR(n) changes from a state in which 0 V (initialization voltage VINI2) is supplied to a state in which the voltage Vnc (initialization voltage VINI1, −2 V) is supplied. The configurations of the first scan signal SC1(*n*) to the fifth scan signal SC5(*n*) are similar to those described in "1-5-1. First Example of Driving Method of Display Device 10".

As a result, the voltage supplied to the second node N2 gradually drops from the voltage Vna toward the voltage Vnc, the voltage supplied to the first node N1 gradually drops from the voltage Vna toward the voltage Vnd (precharge voltage VPRC, 1.5 V), and the voltage supplied to the third node N3 maintains the voltage Vnb.

In the period PIP following the period between the light emission period PEM and the period PIP of the K−1stFRAME, the scan voltage power supply SIR(n) is maintained in the state in which the voltage Vnc (initialization voltage VINI1, −2 V) is supplied. The configurations of the first scan signal SC1(*n*) to the fifth scan signal SC5(*n*) are similar to those described in "1-5-1. First Example of Driving Method of Display Device 10".

As a result, the voltage supplied to the first node N1 gradually drops from the voltage Vna toward the voltage Vnd and becomes the voltage Vnd. The voltage supplied to the second node N2 gradually drops from the voltage Vna toward the voltage Vnc and becomes the voltage Vnc. The voltage supplied to the third node N3 gradually drops from the voltage Vnb toward the voltage Vnc and becomes the voltage Vnc. The potential difference Vgs is 0 V (−2 V−(−2 V)) and the potential difference Vds is 10 V (8 V−(−2 V)). Since the potential difference Vgs is smaller than the threshold voltage VTH, the second transistor T2 is in the OFF state, and the current Ion does not flow from the drive power line PVDD to the scan voltage power line SVIR or the reference voltage line PVSS, so that the light-emitting element OLED does not emit light.

As described above, in the period PIP, the pre-charge voltage (intermediate potential) is supplied to the first node N1, and the second node N2 and the third node N3 are initialized by the initialization voltage VINI1 (−2 V).

In the first period of the horizontal period HRP of the KthFRAME following the period PIP, the scan voltage power supply SIR(n) is maintained in the state in which the voltage Vnc (initialization voltage VINI1, −2 V) is supplied. The configurations of the first scan signal SC1(*n*) to the fifth scan signal SC5(*n*) are similar to those described in "1-5-1. First Example of Driving Method of Display Device 10".

As a result, the voltage supplied to the first node N1 is the voltage Vnd, and the voltage supplied to the second node N2 and the voltage supplied to the third node N3 are the voltages Vnc. In addition, similar to the period PIP, the light-emitting element OLED does not emit light.

In the period PWR following the first period of the horizontal period HRP, when the third scan signal SC3(*n*) changes from the state in which HI is supplied to the state in which LO is supplied, the scan voltage power supply SIR(n) changes from the state in which the initialization voltage VINI1 (−2 V) is supplied to the state in which the initialization voltage VINI2 (0 V) is supplied. The configurations of the first scan signal SC1(*n*) to the fifth scan signal SC5(*n*) are similar to those described in "1-5-1. First Example of Driving Method of Display Device 10".

As a result, the voltage supplied to the first node N1 gradually drops from the voltage Vnd toward the voltage VSIGL (voltage Vnf, −0.5 V), the voltage supplied to the second node N2 gradually rises from the voltage Vnc toward 0 V (initialization voltage VINI2), and the voltage supplied to the third node N3 maintains the voltage Vnc. In addition, similar to the period PIP, the light-emitting element OLED does not emit light.

In the middle of the period PWR, in the period PVH that is parallel to (overlapping) the period PWR, the scan voltage power supply SIR(n) changes from the state in which the initialization voltage VINI1 (−2 V) is supplied to the state in which the initialization voltage VINI2 (0 V) is supplied. The configurations of the first scan signal SC1(*n*) to the fifth scan signal SC5(*n*) are similar to those described in "1-5-1. First Example of Driving Method of Display Device 10".

As a result, the voltage supplied to the second node N2 gradually rises from the voltage Vnc toward 0 V and becomes 0 V.

Immediately after the start of the period PVH, the potential difference Vgs is 0 V, the potential difference Vds is 10 V, and the second transistor T2 is in the OFF state. In addition, the fifth transistor T5 is also in the OFF state. On the other hand, the fourth transistor T4 is in the ON state, and the voltage supplied to the second node N2 rises from the voltage Vnc toward the initialization voltage VINI2 (0 V). When the voltage supplied to the second node N2 rises to 0 V, the potential difference Vgs becomes larger than the threshold voltage VTH.

As a result, the second transistor T2 is turned on, and the voltage supplied to the third node N3 gradually rises from the voltage Vnc. When the potential difference Vgs becomes the threshold voltage VTH, the second transistor T2 is turned from the ON state to the OFF state, and the voltage supplied to the second node N2 and the voltage supplied to the third node N3 are the voltages supplied at that time. For example, as shown in FIG. 17, the voltage supplied to the second node N2 is 0 V, and the voltage supplied to the third node N3 is the voltage Vne (−1 V). The potential difference Vgs is 1 V (0 V−voltage Vne (−1 V)), the potential difference Vds is 9 V, and the potential difference Vgs is the same as the threshold voltage VTH (1 V). That is, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). Furthermore, since the second transistor T2 is in the OFF state, the current Ion does not flow from the drive power line PVDD to the reference voltage line PVSS, and the light-emitting element OLED does not emit light.

In the period at the end of the period PVH, the scan voltage power supply SIR(n) is maintained in the state in which the initialization voltage VINI2 (0 V) is supplied, and the configurations of the first scan signal SC1(*n*) to the fifth scan signal SC5(*n*) are similar to those described in "1-5-1. First Example of Driving Method of Display Device 10".

As a result, the first node N1 and the second node N2 are conductive, the voltage supplied to the first node N1 gradually drops toward the voltage Vnf to become the voltage Vnf, the voltage supplied to the second node N2 gradually drops toward the voltage Vnf to become the voltage Vnf, and the voltage supplied to the third node N3 maintains the voltage Vne. Since the potential difference Vgs is the voltage Vnf−the voltage Vne and the potential difference Vgs is smaller than the threshold voltage VTH, no current Ion flows from the drive power line PVDD to the reference voltage line PVSS. Therefore, the light-emitting element OLED does not emit light.

As described above, in the period PWR, the data signal VDATA is written to the pixel 180 (the pixel circuit 181). Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the horizontal period HRP of the KthFRAME, similar to the configuration described in "1-5-1. First Example of Driving Method of Display Device 10", three pixels using the pixel 180A emitting red light, the pixel 180A emitting blue light, and the pixel 180A emitting green light become black.

The first example of the driving method of the pixel circuit 181A including the above-described configurations has advantageous effects similar to those of the driving method of the display device 10 according to the first embodiment.

In addition, the pixel circuit 181A includes the scan voltage power line SVIR serving as both the reference voltage power line SVR supplied to the pixel circuit 181 and the initialization voltage power line SVI. Therefore, the pixel circuit 181A has a configuration capable of reducing the number of signal lines, and the display device including the pixel circuit 181A can reduce the size of the pixel. As a result, the display device including the pixel circuit 181A can increase the number of pixels and achieve high definition and a large screen.

[2-2-2. Second Example of Driving Method of Pixel Circuit 181A]

Figure 18:
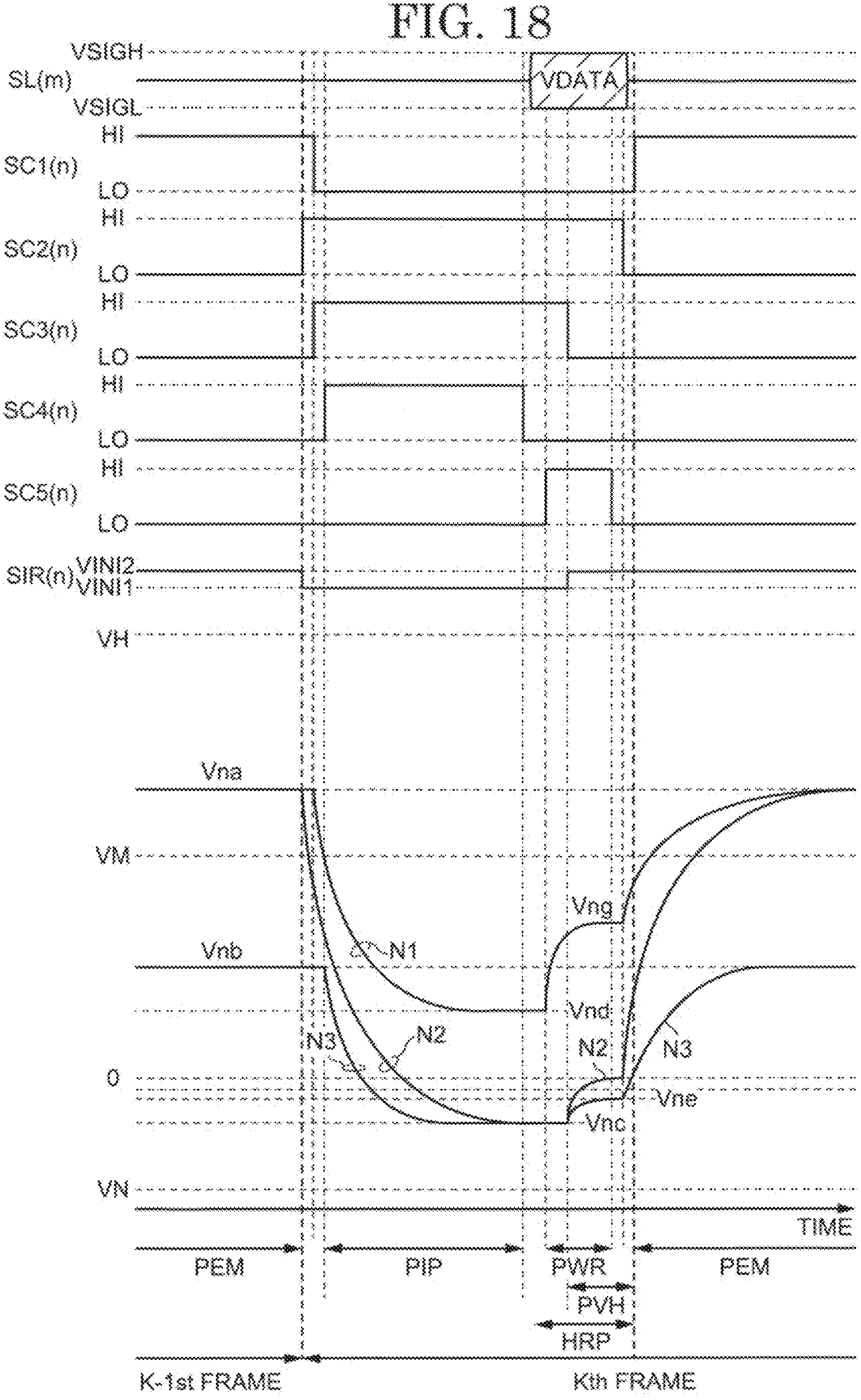
FIG. 18 is a timing chart of a display device according to the second embodiment of the present invention.

A second example of the driving method of the pixel circuit 181A will be described with reference to FIG. 18. Similar to the second example of the driving method of the display device 10 according to the first embodiment, the driving method shown in the second example of the pixel circuit 181A includes displaying images of the same color (white) in consecutive frames. Configurations that are the same as or similar to those in FIG. 1 to FIG. 17 will be described as necessary.

The configurations of the first scan signal SC1(*n*) to the fifth scan signal SC5(*n*) are similar to those described in "1-5-1. First Example of Driving Method of Display Device 10". Further, the voltages (potentials) of the first node N1, the second node N2, and the third node N3 in the periods excluding the horizontal period HRP of the KthFRAME and the light emission period PEM of the KthFRAME are similar to the configurations described in "2-2-1. First Example of Driving Method of Pixel Circuit 181A". Furthermore, the operations and the like of the transistors in the respective periods are similar to those described in "2-2-1. First Example of Driving Method of Pixel Circuit 181A". Therefore, configurations and the like similar to the configurations described in "1-5-1. First Example of Driving Method of Display Device 10" and "2-2-1. First Example of Driving Method of Pixel circuit 181A" will be described as necessary. In addition, the data signal VDATA of VSIGH corresponding to white is supplied to the image data signal SL(m) in the horizontal period HRP, and the data signal VDATA similar to the configuration described in "1-5-1. First Example of Driving Method of Display Device 10" is supplied in the periods other than the horizontal period HRP.

The driving method of the second example of the driving method of the pixel circuit 181A in the light emission period PEM of the K−1stFRAME, the period between the light emission period PEM of the K−1stFRAME and the period PIP of the KthFRAME following the light emission period PEM of the K−1stFRAME, the period PIP of the KthFRAME, and the first period of the horizontal period HRP of the KthFRAME following the period PIP of the KthFRAME is the same as the driving method described in "2-2-1. First Example of Driving Method of Pixel Circuit 181A".

In the period PWR following the first period of the horizontal period HRP in the second example of the driving method of the pixel circuit 181A, the configurations of the control signals, the operations of the transistors, and the like are similar to those described in "2-2-1. First Example of Driving Method of Pixel Circuit 181A". The voltage supplied to the first node N1 gradually rises from the voltage Vnd toward the voltage Vng (voltage VSIGH, 3.5 V), the voltage supplied to the second node N2 gradually rises from −2 V (initialization voltage VINI1) toward 0 V (initialization voltage VINI2), and the voltage supplied to the third node N3 gradually rises from −2 V (initialization voltage VINI1) toward the voltage Vne (−1 V). In addition, similar to the period PIP, the light-emitting element OLED does not emit light.

In the middle of the period PWR in the second example of the driving method of the pixel circuit 181A, in the period PVH parallel to (overlapping) the period PWR, the configurations of the control signals, the operations of the transistors, and the like are similar to those described in "2-2-1. First Example of Driving Method of Pixel Circuit 181A". The voltage supplied to the first node N1 gradually rises toward the voltage Vng to become the voltage Vng, the voltage supplied to the second node N2 gradually rises from −2 V toward 0 V to become 0 V, and the voltage supplied to the third node N3 gradually rises from −2 V toward the voltage Vne to become the voltage Vne.

As a result, the potential difference Vgs becomes the same as the threshold voltage VTH. That is, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). In addition, since the second transistor T2 is in the OFF state and no current flows from the drive power line PVDD to the reference voltage line PVSS, the light-emitting element OLED does not emit light.

In the period at the end of the period PVH in the second example of the driving method of the pixel circuit 181A, the configurations of the control signals, the operations of the transistors, and the like are similar to those described in "2-2-1. First Example of Driving Method of Pixel Circuit 181A". The first node N1 and the second node N2 are conductive, and the voltage supplied to the second node N2 gradually rises. As a result, the second transistor T2 is turned from the OFF state to the ON state, and the current Ion flows from the drive power line PVDD to the reference voltage line PVSS. Therefore, the voltage supplied to the first node N1 and the voltage supplied to the third node N3 rise to follow the rise in the voltage supplied to the second node N2. Due to the voltage rise of the third node N3, the voltage supplied to the first node N1 and the voltage supplied to the second node N2 further rise.

Further, in the light emission period PEM of the KthFRAME following the horizontal period HRP of the KthFRAME in the second example of the driving method of the pixel circuit 181A, the voltage supplied to the first node N1 and the voltage supplied to the second node N2 rise to the voltage Vna, and the voltage supplied to the third node N3 rises to the voltage Vnb.

As a result, the potential difference Vgs is 4.5 V (voltage Vna (7 V)−voltage Vnb (2.5 V)). The potential difference Vgs is greater than the threshold voltage VTH, the second transistor T2 is in the ON state, the current Ion flows from the drive power line PVDD to the reference voltage line PVSS, and the light-emitting element OLED emits light. For example, the pixel 180A (pixel circuit 181A) emits red light, and white light is emitted by three pixels using the pixel 180A emitting red light, the pixel 180A emitting blue light, and the pixel 180A emitting green light.

As described above, in the period PWR in the second example of the driving method of the period 181A, the data signal VDATA is written to the pixel 180A (pixel circuit 181A). Further, in the period PVH in the second example of the driving method of the period 181A, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). Furthermore, in the light emission period PEM of the KthFRAME in the second example of the driving method of the pixel circuit 181A, white light is emitted by three pixels.

[2-2-3. Third Example of Driving Method of Pixel Circuit 181A]

Figure 19:
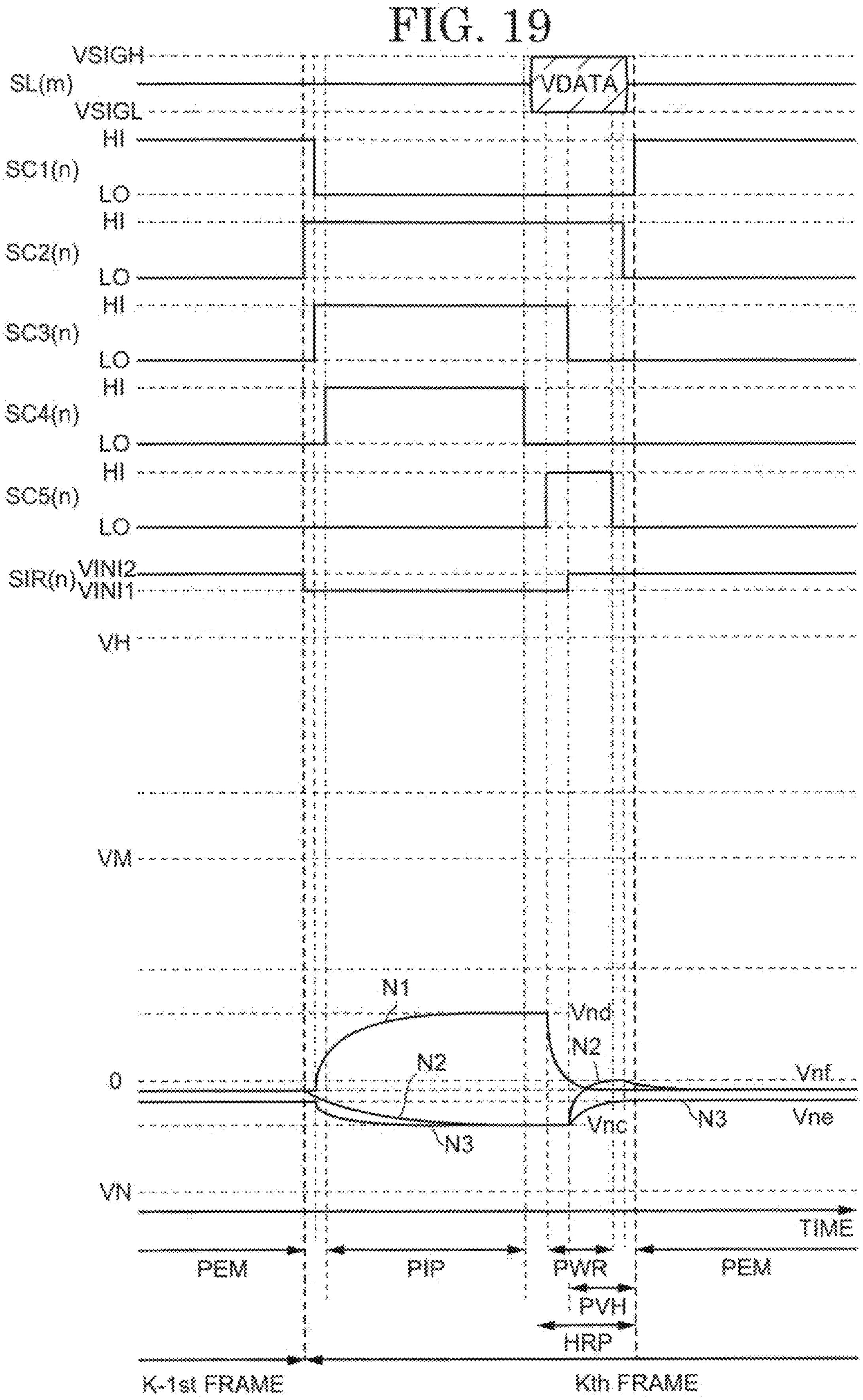
FIG. 19 is a timing chart of a display device according to the second embodiment of the present invention.

A third example of the driving method of the pixel circuit 181A will be described with reference to FIG. 19. The driving method shown in the third example of the driving method of the pixel circuit 181A includes displaying images of the same color (black) in consecutive frames as in the third example of the driving method of the display device 10 according to the first embodiment. Configurations that are the same as or similar to those in FIG. 1 to FIG. 18 will be described as necessary.

The configurations of the first scan signal SC1(*n*) to the fifth scan signal SC5(*n*) are similar to those described in "1-5-1. First Example of Driving Method of Display Device 10". In addition, the voltages (potentials) of the first node N1, the second node N2, and the third node N3, the operations of the transistors, and the like in the light emission period of the K−1stFRAME are similar to the configurations and operations described in "1-5-3. Third Example of Driving Method of Display Device 10". Further, the voltages (potentials) of the first node N1, the second node N2, and the third node N3, the operations of the transistors, and the like in the periods other than the light emission period of the K−1stFRAME to the period PIP of the KthFRAME are similar to the configurations and operations described in "2-2-1. First Example of Driving Method of Pixel Circuit 181A". Configuration and the like described in "1-5-3. Third Example of Driving Method of Display Device 10", "2-2-1. First Example of Driving Method of Pixel Circuit 181A", and "2-2-2. Second Example of Driving Method of Pixel Circuit 181A" will be described as necessary. In addition, for example, the data signal VDATA of VSIGL corresponding to black is supplied to the image data signal SL(m) in the horizontal period HRP, and the data signal VDATA similar to the configuration described in "1-5-3. Example of Driving Method of Display Device 10" is supplied in the periods other than the horizontal period HRP.

In the light emission period PEM of the K−1stFRAME, similar to the configuration described in "1-5-3. Third Example of Driving Method of Display Device 10", the light-emitting element OLED does not emit light and the pixel 180A is black.

In the period between the light emission period PEM of the K−1stFRAME and the period PIP of the KthFRAME following the light emission period PEM of the K−1stFRAME, the configurations of the control signals, the operations of the transistors, and the like are similar to those described in "2-2-1. First Example of Driving Method of Pixel Circuit 181A". The voltage supplied to the first node N1 gradually rises from the voltage Vnf toward the voltage Vnd (pre-charge voltage VPRC, 1.5 V), the voltage supplied to the second node N2 gradually drops from the voltage Vnf toward the initialization voltage VINI1 (Vnc, −2 V), and the voltage supplied to the third node N3 gradually drops from the voltage Vne toward the initialization voltage VINI1 (Vnc, −2 V). In addition, the light-emitting element OLED does not emit light.

In the period PIP of the KthFRAME following the period between the light emission period PEM and the period PIP of the KthFRAME, the voltage supplied to the first node N1 gradually rises from the voltage Vnf toward the voltage Vnd to become the voltage Vnd (pre-charge voltage VPRC). The voltage supplied to the second node N2 gradually drops from the voltage Vnf toward the voltage Vnc and becomes the voltage Vnc (initialization voltage VINI1). The voltage supplied to the third node N3 gradually drops from the voltage Vne toward the voltage Vnc and becomes the voltage Vnc. The potential difference Vgs is 0 V and the potential difference Vds is 8 V. The light-emitting element OLED does not emit light. As described above, in the period PIP, the pre-charge voltage (intermediate potential) is supplied to the first node N1, and the second node N2 and the third node N3 are initialized by the initialization voltage VINI1 (−2 V).

The voltages (potentials) of the first node N1, the second node N2, and the third node N3, the operations of the transistors, and the like in the first period of the horizontal period HRP of the KthFRAME to the light emission period PEM of the KthFRAME following the period PIP are similar to the configurations and operations described in "2-2-1. First Example of Driving Method of Pixel Circuit 181A".

In the period PWR, similar to the configuration described in "2-2-1. First Example of Driving Method of Pixel Circuit 181A", the data signal VDATA (in the third example, the voltage VSIGL) is written to the pixel 180A (the pixel circuit 181A).

Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Furthermore, in the light emission period PEM of the KthFRAME, similar to the configuration described in "2-2-1. First Example of Driving Method of Pixel Circuit 181A", three pixels using the pixel 180A emitting red light, the pixel 180A emitting blue light, and the pixel 180A emitting green light become black.

[2-2-4. Fourth Example of Driving Method of Pixel Circuit 181A]

Figure 20:
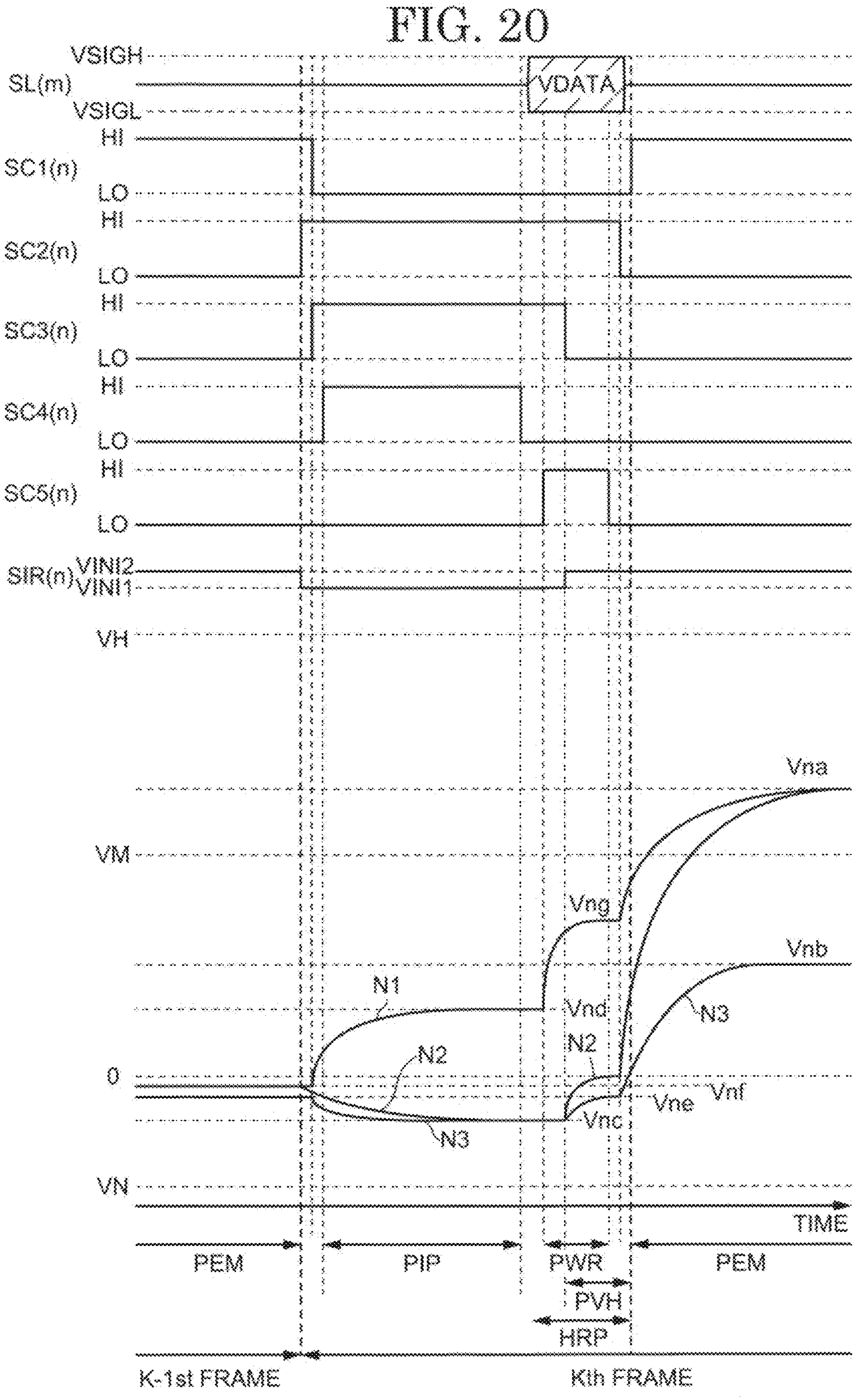
FIG. 20 is a timing chart of a display device according to the second embodiment of the present invention.

A fourth example of the driving method of the pixel circuit 181A will be described with reference to FIG. 20. The driving method shown in the fourth example of the driving method of the pixel circuit 181A includes displaying images of different colors in consecutive frames similar to the fourth example of the driving method of the display device 10 according to the first embodiment. Configurations that are the same as or similar to those in FIG. 1 to FIG. 19 will be described as necessary.

The configurations of the first scan signal SC1(*n*) to the fifth scan signal SC5(*n*) are similar to those described in "1-5-1. First Example of Driving Method of Display Device 10". In addition, the voltages (potentials) of the first node N1, the second node N2, and the third node N3, the operations of the transistors, and the like in the light emission period PEM of the K−1stFRAME to the period PIP of the KthFRAME are similar to the configurations and operations described in "2-2-3. Third Example of Driving Method of Pixel Circuit 181A". Further, the voltages (potentials) of the first node N1, the second node N2, and the third node N3, and the operations of the transistors in the first period of the horizontal period HRP of the KthFRAME to the light emission period PEM of the KthFRAME following the period PIP of the KthFRAME are similar to those described in "2-2-2. Second Example of Driving Method of Pixel Circuit 181A". Configurations described in "1-5-1. First Example of Driving Method of Display Device 10", "2-2-1. First Example of Driving Method of Pixel Circuit 181A", "2-2-2. Second Example of Driving Method of Pixel Circuit 181A", and "2-2-3. Third Example of Driving Method of Pixel Circuit 181A" will be described as necessary. In addition, the data signal VDATA including the voltage VSIGH corresponding to white is supplied to the image data signal SL(m) in a period between the light emission period PEM of the K−1stFRAME and the light emission period PEM of the KthFRAME.

In the light emission period PEM of the K−1stFRAME, the pixel 180A is black similar to "2-2-3. Third Example of Driving Method of Pixel Circuit 181A".

In the period between the light emission period PEM of the K−1stFRAME and the period PIP of the KthFRAME following the light emission period PEM of the K−1stFRAME, the voltage supplied to the first node N1 gradually rises from the voltage Vnf toward the voltage Vnd (pre-charge voltage VPRC, 1.5 V), the voltage supplied to the second node N2 gradually drops from the voltage Vnf toward the initialization voltage VINI1 (Vnc, −2 V), and the voltage supplied to the third node N3 gradually drops from the voltage Vne toward the initialization voltage VINI1 (Vnc, −2 V). In addition, the light-emitting element OLED does not emit light.

In the period PIP of the KthFRAME following the period between the light emission period PEM of the K−1stFRAME and the period PIP of the KthFRAME, similar to "2-2-3. Third Example of Driving Method of Pixel Circuit 181A", the pre-charge voltage (intermediate potential) is supplied to the first node N1, and the second node N2 and the third node N3 are initialized by the initialization voltage VINI2 (−2 V).

In the first period of the horizontal period HRP of the KthFRAME following the period PIP of the KthFRAME, the voltages (potentials) of the first node N1, the second node N2, and the third node N3, the operations of the transistors, and the like are similar to the configurations and operations described in "2-2-1. First Example of Driving Method of Pixel Circuit 181A."

In the period PWR, similar to the configuration described in "2-2-2. Second Example of Driving Method of Pixel Circuit 181A", the data signal VDATA (in the third example, the voltage VSIGH) is written to the pixel 180A (the pixel circuit 181A).

Further, in the period PVH, similar to the configuration described in "2-2-2. Second Example of Driving Method of Pixel Circuit 181A", the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Furthermore, in the light emission period PEM of the KthFRAME, similar to the configuration described in "2-2-2. Second Example of Driving Method of Pixel Circuit 181A", white light is emitted by three pixels using the pixel 180A emitting red light, the pixel 180A emitting blue light, and the pixel 180A emitting green light.

3. Third Embodiment

Figure 21:
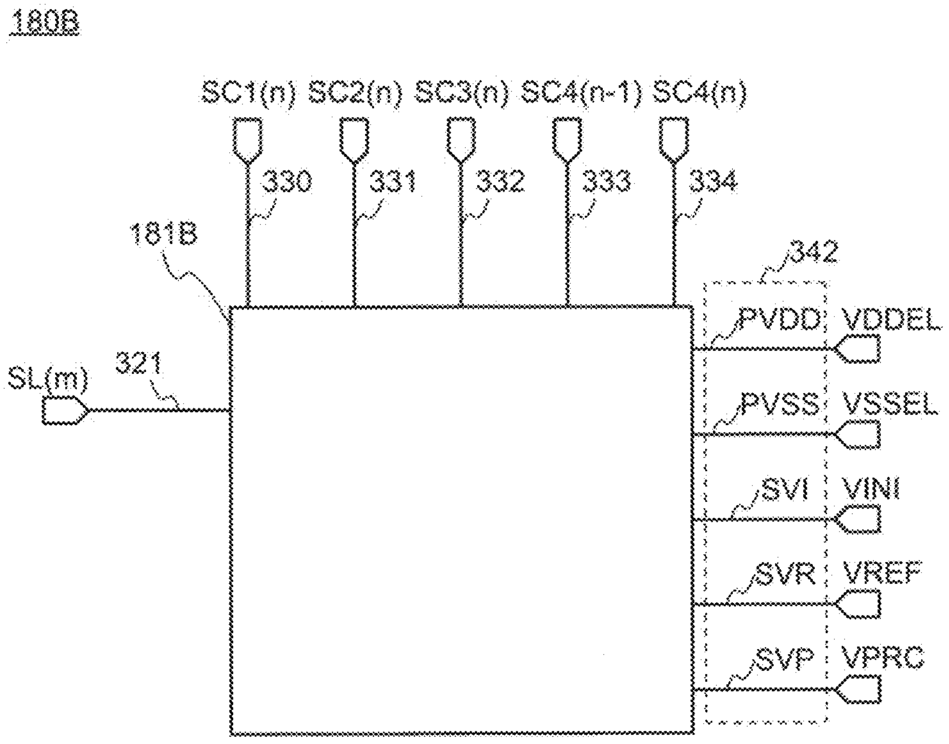
FIG. 21 is a schematic diagram showing input signals to a pixel circuit according to the third embodiment of the present invention.
Figure 22:
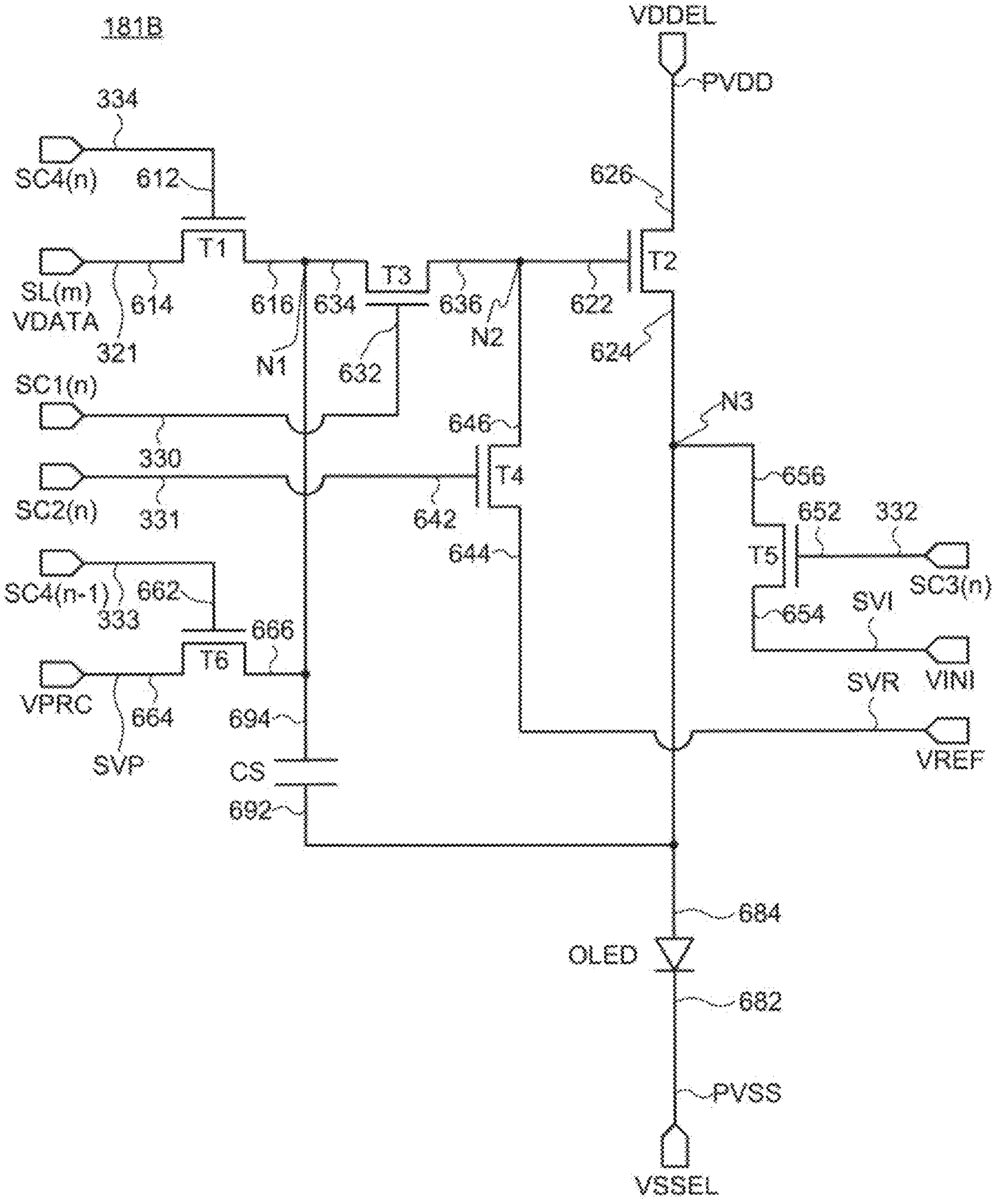
FIG. 22 is a circuit diagram showing a configuration of a pixel circuit according to the third embodiment of the present invention.

An overview of the display device according to the third embodiment will be described with reference to FIG. 1, FIG. 21 to FIG. 27. FIG. 21 is a schematic diagram showing input signals to a pixel 180B (the pixel circuit 181B) according to the third embodiment, FIG. 22 is a circuit diagram showing a configuration of the pixel circuit 181B, and FIG. 23 to FIG. 27 are timing charts of the display device according to the third embodiment.

The display device according to the third embodiment includes the pixel 180B and the pixel circuit 181B. Specifically, the pixel 180B and the pixel circuit 181B include the configurations shown in (1) to (5) below. Mainly, the configurations shown in (1) to (5) are different from the configurations of the pixel 180 and the pixel circuit 181 of the display device 10 according to the first embodiment.

(1) A fourth scan signal SC4(*n*−1) and the fifth scan signal SC4 are included.

(2) The fourth scan signal SC4(*n*−1) is a signal in which the fourth scan signal SC4(*n*) supplied to the pixel circuit 181 is replaced, and the fifth scan signal SC4 is a signal in which the fifth scan signal SC5(*n*) supplied to the pixel circuit 181 is replaced.

(3) The fourth scan signal SC4(*n*) is a signal obtained by shifting the fourth scan signal SC4(*n*−1) in the shift register circuit 130 and the scan driver circuit 160 using the plurality of output signals and the plurality of enable signals output by the shift register circuit 130.

(4) The timings of the fourth scan signal SC4(*n*−1) and the fifth scan signal SC4(*n*) are different from the timings of the fourth scan signal SC4(*n*) and the fifth scan signal SC5(*n*) supplied to the pixel circuit 181.

(5) The scan signal line 334 to which the fifth scan signal SC4(*n*) and the fifth scan signal SC4(*n*) are supplied is a so-called the scan signal and the scan signal line.

Configurations other than the configuration shown in (1) to (5) in the pixel 180B and the pixel circuit 181B and the configuration related to the configuration shown in (1) to (5) in the pixel 180B and the pixel circuit 181B are similar to the configuration of the display device 10 according to the first embodiment. Therefore, differences from the display device 10 according to the first embodiment will be mainly described here. When describing the configurations and functions of the display device according to the third embodiment, configurations and functions similar to those of the display device 10 according to the first embodiment and the display device according to the second embodiment will be described as necessary. In addition, configurations that are the same as or similar to those in FIG. 1 to FIG. 12 will be described as necessary.

[3-1. Configuration of Pixel 180B]

An overview of the pixel 180B and the pixel circuit 181B will be described with reference to FIG. 21 and FIG. 22.

As described above, the pixel 180B and the pixel circuit 181B have a configuration in which the fourth scan signal SC4(*n*) supplied to the pixel circuit 181 is replaced with the fourth scan signal SC4(*n*−1), and the fifth scan signal SC5(*n*) supplied to the pixel circuit 181 is replaced with the fifth scan signal SC4(*n*).

The gate electrode 612 of the first transistor T1 is electrically connected to the scan signal line 334 to which the fifth scan signal SC4(*n*) is supplied. The switching of the first transistor T1 of the pixel 180B and the pixel circuit 181B is controlled using the fifth scan signal SC4(*n*). In other words, the conductive state (ON state) and the non-conductive state (OFF state) of the first transistor T1 are controlled by the fifth scan signal SC4(*n*). When the signal supplied to the fifth scan signal SC4(*n*) is LO, the first transistor T1 is in the non-conductive state. When the signal supplied to the fifth scan signal SC4(*n*) is HI, the first transistor T1 is in the conductive state.

The gate electrode 662 of the sixth transistor T6 is electrically connected to the scan signal line 333 to which the fourth scan signal SC4(*n*−1) is supplied. The switching of the sixth transistor T6 is controlled using the fourth scan signal SC4(*n*−1). In other words, the conductive state (ON state) and the non-conductive state (OFF state) of the sixth transistor T6 are controlled by the fourth scan signal SC4 (*n*−1). When the signal supplied to the fourth scan signal SC4(*n*−1) is LO, the first transistor T1 is in the non-conductive state. When the signal supplied to the fourth scan signal SC4($n$−1) is HI, the first transistor T1 is in the conductive state.

Configuration and functions of the pixel circuit 181B other than the configuration and the function described in "3-1. Configuration of Pixel 180B" are similar to those of the pixel circuit 181.

[3-2. Driving Method of Pixel Circuit 181B]

The driving method of the display device according to the third embodiment will be described with reference to FIG. 23 to FIG. 27. Configurations that are the same as or similar to those in FIG. 1 to FIG. 22 will be described as necessary. In addition, similar to the first embodiment, the horizontal axis of the timing charts represents time (TIME).

As described above, the timings of the fourth scan signal SC4($n$−1) and the fifth scan signal SC4($n$) according to the display device according to the third embodiment are different from the timings of the fourth scan signal SC4($n$) and the fifth scan signal SC4($n$) of the display device according to the second embodiment. Configurations and functions other than the timings of the fourth scan signal SC4($n$−1) and the fifth scan signal SC4($n$) according to the third embodiment are similar to those of the display device 10 according to the first embodiment.

Figure 23:
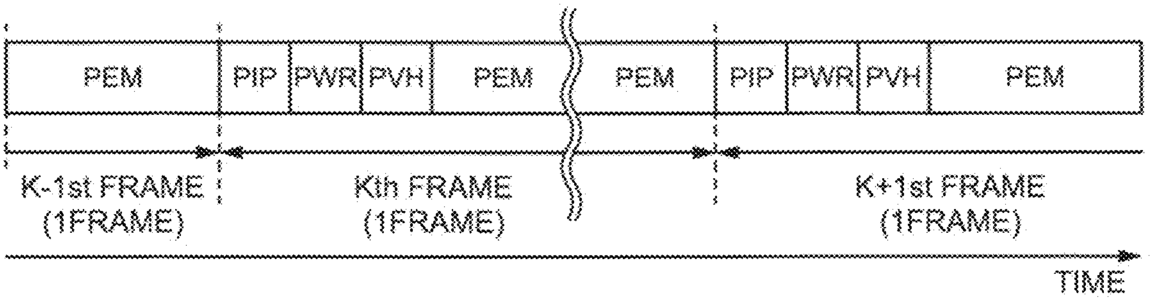
FIG. 23 is a timing chart of a display device according to the third embodiment of the present invention.

As shown in FIG. 23, the driving method of the display device according to the third embodiment is different from the driving method of the display device 10 according to the first embodiment shown in FIG. 4 in that the period PVH is executed after the period PWR. Other configurations of the respective periods shown in FIG. 23 are similar to those described in "1-5. Driving Method of Display Device 10" with reference to FIG. 4. In addition, the horizontal period HRP includes the period PWR and the period PVH.

In one horizontal period (horizontal period HRP) in the driving method of the display device according to the third embodiment, the first scan signal SC1($n$), the second scan signal SC2($n$), the third scan signal SC3($n$), the fourth scan signal SC4($n$−1), the fifth scan signal SC4($n$), the image data signal SL(m), the initialization voltage VINI, the reference voltage VREF, and the pre-charge voltage VPRC are supplied to the pixel 180B (the pixel circuit 181B). For example, the pixel 180B (the pixel circuit 181B) is selected according to the timings of the first scan signal SC1($n$), the second scan signal SC2($n$), the third scan signal SC3($n$), the fourth scan signal SC4($n$−1), and the fifth scan signal SC4($n$). The image data signal SL(m), the initialization voltage VINI, the reference voltage VREF, and the pre-charge voltage VPRC are input to the selected pixel 180B (the pixel circuit 181B) according to the timings of the respective signals. Similar operations are performed on all the pixels 180B (the pixel circuits 181B), and an image of the frame corresponding to 1FRAME is displayed on the display region 22 of the display device 10 based on the image data signal SL(m) input to all the pixels 180B (the pixel circuits 181B).

For example, the voltages (potentials) supplied to each signal in each period of each frame in the timing charts shown in FIG. 23 to FIG. 27 are shown in Table 3.

TABLE 3

| | Setting value [V] |
|---|---|
| VTH | 1 |
| VSIGL(Black) | −0.5 |
| VSIGH(White) | 3.5 |
| HI | 10 |
| LO | −3.5 |
| VINI | −1.5 |
| VREF | 0 |
| VPRC | 1.5 |
| VDDEL | 8 |
| VSSEL | 0 |

For example, as shown in Table 3, the initialization voltage VINI is −1.5 V and the voltage VL (LO) is −3.5 V. The setting values of other voltages are the same as the setting values shown in Table 1 described in "1-5. Driving Method of Display Device 10".

[3-2-1. First Example of Driving Method of Pixel Circuit 181B]

Figure 24:
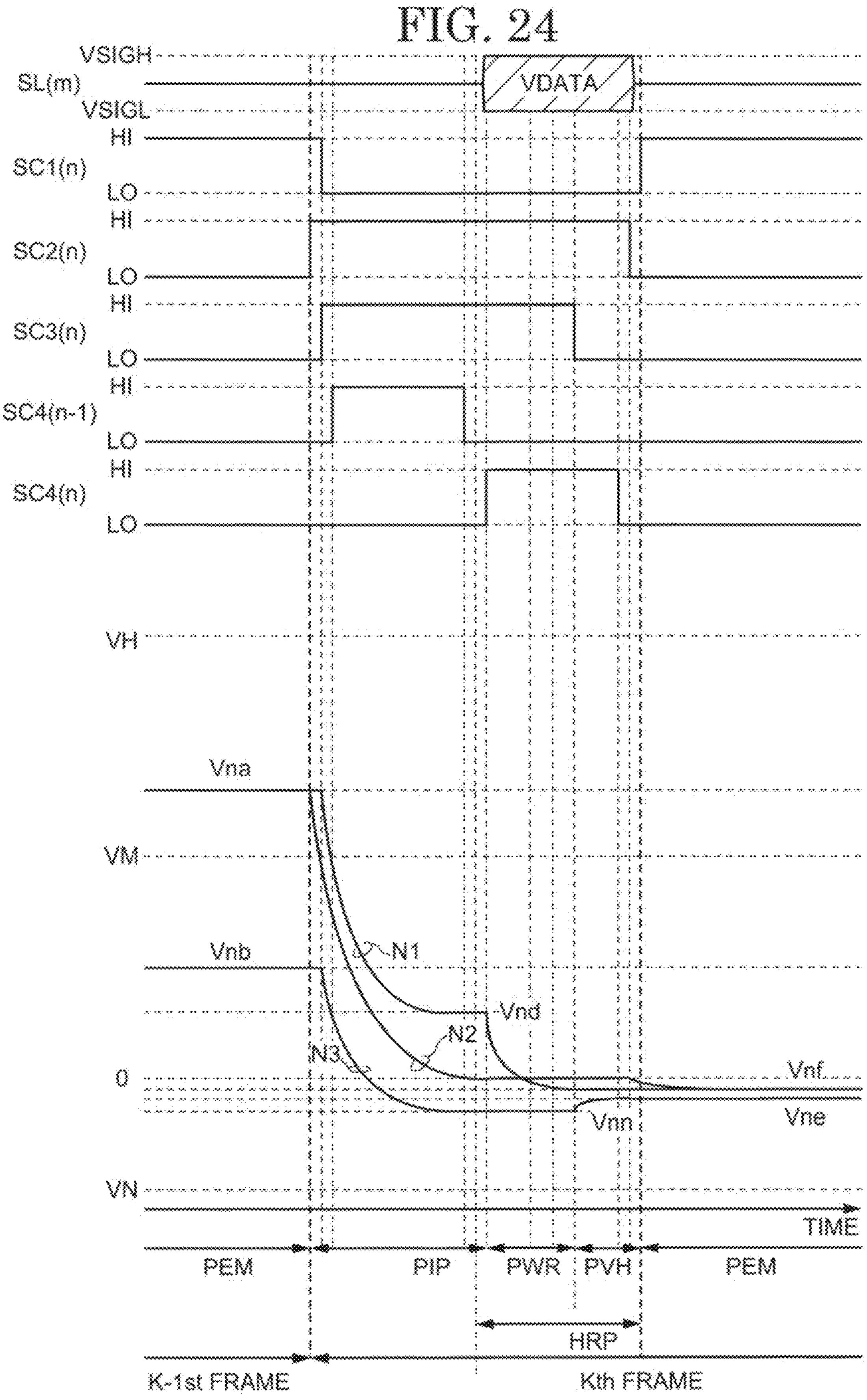
FIG. 24 is a timing chart of a display device according to the third embodiment of the present invention.

A first example of the driving method of the pixel circuit 181B will be described with reference to FIG. 24. The first example of the driving method of the pixel circuit 181B includes displaying images of different colors in consecutive frames, similar to the first example of the driving method of the display device according to the second embodiment. Configurations that are the same as or similar to those in FIG. 1 to FIG. 23 will be described as necessary.

In the light emission period PEM of the K−1stFRAME, the voltages supplied to the respective signals of the image data signal SL(m), the first scan signal SC1($n$), the second scan signal SC2($n$), and the third scan signal SC3($n$) and the timings of the respective signals are similar to the voltages of the respective signals and the timings of the respective signals in "1-5-1. First Example of Driving Method of Display Device 10". In addition, LO is supplied to the fourth scan signal SC4($n$−1) and the fifth scan signal SC4($n$).

Therefore, in the light emission period PEM of the K−1stFRAME, the states of each of the first transistor T1 to the sixth transistor T6 and the voltages supplied to each of the first node N1 to the third node N3 are similar to the states and the voltages in "1-5-1. First Example of Driving Method of Display Device 10".

As a result, the second transistor T2 can flow the current Ion based on the potential difference Vgs and the potential difference Vds corresponding to the voltage VSIGH input in the horizontal period HRP of the K−1stFRAME. In addition, the current Ion flows from the drive power line PVDD to the light-emitting element OLED and the reference voltage line PVSS, and the light-emitting element OLED emits light.

In the period PIP of the KthFRAME following the light emission period PEM of the K−1stFRAME, the voltages of the signals of the image data signal SL(m), the first scan signal SC1($n$), the second scan signal SC2($n$), and the third scan signal SC3($n$) and the timings of the signals are similar to the voltages of the signals and the timings of the signals in "1-5-1. First Example of Driving Method of Display Device 10". In addition, when the third scan signal SC3($n$) is in the state in which LO is supplied, the fourth scan signal SC4($n$−1) changes from the state in which LO is supplied to the state in which HI is supplied. The fifth scan signal SC4($n$) is maintained in the state in which LO is supplied.

Therefore, the fourth transistor T4, the fifth transistor T5, and the sixth transistor T6 are turned from the OFF state to the ON state, the third transistor T3 is turned from the ON state to the OFF state, the second transistor T2 is maintained in the ON state, and the first transistor T1 is maintained in the OFF state. As a result, the voltage supplied to the first node N1 gradually drops from the voltage Vna toward the voltage Vnd (pre-charge voltage VPRC, 1.5 V) and becomes the voltage Vnd. The voltage supplied to the second node N2 gradually drops from the voltage Vna toward 0 V (reference voltage VREF) and becomes 0 V. In addition, the voltage supplied to the third node N3 gradually drops from the voltage Vnb toward a voltage Vnn (initialization voltage VINI, −1.5 V) and becomes the voltage Vnn. Since the second transistor T2 and the fifth transistor T5 are in the ON state and a current flows from the drive power line PVDD to the initialization voltage power line SVI, the light-emitting element OLED does not emit light.

Further, in the period at the end of the period PIP of the KthFRAME, the voltages of each of the image data signal SL(m), the first scan signal SC1(*n*), the second scan signal SC2(*n*), the third scan signal SC3(*n*), and the fifth scan signal SC4(*n*) and the timings of the signals are similar to those in the period PIP of the KthFRAME following the light emission period PEM of the K−1stFRAME. In addition, the fourth scan signal SC4(*n*−1) changes from the state in which HI is supplied to the state in which LO is supplied.

Therefore, the sixth transistor T6 is turned from the ON state to the OFF state, the second transistor T2, the fourth transistor T4, and the fifth transistor T5 are maintained in the ON state, and the first transistor T1 and the third transistor T3 are maintained in the OFF state. As a result, the voltage supplied to the first node N1 maintains the voltage Vnd, the voltage supplied to the second node N2 maintains 0 V, and the voltage supplied to the third node N3 maintains the voltage Vnn. Since the second transistor T2 and the fifth transistor T5 are in the ON state and a current flows from the drive power line PVDD to the initialization voltage power line SVI, the light-emitting element OLED does not emit light.

As described above, in the period PIP of the KthFRAME, the pre-charge voltage (intermediate potential) is supplied to the first node N1, the second node N2 is initialized by the reference voltage VREF (0 V), and the third node N3 is initialized by the initialization voltage VINI (−1.5 V).

In the period PWR of the KthFRAME following the period PIP of the KthFRAME, the image data signal SL(m) is in the state in which the data signal VDATA (−0.5 V) of the voltage VSIGL is input to the pixel 180B (pixel circuit 181B) to be selected, the second scan signal SC2(*n*) and the third scan signal SC3(*n*) are maintained in the state in which HI is supplied, and the first scan signal SC1(*n*) and the fourth scan signal SC4(*n*−1) are maintained in the state in which LO is supplied. The fifth scan signal SC4(*n*) changes from the state in which LO is supplied to the state in which HI is supplied.

Therefore, the first transistor T1 is turned from the OFF state to the ON state, the second transistor T2, the fourth transistor T4, and the fifth transistor T5 are maintained in the ON state, and the third transistor T3 and the sixth transistor T6 are maintained in the OFF state.

As a result, the voltage supplied to the first node N1 gradually drops from the voltage Vnd toward the voltage Vnf (voltage VSIGL, −0.5 V) to become the voltage Vnf, the voltage supplied to the second node N2 maintains 0 V, and the voltage supplied to the third node N3 maintains the voltage Vnn. The potential difference Vgs is 1.5 V (0−(−1.5 V)). Similar to the period PIP, since the potential difference Vgs is greater than the threshold voltage VTH, the second transistor T2 and the fifth transistor T5 are in the ON state, a current flows from the drive power line PVDD to the initialization voltage power line SVI, and the light-emitting element OLED does not emit light.

As described above, in the period PWR of the KthFRAME, the data signal VDATA (in this case, the voltage VSIGL) is written to the pixel 180B (the pixel circuit 181B).

In the period PVH of the KthFRAME following the period PWR of the KthFRAME, the image data signal SL(m) is maintained in the state in which the data signal VDATA of the voltage VSIGL is supplied, the second scan signal SC2(*n*) and the fifth scan signal SC4(*n*) are maintained in the state in which HI is supplied, and the first scan signal SC1(*n*) and the fourth scan signal SC4(*n*−1) are maintained in the state in which LO is supplied. The third scan signal SC3(*n*) changes from the state in which HI is supplied to the state in which LO is supplied.

Therefore, the fifth transistor T5 is turned from the ON state to the OFF state, the first transistor T1 and the fourth transistor T4 are maintained in the ON state, and the third transistor T3 and the sixth transistor T6 are maintained in the OFF state. When the fifth transistor T5 is in the OFF state, the node N3 is released, and the second transistor T2 is in the ON state similar to the state in the period PWR of the KthFRAME, so that the current Ion flows from the drive power line PVDD (the second electrode 626 side) toward the third node N3 (the first electrode 624 side), and the voltage supplied to the third node N3 gradually rises from the voltage Vnn. When the potential difference Vgs becomes the threshold voltage VTH, the second transistor T2 is turned from the ON state to the OFF state, and the current Ion does not flow. In this case, the voltage supplied to the third node N3 rises from the voltage Vnn (−1.5 V) to the voltage Vne (−1 V), and the potential difference Vgs is the same as the threshold voltage VTH (1 V).

That is, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). In addition, since the second transistor T2 is in the OFF state, the current Ion does not flow from the drive power line PVDD to the reference voltage line PVSS, so that the light-emitting element OLED does not emit light.

In the period at the end of the period PVH, the image data signal SL(m) is maintained in the state in which the data signal VDATA of the voltage VSIGL is supplied, and the third scan signal SC3(*n*) and the fourth scan signal SC4(*n*−1) are maintained in the state in which LO is supplied. The fifth scan signal SC4(*n*) changes from the state in which HI is supplied to the state in which LO is supplied. When the fifth scan signal SC4(*n*) is in the state in which LO is supplied, the second scan signal SC2(*n*) changes from the state in which HI is supplied to the state in which LO is supplied. When the second scan signal SC2(*n*) is in the state in which LO is supplied, the first scan signal SC1(*n*) changes from the state in which LO is supplied to the state in which HI is supplied.

Thus, the third transistor is turned from the OFF state to the ON state, the first transistor T1 and the fourth transistor are turned from the ON state to the OFF state, and the second transistor T2, the fifth transistor T5 and the sixth transistor T6 are maintained in the OFF state.

As a result, the first node N1 and the second node N2 are conductive, the voltage supplied to the second node N2 gradually drops toward the voltage Vnf to become the voltage Vnf, the voltage supplied to the first node N1 maintains the voltage Vnf, and the voltage supplied to the third node N3 maintains the voltage Vne. In addition, since the potential difference Vgs is the voltage Vnf−the voltage Vne and the potential difference Vgs is smaller than the threshold voltage VTH, no current Ion flows from the drive power line PVDD to the reference voltage line PVSS. Therefore, the light-emitting element OLED does not emit light.

As described above, in the period PVH of the KthFRAME, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the horizontal period HRP of the KthFRAME, the voltage of the data signal VDATA supplied to pixels other than the selected pixel 180B (the pixel circuit 181B) is supplied to the image data signal SL(m). In addition, the first scan signal SC1(*n*) is maintained in the state in which HI is supplied, and the second scan signal SC2(*n*) to the fifth scan signal SC4(*n*) are maintained in the state in which LO is supplied.

Therefore, the first transistor T1, the second transistor T2, the fourth transistor T4, the fifth transistor T5, and the sixth transistor T6 are maintained in the OFF state, and the third transistor T3 is maintained in the ON state. Since the second transistor T2 is in the OFF state and no current Ion flows from the drive power line PVDD to the reference voltage line PVSS, the light-emitting element OLED does not emit light. As a result, for example, the pixel 180B emitting red light is black. In addition, similar to the pixel 180 emitting red light, since the pixel 180 emitting blue light, and the pixel 180 emitting green light do not emit light, three pixels using the pixel 180 emitting red light, the pixel 180 emitting blue light, and the pixel 180 emitting green light become black.

The first example of the pixel circuit 181B including the above-described configuration can supply the intermediate potential to the first node N1 and then supply the data signal VDATA.

In addition, the first example of the driving method of the pixel circuit 181B includes executing the period PVH after the period PWR. That is, since charging the third node N3 starts after the potential of the data voltage (the first node N1) is determined, the third node N3 does not malfunction due to the influence of the potential fluctuation of the data voltage (the first node N1), and the initialization voltage VINI (Vnc) can be set shallow. As a result, the power consumption can be suppressed.

In addition, similar to "1-5-1. First Example of Driving Method of Display Device 10", the driving method of the pixel circuit 181B can increase the writing speed, and increase the number of pixels that can be written in the period in which the writing speed is reduced. As a result, the display device including the pixel circuit 181B can provide a high-resolution display device and a large-screen display device. In addition, the display device including the pixel circuit 181B can reduce (suppress) the power consumption.

Further, the fourth scan signal SC4(*n*−1) in the display device including the pixel circuit 181B is a signal before the fifth scan signal SC4(*n*) is shifted. That is, the fourth scan signal SC4(*n*−1) is a signal supplied to the pixel circuit 181B electrically connected to the previous row in the row direction. Therefore, the display device including the pixel circuit 181B can share the control signal in the row direction with adjacent pixels. Therefore, for example, the display device including the pixel circuit 181B can simplify the configuration of the control circuit for generating the fourth scan signal SC4(*n*−1) and the fifth scan signal SC4(*n*).

[3-2-2. Second Example of Driving Method of Pixel Circuit 181B]

Figure 25:
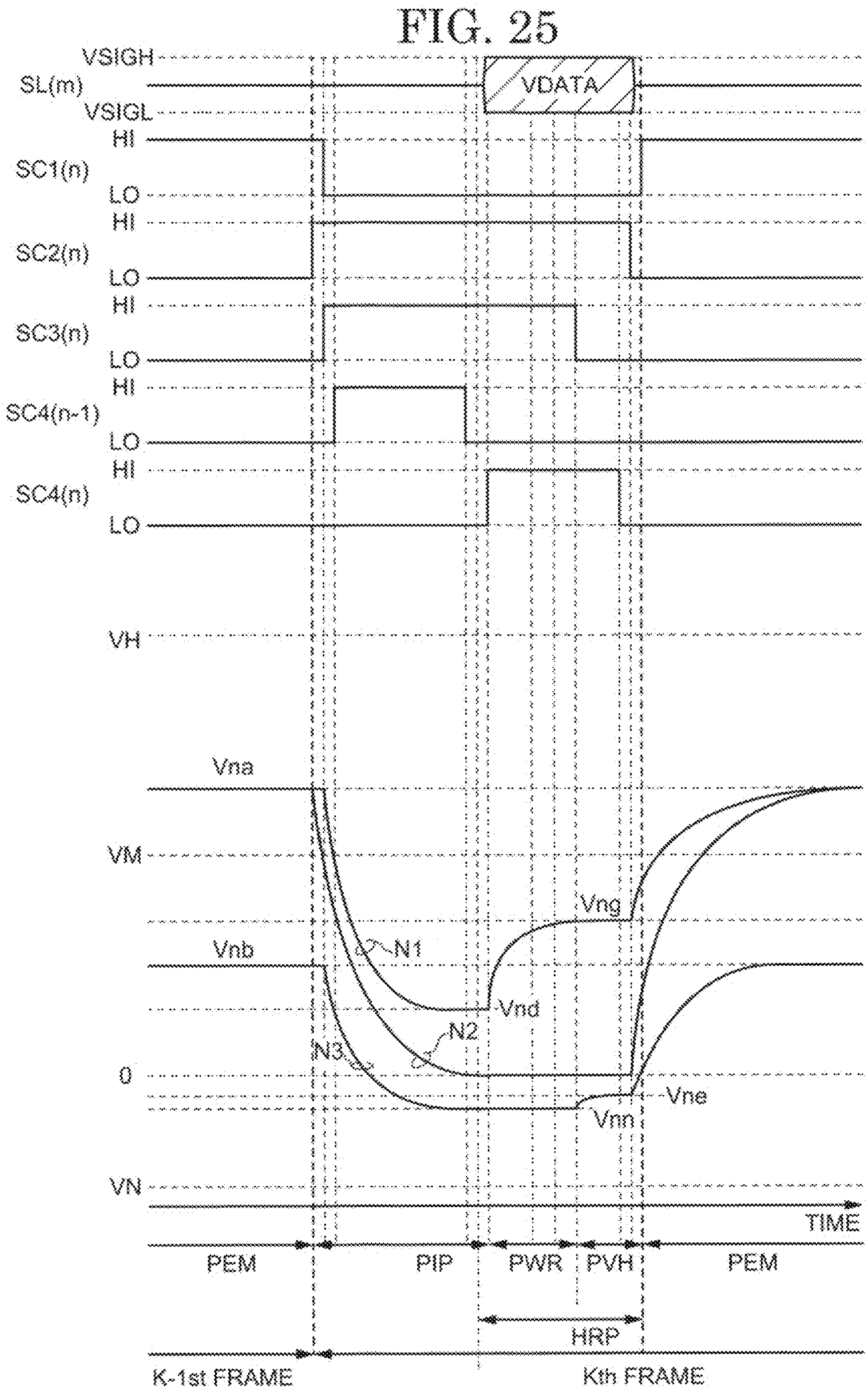
FIG. 25 is a timing chart of a display device according to the third embodiment of the present invention.

A second example of the driving method of the pixel circuit 181B will be described with reference to FIG. 25. The driving method shown in the second example of the pixel circuit 181B includes displaying images of the same color (white) in consecutive frames similar to the second example of the driving method of the display device 10 according to the first embodiment. Configurations that are the same as or similar to those in FIG. 1 to FIG. 24 will be described as necessary.

The configurations of the first scan signal SC1(*n*) to the fifth scan signal SC4(*n*) are similar to those described in "3-2-1. First Example of Driving Method of Pixel Circuit 181B". In addition, the voltages (potentials) of the first node N1, the second node N2, and the third node N3 in the light emission period PEM of the K−1stFRAME and the period PIP of the KthFRAME are similar to the configurations described in "3-2-1. First Example of Driving Method of Pixel Circuit 181B". Further, the operations and the like of the transistors in the respective periods are similar to those described in "3-2-1. First Example of Driving Method of Pixel Circuit 181B". Therefore, configurations and the like similar to those described in "3-2-1. First Example of Driving Method of Pixel Circuit 181B" will be described as necessary. In addition, the data signal VDATA of VSIGH corresponding to white is supplied to the image data signal SL(m) in the horizontal period HRP, and the data signal VDATA similar to the configuration described in "3-2-1. First Example of Driving Method of Pixel Circuit 181B" is supplied in the periods other than the horizontal period HRP.

In the light emission period PEM of the K−1stFRAME, the light-emitting element OLED emits light similar to the configuration described in "3-2-1. First Example of Driving Method of Pixel Circuit 181B".

In the period PIP of the KthFRAME following the light emission period PEM of the K−1stFRAME, similar to the configuration described in "3-2-1. First Example of Driving Method of Pixel Circuit 181B", the voltage supplied to the first node N1 becomes the voltage Vnd, the voltage supplied to the second node N2 becomes the reference voltage VREF (0 V), and the voltage supplied to the third node N3 becomes the voltage Vnn (initialization voltage VINI1, −1.5 V). The potential difference Vgs is less than 1 V, and the potential difference Vds is less than 9.5 V. As a result, the light-emitting element OLED does not emit light.

As described above, in the period PIP, the pre-charge voltage (intermediate potential) is supplied to the first node N1, the second node N2 is initialized by the reference voltage VREF (0 V), and the third node N3 is initialized by the initialization voltage VINI (−1.5 V).

In the period PWR following the period PIP, the voltage supplied to the first node N1 gradually rises from the voltage Vnd toward the voltage Vng (voltage VSIGH, 3.5 V), the voltage supplied to the second node N2 maintains 0 V, and the voltage supplied to the third node N3 maintains the voltage Vnn. As a result, the light-emitting element OLED does not emit light similar to the configuration described in "3-2-1. First Example of Driving Method of Pixel Circuit 181B".

As described above, in the period PWR, the data signal VDATA (in this case, the voltage VSIGH) is written to the pixel 180B (the pixel circuit 181B).

In the period PVH following the period PWR, the voltage supplied to the first node N1 gradually rises from the voltage Vnd toward the voltage Vng to become the voltage Vng, and the voltage supplied to the second node N2 maintains 0 V. Similar to the configuration in the period PVH described in "3-2-1. First Example of Driving Method of Pixel Circuit 181B", the voltage supplied to the third node N3 rises from the voltage Vnn (−1.5 V) to the voltage Vne (−1 V). As a result, the potential difference Vgs is the same as the threshold voltage VTH (1 V). That is, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). In addition, since the second transistor T2 is in the OFF state, the current Ion does not flow from the drive power line PVDD to the reference voltage line PVSS, so that the light-emitting element OLED does not emit light.

In the period at the end of the period PVH, the first node N1 and the second node N2 are conductive, and the voltage supplied to the second node N2 gradually rises. As a result, the second transistor T2 is in the conductive state, and the current Ion flows from the drive power line PVDD to the reference voltage line PVSS. Therefore, the voltage supplied to the first node N1 and the voltage supplied to the third node N3 rise to follow the rise in the voltage supplied to the second node N2. Due to the voltage rise of the third node N3, the voltage supplied to the first node N1 and the voltage supplied to the second node N2 further rise.

As a result, the voltage supplied to the first node N1 and the voltage supplied to the second node N2 rise to the voltage Vna, and the voltage supplied to the third node N3 rises to the voltage Vnb. The potential difference Vgs is 4.5 V (voltage Vna (7 V)−voltage Vnb (2.5 V). The potential difference Vgs is greater than the threshold voltage VTH, the second transistor T2 is in the ON state, the current Ion flows from the drive power line PVDD to the reference voltage line PVSS, and the light-emitting element OLED emits light. For example, the pixel 180 (the pixel circuit 181) emits red light, and white light is emitted by three pixels using the pixel 180 emitting red light, the pixel 180 emitting blue light, and the pixel 180 emitting green light.

[3-2-3. Third Example of Driving Method of Pixel Circuit 181B]

Figure 26:
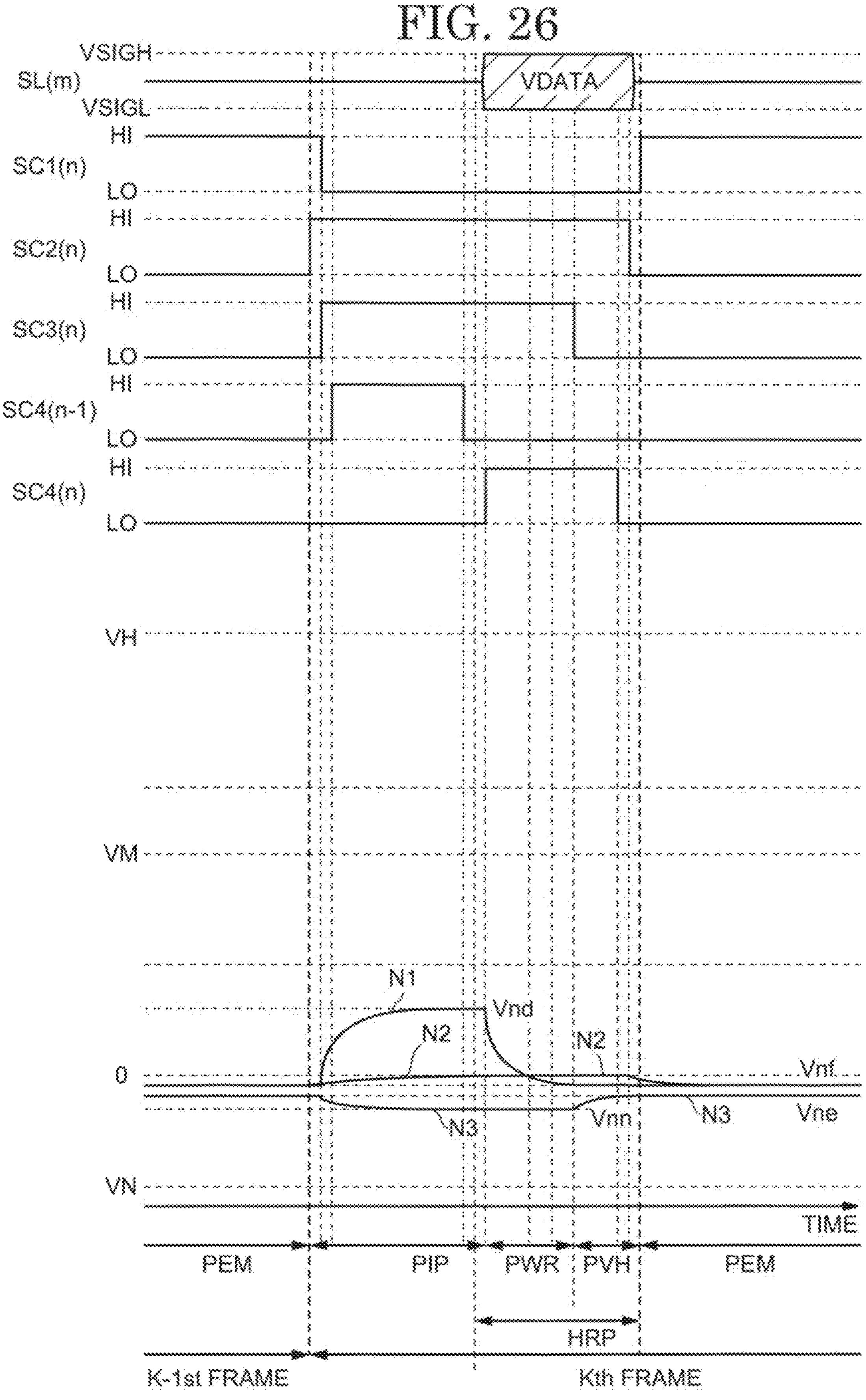
FIG. 26 is a timing chart of a display device according to the third embodiment of the present invention.

A third example of the driving method of the pixel circuit 181B will be described with reference to FIG. 26. The driving method shown in the third example of the driving method of the pixel circuit 181B includes displaying images of the same color (black) in consecutive frames similar to the third example of the driving method of the display device 10 according to the first embodiment. Configurations that are the same as or similar to those in FIG. 1 to FIG. 25 will be described as necessary.

The configurations of the first scan signal SC1(*n*) to the fifth scan signal SC4(*n*) are similar to those described in "3-2-1. First Example of Driving Method of Pixel Circuit 181B". In addition, the voltages (potentials) of the first node N1, the second node N2, and the third node N3 in the light emission period PEM of the K−1stFRAME are similar to the configurations described in "1-5-3. Third Example of Driving Method of Display Device 10". In addition, the voltages (potentials) of the first node N1, the second node N2, and the third node N3 in the period PVH to the light emission period PEM of the KthFRAME are similar to the configurations described in "3-2-1. First Example of Driving Method of Pixel Circuit 181B". Further, the operations and the like of the transistors in the respective periods are similar to the configuration described in "3-2-1. First Example of Driving Method of Pixel Circuit 181B". Therefore, configurations and the like similar to those described in "1-5-3. Third Example of Driving Method of Display Device 10" and "3-2-1. First Example of Driving Method of Pixel Circuit 181B" will be described as necessary. In addition, the data signal VDATA of VSIGL corresponding to black is supplied to the image data signal SL(m) in the horizontal period HRP, and the data signal VDATA similar to the configuration described in "3-2-1. First Example of Driving Method of Pixel Circuit 181B" is supplied in the periods other than the horizontal period HRP.

In the light emission period PEM of the K−1stFRAME, similar to the configuration described in "1-5-3. Third Example of Driving Method of Display Device 10", the light-emitting element OLED does not emit light and the pixel 180B is black.

In the period PIP of the KthFRAME following the light emission period PEM of the K−1stFRAME, the voltage supplied to the first node N1 gradually rises from the voltage Vnf toward the pre-charge voltage VPRC (voltage Vnd, 1.5 V), and becomes the voltage Vnd. The voltage supplied to the second node N2 gradually drops from the voltage Vnf toward 0 V (reference voltage VREF) and becomes 0 V. In addition, the voltage supplied to the third node N3 gradually drops from the voltage Vne toward Vnn (initialization voltage VINI, −1.5 V)) and becomes-1.5 V. Although the potential difference VTH is 1.5 V, similar to the configuration described in "1-5-3. Third Example of Driving Method of Display Device 10", the second transistor T2 and the fifth transistor T5 are in the ON state and a current flows from the drive power line PVDD to the initialization voltage power line SVI, so that the light-emitting element OLED does not emit light.

As described above, in the period PIP, the pre-charge voltage (intermediate potential) is supplied to the first node N1, the second node N2 is initialized by the reference voltage VREF (0 V), and the third node N3 is initialized by the initialization voltage VINI (−1.5 V).

In the period PWR following the period PIP, similar to the configuration described in "3-2-1. First Example of Driving Method of Pixel Circuit 181B", the data signal VDATA (in the third example, the voltage VSIGL) is written to the pixel 180B (the pixel circuit 181B). Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Furthermore, in the light emission period PEM of the KthFRAME, similar to the configuration described in "3-2-1. First Example of Driving Method of Pixel Circuit 181B", three pixels using the pixel 180B emitting red light, the pixel 180B emitting blue light, and the pixel 180B emitting green light become black.

[3-2-4. Fourth Example of Driving Method of Pixel Circuit 181B]

Figure 27:
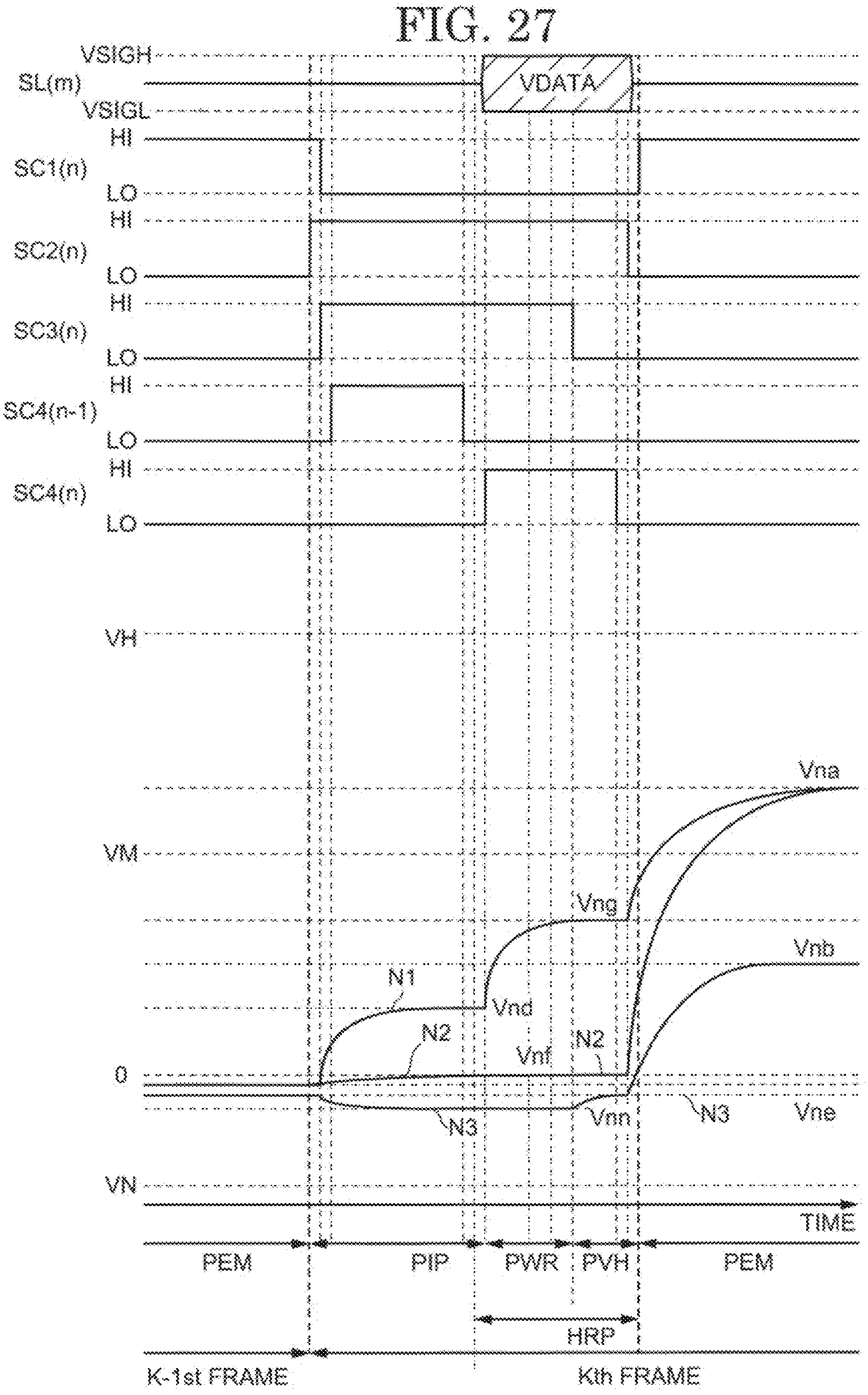
FIG. 27 is a timing chart of a display device according to the third embodiment of the present invention.

A fourth example of the driving method of the pixel circuit 181B will be described with reference to FIG. 27. The driving method shown in the fourth example of the driving method of the pixel circuit 181B includes displaying images of different colors in consecutive frames similar to the fourth example of the driving method of the display device according to the first embodiment. Configurations that are the same as or similar to those in FIG. 1 to FIG. 26 will be described as necessary.

The configurations of the first scan signal SC1(*n*) to the fifth scan signal SC4(*n*) are similar to those described in "3-2-1. First Example of Driving Method of Pixel Circuit 181B". In addition, the voltages (potentials) and the like of the first node N1, the second node N2, and the third node N3 in the light emission period PEM of the K−1stFRAME and the period PIP of the KthFRAME are similar to those described in "3-2-3. Third Example of Driving Method of Pixel Circuit 181B". In addition, the voltages (potentials) and the like of the first node N1, the second node N2, and the third node N3 in the period PVH to the light emission period PEM of the KthFRAME are similar to those described in "3-2-2. Second Example of Driving Method of Pixel Circuit 181B". Further, the operations and the like of the transistors in the respective periods are similar to those described in "3-2-1. First Example of Driving Method of Pixel Circuit 181B". Therefore, configurations and the like similar to those described in "3-2-1. First Example of Driving Method of Pixel Circuit 181B" to "3-2-3. Third Example of Driving Method of Pixel Circuit 181B" will be described as necessary. In addition, the data signal VDATA of VSIGH corresponding to white is supplied to the image data signal SL(m) in the horizontal period HRP, and the data signal VDATA similar to the configuration described in "3-2-1. First Example of Driving Method of Pixel Circuit 181B" is supplied in the periods other than the horizontal period HRP.

In the light emission period PEM of the K−1stFRAME, the pixel 180B is black similar to "3-2-3. Third Example of Driving Method of Pixel Circuit 181B".

In the period PIP, similar to "3-2-3. Third Example of Driving Method of Pixel Circuit 181B", the pre-charge voltage (intermediate potential) is supplied to the first node N1, the second node N2 is initialized by the reference voltage VREF (0 V), and the third node N3 is initialized by the initialization voltage VINI (−1.5 V).

In the period PWR, similar to "3-2-2. Second Example of Driving Method of Pixel Circuit 181B", the data signal VDATA (in the fourth example, the voltage VSIGH) is written to the pixel 180B (the pixel circuit 181B). Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Furthermore, in the light emission period PEM of the KthFRAME, similar to "3-2-2. Second Example of Driving Method of Pixel Circuit 181B", white light is emitted by three pixels using the pixel 180B emitting red light, the pixel 180B emitting blue light, and the pixel 180B emitting green light.

4. Fourth Embodiment

Figure 28:
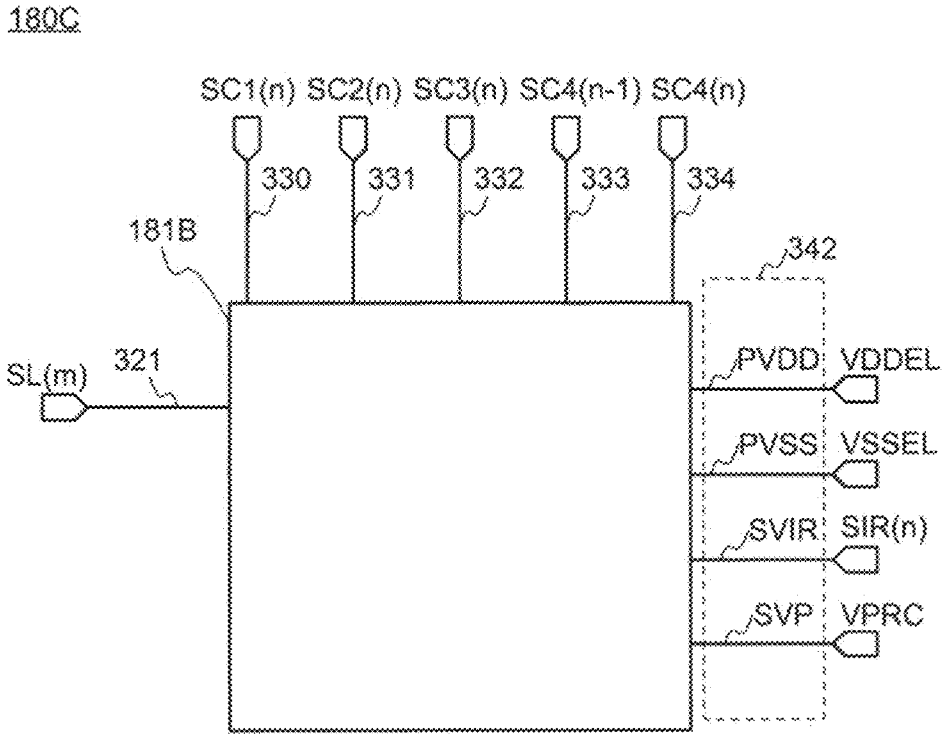
FIG. 28 is a schematic diagram showing input signals to a pixel circuit according to the fourth embodiment of the present invention.
Figure 29:
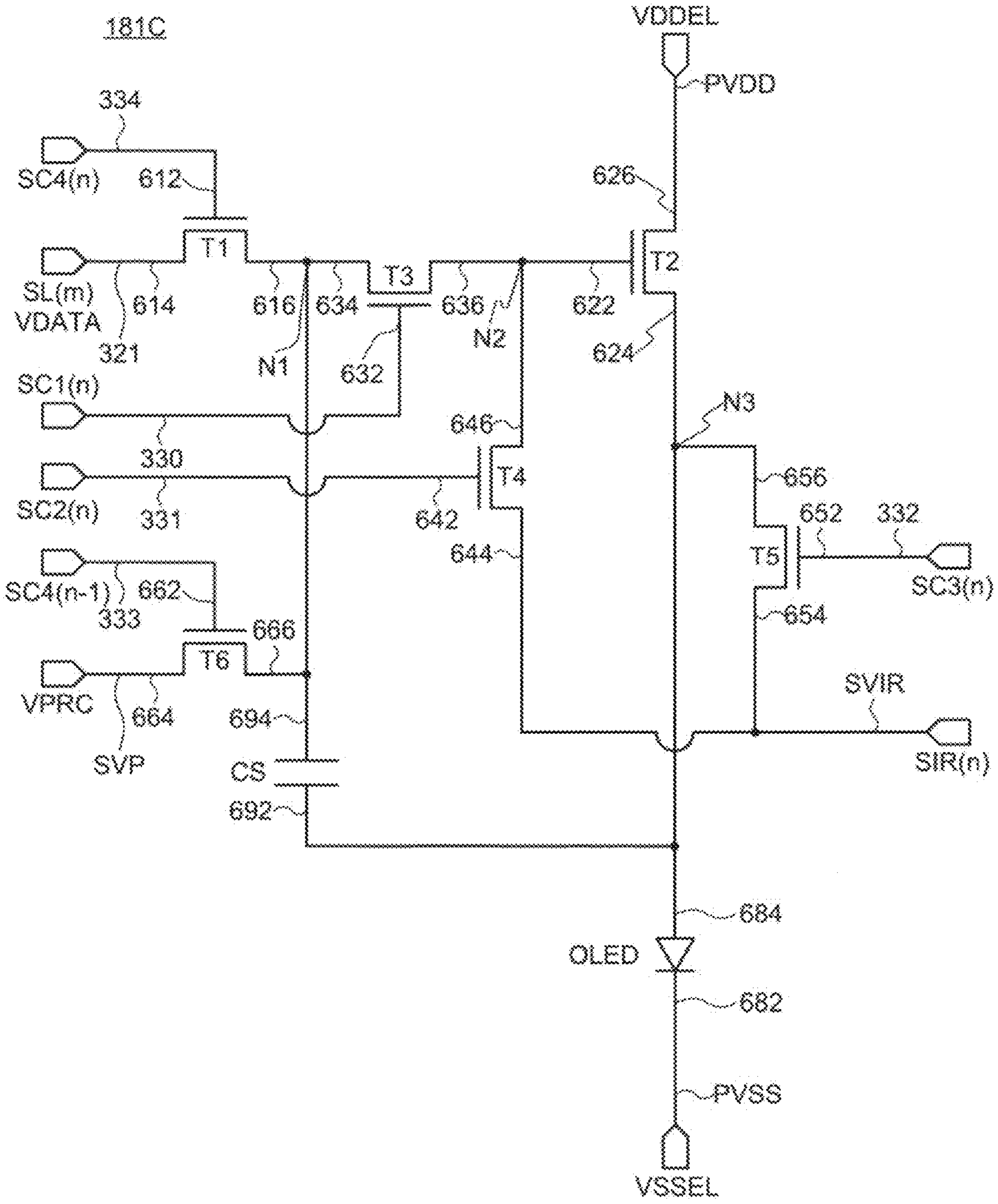
FIG. 29 is a circuit diagram showing a configuration of a pixel circuit according to the fourth embodiment of the present invention.

An overview of the display device according to a fourth embodiment will be described with reference to FIG. 1, FIG. 23, and FIG. 28 to FIG. 34. FIG. 28 is a schematic diagram showing input signals to a pixel 180C (pixel circuit 181C) according to the fourth embodiment, FIG. 29 is a circuit diagram showing a configuration of the pixel circuit 181C, and FIG. 30 to FIG. 33 are timing charts of the display device according to the fourth embodiment. FIG. 34 is a diagram for explaining the setting of an input signal according to the fourth embodiment of the present invention.

The display device according to the fourth embodiment includes the pixel 180C and the pixel circuit 181C. Specifically, the pixel 180C and the pixel circuit 181C include the configurations shown in (1) to (3) below. Mainly, the configurations shown in (1) to (3) are different from the configurations of the pixel 180B and the pixel circuit 181B of the display device according to the third embodiment.

(1) The scan voltage power line SVIR to which the scan voltage power supply SIR(n) is supplied is included.

(2) The scan voltage power line SVIR is a signal line that combines the reference voltage power line SVR to which the reference voltage power supply VREF is supplied and the initialization voltage power line SVI to which the initialization voltage VINI is supplied. That is, the scan voltage power line SVIR has a configuration serving as both the reference voltage power line SVR and the initialization voltage power line SVI.

(3) The scan voltage power supply SIR(n) includes voltages that change alternately with time. The voltages that change alternately with time are the initialization voltage VINI2 and the initialization voltage VINI1.

Configurations other than the configurations shown in (1) to (3) in the pixel 180C and the pixel circuit 181C and the configuration related to the configuration shown in (1) to (3) in the pixel 180C and the pixel circuit 181C are similar to the configuration of the display device according to the third embodiment. In addition, the configurations and functions related to the scan voltage power line SVIR and the scan voltage power supply SIR(n) are similar to those of the scan voltage power line SVIR and the scan voltage power supply SIR(n) described in "2. Second Embodiment". Therefore, differences from the display device according to the second embodiment and the display device according to the third embodiment will be mainly described here. When describing the configurations and functions of the display device according to the fourth embodiment, configurations and functions similar to those of the display device according to the second embodiment and the display device according to the third embodiment will be described as necessary. Configurations that are the same as or similar to those in FIG. 1 to FIG. 27 will be described as necessary.

[4-1. Configuration of Pixel 180C]

An overview of the pixel 180C and the pixel circuit 181C will be described with reference to FIG. 28 and FIG. 29.

The pixel circuit 181C is connected to the scan voltage power line SVIR to which the scan voltage power supply SIR(n) is supplied. In the pixel circuit 181C, the first electrode 644 of the fourth transistor T4 and the first electrode 654 of the fifth transistor T5 are electrically connected to the scan voltage power line SVIR. The configurations and functions including the electrical connection of the scan voltage power line SVIR, the scan voltage power supply SIR(n), the fourth transistor T4, and the fifth transistor T5 are similar to those of the display device according to the second embodiment.

Configurations and functions of the pixel circuit 181C other than the configuration and function described in "4-1. Configuration of Pixel 180C" are similar to those of the display device (the pixel circuit 181A) according to the second embodiment and the display device (the pixel circuit 181B) according to the third embodiment.

[4-2. Driving Method of Pixel Circuit 181C]

A driving method of the display device according to the fourth embodiment will be described with reference to FIG.

Figure 33:
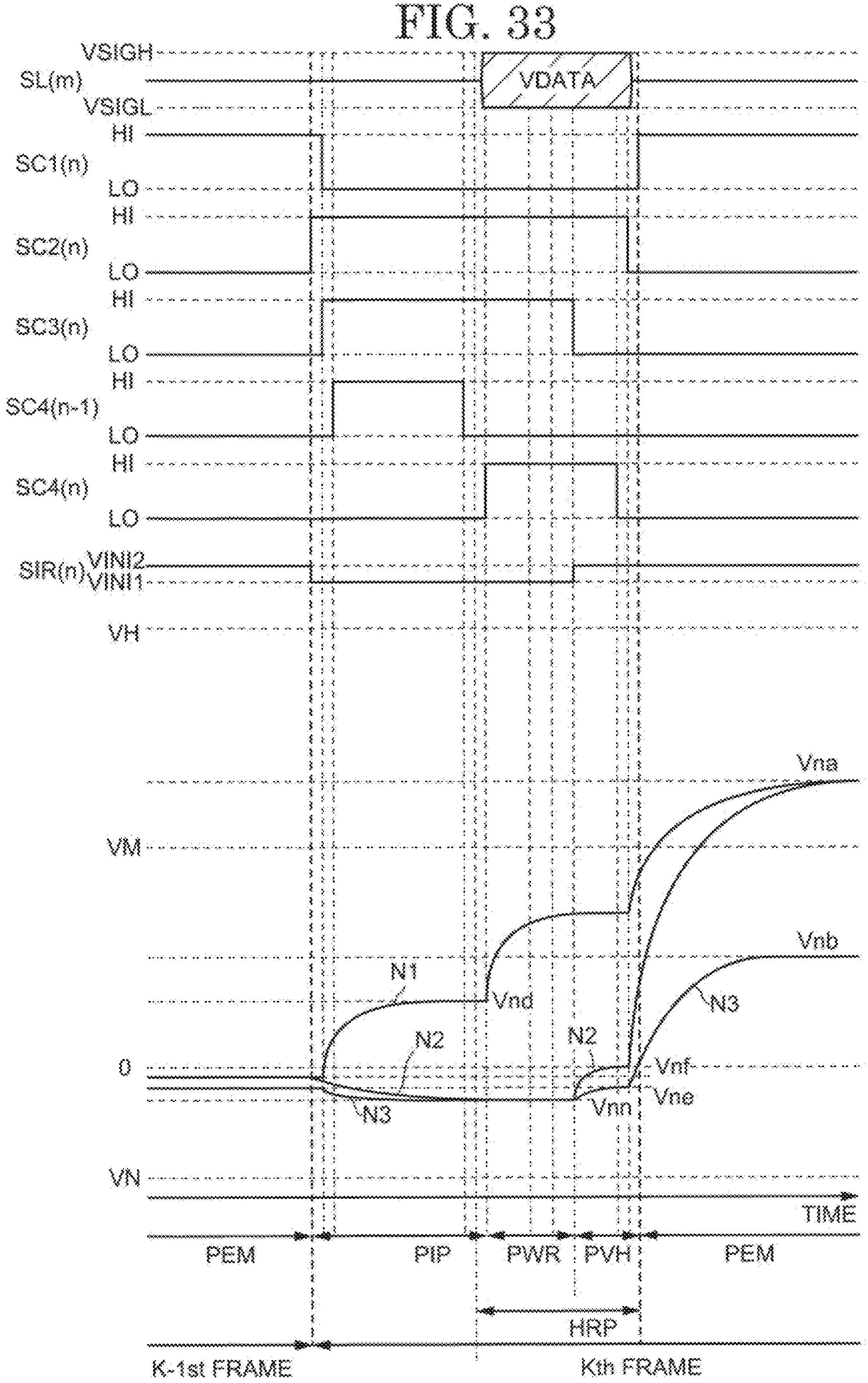
FIG. 33 is a timing chart of a display device according to the fourth embodiment of the present invention.
Figure 34:
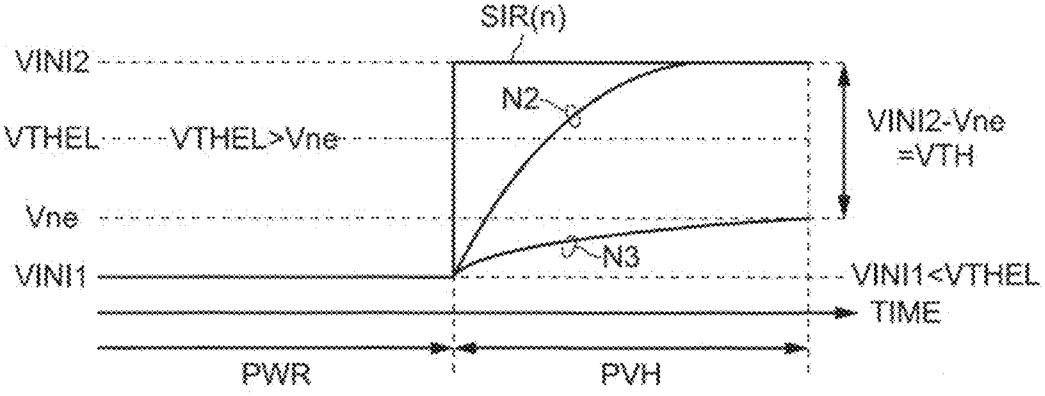
FIG. 34 is a diagram for explaining the setting of an input signal according to the fourth embodiment of the present invention.

30 to FIG. 33. Configurations that are the same as or similar to those in FIG. 1 to FIG. 29 will be described as necessary. In addition, similar to the first embodiment, the horizontal axis of the timing charts represents time (TIME).

The driving method of the display device according to the fourth embodiment is different from the driving method of the display device according to the third embodiment in the configuration related to the configurations (1) to (3) described in "4-1. Configuration of Pixel 180C". Configurations and functions other than the configuration related to (1) to (3) described in "4-1. Configuration of Pixel 180C" are similar to the driving method of the display device according to the third embodiment. In addition, as described in "4-1. Configuration of Pixel 180C", configurations and functions related to the scan voltage power line SVIR and the scan voltage power supply SIR(n) are similar to those of the display device according to the second embodiment.

The driving method of the display device according to the fourth embodiment includes the periods similar to those of the driving method of the display device according to the third embodiment shown in FIG. 23.

In the one horizontal period (horizontal period HRP) in the driving method of the display device according to the fourth embodiment, the first scan signal SC1(*n*), the second scan signal SC2(*n*), the third scan signal SC3(*n*), the fourth scan signal SC4(*n*−1), the fifth scan signal SC4(*n*), the image data signal SL(m), the scan voltage power supply SIR(n), and the pre-charge voltage VPRC are input to the pixel 180C (pixel circuit 181C). For example, the pixel 180C (pixel circuit 181C) is selected according to the timings of the first scan signal SC1(*n*), the second scan signal SC2(*n*), the third scan signal SC3(*n*), the fourth scan signal SC4(*n*−1), the fifth scan signal SC4(*n*), and the scan voltage power supply SIR(n). The image data signal SL(m), the scan voltage power supply SIR(n), and the pre-charge voltage VPRC are input to the selected pixel 180C (pixel circuit 181C) according to the timings of the respective signals. Similar operations are performed on all the pixels 180C (pixel circuits 181C), and an image of the frame corresponding to 1FRAME is displayed on the display region 22 of the display device 10 based on the image data signal SL(m) input to all the pixels 180C (pixel circuits 181C).

For example, the voltages (potentials) supplied to each signal of each frame in the timing charts shown in FIG. 30 to FIG. 34 are shown in Table 4.

TABLE 4

| | Setting value [V] |
|---|---|
| VTH | 1 |
| VSIGL(Black) | −0.5 |
| VSIGH(White) | 3.5 |
| HI | 10 |
| LO | −3.5 |
| VINI1 | −1.5 |
| VINI2 | 0 |
| VPRC | 1.5 |
| VDDEL | 8 |
| VSSEL | 0 |

For example, as shown in Table 4, the initialization voltage VINI2 is 0 V and the initialization voltage VINI1 is −1.5 V. The initialization voltage VINI2 is the same as the reference voltage VREF in the driving method of the pixel circuit 181B, and the initialization voltage VINI1 is the same as the initialization voltage VINI in the driving method of the pixel circuit 181B. The setting values of other voltages are the setting values shown in Table 3 described in "3-2. Driving Method of Pixel Circuit 181B".

[4-2-1. First Example of Driving Method of Pixel Circuit 181C]

Figure 30:
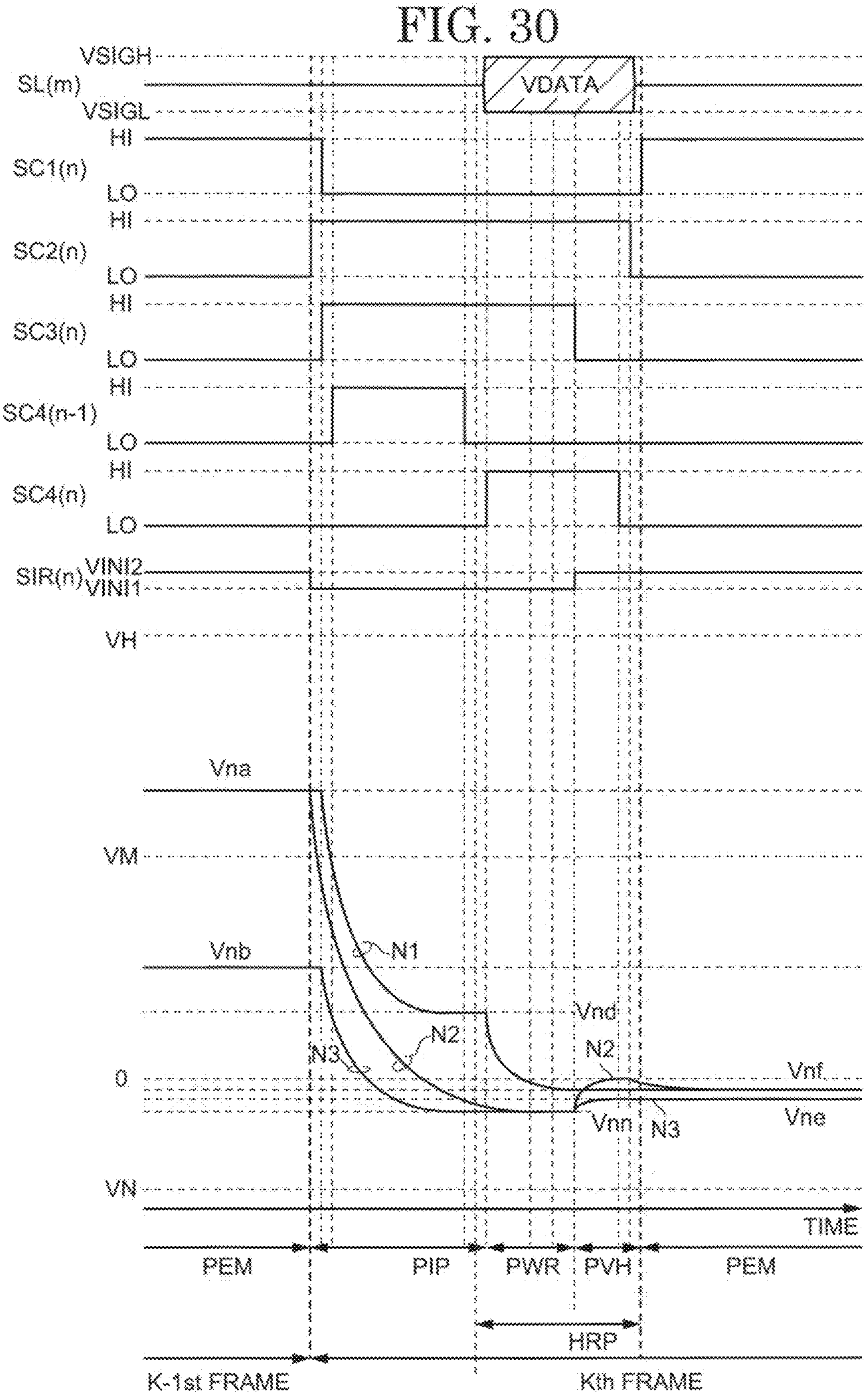
FIG. 30 is a timing chart of a display device according to the fourth embodiment of the present invention.

A first example of the driving method of the pixel circuit 181C will be described with reference to FIG. 30. The first example of the driving method of the pixel circuit 181C includes displaying images of different colors in consecutive frames, similar to the first example of the driving method of the pixel circuit 181B according to the third embodiment. Configurations that are the same as or similar to those in FIG. 1 to FIG. 29 will be described as necessary.

As described in "2-2-1. First Example of Driving Method of Pixel circuit 181A", the initialization voltage VINI2 is supplied to the scan voltage power supply SIR(n) in the light emission period PEM of the K−1stFRAME, the initialization voltage VINI1 is supplied in the period PIP of the KthFRAME, and the initialization voltage VINI2 is supplied in the period PVH and the light emission period PEM of the KthFRAME.

The configurations of the first scan signal SC1(*n*) to the fifth scan signal SC4(*n*) are similar to those described in "3-2-1. First Example of Driving Method of Pixel Circuit 181B". In addition, the operations and the like of the transistors in the respective periods are similar to those described in "3-2-1. First Example of Driving Method of Pixel Circuit 181B". Therefore, configurations and the like similar to the configuration described in "3-2-1. First Example of Driving Method of Pixel Circuit 181B" will be described as necessary.

In the light emission period PEM of the K−1stFRAME, the light-emitting element OLED emits light similar to the configuration described in "3-2-1. First Example of Driving Method of Pixel Circuit 181B".

In the period between the light emission period PEM and the period PIP of the K−1stFRAME following the light emission period PEM of the K−1stFRAME, the scan voltage power supply SIR(n) changes from a state in which 0 V (initialization voltage VINI2) is supplied to a state in which the voltage Vnn (initialization voltage VINI1, −1.5 V) is supplied. As a result, the voltage supplied to the second node N2 gradually drops from the voltage Vna toward the voltage Vnn (initialization voltage VINI1, −1.5 V), the voltage supplied to the first node N1 gradually drops from the voltage Vna toward the voltage Vnd (pre-charge voltage VPRC, 1.5 V), and the voltage supplied to the third node N3 maintains the voltage Vnb.

In the period PIP following the period between the light emission period PEM and the period PIP of the K−1stFRAME, the scan voltage power supply SIR(n) is maintained in the state in which the voltage Vnn (initialization voltage VINI1, −1.5 V) is supplied. The voltage supplied to the first node N1 gradually drops from the voltage Vna toward the voltage Vnd and becomes the voltage Vnd. The voltage supplied to the second node N2 gradually drops from the voltage Vna toward the voltage Vnn and becomes the voltage Vnn. The voltage supplied to the third node N3 gradually drops from the voltage Vnb toward the voltage Vnn and becomes the voltage Vnn. The potential difference Vgs is 0 V (−1.5 V−(−1.5 V)) and the potential difference Vds is 9.5 V (8 V−(−1.5 V)). Since the potential difference Vgs is smaller than the threshold voltage VTH, the second transistor T2 is in the OFF state, and the current Ion does not flow from the drive power line PVDD to the scan voltage power line SVIR or the reference voltage line PVSS, so that the light-emitting element OLED does not emit light.

Further, in the period at the end of the period PIP of the KthFRAME, the scan voltage power supply SIR(n) is maintained in the state in which the voltage Vnn (initialization voltage VINI1, −1.5 V) is supplied. The voltage supplied to the first node N1 maintains the voltage Vnd, the voltage supplied to the second node N2 maintains −1.5 V (Vnn), and the voltage supplied to the third node N3 maintains the voltage Vnn. Since the second transistor T2 is in the OFF state and no current flows from the drive power line PVDD to the reference voltage line PVSS, the light-emitting element OLED does not emit light.

As described above, in the period PIP of the KthFRAME, the pre-charge voltage (intermediate potential) is supplied to the first node N1, and the second node N2 and the third node N3 are initialized by the initialization voltage VINI (−1.5 V).

In the period PWR of the KthFRAME following the period PIP of the KthFRAME, the scan voltage power supply SIR(n) is maintained in the state in which the voltage Vnn (initialization voltage VINI1, −1.5 V) is supplied. The voltage supplied to the first node N1 gradually drops from the voltage Vnd toward the voltage VSIGL (voltage Vnf, −0.5 V), and the voltage supplied to the second node N2 and the third node N3 maintains Vnn (−1.5 V). In addition, similar to the period PIP, the light-emitting element OLED does not emit light.

As described above, in the period PWR of the KthFRAME, the data signal VDATA (in this case, the voltage VSIGL) is written to the pixel 180B (the pixel circuit 181B).

In the period PVH of the KthFRAME following the period PWR of the KthFRAME, the image data signal SL(m) is maintained in the state in which the data signal VDATA of the voltage VSIGL is supplied, and the scan voltage power supply SIR(n) changes from the state in which the initialization voltage VINI1 (−1.5 V) is supplied to the state in which the initialization voltage VINI2 (0 V) is supplied. The voltage supplied to the second node N2 rises from Vnn (−1.5 V) toward VINI2 (0 V), and when the voltage exceeds the threshold voltage VTH of the second transistor T2, the second transistor is turned on. When the fifth transistor T5 is turned off and the third node N3 is released, after the timing at which the second transistor T2 is turned on, the current Ion flows from the drive power line PVDD (the second electrode 626 side) toward the third node N3 (the first electrode 624 side), and the voltage supplied to the third node N3 gradually rises from the voltage Vnn. When the potential difference Vgs becomes the threshold voltage VTH, the second transistor T2 is turned from the ON state to the OFF state, and the current Ion does not flow. In this case, the voltage supplied to the third node N3 rises from the voltage Vnn (−1.5 V) to the voltage Vne (−1 V), and the potential difference Vgs is the same as the threshold voltage VTH (1 V). That is, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). In addition, since the second transistor T2 is in the OFF state, the current Ion does not flow from the drive power line PVDD to the reference voltage line PVSS, so that the light-emitting element OLED does not emit light.

In the period at the end of the period PVH, the image data signal SL(m) is maintained in the state in which the data signal VDATA of the voltage VSIGL is supplied, and the scan voltage power supply SIR(n) is maintained in the state in which the initialization voltage VINI2 (0 V) is supplied. The first node N1 and the second node N2 are conductive, the voltage supplied to the second node N2 becomes the voltage Vnf, the voltage supplied to the first node N1 maintains the voltage Vnf, and the voltage supplied to the third node N3 maintains the voltage Vnn. Since the potential difference Vgs is the voltage Vnf (−0.5 V)−voltage Vne (−1 V) and the potential difference Vgs is lower than the threshold voltage VTH, no current Ion flows from the drive power line PVDD to the reference voltage line PVSS. Therefore, the light-emitting element OLED does not emit light.

As described above, in the period PVH of the KthFRAME, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the horizontal period HRP of the KthFRAME, similar to the configuration described in "3-2-1. First Example of Driving Method of Pixel Circuit 181B", three pixels using the pixel 180C emitting red light, the pixel 180C emitting blue light, and the pixel 180C emitting green light become black.

The first example of the driving method of the pixel circuit 181C including the above-described configuration has advantageous effects similar to those of the driving method of the display device according to the third embodiment.

In addition, similar to the pixel circuit 181A according to the second embodiment, the pixel circuit 181C includes the scan voltage power line SVIR serving as both the reference voltage power line SVR supplied to the pixel circuit 181 and the initialization voltage power line SVI. Therefore, the pixel circuit 181C has a configuration capable of reducing the number of signal lines, and the display device including the pixel circuit 181C can reduce the size of the pixel. As a result, the display device including the pixel circuit 181C can increase the number of pixels and achieve high definition and a large screen.

[4-2-2. Second Example of Driving Method of Pixel Circuit 181C]

Figure 31:
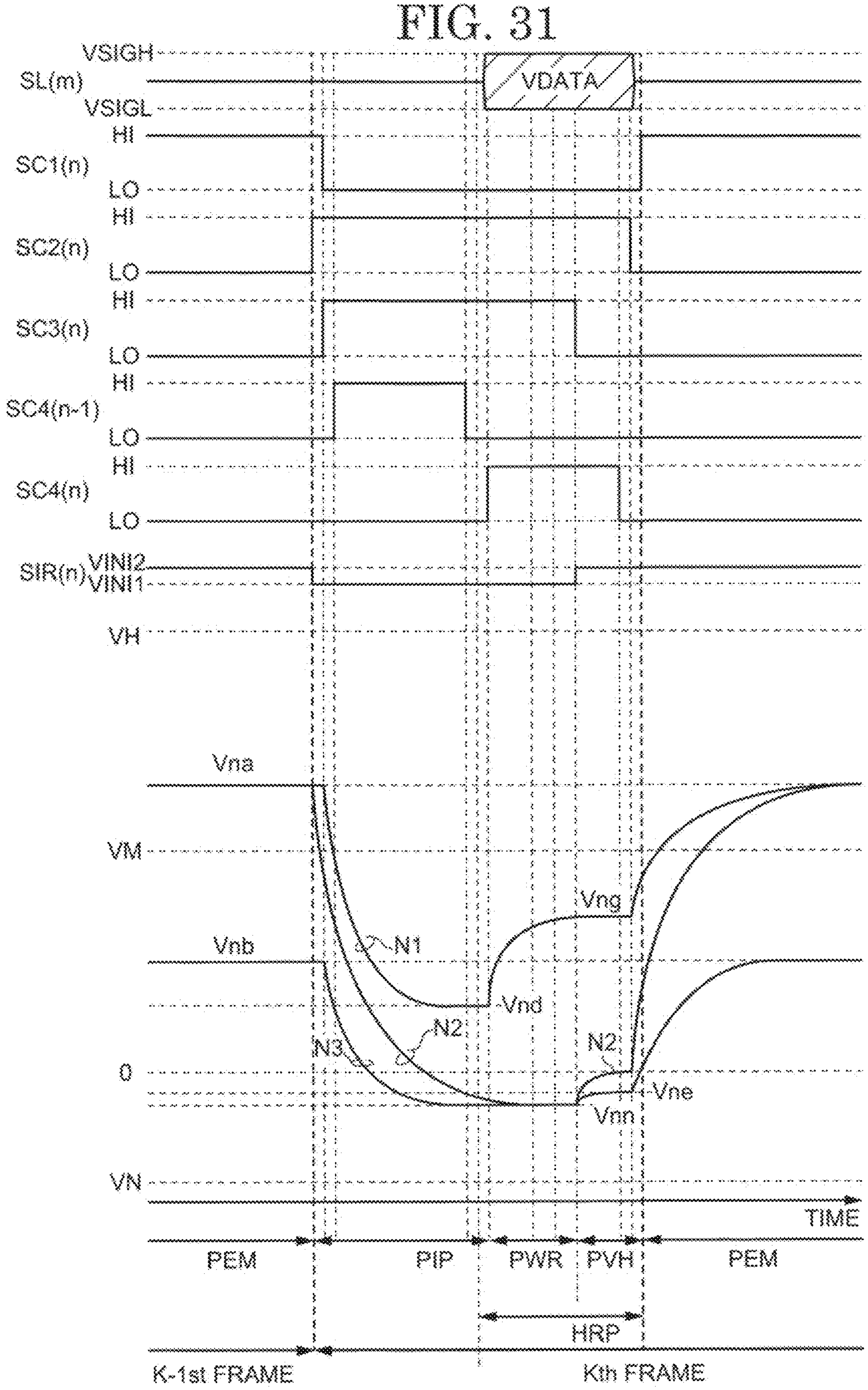
FIG. 31 is a timing chart of a display device according to the fourth embodiment of the present invention.

A second example of the driving method of the pixel circuit 181C will be described with reference to FIG. 31. The driving method shown in the second example of the pixel circuit 181C includes displaying images of the same color (white) in consecutive frames similar to the second example of the driving method of the display device 10 according to the first embodiment. Configurations that are the same as or similar to those in FIG. 1 to FIG. 30 will be described as necessary.

The configurations of the first scan signal SC1(*n*) to the fifth scan signal SC4(*n*) and the scan voltage power supply SIR(n) are similar to the configuration described in "4-2-1. First Example of Driving Method of Pixel 181C". In addition, the operations and the like of the transistors in the respective periods are similar to the configuration described in "3-2-2. Second Example of Driving Method of Pixel Circuit 181B". Further, the voltages (potentials) of the first node N1, the second node N2, and the third node N3 in the periods excluding the horizontal period HRP of the KthFRAME and the light emission period PEM of the KthFRAME are similar to the configurations described in "4-2-1. First Example of Driving Method of Pixel Circuit 181C". Furthermore, the operations and the like of the transistors in the respective periods are similar to the configuration described in "4-2-1. First Example of Driving Method of Pixel Circuit 181C". Therefore, configurations and the like similar to the configurations described in "3-2-2. Second Example of Driving Method of Pixel Circuit 181B" and "4-2-1. First Example of Driving Method of Pixel Circuit 181C" will be described as necessary. In addition, the data signal VDATA of VSIGH corresponding to white is supplied to the image data signal SL(m) in the horizontal period HRP, and the data signal VDATA similar to the configuration described in "4-2-1. First Example of Driving Method of Pixel Circuit 181C" is supplied in the periods other than the horizontal period HRP.

The driving method of the second example of the driving method of the pixel circuit 181C in the light emission period PEM of the K−1stFRAME, the period between the light emission period PEM of the K−1stFRAME and the period PEM of the KthFRAME following the light emission period PEM of K−1stFRAME, and the period PIP of the KthFRAME is similar to the driving method described in "4-2-1. First Example of Driving Method of Pixel Circuit 181C".

In the period PWR of the KthFRAME following the period PIP of the KthFRAME, the voltage supplied to the first node N1 gradually rises from the voltage Vnd toward the voltage Vng (voltage VSIGH, 3.5 V), the voltage supplied to the second node N2 gradually rises from the voltage Vnn (initialization voltage VINI1, −1.5 V) toward 0 V (initialization voltage VINI2), and the voltage supplied to the third node N3 gradually rises from the voltage Vnn (initialization voltage VINI1, −1.5 V) toward the voltage Vne (−1 V). In addition, similar to the period PIP, the light-emitting element OLED does not emit light.

As described above, in the period PWR of the KthFRAME, the data signal VDATA (in this case, the voltage VSIGH) is written to the pixel 180B (the pixel circuit 181B).

In the period PVH of the KthFRAME to the light emission period PEM of the KthFRAME following the period PWR of the KthFRAME, similar to the configuration in the period PVH of the KthFRAME to the light emission period PEM of the KthFRAME described in "3-2-2. Second Example of Driving Method of Pixel Circuit 181B", the threshold voltage VTH of the second transistor T2 is obtained by the operation in which the potential difference Vgs of the second transistor T2 becomes the same as the threshold voltage VTH, after the charge equivalent to the threshold voltage VTH is held in the third node N3 (the first electrode 692 of the capacitive element CS), the voltage supplied to the first node N1 and the voltage supplied to the second node N2 rise to the voltage Vna, and the voltage supplied to the third node N3 rises to the voltage Vnb. The potential difference Vgs is greater than the threshold voltage VTH, the second transistor T2 is in the ON state, the current Ion flows from the drive power line PVDD to the reference voltage line PVSS, and the light-emitting element OLED emits light. For example, the pixel 180 (the pixel circuit 181) emits red light, and white light is emitted by three pixels using the pixel 180 emitting red light, the pixel 180 emitting blue light, and the pixel 180 emitting green light.

[4-2-3. Third Example of Driving Method of Pixel Circuit 181C]

Figure 32:
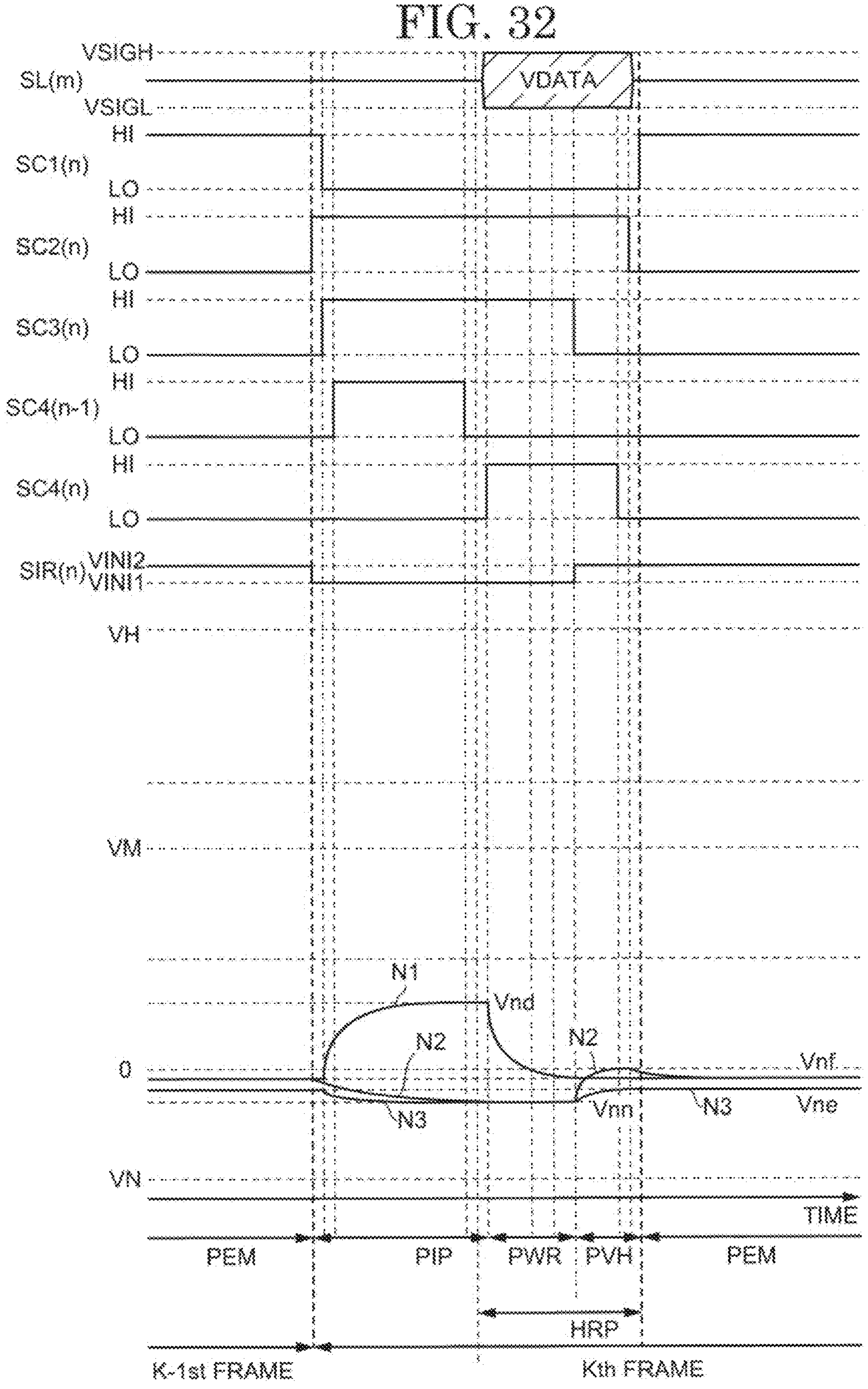
FIG. 32 is a timing chart of a display device according to the fourth embodiment of the present invention.

A third example of the driving method of the pixel circuit 181C will be described with reference to FIG. 32. The driving method shown in the third example of the driving method of the pixel circuit 181C includes displaying images of the same color (black) in consecutive frames similar to the third example of the driving method of the display device 10 according to the first embodiment. Configurations that are the same as or similar to those in FIG. 1 to FIG. 31 will be described as necessary.

The configurations of the first scan signal SC1(*n*) to the fifth scan signal SC4(*n*) and the scan voltage power supply SIR(n) are similar to the configurations described in "4-2-1. First Example of Driving Method of Pixel Circuit 181C". In addition, the voltages (potentials) of the first node N1, the second node N2, and the third node N3 in the periods excluding the period PIP of the KthFRAME, the operations of the transistors in the respective periods, and the like are similar to the configuration described in "3-2-3. Third Example of Driving Method of Pixel Circuit 181B". Therefore, configurations similar to the configurations described in "3-2-3. Third Example of Driving Method of Pixel Circuit 181B" and "4-2-1. First Example of Driving Method of Pixel Circuit 181C" will be described as necessary. In addition, the data signal VDATA of VSIGL corresponding to black is supplied to the image data signal SL(m) in the horizontal period HRP, and the data signal VDATA similar to the configuration described in "4-2-1. First Example of Driving Method of Pixel Circuit 181C" is supplied in the periods other than the horizontal period HRP.

In the light emission period PEM of the K−1stFRAME, similar to the configuration described in "3-2-3. Third Example of Driving Method of Pixel Circuit 181B", the light-emitting element OLED does not emit light and the pixel 180C is black.

In the period between the light emission period PEM of the K−1stFRAME and the period PIP of the KthFRAME following the light emission period PEM of the K−1stFRAME, the voltage supplied to the first node N1 gradually rises from the voltage Vnf toward the voltage Vnd (pre-charge voltage VPRC, 1.5 V), the voltage supplied to the second node N2 gradually drops from the voltage Vnf toward the initialization voltage VINI1 (Vnn, −1.5 V), and the voltage supplied to the third node N3 gradually drops from the voltage Vne toward the initialization voltage VINI1 (Vnn, −1.5 V). In addition, the light-emitting element OLED does not emit light.

In the period PIP of the KthFRAME following the period between the light emission period PEM and the period PIP of the K−1stFRAME, the voltage supplied to the first node N1 gradually rises from the voltage Vnf toward the voltage Vnd to become the voltage Vnd (pre-charge voltage VPRC). The voltage supplied to the second node N2 gradually drops from the voltage Vnf toward the voltage Vnn and becomes the voltage Vnn (initialization voltage VINI1). The voltage supplied to the third node N3 gradually drops from the voltage Vne toward the voltage Vnn and becomes the voltage Vnn. The potential difference Vgs is 0 V and the potential difference Vds is 8 V. The light-emitting element OLED does not emit light. As described above, in the period PIP, the pre-charge voltage (intermediate potential) is supplied to the first node N1, and the second node N2 and the third node N3 are initialized by the initialization voltage VINI1 (−1.5 V).

The period PWR, the period PVH, and the light emission period PEM of the KthFRAME following the period PIP of the KthFRAME are similar to the configuration described in "4-2-1. First Example of Driving Method of Pixel Circuit 181C". In the period PWR, the data signal VDATA (in the third example, the voltage VSIGL) is written to the pixel 180C (the pixel circuit 181C), and in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). Further, in the light emission period PEM, three pixels using the pixel 180C emitting red light, the pixel 180C emitting blue light, and the pixel 180C emitting green light become black.

[4-2-4. Fourth Example of Driving Method of Pixel Circuit 181C]

A fourth example of the driving method of the pixel circuit 181C will be described with reference to FIG. 33. The driving method shown in the fourth example of the driving method of the pixel circuit 181C includes displaying images of different colors in consecutive frames similar to the fourth example of the driving method of the display device 10 according to the first embodiment. Configurations that are the same as or similar to those in FIG. 1 to FIG. 32 will be described as necessary.

The configurations of the first scan signal SC1(*n*) to the fifth scan signal SC4(*n*) and the scan voltage power supply SIR(n) are similar to the configurations described in "4-2-1. First Example of Driving Method of Pixel Circuit 181C". In addition, the voltages (potentials) of the nodes and the operations of the transistors in the light emission period PEM of the K−1stFRAME and the period PIP of the KthFRAME and the like are similar to the configurations described in "4-2-3. Third Example of Driving Method of Pixel Circuit 181C". Further, the voltages (potentials) of the nodes in the horizontal period HRP and the light-emitting period PEM of the KthFRAME (period PWR and period PVH), and the like are similar to the configurations described in "4-2-2. Second Example of Driving Method of Pixel Circuit 181C". Therefore, configurations similar to those described in "4-2-1. First Example of Driving Method of Pixel Circuit 181C" to "4-2-3. Third Example of Driving Method of Pixel Circuit 181C" will be described as necessary. In addition, the data signal VDATA of VSIGH corresponding to white is supplied to the image data signal SL(m) in the horizontal period HRP, and the data signal VDATA similar to the configuration described in "4-2-1. First Example of Driving Method of Pixel Circuit 181C" is supplied in the periods other than the horizontal period HRP.

In the light emission period PEM of the K−1stFRAME, the pixel 180C is black similar to "4-2-3. Third Example of Driving Method of Pixel Circuit 181C".

In the period between the light emission period PEM of the K−1stFRAME and the period PIP of the KthFRAME following the light emission period PEM of the K−1stFRAME, the voltage supplied to the first node N1 gradually rises from the voltage Vnf toward the voltage Vnd (pre-charge voltage VPRC, 1.5 V), the voltage supplied to the second node N2 gradually drops from the voltage Vnf toward the initialization voltage VINI1 (Vnn, −1.5 V), and the voltage supplied to the third node N3 gradually drops from the voltage Vne toward the initialization voltage VINI1 (Vnn, −1.5 V). In addition, the light-emitting element OLED does not emit light.

In the period PIP of the KthFRAME following the period between the light emission period PEM of the K−1stFRAME and the period PIP of the KthFRAME, similar to "4-2-3. Third Example of Driving Method of Pixel Circuit 181C", the pre-charge voltage (intermediate potential) is supplied to the first node N1, and the second node N2 and the third node N3 are initialized by the initialization voltage VINI1 (−1.5 V).

In the period PWR following the period PIP of the KthFRAME, similar to the configuration described in "4-2-2. Second Example of Driving Method of Pixel Circuit 181C", the data signal VDATA (in the third example, the voltage VSIGH) is written to the pixel 180C (the pixel circuit 181C).

In the period PVH following the period PWR of the KthFRAME, similar to the configuration described in "4-2-2. Second Example of Driving Method of Pixel Circuit 181C", the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME, similar to the configuration described in "4-2-2. Second Example of Driving Method of Pixel Circuit 181C", white light is emitted by three pixels using the pixel 180C emitting red light, the pixel 180C emitting blue light, and the pixel 180C emitting green light.

[4-3. Setting Values of Initialization Voltages VINI1 and VINI2]

Setting values of the initialization voltages VINI1 and VINI2 will be described with reference to FIG. 34. FIG. 34 is a diagram for explaining the setting values of the initialization voltages VINI1 and VINI2 of the scan voltage power line SVIR to which the scan voltage power supply SIR(n) is supplied. Configurations that are the same as or similar to those in FIG. 1 to FIG. 33 will be described as necessary.

For example, as shown in FIG. 34, between the period PWR and the period PVH, according to the timing of the second scan signal SC2(*n*), the scan voltage power supply SIR(n) changes from the state in which the initialization voltage VINI2 is supplied to the state in which the initialization voltage VINI1 is supplied.

In the period PWR, in the pixel circuit 181C, the scan voltage power supply SIR(n) (initialization voltage VINI1) is supplied from the scan voltage power line SVIR to the second node N2 and the third node N3, and the second node N2 and the third node N3 are initialized. The pixel 180C including the pixel circuit 181C does not emit light in the period PWR. The condition that the light-emitting element OLED does not emit light is that the initialization voltage VINI1 supplied to the third node N3 is smaller than a threshold voltage VTHEL of the light-emitting element OLED. That is, the initialization voltage VINI1<the threshold voltage VTHEL.

Further, in the period PVH, the pixel circuit 181C corrects the threshold voltage VTH and holds a charge equivalent to the threshold voltage VTH. The pixel 180C including the pixel circuit 181C does not emit light in the period PVH. The condition that the light-emitting element OLED does not emit light is that the voltage Vne supplied to the third node N3 is smaller than the threshold voltage VTHEL of the light-emitting element OLED. That is, the voltage Vne<the threshold voltage VTHEL.

Further, for example, in the case where the pixel circuit 181C emits light based on the voltage VSIGH corresponding to white, the initialization voltage VINI2 is supplied to the second node N2 and the voltage Vne is supplied to the third node N3. The potential difference Vgs is a difference between the voltage supplied to the second node N2 and the voltage supplied to the third node N3, and the potential difference Vgs=the initialization voltage VINI2−the voltage Vne. In addition, since the potential difference Vgs is the threshold voltage VTH, the initialization voltage VINI2−the voltage Vne=the threshold voltage VTH.

As shown in FIG. 34, the condition of the initialization voltage VINI2 calculated using the above formula is the initialization voltage VINI2<the threshold voltage VTHEL+the threshold voltage VTH. In addition, the condition of the initialization voltage VINI1 is the initialization voltage VINI1<the threshold voltage VTHEL.

5. Fifth Embodiment

Figure 35:
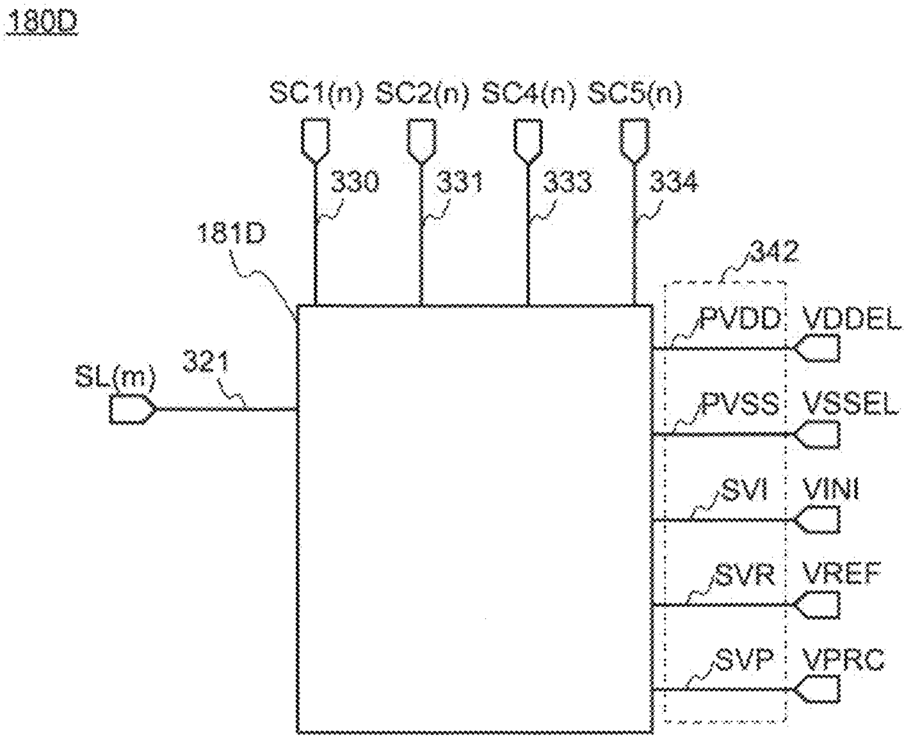
FIG. 35 is a schematic diagram showing input signals to a pixel circuit according to the fifth embodiment of the present invention.
Figure 36:
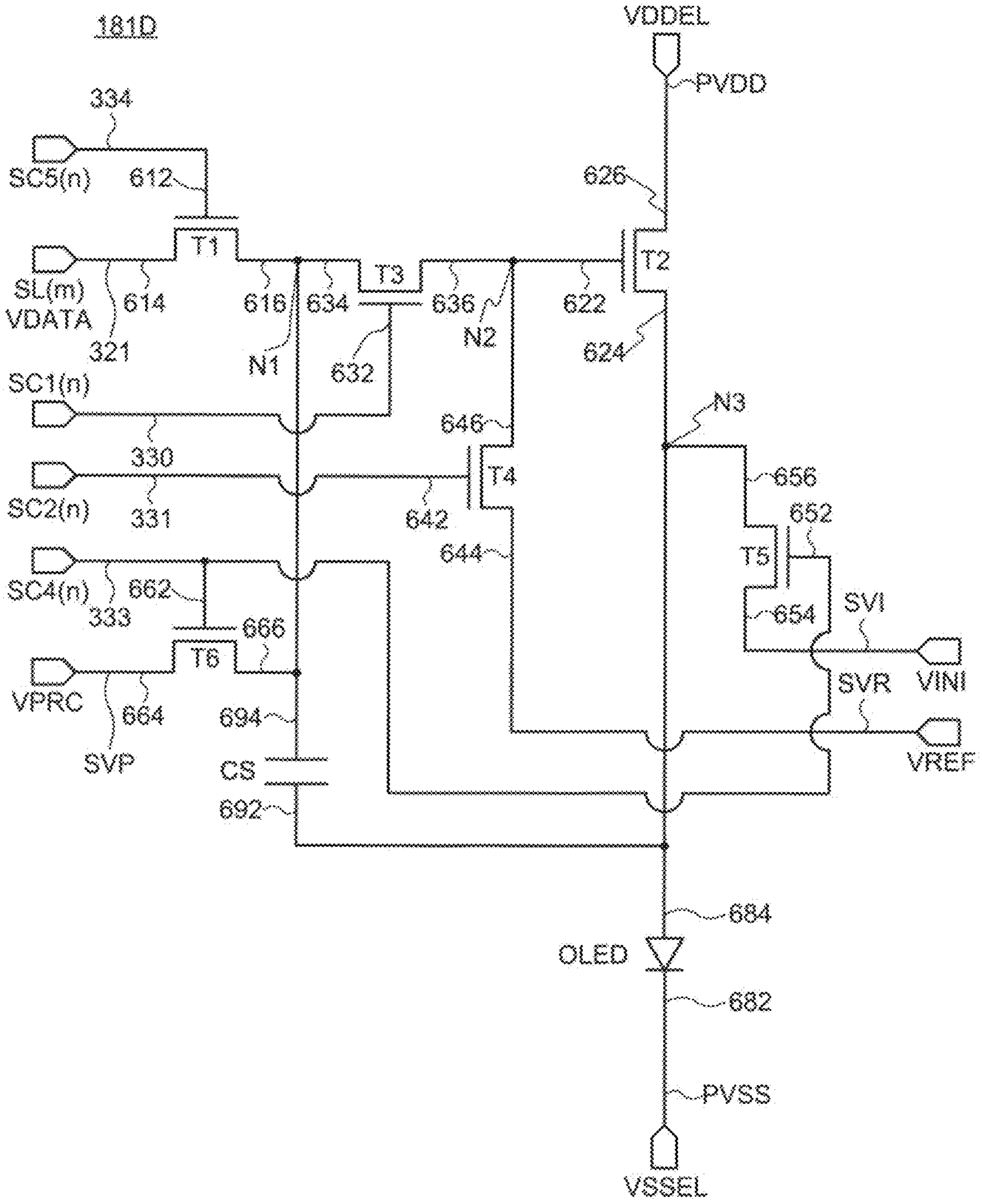
FIG. 36 is a circuit diagram showing a configuration of a pixel circuit according to the fifth embodiment of the present invention.

An overview of the display device according to the fifth embodiment will be described with reference to FIG. 1, FIG. 4, and FIG. 35 to FIG. 40. FIG. 35 is a schematic diagram showing input signals to a pixel 180D (a pixel circuit 181D) according to the fifth embodiment of the present invention. FIG. 36 is a circuit diagram showing a configuration of the pixel circuit 181D. FIG. 37 to FIG. 40 are timing charts of the display device according to the fifth embodiment of the present invention.

The display device according to the fifth embodiment includes the pixel 180D and the pixel circuit 181D. Specifically, the pixel 180D and the pixel circuit 181D include the configurations shown in (1) and (2) below. Mainly, the configurations shown in (1) and (2) are different from the configurations of the pixel 180 and the pixel circuit 181 of the display device 10 according to the first embodiment.

(1) The scan signal line 333 to which the pixel 180D is connected is a signal line that combines the scan signal line 332 to which the pixel circuit 181 is connected and the scan signal line 333. That is, the third scan signal SC3(*n*) supplied to the pixel 180D has a configuration serving as both the third scan signal SC3(*n*) and the fourth scan signal supplied to the pixel circuit 181.

(2) The voltage LO (LO) is −5.5 V and the initialization voltage VINI is −3.5 V.

Configurations other than the configurations shown in (1) and (2) in the pixel 180D and the pixel circuit 181D and the configurations related to the configuration shown in (1) and (2) in the pixel 180D and the pixel circuit 181D are similar to the configuration of the display device 10 according to the first embodiment. Therefore, differences from the display device 10 according to the first embodiment will mainly be described here. When describing the configurations and functions of the display device according to the fifth embodiment, configurations and functions similar to the configuration of the display device 10 according to the first embodiment will be described as necessary. In addition, configurations that are the same as or similar to those in FIG. 1 to FIG. 34 will be described as necessary.

[5-1. Configuration of Pixel 180D]

An overview of the pixel 180D and the pixel circuit 181D will be described with reference to FIG. 35 and FIG. 36.

In the pixel circuit 181A, the gate electrode 652 of the fifth transistor T5 and the gate electrode 662 of the sixth transistor T6 are electrically connected to the scan signal line 333 to which the fourth scan signal SC4(*n*) is supplied. The switching of the fifth transistor T5 and the sixth transistor T6 are controlled using the fourth scan signal SC4(*n*). In other words, the conductive state (ON state) and the non-conductive state (OFF state) of the fifth transistor T5 and the sixth transistor T6 are controlled by the fourth scan signal SC4(*n*). When the signal supplied to the fourth scan signal SC4(*n*) is LO, the fifth transistor T5 and the sixth transistor T6 are in the non-conductive state. When the signal supplied to the fourth scan signal SC4(*n*) is HI, the fifth transistor T5 and the sixth transistor T6 are in the conductive state.

Configuration and functions of the pixel circuit 181D other than the configurations and functions described in "5-1. Configuration of Pixel 180B" are similar to those of the pixel circuit 181.

[5-2. Driving Method of Pixel Circuit 181D]

A driving method of the display device according to the fifth embodiment will be described with reference to FIG. 37 to FIG. 40. Configurations that are the same as or similar to those in FIG. 1 to FIG. 36 will be described as necessary. In addition, similar to the first embodiment, the horizontal axis of the timing charts represents time (TIME).

The driving method of display device according to the fifth embodiment is different from the driving method of the display device 10 according to the first embodiment in the configuration related to the configurations (1) and (2) described in "5-1. Configuration of Pixel 180D". Configurations and functions other than those related to (1) and (2) described in "5-1. Configuration of Pixel 180D" are similar to those of the display device 10 according to the first embodiment.

The driving method of the display device according to the fifth embodiment includes periods similar to those of the driving method of the display device 10 according to the first embodiment shown in FIG. 4.

In one horizontal period (horizontal period HRP) in the driving method of the display device according to the fifth embodiment, the first scan signal SC1(*n*), the second scan signal SC2(*n*), the fourth scan signal SC4(*n*), the fifth scan signal SC5(*n*), the image data signal SL(m), the initialization voltage VINI, the reference voltage VREF, and the pre-charge voltage VPRC are supplied to the pixel 180D (pixel circuit 181D). For example, the pixel 180D (pixel circuit 181D) is selected according to the timings of the first scan signal SC1(*n*), the second scan signal SC2(*n*), the fourth scan signal SC4(*n*), and the fifth scan signal SC5(*n*). The image data signal SL(m), the initialization voltage VINI, the reference voltage VREF, and the pre-charge voltage VPRC are input to the selected pixel 180D (pixel circuit 181D) according to the timings of the respective signals. Similar operations are performed on all the pixels 180D (pixel circuits 181D), and an image of the frame corresponding to 1FRAME is displayed on the display region 22 of the display device based on the image data signal SL(m) input to all the pixels 180D (pixel circuits 181D).

For example, the voltages (potentials) supplied to each signal in each period of each frame in the timing charts shown in FIG. 37 to FIG. 40 are shown in Table 5.

TABLE 5

| | Setting value [V] |
|---|---|
| VTH | 1 |
| VSIGL(Black) | −0.5 |
| VSIGH(White) | 3.5 |
| HI | 10 |
| LO | −5.5 |
| VINI | −3.5 |
| VREF | 0 |
| VPRC | 1.5 |
| VDDEL | 8 |
| VSSEL | 0 |

For example, as shown in Table 5, the initialization voltage VINI is −3.5 V and the voltage VL (LO) is −5.5 V. The setting values of other voltages are the same as the setting values shown in Table 1 described in "1-5. Driving Method of Display Device 10".

[5-2-1. First Example of Driving Method of Pixel Circuit 181D]

A first example of the driving method of the pixel circuit 181D will be described with reference to FIG. 37. The first example of the driving method of the pixel circuit 181D includes displaying images of different colors in consecutive frames, similar to the first example of the driving method of the display device 10 according to the first embodiment. Configurations that are the same as or similar to those in FIG. 1 to FIG. 36 will be described as necessary.

The configurations of the first scan signal SC1(*n*), the second scan signal SC2(*n*), the fourth scan signal SC4(*n*), the fifth scan signal SC5(*n*), and the image data signal SL(m) are similar to those described in "1-5-1. First Example of Driving Method of Display Device 10". Therefore, configurations similar to the configurations described in "1-5-1. First Example of Driving Method of Display Device 10" will be described as necessary.

In the light emission period PEM of the K−1stFRAME, the light-emitting element OLED emits light similar to the configuration described in "1-5-1. First Example of Driving Method of Display Device 10". In addition, the fifth transistor T5 to which the fourth scan signal SC4(*n*) is supplied is in the OFF state.

In the period between the light emission period PEM and the period PIP of the K−1stFRAME following the light emission period PEM of the K−1stFRAME, similar to the configuration described in "1-5-1. First Example of Driving Method of Display Device 10", the voltage supplied to the first node N1 maintains the voltage Vna, and the voltage supplied to the second node N2 gradually drops from the voltage Vna toward 0 V (reference voltage VREF). In addition, the voltage supplied to the third node N3 gradually drops from the voltage Vnb toward a voltage Vnh (initialization voltage VINI, −3.5 V). Since the second transistor T2 and the fifth transistor T5 are in the ON state and a current flows from the drive power line PVDD to the initialization voltage power line SVI, the light-emitting element OLED does not emit light.

In the period PIP following the period between the light emission period PEM and the period PIP of the K−1stFRAME, the fourth scan signal SC4(*n*) changes from the state in which LO is supplied to the state in which HI is supplied. The fifth transistor T5 and the sixth transistor T6 are turned from the OFF state to the ON state, the second transistor T2 and the fourth transistor T4 are maintained in the ON state, and the first transistor T1 and the third transistor T3 are maintained in the OFF state.

As a result, the voltage supplied to the first node N1 gradually drops from the voltage Vna toward the voltage Vnd (pre-charge voltage VPRC, 1.5 V) and becomes the voltage Vnd. The voltage supplied to the second node N2 gradually drops from the voltage Vna toward 0 V (reference voltage VREF) and becomes 0 V. The voltage supplied to the third node N3 gradually drops from the voltage Vnb toward the voltage Vnh (initialization voltage VINI, −3.5 V) and becomes the voltage Vnh. The potential difference Vgs is 3.5 V (0 V−(−3.5 V)) and the potential difference Vds is 11.5 V (8 V−(−3.5 V)). Similar to the period between the light emission period PEM and the period PIP of the K−1stFRAME, since the second transistor T2 and the fifth transistor T5 are in the ON state and the current Ion flows from the drive power line PVDD to the initialization voltage power line SVI, the light-emitting element OLED does not emit light.

As described above, in the period PIP, the pre-charge voltage (intermediate potential) is supplied to the first node N1, the second node N2 is initialized by the reference voltage VREF (0 V), and the third node N3 is initialized by the initialization voltage VINI (−3.5 V).

In the first period of the horizontal period HRP of the KthFRAME following the period PIP, the fourth scan signal SC4(*n*) changes from the state in which HI is supplied to the state in which LO is supplied. The fifth transistor T5 and the sixth transistor T6 are turned from the ON state to the OFF state, the second transistor T2 and the fourth transistor T4 are maintained in the ON state, and the first transistor T1 and the third transistor are maintained in the OFF state.

As a result, the voltage supplied to the first node N1 maintains the voltage Vnd, the voltage supplied to the second node N2 maintains 0 V, and when the third node N3 is released by turning off the fifth transistor T5, charging of the third node N3 starts due to the Ion of the second transistor T2 being in the ON state, and the voltage supplied to the second node N2 starts to rise. The potential difference Vgs at this time is 3.5 V (0 V−potential Vnh (−3.5 V)), and the potential difference Vds is 11.5 V. Since the potential difference Vgs is greater than the threshold voltage VTH, the second transistor T2 is in the ON state. The current Ion flows from the drive power line PVDD (the second electrode 626 side) toward the third node N3 (the first electrode 624 side), and the voltage supplied to the third node N3 gradually rises from the voltage Vnh. In addition, similar to the period PIP, the light-emitting element OLED does not emit light.

In the period PWR following the first period of the horizontal period HRP, the first transistor T1 is turned from the OFF state to the ON state, the second transistor T2 and the fourth transistor T4 are maintained in the ON state, and the third transistor, the fifth transistor T5, and the sixth transistor T6 are maintained in the OFF state.

As a result, the voltage supplied to the first node N1 gradually drops from the voltage Vnd toward the voltage Vnf (voltage VSIGL, −0.5 V), the voltage supplied to the second node N2 maintains 0 V, and the voltage supplied to the third node N3 maintains the voltage Vnh. In addition, similar to the period PIP, the light-emitting element OLED does not emit light.

In the middle of the period PWR, in the period PVH parallel to (overlapping) the period PWR, the first transistor T1 and the fourth transistor T4 are maintained in the ON state, and the third transistor T3, the fifth transistor T5, and the sixth transistor T6 are maintained in the OFF state.

As a result, the voltage supplied to the first node N1 gradually drops toward the voltage Vnf to become the voltage Vnf, and the voltage supplied to the second node N2 maintains 0 V.

When the potential difference Vgs becomes the threshold voltage VTH, the second transistor T2 is turned from the ON state to the OFF state, and the current Ion does not flow. In this case, the voltage supplied to the third node N3 rises from the voltage Vnh (−3.5 V) to the voltage Vne (−1 V), and the potential difference Vgs is the same as the threshold voltage VTH (1 V). That is, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). In addition, since the second transistor T2 is in the OFF state and no current Ion flows from the drive power line PVDD to the reference voltage line PVSS, the light-emitting element OLED does not emit light.

In the period at the end of the period PVH, similar to the configuration described in "1-5-1. First Example of Driving Method of Display Device 10", the first node N1 and the second node N2 are conductive, the voltage supplied to the second node N2 becomes the voltage Vnf, the voltage supplied to the first node N1 maintains the voltage Vnf, and the voltage supplied to the third node N3 maintains the voltage Vne. Since the potential difference Vgs is lower than the threshold voltage VTH, no current Ion flows from the drive power line PVDD to the reference voltage line PVSS. Therefore, the light-emitting element OLED does not emit light.

As described above, in the period PWR, the data signal VDATA is written to the pixel 180D (pixel circuit 181D). Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Figure 37:
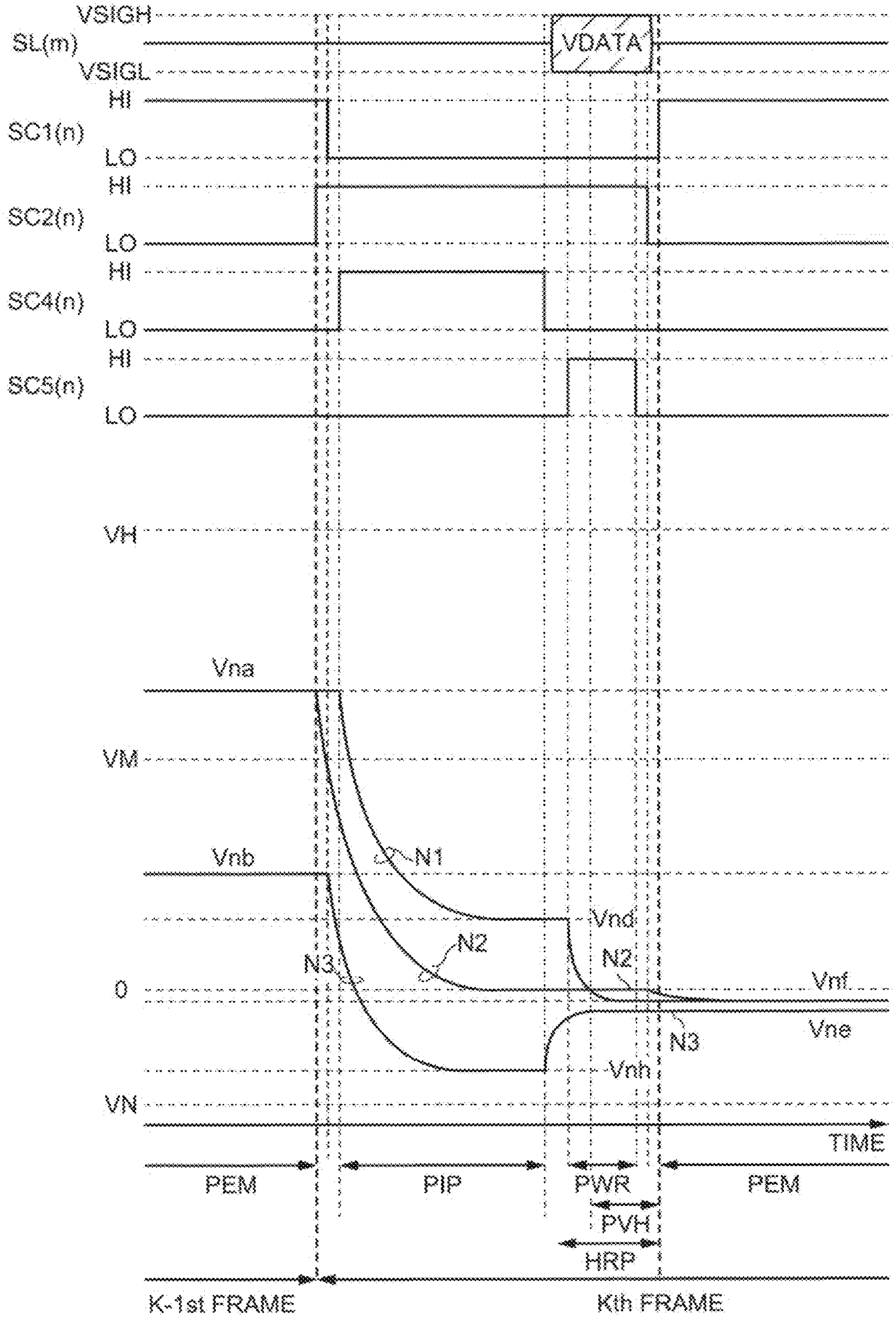
FIG. 37 is a timing chart of a display device according to the fifth embodiment of the present invention.

Further, in the explanation of the driving method of the display device according to the fifth embodiment, in order to make the voltage (potential) supplied to the first node N1 shown in FIG. 37 and the like, the voltage (potential) supplied to the second node N2, and the voltage (potential) supplied to the third node N3 easy to see, the difference between the timing at which the fourth scan signal SC4(*n*) changes from the state in which HI is supplied to the state in which LO is supplied and the timing at which the fifth scan signal SC5(*n*) changes from the state in which LO is supplied to the state in which HI is supplied are exaggerated. In practice, the difference between the timing at which the fourth scan signal SC4(*n*) changes from the state in which HI is supplied to the state in which LO is supplied and the timing at which the fifth scan signal SC5(*n*) changes from the state in which LO is supplied to the state in which HI is supplied is small, and is, for example, substantially the same. That is, the time differences in the change in the voltages (potentials) supplied to the first node N1, the second node N2, and the third node N3 due to the timing at which the fourth scan signal SC4(*n*) changes from the state in which HI is supplied to the state in which LO is supplied and the timing at which the fifth scan signal SC5(*n*) changes from the state in which LO is supplied to the state in which HI is supplied shown in FIG. 37 or the like are small. Therefore, the time difference between the period PWR and the period PVH is small and may be regarded as substantially the same or the same.

In the light emission period PEM of the KthFRAME following the horizontal period HRP of the KthFRAME, similar to the configuration described in "1-5-1. First Example of Driving Method of Display Device 10", three pixels using the pixel 180D emitting red light, the pixel 180D emitting blue light, and the pixel 180D emitting green light become black.

The first example of the driving method of the pixel circuit 181D including the above-described configuration has advantageous effects similar to those of the driving method of the display device 10 according to the first embodiment.

In addition, the scan signal line 333 in the pixel circuit 181D serves as both the scan signal lines 332 and 333 in the pixel circuit 181. Therefore, the pixel circuit 181D has a configuration capable of reducing the number of signal lines, and the display device including the pixel circuit 181D can reduce the size of the pixel. As a result, the display device including the pixel circuit 181D can increase the number of pixels and achieve high definition and a large screen. Further, since the initialization voltage VINI (−3.5 V) is deep (lower voltage), the power consumption is increased, but the period PWR can be made the shortest because the period PVH overlaps the period PWR.

[5-2-2. Second Example of Driving Method of Pixel Circuit 181D]

Figure 38:
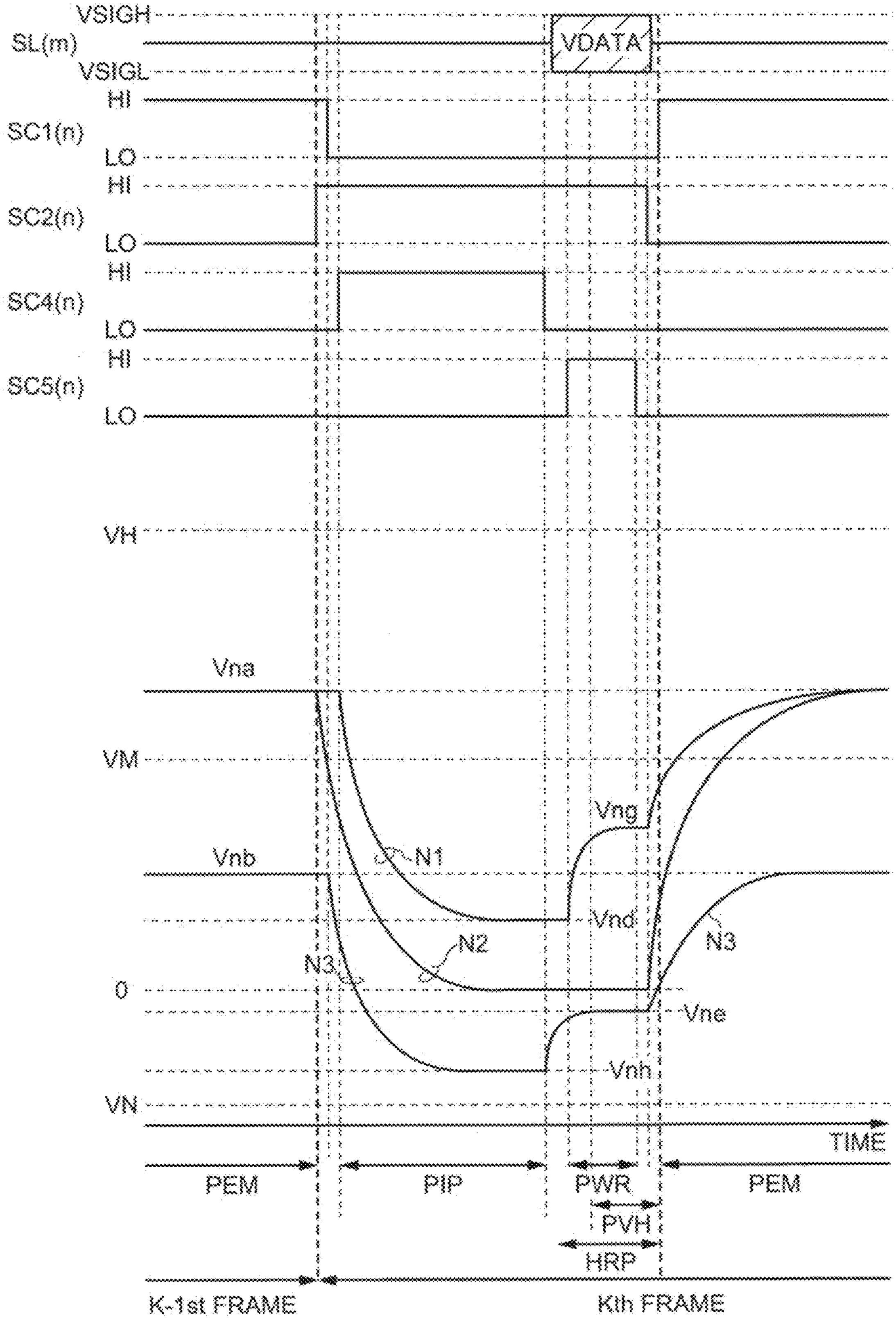
FIG. 38 is a timing chart of a display device according to the fifth embodiment of the present invention.

A second example of the driving method of the pixel circuit 181D will be described with reference to FIG. 38. The driving method shown in the second example of the driving method of the pixel circuit 181D includes displaying images of the same color (white) in consecutive frames similar to the second example of the driving method of the display device 10 according to the first embodiment. Configurations that are the same as or similar to those in FIG. 1 to FIG. 37 will be described as necessary.

The configurations of the first scan signal SC1(*n*), the second scan signal SC2(*n*), the fourth scan signal SC4(*n*), the fifth scan signal SC5(*n*), and the image data signal SL(m) are similar to those described in "5-2-1. First Example of Driving Method of Pixel Circuit 181D". In addition, the voltages (potentials) of the first node N1, the second node N2, and the third node N3 in the periods excluding the horizontal period HRP of the KthFRAME and the light emission period PEM of the KthFRAME are similar to the configuration described in "5-2-1. First Example of Driving Method of Pixel Circuit 181D". Further, the operations and the like of the transistors in the respective periods are similar to the configuration described in "5-2-1. First Example of Driving Method of Pixel Circuit 181D". Therefore, configurations and the like similar to those described in "5-2-1. First Example of Driving Method of Pixel Circuit 181D" will be described as necessary. In addition, the data signal VDATA of VSIGH corresponding to white is supplied to the image data signal SL(m) in the horizontal period HRP, and the data signal VDATA similar to the configuration described in "5-2-1. First Example of Driving Method of Pixel Circuit 181D" is supplied in the periods other than the horizontal period HRP.

The driving method of the second example of the pixel circuit 181D in the light emission period PEM of the K−1stFRAME, the period between the light emission period PEM of K−1stFRAME and the period PIP of the KthFRAME following the light emission period PEM of the K−1stFRAME, the period PIP of the KthFRAME, and the first period of the horizontal period HRP of the KthFRAME following the period PIP of the KthFRAME is similar to the driving method described in "5-2-1. First Example of Driving Method of Pixel Circuit 181D".

In the period PWR following the first period of the horizontal period HRP in the second example of the driving method of the pixel circuit 181D, the configurations of the respective control signals, the operations of the respective transistors, and the like are similar to the configurations described in "5-2-1. First Example of Driving Method of Display Device 10". The voltage supplied to the first node N1 gradually rises from the voltage Vnd toward the voltage Vng (voltage VSIGH, 3.5 V), the voltage supplied to the second node N2 maintains 0 V (reference voltage VREF), and the voltage supplied to the third node N3 gradually rises from Vnh (−3.5 V). In addition, similar to the period PIP, the light-emitting element OLED does not emit light.

In the middle of the period PWR in the second example of the driving method of the pixel circuit 181D, in the period PVH, the period parallel to (overlapping) the period PWR, the period at the end of the period PVH, and the light-emitting period PEM of the KthFRAME, the configurations of the control signals, the operations of the transistors, the voltages supplied to the nodes, and the like are similar to the configurations described in “5-2-1. First Example of Driving Method of Pixel Circuit 181D”.

As described above, in the period PWR in the second example of the driving method of the pixel circuit 181D, the data signal VDATA is written to the pixel 180 (the pixel circuit 181). Further, in the period PVH in the second example of the driving method of the pixel circuit 181D, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). Further, in the light emission period PEM of the KthFRAME in the second example of the driving method of the pixel circuit 181D, white light is emitted by three pixels.

[5-2-3. Third Example of Driving Method of Pixel Circuit 181D]

Figure 39:
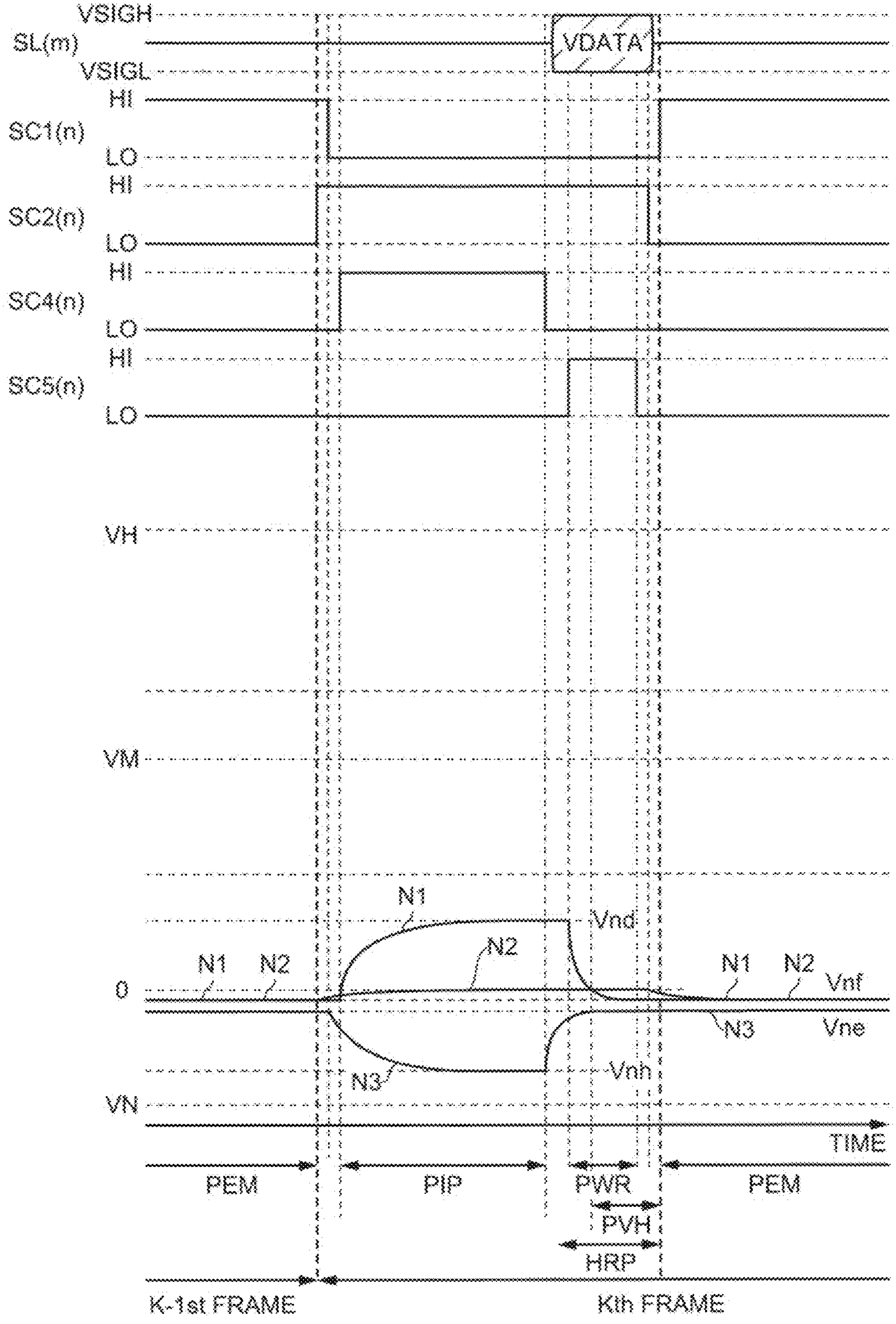
FIG. 39 is a timing chart of a display device according to the fifth embodiment of the present invention.

A third example of the driving method of the pixel circuit 181D will be described with reference to FIG. 39. The driving method shown in the third example of the driving method of the pixel circuit 181D includes displaying images of the same color (black) in consecutive frames similar to the third example of the driving method of the display device 10 according to the first embodiment. Configurations that are the same as or similar to those in FIG. 1 to FIG. 38 will be described as necessary.

The configurations of the first scan signal SC1(*n*), the second scan signal SC2(*n*), the fourth scan signal SC4(*n*), the fifth scan signal SC5(*n*), and the image data signal SL(m) are similar to those described in “5-2-1. First Example of Driving Method of Pixel Circuit 181D”. In addition, the voltages (potentials) of the first node N1, the second node N2, and the third node N3 in the light emission period of the K−1stFRAME, the operations of the transistors, and the like are similar to the configurations and operations described in “1-5-3. Third Example of Driving Method of Display Device 10”. Further, the voltages (potentials) of the first node N1, the second node N2, and the third node N3 in the periods other than the light emission period of the K−1stFRAME to the period PIP of the KthFRAME, the operations of the transistors, and the like are similar to the configurations and operations described in “5-2-1. First Example of Driving Method of Pixel Circuit 181D”. Therefore, configurations similar to those described in “1-5-3. Third Example of Driving Method of Display Device 10” and “5-2-1. First Example of Driving Method of Pixel circuit 181D” will be described as necessary. In addition, the data signal VDATA of VSIGL corresponding to black is supplied to the image data signal SL(m) in the horizontal period HRP, and the data signal VDATA similar to the configuration described in “5-2-1. First Example of Driving Method of Pixel Circuit 181D” is supplied in the periods other than the horizontal period HRP.

In the light emission period PEM of the K−1stFRAME, similar to the configuration described in “1-5-3. Third Example of Driving Method of Display Device 10”, the light-emitting element OLED does not emit light and the pixel 180D is black.

In the period between the light emission period PEM of the K−1stFRAME and the period PIP of the KthFRAME following the light emission period PEM of the K−1stFRAME, the configurations of the control signals, the operations of the transistors, and the like are similar to the configuration described in “5-2-1. First Example of Driving Method of Pixel Circuit 181A”. The voltage supplied to the first node N1 gradually rises from the voltage Vnf toward the voltage Vnd (pre-charge voltage VPRC, 1.5 V), the voltage supplied to the second node N2 gradually rises from the voltage Vnf toward the reference voltage VREF (0 V), and the voltage supplied to the third node N3 gradually drops from the voltage Vne toward the initialization voltage VINI (Vnh, −3.5 V). In addition, the light-emitting element OLED does not emit light.

In the period PIP of the KthFRAME following the period between the light emission period PEM and the period PIP of the K−1stFRAME, the voltage supplied to the first node N1 gradually rises from the voltage Vnf toward the voltage Vnd and becomes the voltage Vnd. The voltage supplied to the second node N2 gradually rises from the voltage Vnf toward 0 V and becomes 0 V. The voltage supplied to the third node N3 gradually drops from the voltage Vne toward the voltage Vnh and becomes the voltage Vnh. The potential difference Vgs is 3.5 V and the potential difference Vds is 11.5 V. Since the second transistor T2 and the fifth transistor T5 are in the ON state and a current flows from the drive power line PVDD to the initialization voltage power line SVI, the light-emitting element OLED does not emit light.

As described above, in the period PIP, the pre-charge voltage (intermediate potential) is supplied to the first node N1, the second node N2 is initialized by the reference voltage VREF (0 V), and the third node N3 is initialized by the initialization voltage VINI1 (−3.5 V).

the voltages (potentials) of the first node N1, the second node N2, and the third node N3 in the first period of the horizon period HRP of the KthFRAME to the light emission period PEM of the KthFRAME following the period PIP, the operations of the transistors, and the like are similar to the configurations and operations described in “5-2-1. First Example of Driving Method of Pixel Circuit 181A”.

In the period PWR, similar to the configuration described in “5-2-1. First Example of Driving Method of Pixel Circuit 181A”, the data signal VDATA (in the third example, the voltage VSIGL) is written to the pixel 180D (pixel circuit 181D).

Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Furthermore, in the light emission period PEM of the KthFRAME, similar to the configuration described in “5-2-1. First Example of Driving Method of Pixel Circuit 181A”, three pixels using the pixel 180A emitting red, the pixel 180A emitting blue light, and the pixel 180A emitting green light become black.

[5-2-4. Fourth Example of Driving Method of Pixel Circuit 181D]

Figure 40:
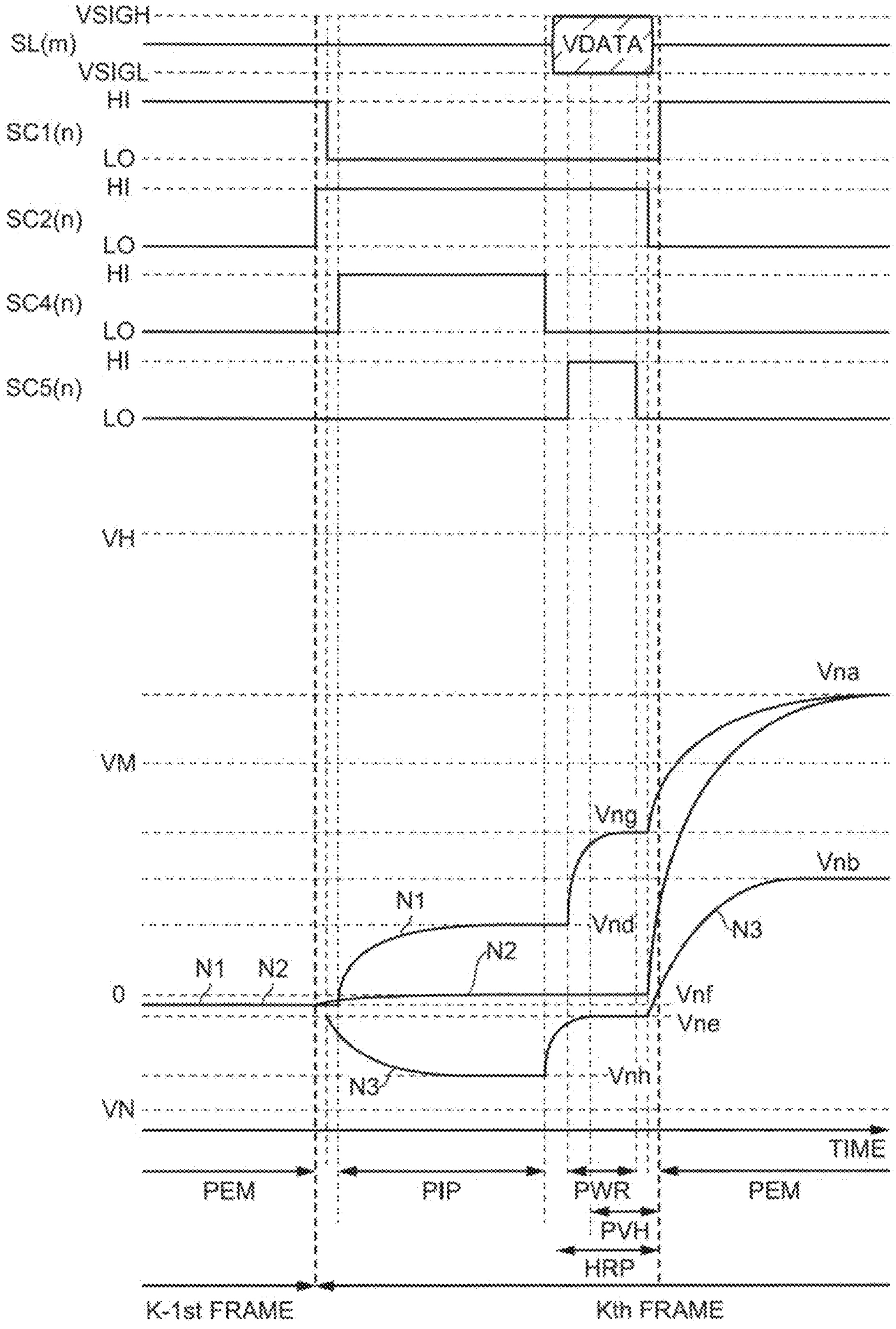
FIG. 40 is a timing chart of a display device according to the fifth embodiment of the present invention.

A fourth example of the driving method of the pixel circuit 181D will be described with reference to FIG. 40. The driving method shown in the fourth example of the driving method of the pixel circuit 181A includes displaying images of different colors in consecutive frames similar to the fourth example of the driving method of the display device 10 according to the first embodiment. Configurations that are the same as or similar to those in FIG. 1 to FIG. 39 will be described as necessary.

The configurations of the first scan signal SC1(*n*), the second scan signal SC2(*n*), the fourth scan signal SC4(*n*), the fifth scan signal SC5(*n*), and the image data signal SL(m) are similar to those described in “5-2-1. First Example of Driving Method of Pixel Circuit 181D". In addition, the voltages (potentials) of the first node N1, the second node N2, and the third node N3 in the light emission period PEM of the K−1thFRAME and the period PIP of the KthFRAME, the operations of the transistors, and the like are similar to those of "5-2-3. Third Example of Driving Method of Pixel Circuit 181D", and the voltages (potentials) of the first node N1, the second node N2, and the third node N3 in the horizontal period HRP of the KthFRAME and the light emission period PEM of the KthFRAME, the operations of the transistors, and the like are similar to those of "5-2-2. Second Example of Driving Method of Pixel Circuit 181D". Configuration similar to "5-2-1. First Example of Driving Method of Pixel Circuit 181D", "5-2-2. Second Example of Driving Method of Pixel Circuit 181D", and "5-2-3. Third Example of Driving Method of Pixel Circuit 181D" will be described as necessary. In addition, the data signal VDATA of VSIGH corresponding to white is supplied to the image data signal SL(m) in the horizontal period HRP, and the data signal VDATA similar to the configuration described in "5-2-1. First Example of Driving Method of Pixel Circuit 181D" is supplied in the periods other than the horizontal period HRP.

The driving method of the fourth example of the display device 10 in the light emission period PEM of the K−1stFRAME, the period between the light emission period PEM of the K−1stFRAME and the period PIP of the KthFRAME following the light emission period PEM of the K−1stFRAME, and the period PIP of the KthFRAME is similar to the driving method described in "5-2-3. Third Example of Driving Method of Pixel Circuit 181D".

The driving method of the fourth example of the display device 10 in the horizontal period HRP of the K−1stFRAME and the light emission period PEM of the KthFRAME is similar to the driving method described in "5-2-2. Second Example of Driving Method of Pixel Circuit 181D".

6. Sixth Embodiment

Figure 41:
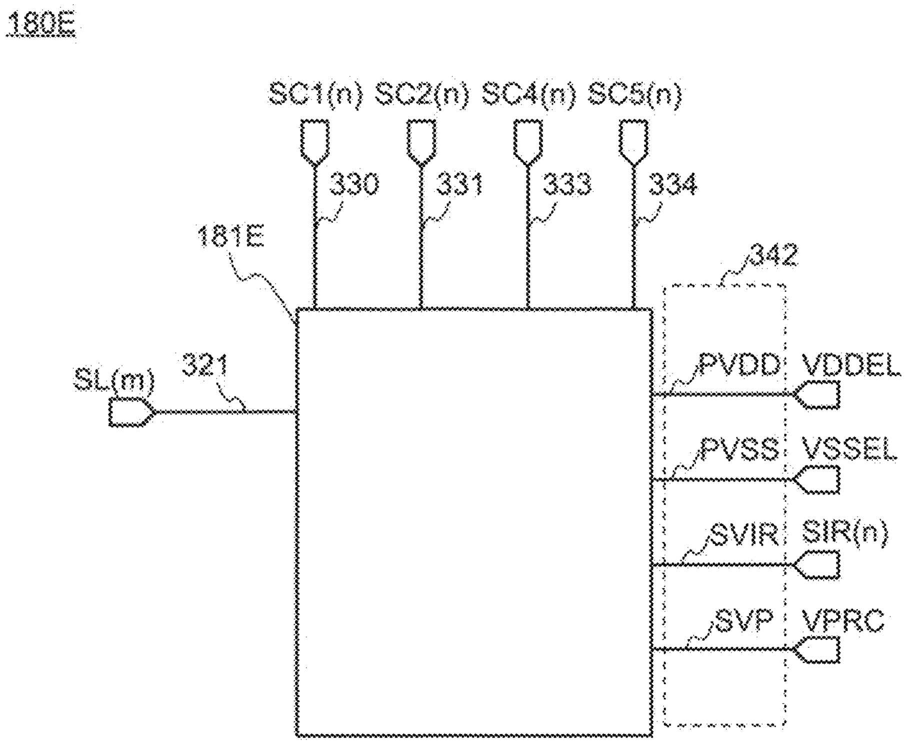
FIG. 41 is a schematic diagram showing input signals to a pixel circuit according to the sixth embodiment of the present invention.
Figure 42:
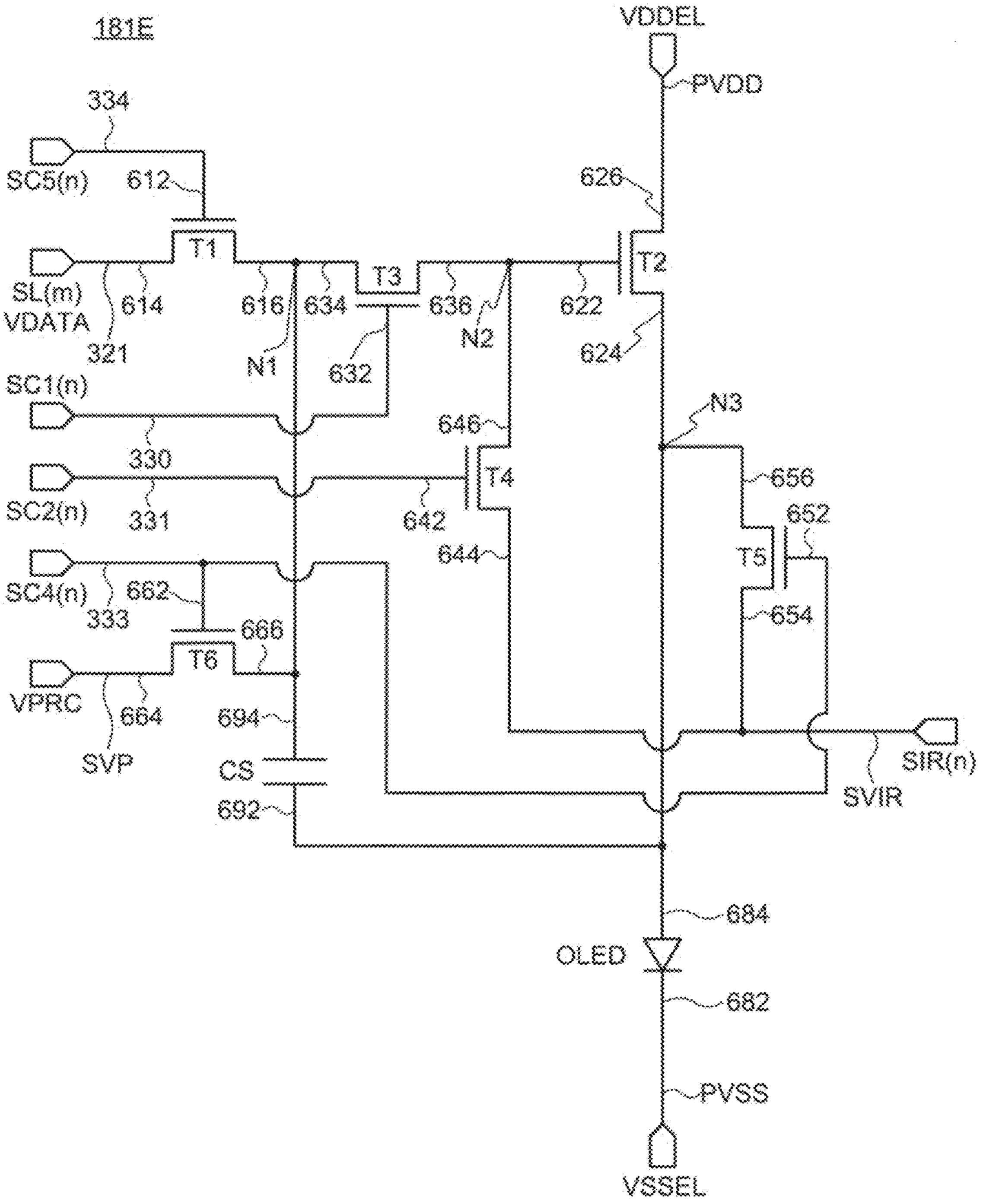
FIG. 42 is a circuit diagram showing a configuration of a pixel circuit according to the sixth embodiment of the present invention.

An overview of the display device according to the sixth embodiment will be described with reference to FIG. 1, FIG. 4, and FIG. 41 to FIG. 46. FIG. 41 is a schematic diagram showing input signals to a pixel 180E (a pixel circuit 181E) according to the sixth embodiment of the present invention. FIG. 42 is a circuit diagram showing a configuration of the pixel circuit 181E. FIG. 43 to FIG. 46 are timing charts of the display device according to the sixth embodiment of the present invention.

The display device according to the sixth embodiment includes the pixel 180E and the pixel circuit 181E. Specifically, the pixel 180E and the pixel circuit 181E include the configurations shown in (1) to (3) below. Mainly, the configurations shown in (1) to (3) are different from the configurations of the pixel 180D and the pixel circuit 181D of the display device according to the fifth embodiment.

(1) The scan voltage power line SVIR to which the scan voltage power supply SIR(n) is supplied is included.

(2) The scan voltage power line SVIR is a signal line that combines the reference voltage power line SVR to which the reference voltage power supply VREF is supplied and the initialization voltage power line SVI to which the initialization voltage VINI is supplied. That is, the scan voltage power line SVIR has a configuration serving as both the reference voltage power line SVR and the initialization voltage power line SVI.

(3) The scan voltage power supply SIR(n) includes voltages that change alternately with time. The voltages that change alternately with time are the initialization voltage VINI2 and the initialization voltage VINI1.

Configurations other than the configurations shown in (1) to (3) in the pixel 180E and the pixel circuit 181E and the configurations related to the configurations shown in (1) to (3) in the pixel 180E and the pixel circuit 181E are similar to those of the display device according to the second embodiment. In addition, configurations other than the configurations shown in (1) to (3) in the pixel 180E and the pixel circuit 181E and the configurations related to the configurations shown in (1) to (3) in the pixel 180E and the pixel circuit 181E are similar to those of the display device according to the fifth embodiment. Therefore, differences from the display device according to the second embodiment and the display device according to the fifth embodiment will mainly be described here. When describing the configurations and functions of the display device according to the sixth embodiment, configurations and functions similar to those of the display device according to the second embodiment and the display device according to the fifth embodiment will be described as necessary. In addition, configurations that are the same as or similar to those in FIG. 1 to FIG. 40 will be described as necessary.

[6-1. Configuration of Pixel 180E]

An overview of the pixel 180E and the pixel circuit 181E will be described with reference to FIG. 41 and FIG. 42.

The pixel circuit 181E is connected to the scan voltage power line SVIR. The configuration and function of the scan voltage power line SVIR according to the sixth embodiment are similar to the configuration and function of the scan voltage power line SVIR according to the second embodiment.

In addition, the configurations and functions related to the fourth transistor T4, the fifth transistor T5, and the scan voltage power line SVIR are similar to the configurations and functions of the fourth transistor T4, the fifth transistor T5, and the scan voltage power line SVIR according to the second embodiment.

Configuration and functions of the pixel circuit 181E other than the configurations and functions described in "6-1. Configuration of Pixel 180E" are similar to those of the pixel circuit 181D.

[6-2. Driving Method of Pixel Circuit 181E]

A driving method of the display device according to the sixth embodiment will be described with reference to FIG. 43 to FIG. 46. Configurations that are the same as or similar to those in FIG. 1 to FIG. 42 will be described as necessary. In addition, similar to the first embodiment, the horizontal axis of the timing charts represents time (TIME).

The driving method of the display device according to the sixth embodiment is different from the driving method of the display device 10 according to the fifth embodiment in the configuration related to the configurations (1) to (3) described in "6-1. Configuration of Pixel 180E". Configurations and functions other than those related to (1) to (3) described in "6-1. Configuration of Pixel 180E" are similar to the driving method of the display device according to the fifth embodiment.

The driving method of the display device according to the sixth embodiment includes periods similar to those of the driving method of the display device 10 according to the first embodiment shown in FIG. 4.

In one horizontal period (horizontal period HRP) in the driving method of the display device according to the sixth embodiment, the first scan signal SC1(*n*), the second scan signal SC2(*n*), the fourth scan signal SC4(*n*), the fifth scan signal SC5(*n*), the image data signal SL(m), and the scan voltage power supply SIR(n) is supplied to the pixel 180E (pixel circuit 181E). For example, the pixel 180E (pixel circuit 181E) is selected according to the timings of the first scan signal SC1(*n*), the second scan signal SC2(*n*), the fourth scan signal SC4(*n*), and the fifth scan signal SC5(*n*). The image data signal SL(m) and the scan voltage power supply SIR(n) are input to the selected pixel 180E (pixel circuit 181E) according to the timings of the respective signals. Similar operations are performed on all the pixels 180E (pixel circuits 181E), and an image of the frame corresponding to 1FRAME is displayed on the display region 22 of the display device based on the image data signal SL(m) input to all the pixels 180E (pixel circuits 181E).

For example, the voltages (potentials) supplied to each signal in each period of each frame in the timing charts shown in FIG. 43 to FIG. 46 are shown in Table 6.

TABLE 6

| | Setting value [V] |
|---|---|
| VTH | 1 |
| VSIGL(Black) | −0.5 |
| VSIGH(White) | 3.5 |
| HI | 10 |
| LO | −5.5 |
| VINI1 | −3.5 |
| VINI2 | 0 |
| VPRC | 1.5 |
| VDDEL | 8 |
| VSSEL | 0 |

For example, as shown in Table 6, the initialization voltage VINI2 is 0 V and the initialization voltage VINI1 is −3.5 V. The initialization voltage VINI2 is the same as the reference voltage VREF, and the initialization voltage VINI1 is the same as the initialization voltage VINI. The setting values of other voltages are the same as the setting values shown in Table 5 described in "5-2. Driving Method of Pixel Circuit 181D".

[6-2-1. First Example of Driving Method of Pixel Circuit 181E]

Figure 43:
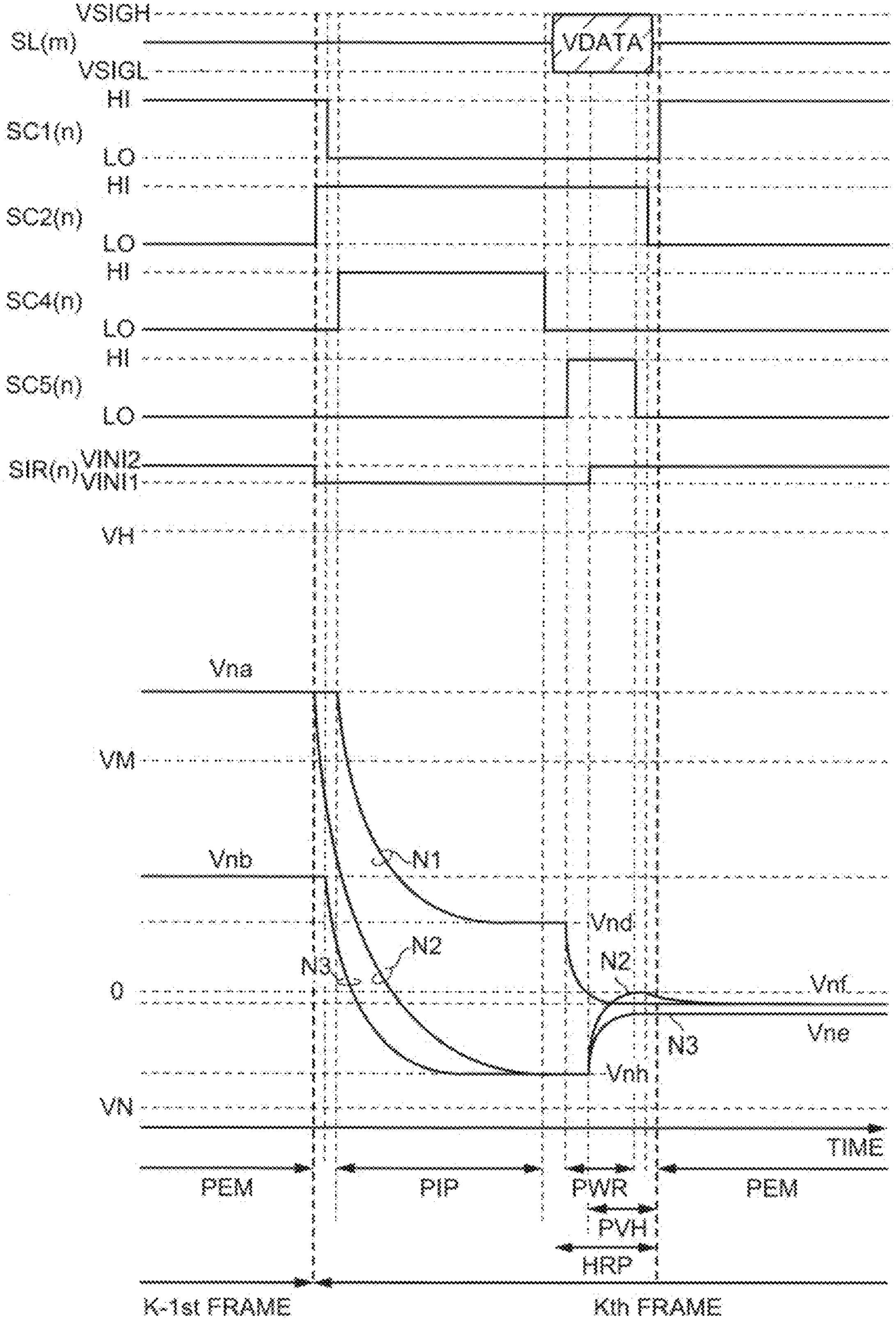
FIG. 43 is a timing chart of a display device according to the sixth embodiment of the present invention.

A first example of the driving method of the pixel circuit 181E will be described with reference to FIG. 43. The first example of the driving method of the pixel circuit 181E includes displaying images of different colors in consecutive frames, similar to the first example of the driving method of the display device 10 according to the first embodiment. Configurations that are the same as or similar to those in FIG. 1 to FIG. 42 will be described as necessary.

The initialization voltage VINI2 is supplied to the scan voltage power supply SIR(n) in the light emission period PEM of the K−1stFRAME, the initialization voltage VINI1 is supplied in the period PIP of the KthFRAME, and the initialization voltage VINI2 is supplied in the period PVH and the light emission period PEM of the KthFRAME.

The configurations of the first scan signal SC1(*n*), the second scan signal SC2(*n*), the fourth scan signal SC4(*n*), the fifth scan signal SC5(*n*), and the image data signal SL(m) are similar to those described in "5-2-1. First Example of Driving Method of Pixel Circuit 181D". Therefore, configurations similar to the configuration described in "5-2-1. First Example of Driving Method of Pixel Circuit 181D" will be described as necessary.

In the light emission period PEM of the K−1stFRAME, the light-emitting element OLED emits light similar to the configuration described in "5-2-1. First Example of Driving Method of Display Device 10".

In the period between the light emission period PEM and the period PIP of the K−1stFRAME following the light emission period PEM of the K−1stFRAME, similar to the configuration shown in "5-2-1. First example of Driving Method of Pixel Circuit 181D", the voltage supplied to the first node N1 maintains Vna, the scan voltage power supply SIR(n) changes from the state in which 0 V (initialization voltage VINI2) is supplied to the state in which the voltage Vnh (initialization voltage VINI1, −3.5 V) is supplied, so that the voltage supplied to the second node N2 gradually drops from the voltage Vna toward the voltage Vnh (initialization voltage VINI1, −3.5 V), and the voltage supplied to the third node N3 gradually drops from the voltage Vnb toward the voltage Vnh (initialization voltage VINI1, −3.5 V). In addition, the light-emitting element OLED does not emit light.

In the period PIP following the period between the light emission period PEM and the period PIP of the K−1stFRAME, similar to the configuration described in "5-2-1. First Example of Driving Method of Pixel Circuit 181D", the voltage supplied to the first node N1 gradually drops from the voltage Vna toward the voltage Vnd (the pre-charge voltage VPRC, 1.5 V) and becomes the voltage Vnd. The scan voltage power supply SIR(n) is maintained in the state in which the voltage Vnh is supplied, the voltage supplied to the second node N2 becomes Vnh, and the voltage supplied to the third node N3 becomes the voltage Vnh. Similar to the period between the light emission period PEM and the period PIP of the K−1stFRAME, the light-emitting element OLED does not emit light.

As described above, in the period PIP, the pre-charge voltage (intermediate potential) is supplied to the first node N1, and the second node N2 and the third node N3 are initialized by the initialization voltage VINI1 (−3.5 V).

In the first period of the horizontal period HRP of the KthFRAME following the period PIP, similar to the configuration described in "5-2-1. First Example of Driving Method of Pixel Circuit 181D", the voltage supplied to the first node N1 maintains the voltage Vnd, and the voltage supplied to the second node N2 and the voltage supplied to the third node N3 maintain the voltage Vnh. In addition, the light-emitting element OLED does not emit light. Further, the scan voltage power supply SIR(n) is maintained in the state in which the voltage Vnh is supplied.

In the period PWR following the first period of the horizontal period HRP, the scan voltage power supply SIR (n) changes from the state in which the initialization voltage VINI1 (−3.5 V) is supplied to the state in which the initialization voltage VINI2 (0 V) is supplied. The voltage supplied to the first node N1 gradually drops from the voltage Vnd toward the voltage Vnf (voltage VSIGL, −0.5 V), and the voltage supplied to the second node N2 gradually rises from the voltage Vnh toward 0 V. When the voltage supplied to the second node N2 gradually rises from the voltage Vnh toward 0 V, and the second transistor T2 exceeds the threshold voltage VTH and is turned on, charging of the third node N3 starts, and the voltage supplied to the third node N3 rises. In addition, the light-emitting element OLED does not emit light.

In the middle of the period PWR, in the period PVH parallel to (overlapping) the period PWR, and immediately after the start of the period PVH, similar to the configuration described in "5-2-1. First Example of Driving Method of Pixel Circuit 181D", the voltage supplied to the first node N1 is Vnf, the voltage supplied to the second node N2 is 0

V, the voltage supplied to the third node N3 rises from the voltage Vnh to the voltage Vne, charging of the voltage supplied to the third node N3 stops at the potential reaching the threshold voltage VTH of the second transistor T2, and the third node N3 is the voltage Vne. As a result, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). In addition, the light-emitting element OLED does not emit light. Further, the scan voltage power supply SIR(n) is maintained in the state in which the initialization voltage VINI2 (0 V) is supplied.

In the period at the end of the period PVH, similar to the configuration described in "5-2-1. First Example of Driving Method of Pixel Circuit 181D", the voltage supplied to the first node N1 maintains the voltage Vnf and the voltage supplied to the third node N3 maintains the voltage Vne. In addition, the light-emitting element OLED does not emit light. Further, the scan voltage power supply SIR(n) is maintained in the state in which the initialization voltage VINI2 (0 V) is supplied.

As described above, in the period PWR, the data signal VDATA is written to the pixel 180E (pixel circuit 181E). Further, in the period PVH, as described above, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the horizontal period HRP of the KthFRAME, similar to the configuration described in "5-2-1. First Example of Driving Method of Pixel Circuit 181D", three pixels using the pixel 180E emitting red light, the pixel 180E emitting blue light, and the pixel 180E emitting green light become black. In addition, the scan voltage power supply SIR(n) is maintained in the state in which the initialization voltage VINI2 (0 V) is supplied.

The first example of the driving method of the pixel circuit 181E including the above-described configuration has advantageous effects similar to those of the driving method of the display device according to the fifth embodiment. In addition, the first example of the driving method of the pixel circuit 181E including the above-described configuration has advantageous effects similar to those of the driving method of the display device according to the second embodiment.

[6-2-2. Second Example of Driving Method of Pixel Circuit 181E]

Figure 44:
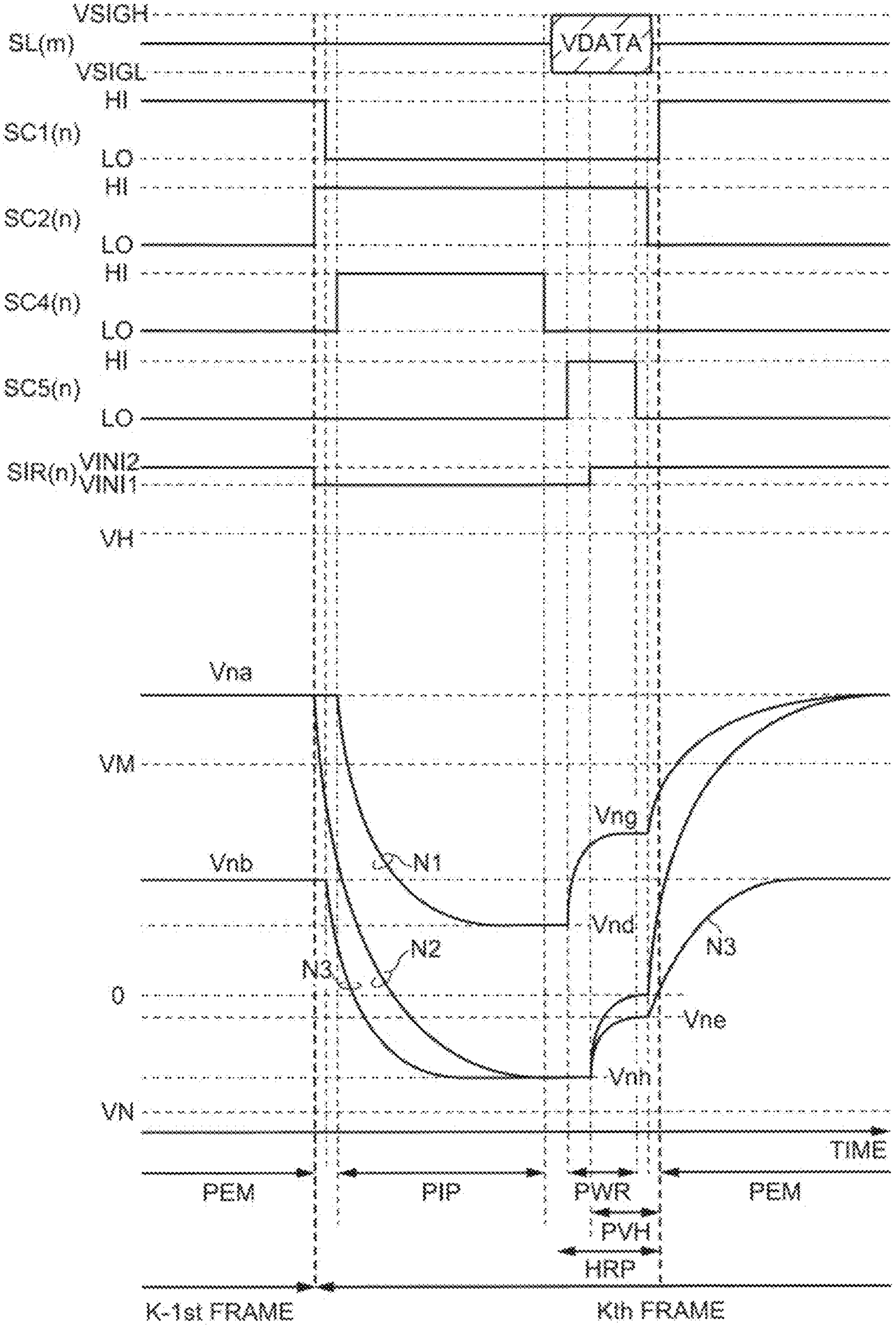
FIG. 44 is a timing chart of a display device according to the sixth embodiment of the present invention.

A second example of the driving method of the pixel circuit 181E will be described with reference to FIG. 44. The driving method shown in the second example of the driving method of the pixel circuit 181E includes displaying images of the same color (white) in consecutive frames similar to the second example of the driving method of the display device 10 according to the first embodiment. Configurations that are the same as or similar to those in FIG. 1 to FIG. 43 will be described as necessary.

The configurations of the first scan signal SC1(*n*), the second scan signal SC2(*n*), the fourth scan signal SC4(*n*), the fifth scan signal SC5(*n*), the image data signal SL(m), and the scan voltage power supply SIR(n) are similar to those described in "6-2-1. First Example of Driving Method of Pixel Circuit 181E". In addition, the voltages (potentials) of the first node N1, the second node N2, and the third node N3 in the periods excluding the horizontal period HRP of the KthFRAME and the light emission period PEM of the KthFRAME are similar to the configurations described in "6-2-1. First Example of Driving Method of Pixel Circuit 181E". In addition, the data signal VDATA of VSIGH corresponding to white is supplied to the image data signal SL(m) in the horizontal period HRP, and the data signal VDATA similar to the configuration described in "6-2-1. First Example of Driving Method of Pixel Circuit 181E" is supplied in the periods other than the horizontal period HRP.

The driving method of the second example of the pixel circuit 181E in the light emission period PEM of the K−1stFRAME, the period between the light emission period PEM of the K−1stFRAME and the period PIP of the KthFRAME, the period PIP of the KthFRAME, and the first period of the horizontal period HRP of the KthFRAME following the period PIP of the KthFRAME is similar to the driving method described in "6-2-1. First Example of Driving Method of Pixel Circuit 181E".

In the period PWR following the first period of the horizontal period HRP in the second example of the driving method of the pixel circuit 181E, the configurations of the respective control signals, the operations of the respective transistors, and the like are similar to those described in "6-2-1. First Example of Driving Method of Display Device 10". The voltage supplied to the first node N1 gradually rises from the voltage Vnd toward the voltage Vng (voltage VSIGH, 3.5 V), and the voltage supplied to the second node N2 and the voltage supplied to the third node N3 maintain the voltage Vnh (initialization voltage VINI1, −3.5 V). In addition, the light-emitting element OLED does not emit light.

In the middle of the period PWR in the second example of the driving method of the pixel circuit 181E, in the period PVH parallel to (overlapping) the period PWR, the voltage supplied to the first node N1 gradually rises from the voltage Vnd toward the voltage Vng to become the voltage Vng, the voltage supplied to the second node N2 rises from the voltage Vnh toward VINI2 (0 V), and when the voltage supplied to the second node N2 exceeds the threshold voltage VTH of the second transistor T2, the second transistor T2 is turned on. Since the fifth transistor T5 is in the OFF state and the third node N3 is released, the third node N3 is charged by the current Ion of the second transistor T2, the voltage supplied to the third node N3 rises from Vnh, and the rise stops at the potential (Vne) of the threshold voltage VTH. That is, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). In addition, the light-emitting element OLED does not emit light.

In the period at the end of the period PVH in the second example of the driving method of the pixel circuit 181E, the configurations of the control signals, the operations of the transistors, and the like are similar to the configurations described in "6-2-1. First Example of Driving Method of Display Device 10". The first node N1 and the second node N2 are conductive, the voltage supplied to the second node N2 gradually rises, the second transistor T2 is in the conductive state, and the current Ion flows from the drive power line PVDD to the reference voltage line PVSS. Therefore, the voltage supplied to the first node N1 and the voltage supplied to the third node N3 rise to follow the rise in the voltage supplied to the second node N2. Due to the voltage rise of the third node N3, the voltage supplied to the first node N1 and the voltage supplied to the second node N2 further rise.

Further, in the light emission period PEM of the KthFRAME in the second example of the driving method of the pixel circuit 181E, the voltage supplied to the first node N1 and the voltage supplied to the second node N2 rise to the voltage Vna, and the voltage supplied to the third node N3 rises to the voltage Vnb. The potential difference Vgs is greater than the threshold voltage VTH, the second transistor T2 is in the ON state, the current Ion flows from the drive power line PVDD to the reference voltage line PVSS, and the light-emitting element OLED emits light. For example, the pixel 180 (the pixel circuit 181) emits red light, and white light is emitted by three pixels using the pixel 180 emitting red light, the pixel 180 emitting blue light, and the pixel 180 emitting green light.

As described above, in the period PWR in the second example of the driving method of the pixel circuit 181E, the data signal VDATA is written to the pixel 180 (the pixel circuit 181). Further, in the period PVH in the second example of the driving method of the pixel circuit 181E, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). Further, in the light emission period PEM of the KthFRAME in the second example of the driving method of the pixel circuit 181E, white light is emitted by three pixels.

[6-2-3. Third Example of Driving Method of Pixel Circuit 181E]

Figure 45:
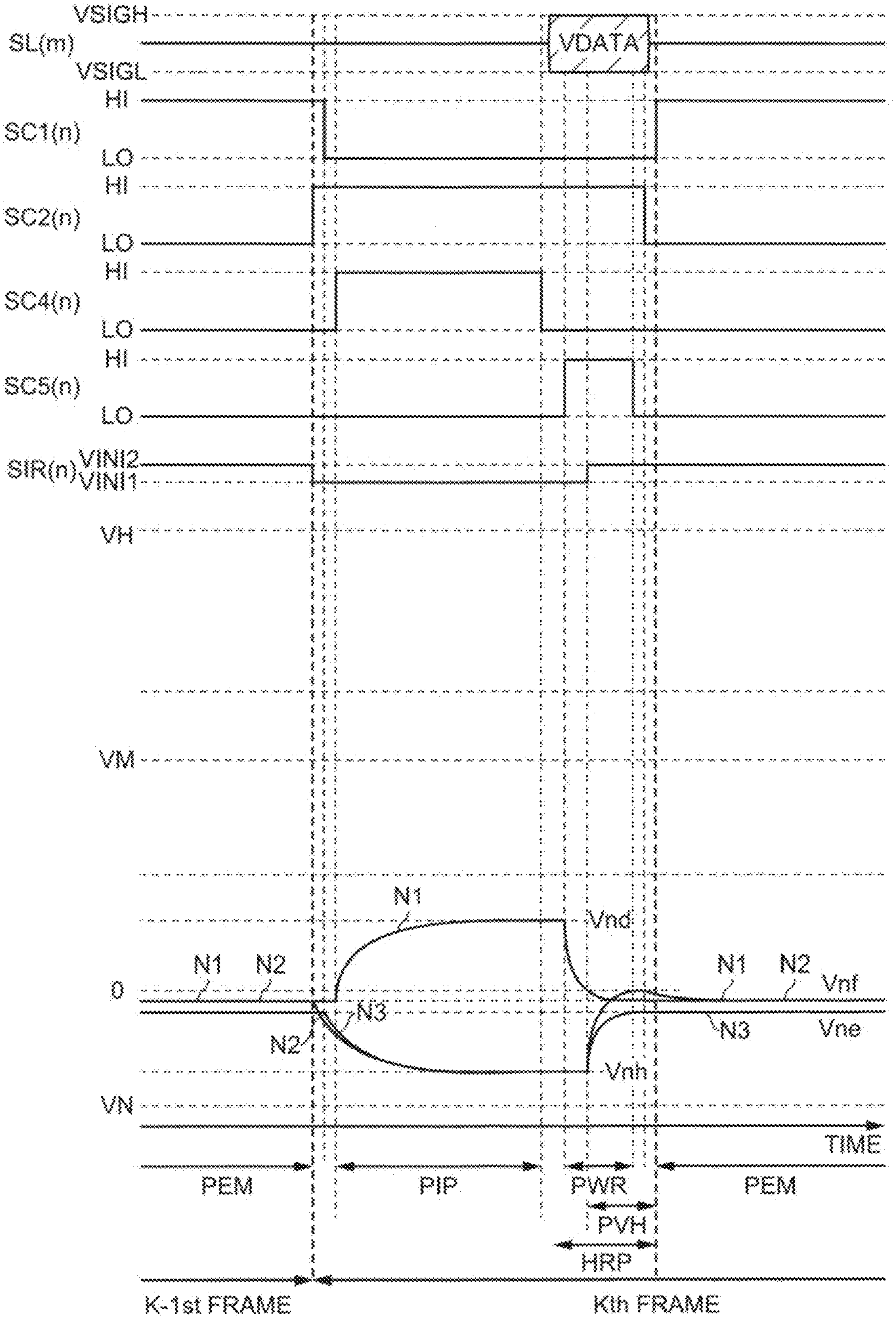
FIG. 45 is a timing chart of a display device according to the sixth embodiment of the present invention.

A third example of the driving method of the pixel circuit 181E will be described with reference to FIG. 45. The driving method shown in the third example of the driving method of the pixel circuit 181E includes displaying images of the same color (black) in consecutive frames similar to the third example of the driving method of the display device 10 according to the first embodiment. Configurations that are the same as or similar to those in FIG. 1 to FIG. 44 will be described as necessary.

The configurations of the first scan signal SC1(*n*), the second scan signal SC2(*n*), the fourth scan signal SC4(*n*), the fifth scan signal SC5(*n*), the image data signal SL(m), and the scan voltage power supply SIR(n) are similar to the configurations described in “6-2-1. First Example of Driving Method of Pixel Circuit 181E”. In addition, the voltages (potentials) of the first node N1, the second node N2, and the third node N3 in the light emission period PEM of the K−1stFRAME, the operations of the transistors, and the like are similar to the configurations and operations described in “5-2-3. Third Example of Driving Method of Display Device 10”. Further, the voltages (potentials) of the first node N1, the second node N2, and the third node N3 in the periods other than the light emission period PEM of the K−1stFRAME to the period PIP of the KthFRAME, the operations of the transistors, and the like are similar to the configurations and operations described in “6-2-1. First Example of Driving Method of Pixel Circuit 181E”. Therefore, configurations and the like similar to those described in “5-2-3. Third Example of Driving Method of Display Device 10” and “6-2-1. First Example of Driving Method of Pixel Circuit 181E” will be described as necessary. In addition, the data signal VDATA of VSIGL corresponding to black is supplied to the image data signal SL(m) in the horizontal period HRP, and the data signal VDATA similar to the configuration described in “6-2-1. First Example of Driving Method of Pixel Circuit 181E” is supplied in the periods other than the horizontal period HRP.

In the light emission period PEM of the K−1stFRAME, the light-emitting element OLED does not emit light and the pixel 180E is black similar to the configuration described in “5-2-3. Third Example of Driving Method of Display Device 10”.

In the period between the light emission period PEM of the K−1stFRAME and the period PIP of the KthFRAME following the light emission period PEM of the K−1stFRAME, the configurations of the control signals, the operations of the transistors, and the like are similar to those described in “6-2-1. First Example of Driving Method of Pixel Circuit 181A”. The voltage supplied to the first node N1 gradually rises from the voltage Vnf toward the voltage Vnd (pre-charge voltage VPRC, 1.5 V), and the voltage supplied to the second node N2 gradually drops from the voltage Vnf toward the initialization voltage VINI1 (Vnh, −3.5 V). The voltage supplied to the third node N3 gradually drops from the voltage Vne toward the initialization voltage VINI1 (Vnh, −3.5 V). In addition, the light-emitting element OLED does not emit light.

In the period PIP of the KthFRAME following the period between the light emission period PEM and the period PIP of the K−1stFRAME, the voltage supplied to the first node N1 gradually rises from the voltage Vnf toward the voltage Vnd and becomes the voltage Vnd. The voltage supplied to the second node N2 gradually drops from the voltage Vnf toward the voltage Vnh (initialization voltage VINI1, −3.5 V) and becomes the voltage Vnh. The voltage supplied to the third node N3 gradually drops from the voltage Vne toward the voltage Vnh and becomes the voltage Vnh. The potential difference Vgs is 0 V and the potential difference Vds is 8 V. Since the second transistor T2 and the fifth transistor T5 are in the ON state and a current flows from the drive power line PVDD to the initialization voltage power line SVI, the light-emitting element OLED does not emit light.

As described above, in the period PIP, the pre-charge voltage (intermediate potential) is supplied to the first node N1, and the second node N2 and the third node N3 are initialized by the initialization voltage VINI1 (−3.5 V).

The voltages (potentials) of the first node N1, the second node N2, and the third node N3 in the first period of the horizontal period HRP of the KthFRAME to the light emission period PEM of the KthFRAME following the period PIP, the operations of the transistors, and the like are similar to the configurations and operations described in “6-2-1. First Example of Driving Method of Pixel Circuit 181A”.

In the period PWR, similar to the configuration described in “6-2-1. First Example of Driving Method of Pixel Circuit 181A”, the data signal VDATA (in the third example, the voltage VSIGL) is written to the pixel 180E (pixel circuit 181E).

Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Further, in the light emission period PEM of the KthFRAME, similar to the configuration described in “6-2-1. First Example of Driving Method of Pixel Circuit 181A”, three pixels using the pixel 180A emitting red light, the pixel 180A emitting blue light, and the pixel 180A emitting green light become black.

[6-2-4. Fourth Example of Driving Method of Pixel Circuit 181E]

Figure 46:
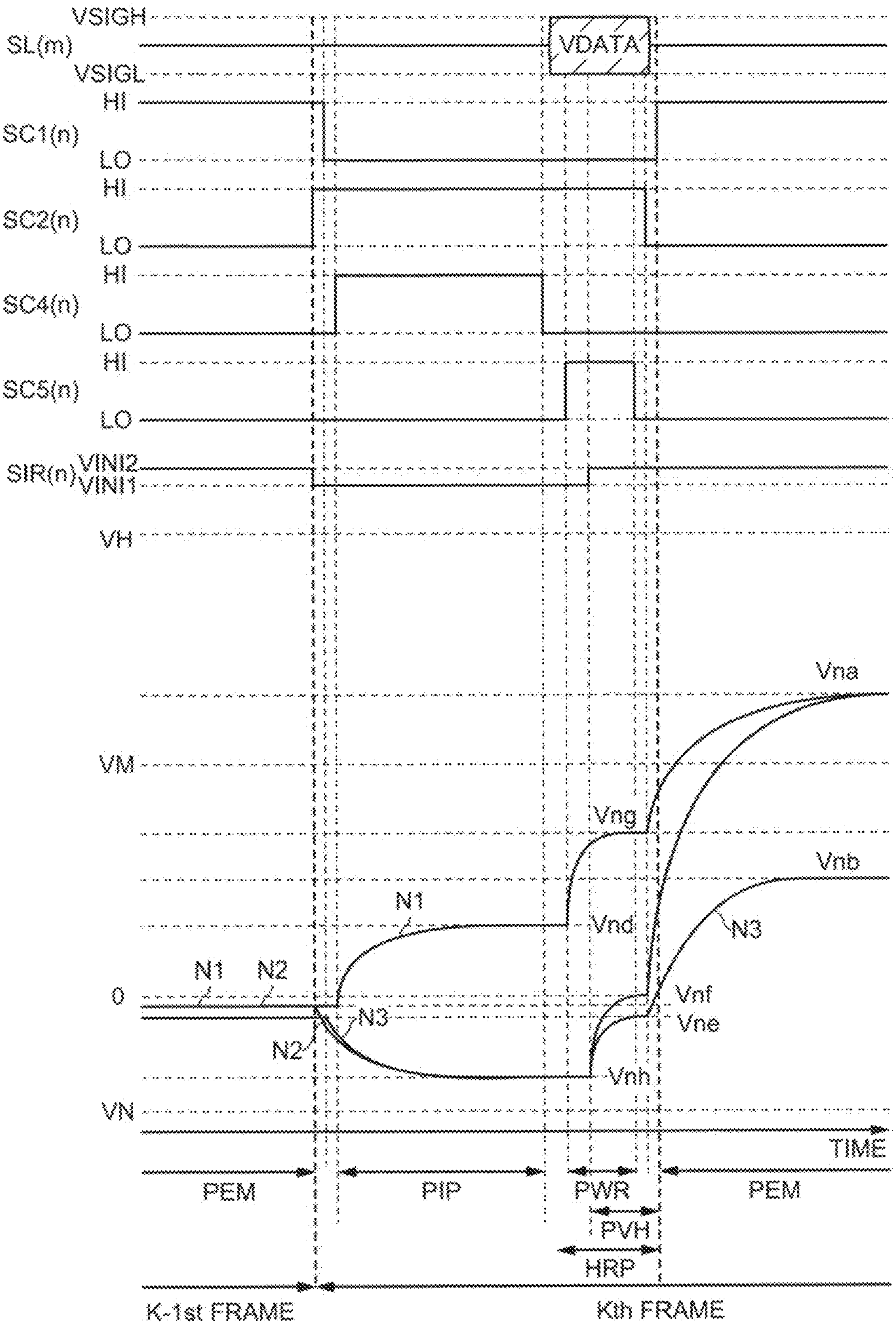
FIG. 46 is a timing chart of a display device according to the sixth embodiment of the present invention.

A fourth example of the driving method of the pixel circuit 181E will be described with reference to FIG. 46. The driving method shown in the fourth example of the driving method of the pixel circuit 181A includes displaying images of different colors in consecutive frames similar to the fourth example of the driving method of the display device 10 according to the first embodiment. Configurations that are the same as or similar to those in FIG. 1 to FIG. 45 will be described as necessary.

The configurations of the first scan signal SC1(*n*), the second scan signal SC2(*n*), the fourth scan signal SC4(*n*), the fifth scan signal SC5(*n*), the image data signal SL(m), and the scan voltage power supply SIR(n) are similar to the configurations described in "6-2-1. First Example of Driving Method of Pixel Circuit 181E". In addition, the voltages (potentials) of the first node N1, the second node N2, and the third node N3 in the light emission period PEM of the K−1stFRAME and the period PIP of the KthFRAME, the operations of the transistors, and the like are similar to "6-2-3. Third Example of Driving Method of Pixel Circuit 181E", and the voltages (potentials) of the first node N1, the second node N2, and the third node N3 in the horizontal period HRP of the KthFRAME and the light emission period PEM of the KthFRAME, the operations of the transistors and the like are similar to "6-2-2. Second Example of Driving Method of Pixel Circuit 181E". Configurations and the like similar to "6-2-1. First example of Driving Method of Pixel Circuit 181E", "6-2-2. Second Example of Driving Method of Pixel Circuit 181E", and "6-2-3. Third Example of Driving Method of Pixel Circuit 181E" will be described as necessary. In addition, the data signal VDATA of VSIGH corresponding to white is supplied to the image data signal SL(m) in the horizontal period HRP, and the data signal VDATA similar to the configuration described in "6-2-1. First Example of Driving Method of Pixel Circuit 181E" is supplied in the periods other than the horizontal period HRP.

The driving method of the fourth example of the display device 10 in the light emission period PEM of the K−1stFRAME, the period between the light emission period PEM of the K−1stFRAME and the period PIP of the KthFRAME following the light emission period PEM of the K−1stFRAME is similar to the driving method described in "6-2-3. Third Example of Driving Method of Pixel Circuit 181E".

The driving method of the fourth example of the display device 10 in the horizontal period HRP of the K−1stFRAME and the light emission period PEM of the KthFRAME is similar to the driving method described in "6-2-2. Second example of Driving Method of Pixel Circuit 181E".

7. Seventh Embodiment

Figure 47:
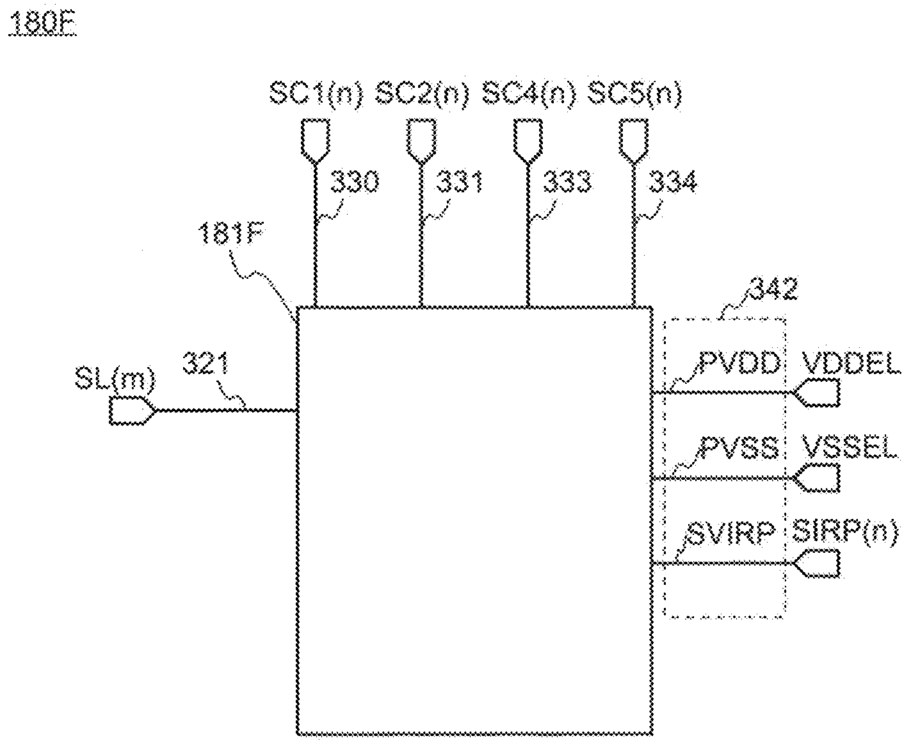
FIG. 47 is a schematic diagram showing input signals to a pixel circuit according to the seventh embodiment of the present invention.
Figure 48:
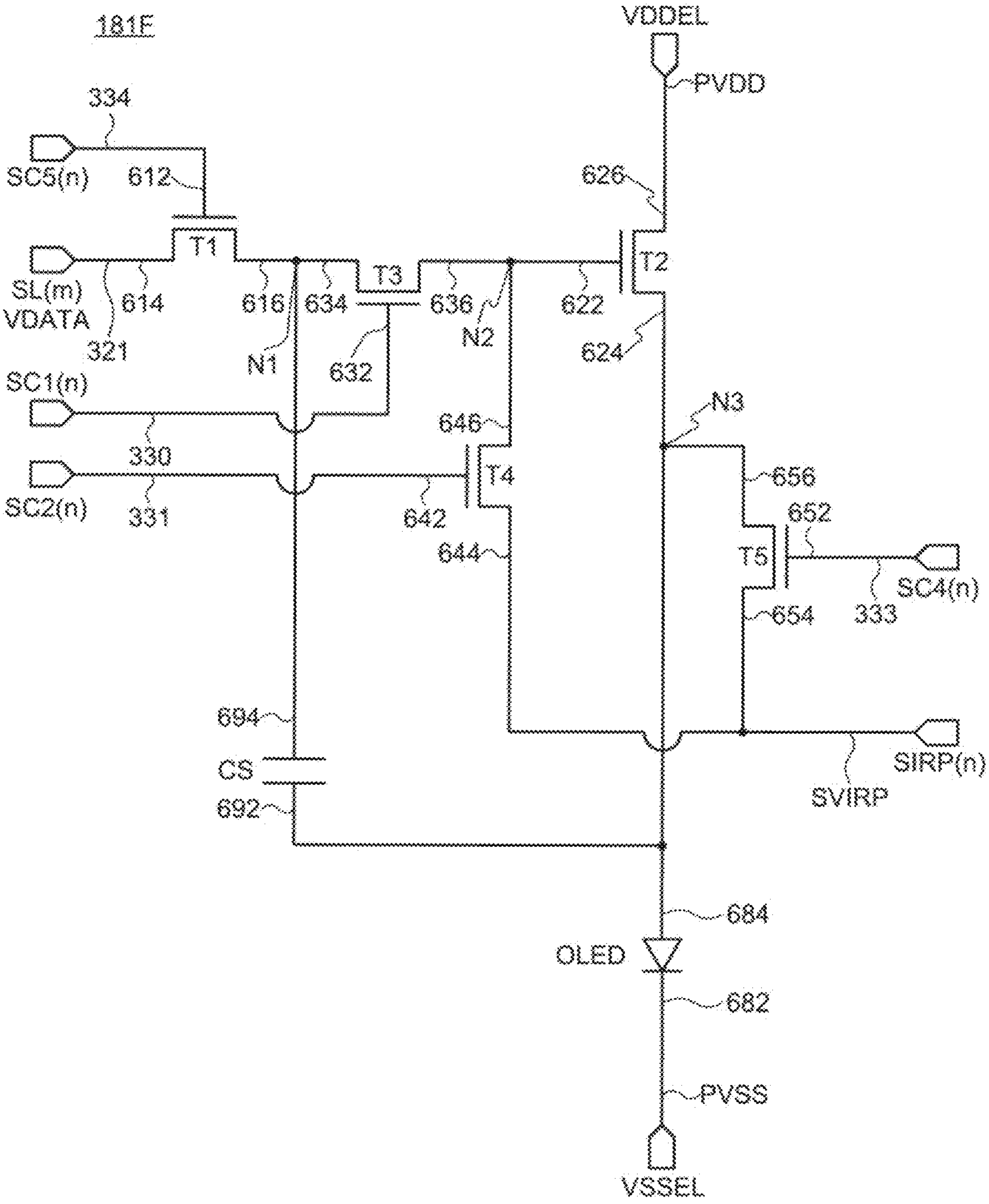
FIG. 48 is a circuit diagram showing a configuration of a pixel circuit according to the seventh embodiment of the present invention.

An overview of the display device according to the seventh embodiment will be described with reference to FIG. 1, FIG. 23, and FIG. 47 to FIG. 52. FIG. 47 is a schematic diagram showing input signals to a pixel 180F (a pixel circuit 181F) according to the seventh embodiment, FIG. 48 is a circuit diagram showing a configuration of the pixel circuit 181F, and FIG. 49 to FIG. 52 are timing charts of the display device according to the seventh embodiment.

The display device according to the seventh embodiment includes the pixel 180F and the pixel circuit 181F. Specifically, the pixel 180F and the pixel circuit 181F include the configurations shown in (1) to (5) below. Mainly, the configurations shown in (1) to (5) are different from the configurations of the pixel 180A and the pixel circuit 181A of the display device according to the second embodiment.

(1) A scan voltage power line SVIRP to which a scan voltage power supply SIRP(n) is supplied is included.

(2) The scan voltage power line SVIRP is a signal line that combines the pre-charge voltage power line SVP to which the pre-charge voltage VPRC is supplied and the scan voltage power line SVIR to which the initialization voltage VINI1 and VINI2 are supplied. That is, the scan voltage power line SVIRP has a configuration serving as both the pre-charge voltage power line SVP and the scan voltage power line SVIR.

(3) The scan volage power line SVIRP includes voltages that change alternately with time. The voltages that change alternately with time are the pre-charge voltage VPRC, the initialization voltage VINI2, and the initialization voltage VINI1.

(4) The fourth scan signal SC4(*n*) and the sixth transistor T6 are not included.

(5) The timing of the first scan signal SC1(*n*) is different.

Configurations other than the configurations shown in (1) to (5) in the pixel 180F and the pixel circuit 181F and the configurations related to the configurations shown in (1) to (5) in the pixel 180F and the pixel circuit 181F are similar to those of the display device according to the second embodiment. Therefore, differences from the display device according to the second embodiment will mainly be described here. When describing the configurations and functions of the display device according to the seventh embodiment, configurations and functions similar to those of the display device according to the second embodiment will be described as necessary. In addition, configurations that are the same as or similar to those in FIG. 1 to FIG. 46 will be described as necessary.

[7-1. Configuration of Pixel 180F]

An overview of the pixel 180F and the pixel circuit 181F will be described with reference to FIG. 47 and FIG. 48.

The pixel circuit 181F is connected to the scan voltage power line SVIRP. The scan voltage power line SVIRP is a signal line serving as both the pre-charge voltage power line SVR supplied to the pixel 181A and the scan voltage power line SVIR. In other words, the scan voltage power line SVIRP is a signal line that combines the pre-charge voltage power line SVR supplied to the pixel circuit 181A and the scan voltage power line SVIR. In addition, the scan voltage power line SVIRP functions as a power line that supplies a voltage to the pixel 180F and the pixel circuit 181F, and also functions as a signal line whose voltage (potential) changes with time.

The scan voltage power supply SIRP(n) is supplied to the scan voltage power line SVIRP. In the pixel circuit 181F, the first electrode 644 of the fourth transistor T4 and the first electrode 654 of the fifth transistor T5 are electrically connected to the scan voltage power line SVIRP.

For example, the scan voltage power line SVIRP is electrically connected to the connection wiring 342 different from the drive power line PVDD and the reference voltage line PVSS. In addition, for example, the scan voltage power line SVIRP may be one of the connection wirings 342.

For example, similar to the pre-charge voltage VPRC, the initialization voltage VINI1, and the initialization voltage VINI2, the scan voltage power supply SIRP(n) may be supplied from an external device to the IC chip 110 (see FIG. 1), and may be supplied from the IC chip 110 to a plurality of pixels 180F (pixel circuits 181F) via the connection wiring 342 and the scan voltage power line SVIRP. Although not shown, similar to the pre-charge voltage VPRC, the initialization voltage VINI1, and the initialization voltage VINI2, the scan voltage power supply SIRP(n) may be connected to the scan voltage power line SVIR and may be supplied to the plurality of pixels 180F (pixel circuits 181F) from an external device via the FPC 200, the terminal section 150, and the connection wiring 341, and not via the IC chip 110 and the connection wiring 342.

When the third transistor T3 is in the conductive state, the fourth transistor T4 is in the conductive state, and the third transistor T3 causes the second node N2 and the first node N1 to be conductive to electrically connect the second node N2 and the first node N1 to the fourth transistor T4 and the scan voltage power line SVIRP. As a result, the third transistor T3 has a function of supplying the intermediate potential to the second node N2 by supplying the pre-charge voltage VPRC (intermediate potential) to the second node N2.

The fourth transistor T4 has a function of conducting the second node N2 and the scan voltage power line SVIRP to supply the initialization voltage VINI1 or VINI2 to the second node N2 and initializing the second node N2. For example, the initialization voltages VINI1 and VINI2 are constant voltages.

The fifth transistor T5 has a function of conducting the third node N3 and the scan voltage power line SVIRP to supply the initialization voltage VINI1 or VINI2 to the second node N2 and initializing the third node N3.

Configurations and functions of the pixel circuit 181F other than the configurations and functions described in "2-1. Configuration of Pixel 180F" are similar to those of the pixel circuit 181A.

[7-2. Driving Method of Pixel Circuit 181F]

A driving method of the display device according to the seventh embodiment will be described with reference to FIG. 49 to FIG. 52. Configurations that are the same as or similar to those in FIG. 1 to FIG. 48 will be described as necessary. In addition, similar to the first embodiment, the horizontal axis of the timing charts represents time (TIME).

The driving method of the display device according to the seventh embodiment has a configuration and function in which the operation related to the pre-charge voltage power line SVP (pre-charge voltage VPRC) and the scan voltage power line SVIR (initialization voltage VINI1 and initialization voltage VINI2) in the driving method of the display device according to the second embodiment is replaced with the operation related to the scan voltage power supply SIRP(n) without including the sixth transistor T6. Configurations and functions other than the operation related to the scan voltage power supply SIRP(n) without including the sixth transistor T6 are similar to those of the driving method of the display device according to the second embodiment.

The driving method of the display device according to the seventh embodiment includes periods similar to those of the driving method of the display device according to the third embodiment shown in FIG. 23.

In one horizontal period (horizontal period HRP) in the driving method of the display device according to the seventh embodiment, the first scan signal SC1(*n*), the second scan signal SC2(*n*), the third scan signal SC3(*n*), the fifth scan signal SC5(*n*), the image data signal SL(m), and the scan voltage power supply SIRP(n) are input to the pixel 180F (pixel circuit 181F). For example, the pixel 180F (pixel circuit 181F) is selected according to the timings of the first scan signal SC1(*n*), the second scan signal SC2(*n*), the third scan signal SC3(*n*), and the fifth scan signal SC5(*n*). The image data signal SL(m) and the scan voltage power supply SIRP(n) are input to the selected pixel 180F (pixel circuit 181F) according to the timings of the respective signals. Similar operations are performed on all the pixels 180F (pixel circuits 181F), and an image of the frame corresponding to 1FRAME is displayed on the display region 22 of the display device according to the seventh embodiment based on the image data signal SL(m) input to all the pixels 180F (pixel circuits 181F).

For example, the voltages (potentials) supplied to each signal of each frame in the timing charts shown in FIG. 49 to FIG. 52 are shown in Table 7.

TABLE 7

| | Setting value [V] |
|---|---|
| VTH | 1 |
| VSIGL(Black) | −2 |
| VSIGH(White) | 2 |
| HI | 10 |
| LO | −5 |
| VINI1 | −3 |
| VINI2(VREF) | −1.5 |
| VPRC | 0 |
| VDDEL | 8 |
| VSSEL | 0 |

[7-2-1. First Example of Driving Method of Pixel Circuit 181F]

Figure 49:
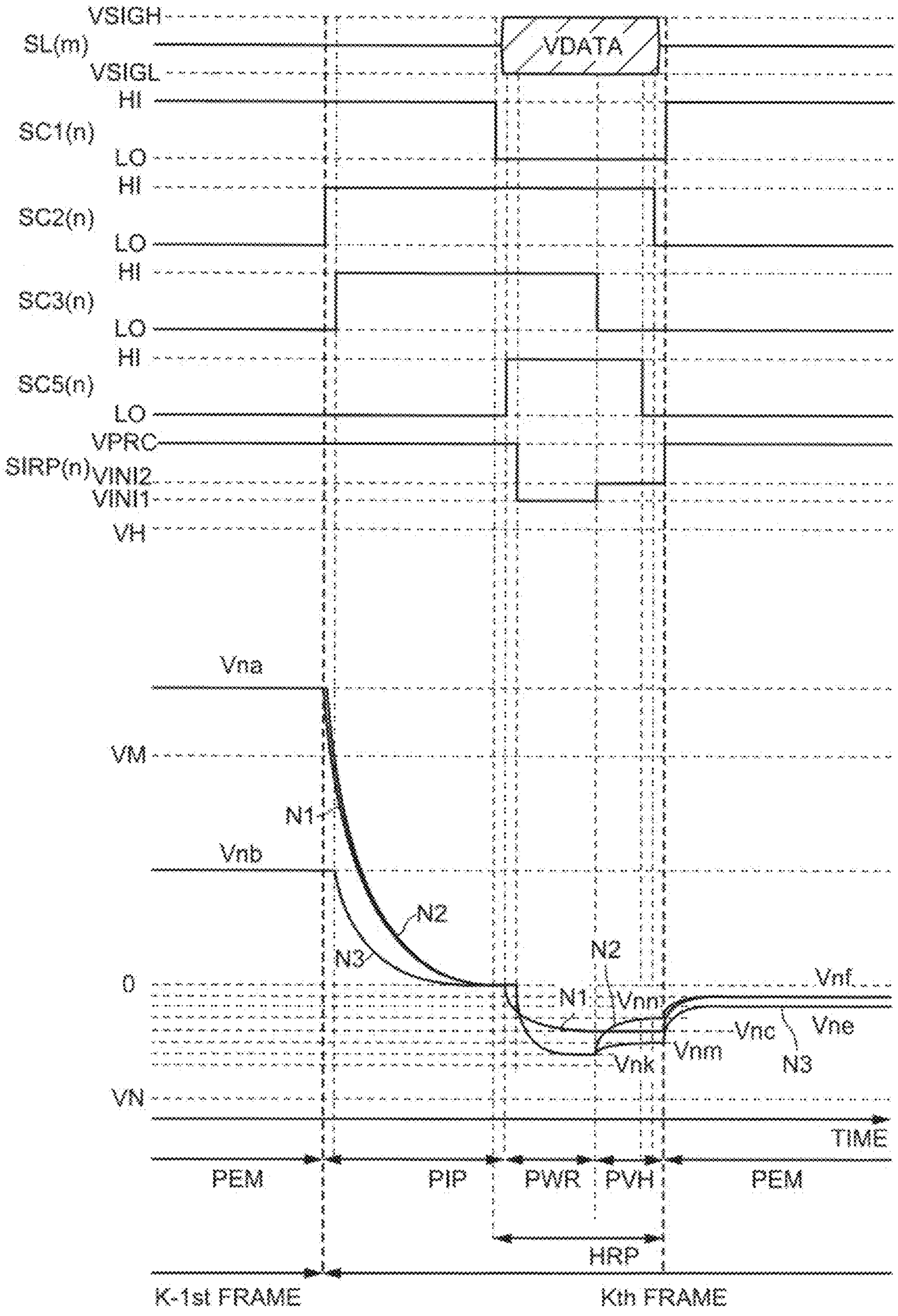
FIG. 49 is a timing chart of a display device according to the seventh embodiment of the present invention.

A first example of the driving method of the pixel circuit 181F will be described with reference to FIG. 49. Similar to the first example of the driving method of the display device 10 according to the first embodiment, the first example of the driving method of the pixel circuit 181F includes displaying images of different colors in consecutive frames.

For example, as shown in Table 7, the voltage VSIGL corresponding to non-light emitting black is −2 V, the voltage VSIGH corresponding to the light emission is 2.0 V, the voltage VL (LO) is −5 V, the initialization voltage VINI2 (reference voltage VREF) is −1.5 V, the initialization voltage VINI1 is −3 V, and the pre-charge voltage VPRC is 0 V. Other setting values are the setting values shown in Table 2 described in "2-2. Driving Method of Pixel Circuit 181A".

The scan voltage power supply SIRP(n) is supplied with the pre-charge voltage VPRC in the light emission period PEM of the K−1stFRAME, the period PIP of the KthFRAME, a part of the period PWR of the KthFRAME, and the light emission period PEM of the KthFRAME, and is supplied with the initialization voltage VINI2 in the period PWR of the KthFRAME, and is supplied with the initialization voltage VINI1 in the period PVH of the KthFRAME.

The first scan signal SC1(*n*) is supplied with LO in the horizontal period HRP of the KthFRAME, and is supplied with HI in the periods other than the horizontal period HRP.

The configurations of the second scan signal SC2(*n*), the third scan signal SC3(*n*), and the fifth scan signal SC4(*n*) are similar to those described in "2-2-1. First Example of Driving Method of Pixel Circuit 181A".

The configurations of the first scan signal SC1(*n*) to the third scan signal SC3(*n*) and the image data signal SL(m) in the light emission period PEM of the K−1stFRAME to the light emission period PEM of the KthFRAME are similar to those described in "2-2-1. First Example of Driving Method of Pixel Circuit 181A". Configurations and the like similar to those described in "2-2-1. First Example of Driving Method of Pixel Circuit 181A" will be described as necessary.

In the light emission period PEM of the K−1stFRAME, the pre-charge voltage VPRC (0 V) is supplied to the scan voltage power supply SIRP(n), and HI is supplied to the first scan signal SC1(*n*). Similar to the configuration described in "2-2-1. First Example of Driving Method of Pixel Circuit 181A", the first transistor T1, the fourth transistor T4, and the fifth transistor are in the OFF state, and the third transistor T3 is in the ON state. In addition, the voltage Vna supplied to the first node N1 and the second node N2 is 7 V, the voltage Vnb supplied to the third node N3 is 2.5 V, and the potential difference Vgs is 4.5 V. Therefore, the second transistor T2 is in the ON state, and the current Ion can flow based on the potential difference Vgs and the potential difference Vds corresponding to the voltage VSIGH (2.0 V) input in the horizontal period HRP of the K−1stFRAME. In addition, the current Ion flows from the drive power line PVDD to the light-emitting element OLED and the reference voltage line PVSS, and the light-emitting element OLED emits light.

In the period PIP of the KthFRAME following the light emission period PEM of the K−1stFRAME, the scan voltage power supply SIRP(n) is maintained in the state in which the pre-charge voltage VPRC (0 V) is supplied, and the first scan signal SC1(*n*) is maintained in the state in which HI is supplied. The fourth transistor T4 and the fifth transistor T5 are turned from the OFF state to the ON state, the third transistor T3 is turned from the ON state to the OFF state, and the first transistor T1 is maintained in the OFF state. As a result, the voltage supplied to the first node N1 and the voltage supplied to the second node N2 gradually drop from the voltage Vna toward the pre-charge voltage VPRC (0 V) to become 0 V, and the voltage supplied to the third node N3 gradually drops from the voltage Vnb toward the pre-charge voltage VPRC (0 V) to become 0 V. Since the potential difference Vgs is 0 V and smaller than the threshold voltage VTH, the second transistor T2 is turned off. Therefore, since the current Ion does not flow from the drive power line PVDD to the initialization voltage power line SVI or the reference voltage line PVSS, the light-emitting element OLED does not emit light.

As described above, in the period PIP, the intermediate potential is supplied to the first node N1, the second node N2, and the third node N3 by the pre-charge voltage VPRC (0 V). Therefore, in the period PIP, the pre-charge voltage (intermediate potential) is supplied to the first node N1, and the second node N2 and the third node N3 are initialized by the pre-charge voltage VPRC (0 V).

In the period PWR of the horizontal period HRP of the KthFRAME following the period PIP of the KthFRAME, the data signal VDATA of the voltage VSIGL is supplied to the image data signal SL(m). When the fifth scan signal SC5(*n*) changes from the state in which LO is supplied to the state in which HI is supplied, the scan voltage power supply SIRP(n) changes from the state in which the pre-charge voltage VPRC (0 V) is supplied to the state in which the initialization voltage VINI1 (−3 V) is supplied. The first transistor T1 is turned from the OFF state to the ON state, the third transistor T3 is maintained in the OFF state, and the fourth transistor T4 and the fifth transistor T5 are maintained in the ON state. As a result, the voltage supplied to the first node N1 gradually drops from 0 V toward the voltage Vnc (voltage VSIGL, −2 V) and becomes the voltage Vnc, and the voltage supplied to the second node N2 and the voltage supplied to the third node N3 gradually drop from 0 V toward a voltage Vnk (initialization voltage VINI1, −3 V). In addition, similar to the period PIP, the potential difference Vgs is 0 V, the second transistor T2 is in the OFF state, and the light-emitting element OLED does not emit light.

As described above, in the period PWR, the data signal VDATA is written to the pixel 180F (pixel circuit 181F), and the voltage supplied to the second node N2 and the voltage supplied to the third node N3 become the initialization voltage VINI1 (−3 V).

In the period PVH of the KthFRAME following the period PWR of the horizontal period HRP of the KthFRAME, the fourth scan signal SC4(*n*) changes from the state in which HI is supplied to the state in which LO is supplied. When the fourth scan signal SC4(*n*) changes from the state in which HI is supplied to the state in which LO is supplied, the scan voltage power supply SIRP(n) changes from the state in which the initialization voltage VINI1 (−3 V) is supplied to the state in which the initialization voltage VINI2 (−1.5 V) is supplied. In addition, when the fifth scan signal SC5(*n*) changes from the state in which HI is supplied to the state in which LO is supplied, the second scan signal SC2(*n*) changes from the state in which HI is supplied to the state in which LO is supplied. When the fifth transistor T5 is turned from the ON state to the OFF state and the fifth transistor T5 is in the OFF state, the first transistor T1 is turned from the ON state to the OFF state. The third transistor T3 is maintained in the OFF state and the fourth transistor T4 is maintained in the ON state. As a result, the voltage supplied to the first node N1 maintains the voltage Vnc (voltage VSIGL, −2 V), and the voltage supplied to the second node N2 gradually rises from the voltage Vnk toward the voltage Vnn (initialization voltage VINI2, −1.5 V) to become the initialization voltage VINI2 (voltage Vnn, −1.5 V).

Immediately after the start of the period PVH, the potential difference Vgs is 0 V, the potential difference Vds is 11 V, and the second transistor T2 is in the OFF state. In addition, the fifth transistor T5 is also in the OFF state. On the other hand, the fourth transistor T4 is in the ON state, and the voltage supplied to the second node N2 rises from the voltage Vnk toward the voltage Vnn. The voltage supplied to the second node N2 is directed to −1.5 V, so that the potential difference Vgs exceeds the threshold voltage VTH. As a result, the second transistor T2 is turned on, and the voltage supplied to the third node N3 gradually rises.

When the potential difference Vgs becomes the threshold voltage VTH, the voltage supplied to the second node N2 and the voltage supplied to the third node N3 maintain their respective voltages at that time. For example, as shown in FIG. 49, the voltage supplied to the second node N2 is the voltage Vnn, and the voltage supplied to the third node N3 is a voltage Vnm (−2.5 V). In this case, the potential difference Vgs is 1 V, the potential difference Vds is 10.5 V, and the potential difference Vgs is the same as the threshold voltage VTH. That is, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). In addition, since the second transistor T2 is in the OFF state and no current flows from the drive power line PVDD to the reference voltage line PVSS, the light-emitting element OLED does not emit light.

In the period at the end of the period PVH, the second scan signal SC2(*n*) changes from the state in which HI is supplied to the state in which LO is supplied. The fourth transistor T4 is turned from the ON state to the OFF state, the third transistor T3 is turned from the OFF state to the ON state, and the first transistor T1 and the fifth transistor T5 are maintained in the OFF state.

As described above, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light-emitting period PEM of the KthFRAME following the horizontal period HRP of the KthFRAME, when the first scan signal SC1(*n*) changes from the state in which HI is supplied to the state in which LO is supplied, the first scan signal power supply SIRP(n) changes from the state in which the initialization voltage VINI2 (−1.5 V) is supplied to the state in which the pre-charge voltage VPRC (0 V) is supplied. The third transistor T3 is maintained in the ON state, and the first transistor T1, the fourth transistor T4, and the fifth transistor T5 are maintained in the OFF state. The voltage supplied to the third node N3 rises slightly from Vnm due to capacitive coupling and becomes the voltage Vne (−1 V). The rise in the voltage supplied to the third node N3 causes the voltage supplied to the first node N1 and the voltage supplied to the second node N2 to gradually rise toward the voltage Vnf and become the voltage Vnf (−0.5 V). Therefore, since the potential difference Vgs is −0.5 V, the second transistor T2 is in the OFF state, no current flows from the drive power line PVDD to the reference voltage line PVSS, and the light-emitting element OLED does not emit light. As a result, in the light emission period PEM of the KthFRAME, three pixels using the pixel 180F emitting red light, the pixel 180F emitting blue light, and the pixel 180F emitting green light become black.

The first example of the driving method of the pixel circuit 181F including the above-described configuration has advantageous effects similar to those of the driving method of the display device according to the third embodiment.

In addition, the pixel circuit 181F has a configuration and function in which the pre-charge voltage SVP and the scan voltage power supply SIR(n) supplied to the pixel circuit 181A are replaced with the scan voltage power supply SIRP(n) serving as both the pre-charge voltage SVP and the scan voltage power supply SIR(n). In addition, the pixel circuit 181F does not include the fourth scan-signal SC4(*n*) and the sixth transistor T6. Therefore, since the pixel circuit 181F has a configuration capable of reducing the number of signal lines and a configuration capable of reducing the number of transistors, the display device including the pixel circuit 181F can reduce the size of the pixel. As a result, the display device including the pixel circuit 181F can increase the number of pixels and achieve high definition and a large screen.

[7-2-2. Second Example of Driving Method of Pixel Circuit 181F]

Figure 50:
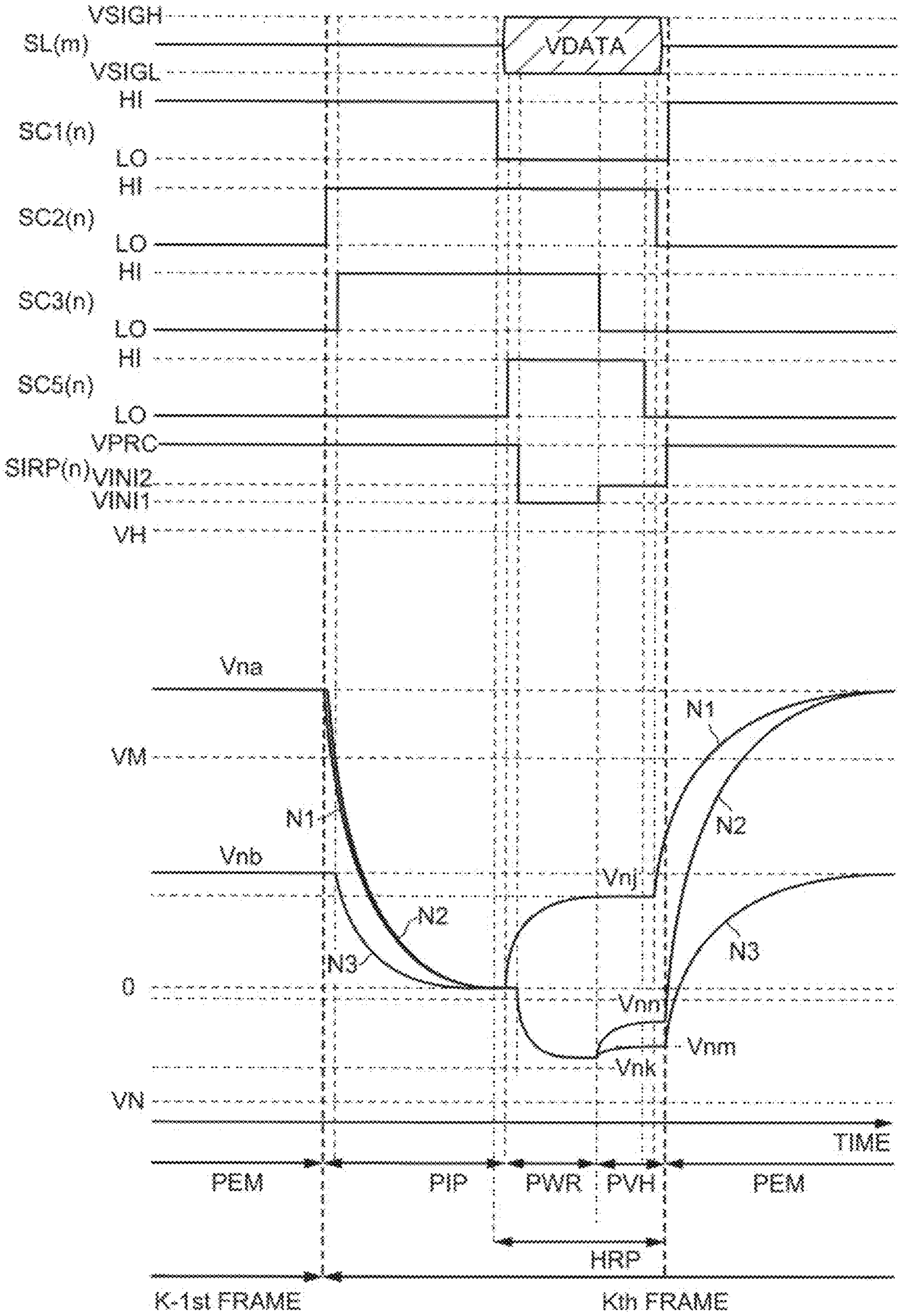
FIG. 50 is a timing chart of a display device according to the seventh embodiment of the present invention.

A second example of the driving method of the pixel circuit 181F will be described with reference to FIG. 50. The driving method shown in the second example of the pixel circuit 181F includes displaying images of the same color (white) in consecutive frames similar to the second example of the driving method of the display device 10 according to the first embodiment. Configurations that are the same as or similar to those in FIG. 1 to FIG. 49 will be described as necessary.

The configurations of the first scan signal SC1(*n*), the second scan signal SC2(*n*), the third scan signal SC3(*n*), the fifth scan signal SC5(*n*), the image data signal SL(m), and the scan voltage power supply SIRP(n) in the light emission period PEM of the K−1stFRAME to the light emission period PEM of the KthFRAME are similar to the configurations described in "7-2-1. First Example of Driving Method of Pixel Circuit 181F". In addition, the voltages (potentials) of the nodes and the transistors in the light emission period PEM of the K−1stFRAME and the period PIP of the KthFRAME and the operations of the respective transistors are similar to the configuration described in "7-2-1. First Example of Driving Method of Pixel Circuit 181F". Configurations and the like similar to those described in "7-2-1. First Example of Driving Method of Pixel Circuit 181F" will be described as necessary. In addition, the data signal VDATA including the VSIGH (3.5 V) corresponding to white is supplied to the image data signal SL(m) in the horizontal period HRP.

In the light emission period PEM of the K−1stFRAME, the light-emitting element OLED emits light similar to the configuration described in "7-2-1. First Example of Driving Method of Pixel Circuit 181F".

In the period PIP of the KthFRAME following the light emission period PEM of the K−1stFRAME, similar to the configuration described in "7-2-1. First Example of Driving Method of Pixel Circuit 181F", the intermediate potential is supplied to the first node N1, the second node N2, and the third node N3 by the pre-charge voltage VPRC (0 V). Therefore, in the period PIP, the pre-charge voltage (intermediate potential) is supplied to the first node N1, and the second node N2 and the third node N3 are initialized by the pre-charge voltage VPRC (0 V). In addition, the potential difference Vgs is 0 V, the second transistor T2 is in the OFF state, and the light-emitting element OLED does not emit light.

In the period PWR of the horizontal period HRP of the KthFRAME following the period PIP of the KthFRAME, the voltage supplied to the first node N1 gradually rises from 0 V toward a voltage Vnj to become the voltage Vnj (voltage VSIGH, 3.5 V), and the voltage supplied to the second node N2 and the voltage supplied to the third node N3 gradually drop from 0 V toward the voltage Vnk (initialization voltage VINI1, −3 V). In addition, similar to the period PIP, the potential difference Vgs is 0 V, the second transistor T2 is in the OFF state, and the light-emitting element OLED does not emit light.

As described above, in the period PWR, the data signal VDATA is written to the pixel 180 (the pixel circuit 181), and the voltage supplied to the second node N2 and the voltage supplied to the third node N3 become the initialization voltage VINI1 (−3 V).

In the period PVH of the KthFRAME following the period PWR of the horizontal period HRP of the KthFRAME, the voltage supplied to the first node N1 maintains the voltage Vnj, and the voltage supplied to the second node N2 gradually rises from the voltage Vnk toward the voltage Vnn (initialization voltage VINI2, −1.5 V) to become the voltage Vnn.

Immediately after the start of the period PVH, the potential difference Vgs is 0 V, the potential difference Vds is 11 V, and the second transistor T2 is in the OFF state. In addition, the fifth transistor T5 is also in the OFF state. On the other hand, the fourth transistor T4 is in the ON state, and the voltage supplied to the second node N2 rises from the voltage Vnk toward the voltage Vnn. When the voltage supplied to the second node N2 is directed to the voltage Vnn, the potential difference Vgs exceeds the threshold voltage VTH. As a result, the second transistor T2 is turned ON, and the third node N3 gradually rises.

When the potential difference Vgs between the voltage supplied to the second node N2 and the voltage supplied to the third node N3 becomes the threshold voltage VTH, the voltage supplied to the second node N2 and the voltage supplied to the third node N3 maintain their respective voltages at that time. For example, as shown in FIG. 50, the voltage supplied to the second node N2 is the voltage Vnn, and the voltage supplied to the third node N3 is the voltage Vnm. In this case, the potential difference Vgs is 1 V, the potential difference Vds is 10.5 V, and the potential difference VTH is the same as the threshold voltage. That is, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). In addition, since the second transistor T2 is in the OFF state and no current flows from the drive power line PVDD to the reference voltage line PVSS, the light-emitting element OLED does not emit light.

In the period at the end of the period PVH, the first node N1 and the second node N2 are conductive, and the voltage supplied to the second node N2 rises due to the voltage Vnj supplied to the first node N1. The second transistor T2 is turned ON, and the voltage supplied to the third node N3 rises due to the current Ion. Due to the rise in the voltage supplied to the third node N3, the voltage supplied to the first node N1 and the voltage supplied to the second node N2 further rise toward the voltage Vna.

As described above, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the horizon period HRP of the KthFRAME, the voltage supplied to the first node N1 and the voltage supplied to the second node N2 gradually rise toward the voltage Vna to become the voltage Vna (7 V), and the voltage supplied to the third node N3 becomes the voltage Vnb (2.5 V). According to the rise in the voltage supplied to the third node N3, the voltage supplied to the first node N1 and the voltage supplied to the second node N2 gradually rise from the voltage Vnm. When the potential difference Vgs exceeds the threshold voltage VTH, the second transistor T2 is turned ON. As a result, the current Ion flows from the drive power line PVDD toward the reference voltage line PVSS, and white light is emitted by three pixels using the pixel 180F emitting red light, the pixel 180F emitting blue light, and the pixel 180F emitting green light.

[7-2-3. Third Example of Driving Method of Pixel Circuit 181F]

Figure 51:
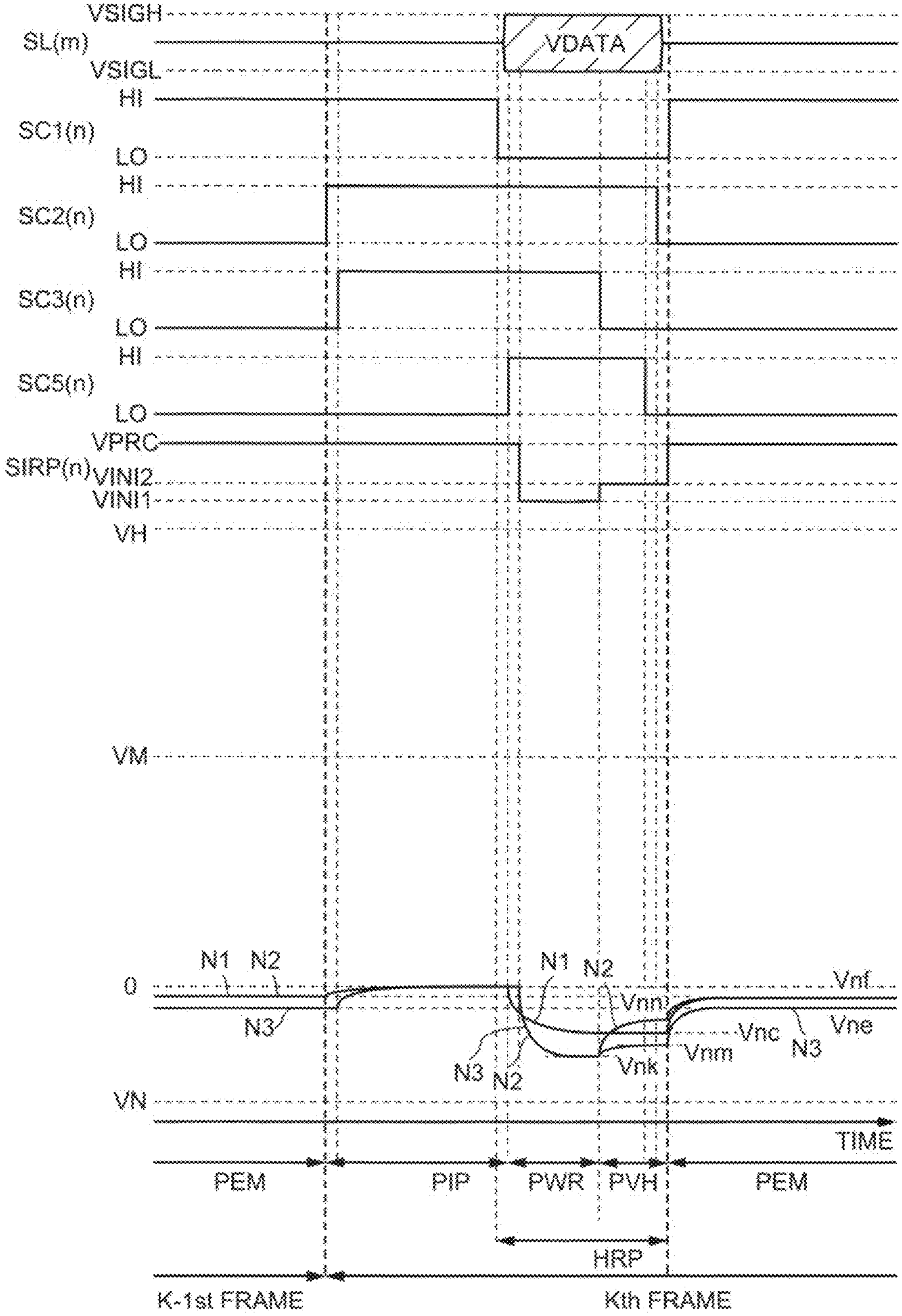
FIG. 51 is a timing chart of a display device according to the seventh embodiment of the present invention.

A third example of the driving method of the pixel circuit 181F will be described with reference to FIG. 51. The driving method shown in the third example of the driving method of the pixel circuit 181F includes displaying images of the same color (black) in consecutive frames similar to the third example of the driving method of the display device 10 according to the first embodiment. Configurations that are the same as or similar to those in FIG. 1 to FIG. 50 will be described as necessary.

The configurations of the first scan signal SC1(*n*) to the third scan signal SC3(*n*), the fifth scan signal SC5(*n*), the image data signal SL(m), and the scan voltage power supply SIRP(n) in the light emission period PEM of the K−1stFRAME to the light emission period PEM of the KthFRAME are similar to those described in "7-2-1. First Example of Driving Method of Pixel Circuit 181F". In addition, the operations of the transistors in the light-emitting period PEM of the K−1stFRAME to the light-emitting period PEM of the KthFRAME are similar to the configuration described in "7-2-1. First Example of Driving Method of Pixel Circuit 181F". Configurations and the like similar to those described in "7-2-1. First Example of Driving Method of Pixel Circuit 181F" will be described as necessary. In addition, the data signal VDATA including VSIGL (−2 V) corresponding to black is supplied to the image data signal SL(m) in the horizontal period HRP.

In the light emission period PEM of the K−1stFRAME, the voltage supplied to the first node N1 and the second node N2 is the voltage Vnf (−0.5 V), the voltage supplied to the third node N3 is the voltage Vne (−1 V), and the potential difference Vgs is 0.5 V. Therefore, the second transistor T2 is in the OFF state, and based on the potential difference Vgs and the potential difference Vds according to the voltage VSIGL (−2 V) input in the horizontal period HRP of the K−1stFRAME, the current Ion does not flow from the drive power line PVDD to the light-emitting element OLED and the reference voltage line PVSS. Therefore, the light-emitting element OLED does not emit light.

In the period PIP of the KthFRAME following the light emission period PEM of the K−1stFRAME, the voltage supplied to the first node N1 and the voltage supplied to the second node N2 gradually rise from the voltage Vnf toward the pre-charge voltage VPRC (0 V) and become 0 V, and the voltage supplied to the third node N3 gradually rises from the voltage Vne toward the pre-charge voltage VPRC (0 V) and becomes 0 V. Since the potential difference Vgs is 0 V and smaller than the threshold voltage VTH, the second transistor T2 is maintained in the OFF state. Therefore, since the drain current Ion does not flow from the drive power line PVDD to the initialization voltage power line SVI or the reference voltage line PVSS, the light-emitting element OLED does not emit light.

As described above, in the period PIP, the first node N1, the second node N2, and the third node N3 are in the state in which the intermediate potential is supplied by the pre-charge voltage VPRC (0 V). Therefore, in the period PIP, the pre-charge voltage (intermediate potential) is supplied to the first node N1, and the second node N2 and the third node N3 are initialized by the pre-charge voltage VPRC (0 V).

The voltages (potentials) of the first node N1, the second node N2, and the third node N3 in the period PWR of the horizontal period HRP of the KthFRAME to the light emission period PEM of the KthFRAME following the period PIP of the KthFRAME, the operations of the transistors, and the like are similar to those of the "7-2-1. First Example of Driving Method of Pixel Circuit 181F".

Therefore, in the period PWR, the data signal VDATA is written to the pixel 180F (pixel circuit 181F), and the voltage supplied to the second node N2 and the voltage supplied to the third node N3 become the initialization voltage VINI1 (−3 V).

Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Further, in the light emission period PEM of the KthFRAME, three pixels using the pixel 180F emitting red light, the pixel 180F emitting blue light, and the pixel 180F emitting green light become black.

[7-2-4. Fourth Example of Driving Method of Pixel Circuit 181F]

Figure 52:
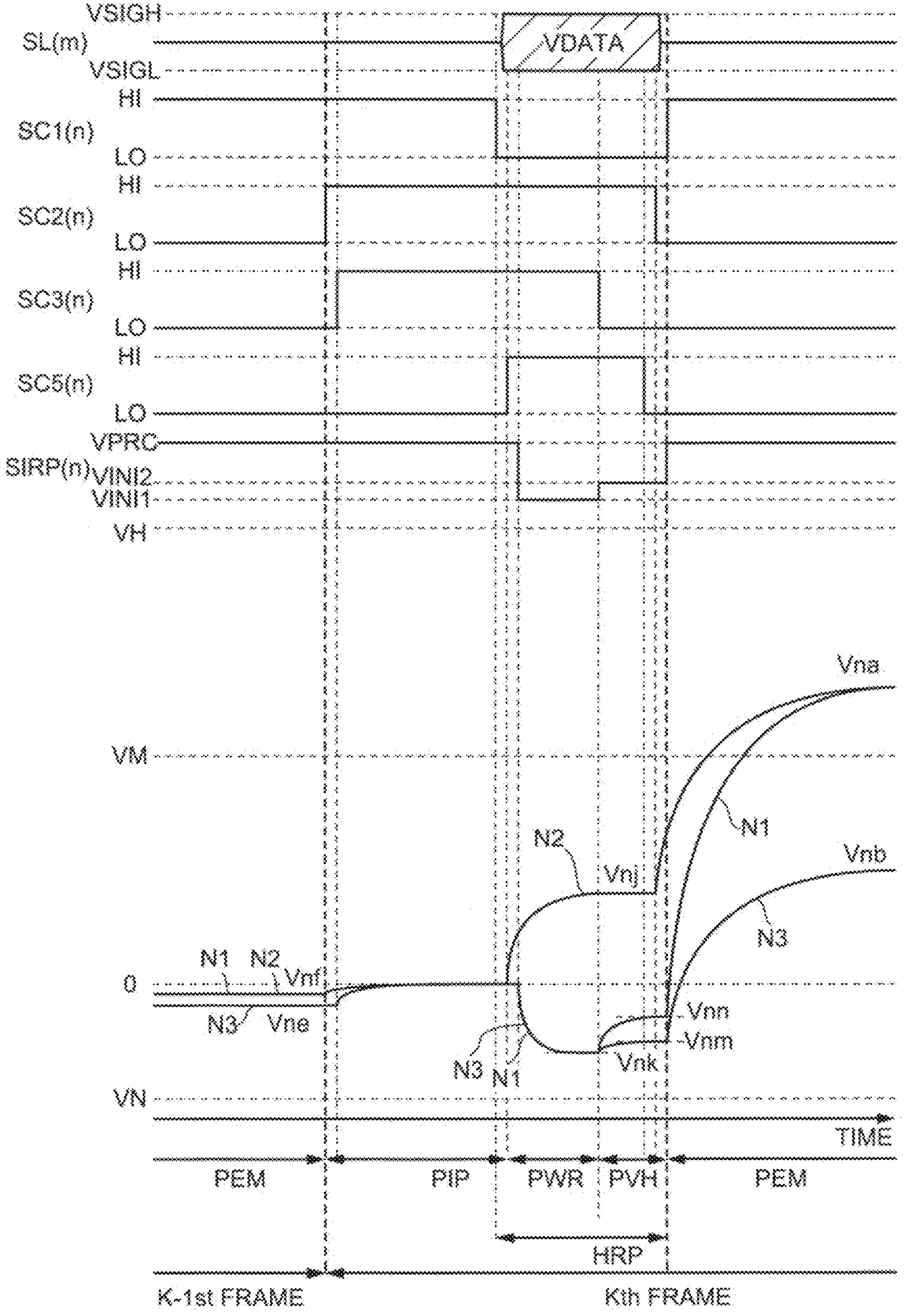
FIG. 52 is a timing chart of a display device according to the seventh embodiment of the present invention.

A fourth example of the driving method of the pixel circuit 181F will be described with reference to FIG. 52. The driving method shown in the fourth example of the driving method of the pixel circuit 181F includes displaying images of different colors in consecutive frames similar to the fourth example of the driving method of the display device 10 according to the first embodiment. Configurations that are the same as or similar to those in FIG. 1 to FIG. 51 will be described as necessary.

The configurations of the first scan signal SC1(*n*) to the third scan signal SC3(*n*), the fifth scan signal SC5(*n*), the image data signal SL(m), and the scan voltage power supply SIRP(n) in the light emission period PEM of the K−1stFRAME to the light emission period PEM of the KthFRAME are similar to those described in “7-2-1. First Example of Driving Method of Pixel Circuit 181F”. In addition, the voltages (potentials) of the nodes and the transistors in the light emission period PEM of the K−1stFRAME and the period PIP of the KthFRAME and the operations of the transistors are similar to those described in “7-2-3. Third Example of Driving Method of Pixel Circuit 181F”. Further, the voltages (potentials) of the nodes and the transistors in the period PWR of the KthFRAME to the light-emitting period PEM of the KthFRAME and the operations of the transistors are similar to those described in “7-2-2. Second Example of Driving Method of Pixel C181F”. Configurations and the like similar to those described in “7-2-1. First Example of Driving Method of Pixel Circuit 181F”, “7-2-2. Second Example of Driving Method of Pixel Circuit 181F”, and “7-2-3. Third Example of Driving Method of Pixel Circuit 181F” will be described as necessary. In addition, the data signal VDATA of the VSIGH (3.5 V) corresponding to white is supplied to the image data signal SL(m) in the horizontal period HRP.

In the light emission period PEM of the K−1stFRAME, the pixel 180F is black similar to “7-2-3. Third Example of Driving Method of Pixel Circuit 181F”

In the period PIP, similar to “7-2-3. Third Example of Driving Method of Pixel Circuit 181F”, the pre-charge voltage (intermediate potential) is supplied to the first node N1, and the second node N2 and the third node N3 are initialized by the pre-charge voltage VPRC (0 V).

In the period PWR, similar to “7-2-2. Second Example of Driving Method of the pixel circuit 181F”, the data signal VDATA (in the fourth example, the voltage VSIGH) is written to the pixel 180F (the pixel circuit 181F). In addition, the voltage supplied to the second node N2 and the voltage supplied to the third node N3 become the initialization voltage VINI1 (−3 V).

In the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Furthermore, in the light emission period PEM of the KthFRAME, similar to “7-2-2. Second Example of Driving Method of Pixel Circuit 181F”, white light is emitted by three pixels using the pixel 180F emitting red light, the pixel 180F emitting blue light, and the pixel 180F emitting green light.

Furthermore, each of the embodiments or part of each of the embodiments described above as an embodiment of the present invention can be appropriately combined and implemented as long as no contradiction is caused.

It is understood that, even if the effect is different from those provided by each of the above-described embodiments, the effect obvious from the description in the specification or easily predicted by persons ordinarily skilled in the art is apparently derived from the present invention.

What is claimed is:

1. A display device comprising:

an image data signal line supplied with a data voltage;

a power line supplied with a constant voltage;

a reference voltage power line supplied with a reference voltage;

an initialization voltage power line supplied with an initialization voltage;

a pre-charge voltage power line supplied with a pre-charge voltage;

a first transistor controlled by a first control signal, and electrically connected between the image data signal line and a first node;

a third transistor controlled by a second control signal different from the first control signal, electrically connected between the first node and a second node;

a second transistor including a gate electrode electrically connected to the second node, and electrically connected between the power line and a third node;

a fourth transistor controlled by a third control signal different from the first control signal and the second control signal, electrically connected between the reference voltage power line and the second node;

a fifth transistor controlled by a fourth control signal different from the first control signal, the second control signal, and the third control signal, and electrically connected between the initialization voltage power line and the third node;

a sixth transistor controlled by a fifth control signal different from the first control signal, the second control signal, the third control signal, and the fourth control signal, and electrically connected between the pre-charge voltage power line and the first node;

a light-emitting element electrically connected to the third node; and a capacitive element electrically connected between the first node and the third node.

2. The display device according to claim 1, further comprising a control circuit outputting the first control signal, the second control signal, the third control signal, the fourth control signal, and the fifth control signal, wherein the control circuit includes a first period and a second period after the first period, the control circuit is configured to control supplying a low-level voltage to the first control signal, turning the first transistor off, supplying a low-level voltage to the second control signal, turning the third transistor off, supplying a high-level voltage to the fifth control signal, turning the sixth transistor on, and supplying a pre-charge voltage to the first node, in the first period, and the control circuit is configured to control turning the first transistor on, supplying a low-level voltage to the second control signal, maintaining the third transistor in an OFF state, supplying a low-level voltage to the fifth control signal, turning the sixth transistor off, and controlling the first transistor to supply the data voltage to the first node, in the second period.

3. The display device according to claim 2, wherein the control circuit is configured to control, while supplying a high-level voltage to the first control signal, supplying a high-level voltage to the third control signal and a low-level voltage to the fourth control signal, causing the first transistor and the fourth transistor to maintain an ON state, and the sixth transistor to maintain an OFF state, and the control circuit is configured to control the first transistor to supply the data voltage to the first node, the fourth transistor to supply the initialization voltage to the second node, and the third node to hold a charge equivalent to a threshold voltage of the second transistor.

4. The display device according to claim 1, wherein the first transistor, the second transistor, the third transistor, the fourth transistor, the fifth transistor, and the sixth transistor are n-channel field effect transistors.

5. The display device according to claim 1, wherein a channel length of the second transistor is longer than a channel length of the first transistor, a channel length of the third transistor, a channel length of the fourth transistor, a channel length of the fifth transistor, and a channel length of the sixth transistor.

6. The display device according to claim 1, wherein a channel region of each of the first transistor, the second transistor, the third transistor, the fourth transistor, the fifth transistor, and the sixth transistor are comprised of an oxide semiconductor.

7. The display device according to claim 1, further comprising:

a first conductive layer; and a second conductive layer different from the first conductive layer, wherein the initialization voltage power line and the pre-charge voltage power line include the first conductive layer and the second conductive layer which are different from each other, the first conductive layer and the second conductive layer included in the initialization voltage power line overlap in a plan view, and the first conductive layer and the second conductive layer included in the pre-charge voltage power line overlap in a plan view.

8. The display device according to claim 1, wherein the gate electrode overlaps the capacitive element in a plan view.

* * * * *